US008274399B2

(12) United States Patent  
Strachan et al.

(10) Patent No.: US 8,274,399 B2
(45) Date of Patent: Sep. 25, 2012

(54) METHOD AND SYSTEM FOR PREDICTING PERFORMANCE OF A DRILLING SYSTEM HAVING MULTIPLE CUTTING STRUCTURES

(75) Inventors: Michael Strachan, Spring, TX (US); Martin Paulk, Houston, TX (US)

(73) Assignee: Halliburton Energy Services Inc., Houston, TX (US)

( * ) Notice: Subject to any disclaimer, the term of this patent is extended or adjusted under 35 U.S.C. 154(b) by 246 days.

(21) Appl. No.: 12/741,490

(22) PCT Filed: Nov. 30, 2007

(86) PCT No.: PCT/US2007/086148
§ 371 (c)(1),
(2), (4) Date: May 5, 2010

(87) PCT Pub. No.: WO2009/075667
PCT Pub. Date: Jun. 18, 2009

(65) Prior Publication Data
US 2010/0259415 A1 Oct. 14, 2010

(51) Int. Cl.
*G01V 3/00* (2006.01)
(52) U.S. Cl. .................. 340/853.6; 340/870.02
(58) Field of Classification Search ............ 340/853.6; 702/2, 9, 14; 703/1, 2, 6, 7, 10; 175/340, 175/341, 327, 57, 45, 61, 76, 40
See application file for complete search history.

(56) References Cited

U.S. PATENT DOCUMENTS
1,209,299 A 12/1916 Hughes
(Continued)

FOREIGN PATENT DOCUMENTS
DE 3207012 12/1983
(Continued)

OTHER PUBLICATIONS

Kelly, Jr., Joe "Use break-Even Analysis to Optimize Bit Runs", *World Oil*, (Nov. 1992),pp. 75, 76, 78, 79.

(Continued)

*Primary Examiner* — Joseph Lauture
(74) *Attorney, Agent, or Firm* — Howard L. Speight; Malcolm E. Whittaker

(57) ABSTRACT

A drilling system has multiple cutting structures, including a bit and one or more secondary cutting structures. A method balances the rate of penetration of the drilling system and the wear on the cutting structures by controlling weight on bit and RPM. The method includes calculating a predicted rate of penetration for the bit, using in the calculation the current predicted wear on the bit and the properties of the rock to be penetrated by the bit. The method includes calculating a predicted rate of penetration for at least one of the one or more secondary cutting structures, using in the calculation the current predicted wear on the secondary cutting structure and the properties of the rock to be penetrated by the secondary cutting structure. The method includes determining the slowest rate of penetration among those calculated for the bit and at least one the one or more secondary cutting structures. The method includes calculating the weight on bit and RPM for each of the bit and at least one of the one or more secondary cutting structures to substantially match the determined slowest rate of penetration. The method includes summing the calculated weights on bit to calculate a goal weight on bit for the drilling system and setting a goal RPM for a rotary portion of the drilling system to the slowest RPM calculated for the cutting structures that rotate at substantially the speed of the rotary portion of the drilling system.

22 Claims, 31 Drawing Sheets

U.S. PATENT DOCUMENTS

| | | | |
|---|---|---|---|
| 1,263,802 A | 4/1918 | Reed | |
| 1,394,769 A | 10/1921 | Sorenson | |
| 3,593,807 A | 7/1971 | Klima | |
| 3,660,649 A | 5/1972 | Gilchrist et al. | |
| 3,752,966 A | 8/1973 | Foy, Jr. et al. | |
| 3,761,701 A | 9/1973 | Wilder et al. | |
| 3,971,449 A | 7/1976 | Nylund et al. | |
| 4,056,153 A | 11/1977 | Miglierini | |
| 4,064,749 A | 12/1977 | Pittman et al. | |
| 4,096,385 A | 6/1978 | Marett | |
| 4,195,699 A | 4/1980 | Rogers et al. | |
| 4,354,233 A | 10/1982 | Zhokovsky et al. | |
| 4,407,017 A | 9/1983 | Zhilikov et al. | |
| 4,479,176 A | 10/1984 | Grimshaw et al. | |
| 4,617,825 A | 10/1986 | Ruhovets | |
| 4,627,276 A | 12/1986 | Burgess et al. | |
| 4,646,240 A | 2/1987 | Serra et al. | |
| 4,685,329 A | 8/1987 | Burgess | |
| 4,694,686 A | 9/1987 | Fildes et al. | |
| 4,718,011 A | 1/1988 | Patterson, Jr. | |
| 4,733,733 A | 3/1988 | Bradley et al. | |
| 4,793,421 A | 12/1988 | Jasinski | |
| 4,794,534 A | 12/1988 | Millheim | |
| 4,794,535 A | 12/1988 | Gray et al. | |
| 4,845,628 A | 7/1989 | Gray et al. | |
| 4,852,399 A | 8/1989 | Falconer | |
| 4,875,530 A | 10/1989 | Frink et al. | |
| 4,876,886 A | 10/1989 | Bible et al. | |
| 4,886,129 A | 12/1989 | Bourdon | |
| 4,903,527 A | 2/1990 | Herron | |
| 4,914,591 A | 4/1990 | Warren et al. | |
| 4,916,616 A | 4/1990 | Freedman et al. | |
| 4,926,686 A | 5/1990 | Fay | |
| 4,926,950 A | 5/1990 | Zijsling | |
| 4,928,521 A | 5/1990 | Jardine | |
| 4,981,037 A | 1/1991 | Holbrook et al. | |
| 5,010,789 A | 4/1991 | Brett et al. | |
| 5,012,674 A | 5/1991 | Millheim et al. | |
| 5,042,596 A | 8/1991 | Brett et al. | |
| 5,205,164 A | 4/1993 | Steiger et al. | |
| 5,216,612 A | 6/1993 | Cornett et al. | |
| 5,216,917 A | 6/1993 | Detournay | |
| 5,239,467 A | 8/1993 | Kelly et al. | |
| 5,251,286 A | 10/1993 | Wiener et al. | |
| 5,282,384 A | 2/1994 | Holbrook | |
| 5,305,836 A | 4/1994 | Holbrook et al. | |
| 5,318,136 A | 6/1994 | Rowsell et al. | |
| 5,330,016 A | 7/1994 | Paske et al. | |
| 5,334,833 A | 8/1994 | Case et al. | |
| 5,369,570 A | 11/1994 | Parad | |
| 5,415,030 A | 5/1995 | Jogi et al. | |
| 5,416,697 A | 5/1995 | Goodman | |
| 5,442,950 A | 8/1995 | Unalmiser et al. | |
| 5,449,047 A | 9/1995 | Schivley, Jr. | |
| 5,458,207 A | 10/1995 | Mattero | |
| 5,461,562 A | 10/1995 | Tabanou et al. | |
| 5,474,142 A | 12/1995 | Bowden | |
| 5,539,704 A | 7/1996 | Doyen et al. | |
| 5,608,162 A | 3/1997 | Ho | |
| 5,660,239 A | 8/1997 | Mueller | |
| 5,671,818 A | 9/1997 | Newton et al. | |
| 5,704,436 A | 1/1998 | Smith et al. | |
| 5,767,399 A | 6/1998 | Smith et al. | |
| 5,794,720 A | 8/1998 | Smith et al. | |
| 5,845,258 A | 12/1998 | Kennedy | |
| 5,862,513 A | 1/1999 | Mezzatesta et al. | |
| 5,963,910 A | 10/1999 | Ulwick | |
| 5,965,810 A | 10/1999 | Holbrook | |
| 5,967,246 A | 10/1999 | Caraway et al. | |
| 6,021,859 A | 2/2000 | Tibbitts et al. | |
| 6,026,912 A | 2/2000 | King et al. | |
| 6,044,327 A | 3/2000 | Goldman | |
| 6,052,649 A | 4/2000 | Goldman et al. | |
| 6,109,368 A | 8/2000 | Goldman et al. | |
| 6,131,673 A | 10/2000 | Goldman | |
| 6,155,357 A | 12/2000 | King et al. | |
| 6,169,967 B1 | 1/2001 | Dahlem et al. | |
| 6,233,498 B1 | 5/2001 | King et al. | |
| 6,276,465 B1 | 8/2001 | Cooley et al. | |
| 6,349,595 B1 | 2/2002 | Civolani et al. | |
| 6,352,107 B1 | 3/2002 | Bennett et al. | |
| 6,374,926 B1 | 4/2002 | Goldman et al. | |
| 6,389,360 B1 | 5/2002 | Alft et al. | |
| 6,408,953 B1 | 6/2002 | Goldman et al. | |
| 6,424,919 B1 | 7/2002 | Moran et al. | |
| 6,439,304 B2 | 8/2002 | Eaton | |
| 6,516,293 B1 | 2/2003 | Huang et al. | |
| 6,562,401 B2 | 5/2003 | Eaton | |
| 6,612,382 B2 | 9/2003 | King | |
| 6,732,052 B2 | 5/2004 | Macdonald et al. | |
| 6,785,641 B1 | 8/2004 | Huang | |
| 6,879,947 B1 | 4/2005 | Glass | |
| 6,885,943 B2 | 4/2005 | Bittar et al. | |
| 7,003,439 B2 | 2/2006 | Aldred et al. | |
| 7,032,689 B2 | 4/2006 | Goldman et al. | |
| 7,035,778 B2 | 4/2006 | Goldman et al. | |
| 7,085,696 B2 | 8/2006 | King | |
| 7,172,037 B2 | 2/2007 | Dashevskiy et al. | |
| 7,182,161 B2 | 2/2007 | Swietlik | |
| 7,261,167 B2 | 8/2007 | Goldman et al. | |
| 7,308,957 B2 | 12/2007 | Cariveau et al. | |
| 7,357,196 B2 | 4/2008 | Goldman et al. | |
| 7,412,331 B2 | 8/2008 | Calhoun et al. | |
| 7,555,414 B2 | 6/2009 | Calhoun et al. | |
| 7,778,777 B2 * | 8/2010 | Chen | 702/2 |
| 2004/0059554 A1 | 3/2004 | Goldman et al. | |
| 2004/0256152 A1 | 12/2004 | Dashevskiy et al. | |
| 2005/0149306 A1 | 7/2005 | King | |
| 2005/0267719 A1 | 12/2005 | Foucault | |
| 2006/0157279 A1 | 7/2006 | Cariveau et al. | |
| 2009/0006058 A1 | 1/2009 | King | |

FOREIGN PATENT DOCUMENTS

| | | |
|---|---|---|
| EP | 0384734 | 8/1990 |
| EP | 0466255 | 1/1992 |
| GB | 2241266 | 8/1991 |
| GB | 2265923 | 10/1993 |
| GB | 2328467 | 2/1999 |
| GB | 2328966 | 3/1999 |
| GB | 2332227 | 6/1999 |
| GB | 2343905 | 5/2000 |
| GB | 2354852 | 4/2001 |
| GB | 2360304 | 9/2001 |
| GB | 2363144 | 12/2001 |
| GB | 2363145 | 12/2001 |
| GB | 2363146 | 12/2001 |
| GB | 2364083 | 1/2002 |
| GB | 2365899 | 2/2002 |
| GB | 2370059 | 6/2002 |
| GB | 2370060 | 6/2002 |
| GB | 2371321 | 7/2002 |
| GB | 2371366 | 7/2002 |
| GB | 2378017 B | 3/2005 |
| GB | 2403743 | 8/2006 |
| RU | 1795220 | 2/1993 |
| RU | 1796769 | 2/1993 |
| RU | 1231946 | 11/1995 |
| SU | 470593 | 8/1975 |
| SU | 479866 | 8/1975 |
| SU | 726295 | 4/1980 |
| SU | 983258 | 12/1982 |
| SU | 1479630 | 5/1989 |
| SU | 1654515 | 6/1991 |
| SU | 1691497 | 11/1991 |
| SU | 1716112 | 2/1992 |
| WO | WO-91/14214 | 9/1991 |
| WO | WO-96/03568 | 2/1996 |
| WO | WO-00/12859 | 3/2000 |
| WO | WO-00/12860 | 3/2000 |
| WO | WO-01/25595 | 4/2001 |
| WO | WO-01/25597 | 4/2001 |
| WO | WO-02/50571 | 6/2002 |
| WO | WO-2005/017943 | 12/2005 |
| WO | WO-2006/024865 | 3/2006 |
| WO | WO-2005/044742 | 6/2006 |

OTHER PUBLICATIONS

"European Search Report for EP03021140.3", (Feb. 4, 2004),6 pages.
Scott, Dr. Alan J., "Online Animations of Time Evolving Physical Systems", Department of Physics. University of Wisconsin-Stout,(May 4, 2004),12 pages.
"Brochure entitled: "Twist & Shout"", Smith International, Inc.,(Jun. 2004),4 pages.
"Security DBS, Design at the Customer Interface", brochure,(1997).
Foucault, Hubert et al., "An Integrated Drilling Optimazation for Faster and Higher Improvements in Oseberg South", *Halliburton Energy Services; Hydro*, Bergen, Norway,(Apr. 2003),8 pages.
Steklyanov, A. V., et al., "Improving the Effectiveness of Drilling Tools", *KhM-3 Oil Industry Machine Building*, Moscow,(1991),pp. 1-35.
"Memorandum Opinion of Judge Davis signed Feb. 13, 2004, in the United States District Court for the Eastern District of Texas, Sherman Division", Civil Action No. 4-02CV269, *Haliburton Energy Services, Inc. Inc. v. Smith International, Inc.*,(Feb. 19, 2004),37 pages including fax sheet.
"French Preliminary Report for application No. FR 0203948", (Nov. 21, 2003), 4 pages.
"Oasis", *Baker Hughes OASIS Performance Improvement*, Oasis Engineering and Consulting Services,(2001),10 pages.
"Great Britain Search Report for GB Application No. 0408697.1", (Oct. 19, 2004),3 pages.
"French Preliminary Report for application No. FR 0503786", (Jun. 29, 2006), 2 pages.
Dekun, MA et al., "The Operation Mechanics of the Rock Bit", *Petroleum Industry Press*, (1996), pp. 1-238.
Intellectual Property Office, Patents Directorate, Concept House, Cardiff Road, Newport, South Wales, NP10 8QQ, "Patents Act 1977: Examination Report under section 18(3)," for Application No. GB1010495.8, which claims priority from International Application No. PCT/US2007/086148.
Intellectual Property Office, Patents Directorate, Concept House, Cardiff Road, Newport, South Wales, NP10 8QQ, Claims accompanying "Patents Act 1977: Examination Report under section 18(3)," for Application No. GB1010495.8, which claims priority from International Application No. PCT/US2007/086148.
"Drilling Mud", *The University of Texas at Austin*, Revised edition, Part of Rotary Drilling Series,(1968),1-73.
"Dutch Search Report for NL Application No. 1020253", (Nov. 14, 2003),10 pages.
"Making Hole", *The University of Texas at Austin*, Part of Rotary Drilling Series,(1968),1-1 through 1-55.
"Schlumberger Log Interpretation Principles/Applications", Schlumberger Wireline & Testing,(1991),13-1 through 13-19.
Barragan, R. V., et al., "Optimization of Multiple Bit Runs", *SPE/IADC 37644*, Amsterdam, The Netherlands,(Mar. 1997),pp. 579-589.
Bassiouni, Z. "Theory, Measurement, and Interpretation of Well Logs", Richardson, Texas,(1994),23 pages.
Bentson, H. G., "Rock Bit Design, Selection and Evaluation", *Presented at the spring meeting of the Pacific Coast District, American Petroleum Institute, Division of Production*, Los Angeles, CA,(May 1956),pp. 288-322.
Booth, J. et al., "Meeting Future Drilling Planning and Decision Support Requirements: A New Drilling Simulator", *SPE/IADC 67816*, Amsterdam, The Netherlands,(Feb. 2001),13 pages.
Bourgoyne Jr, Adam T., et al., "Applied Drilling Engineering", *Society of Petroleum Engineers Textbook Series*, Richardson, Texas,(1991),190-245.
Bratli, R. K., et al., "Drilling Optimization Software Verified in the North Sea", *SPE 39007*, Rio de Janeiro, Brazil,(Aug. 1997),7 pages.
Burgess, T. M., et al., "Measuring the Wear of Milled Tooth Bits Using MWD Torque and Weight-On-Bit", *SPE/IADC 13475*, New Orleans, Louisiana,(Mar. 1985),pp. 453-458 plus 4 pp. of illustrations.
Burke, J. A., et al., "Computer Processing of Log Data Improves Production in Chaveroo Field", *Journal of Petroleum Technology*, (Jul. 1967),pp. 889-895.

Chambers, Robert et al., "Drilling Man's Guide to Better Bit Selection", *Petroleum Engineer International*, (Jun. 1982),pp. 100-108.
Chin, Wilson C., "Wave Propagation in Petroleum Engineering", *Gulf Publishing Company*, (1994), pp. 119-277.
Crain, E. R., *The Log Analysis Handbook, vol. One: Quantative Log Analysis Methods*, PennWell, Tulsa, OK, (1986), pp. 562-593.
De Castro, F.J.N. et al., "Evaluation of Drill Bit Performance Taking into Account the In Situ State of Stress", *SPE 39006*, Rio de Janeiro, Brazil,(Aug. 1997),pp. 1-8.
Dekun, MA et al., "Computer Simulation of the Interaction between Roller Bit and Rock", *SPE 29922*, Proceedings of the International Meeting on Petroleum Engineering, Part 1 of 2; vol. 1; XP002266077, Beijing, PR China,(Nov. 1995),pp. 309-317.
Detournay, E. et al., "A Phenomenological Model for the Drilling Action of Drag Bits", *International Journal of Rock Mechanics, Mineral Sciences and Geomechanical Abstracts*, vol. 29 No. 1, Pergamon Press, Great Britain,(1992),pp. 13-23.
Doveton, J. D., et al., "Fast Matrix Methods for the Lithological Interpretation of Geophysical Logs", *The American Association of Petroleum Geologists*, Tulsa, Oklahoma,(Jul. 1978),47-64.
Doveton, John D., "Geologic Log Analysis Using Computer Methods", *AAGP Computer Applications in Geology*, No. 2, (1994),30 pages.
Dykstra, et al., "Experimental Evaluations of Drill String Dynamics", *SPE 28323*, New Orleans, LA,(Sep. 1994),pp. 319-334.
Efendiyev, G. M., et al., "The Optimum Decision in Cutting-Type Drilling Bits Selection with Regard to Their Operating Conditions and the Vagueness of the Task Posed", *Energy Sources*, vol. 13, (1991),pp. 243-250.
Estes, J. C., "Selecting the Proper Rotary Rock Bit", *Journal of Petroleum Technology*, (Nov. 1971),pp. 1359-1367.
Estes, Jack C., "Guidelines for Selecting Rotary Insert Rock Bit", *Petroleum Engineer*, (Sep. 1974),pp. 30-34.
Fabian, Robert T., "In Situ Compressive Strength Analysis as an Aid in Fixed Cutter Bit Selection and Performance", *ASME International*, (1997),pp. 86-94.
Falcao, J. L., et al., "PDC Bit Selection through Cost Prediction Estimates Using Crossplots and Sonic Log Data", *SPE/IADC 25733*, Amsterdam,(Feb. 1993),pp. 525-535.
Fassihi, M. R., et al., "Risk Management for the Development of an Offshore Prospect", *SPE 52975*, XP-002261289, Dallas, TX,(Mar. 1999),pp. 1-6.
Galle, E. M., et al., "Best Constant Weight and Rotary Speed for Rotary Rock Bits", *API Drilling and Production Practice*, (1963),pp. 48-73.
Gault, Allen D., "Measurement of Drilling Properties", *SPE Drilling Engineering*, published New Orleans, Louisiana, Mar. 1985 (SPE 13444),(Jun. 1987),pp. 143-148.
Gjelstad, G. et al., "The Method of Reducing Drilling Costs More Than 50 Percent", *SPE/ISRM 47342*, Trondheim, Norway,(Jul. 1998),pp. 161-167.
Glover, et al., "New Advances and Applications of Combining Simulation and Optimization", *Proc. Winter Simulation Conference*, (Dec. 1996),pp. 144-152.
Glowka, David A., "Use of Single-Cutter Data in the Analysis of PDC Bit Designs: Part I—Development of a PDC Cutting Force Model", *JPT*, (Aug. 1989),pp. 797-849.
Glowka, David A., "Use of Single-Cutter Data in the Analysis of PDC Bit Designs: Part II—Development and use of the PDCWEAR Computer Code", *JPT*, SPE 19309,(Aug. 1989),pp. 850-859.
Hameed, A. et al., "Deep Wells Bit Optimization", *SPE/IADC 39269*, Bahrain,(Nov. 1997),pp. 197-203.
Hancke, et al., "A Control System for Optimizing Deep Hole Drilling Conditions", *Proc. IECON Inter. Conf. on Industrial Electronics, Control and Instrument*, vol. 3, (Nov. 1991),pp. 2279-2284.
Hareland, Geir et al., "Use of Drilling Parameters to Predict In-Situ Stress Bounds", *SPE/IADC 25727*, Amsterdam, Netherlands,(Feb. 1993),pp. 457-471.
Harris, Martin H., et al., "A Computer-Oriented Generalized Porosity-Lithology Interpretation of Neutron, Density and Sonic Log", (Feb. 1971),10 pages.

Hill, J.R.M. et al., "Intelligent Drilling System for Geological Sensing", *Proc. of the 1993 IEEE/RSJ Int. Conf. on Intelligent Robots and Systems*, vol. 1, Yokohama, Japan,(Jul. 1993),pp. 495-501.

Hill, Tom H., et al., "Drilling Optimization: Practice makes perfect", *World Oil* vol. 220, No. 4, XP-000831749, (Apr. 1999),pp. 63-64, 66, and 68.

Holbrook, Philip et al., "Petrophysical-Mechanical Math Model Real-Time Wellsite Poor Pressure/Fracture Gradient Prediction", *SPE 16666*, Dallas, Texas,(Sep. 1987),pp. 163-171.

Jackson, R. A., "Cost/Foot: Key to Economic Selection of Rock Bits", *World Oil*, (Jun. 1972),pp. 83-85.

Kadaster, Ali G., et al., "Drilling Time Analysis-A TQM Tool for Drilling in the '90s", *Petroleum Engineer International* vol. 65, No. 65, No. 2, XP 000349995, (Feb. 1993),pp. 31-32, 35-37.

Kenner, J. V., et al., "Dynamic Analysis Reveals Stability of Roller Cone Rock Bits", *SPE 28314*, New Orleans, LA,(Sep. 1994),14 pages.

Mason, Kenneth L., "Three-Cone Bit Selection With Sonic Logs", *SPE 13256, SPE Drilling Engineering*, first published Sep. 1984 in Houston, Texas,(Jun. 1987),pp. 135-142.

Millheim, K. K., "The Role of the Simulator in Drilling Operations", *SPE Drilling Engineering*, (Oct. 1986),347-357.

Milner, G. M., et al., "Data Processing and Interpretation While Drilling", *AADE National Drilling Technical Conference*, Houston, TX,(Mar. 2001),14 pages.

Murphy, Don "Selecting the Right Rotary Bit is the Place to Smart Cutting Costs", *The Oil & Gas Journal*, (Feb. 3, 1969),pp. 88-92.

Novig, T. "Factors Affecting Rock Bit Selection", *Oil Gas European Magazine*, (Apr. 1989),pp. 25-31.

O'Hare, Jim et al., "Design Index: A Systematic Method of PDC Drill-Bit Selection", *IADC/SPE 59112*, New Orleans, LA,(Feb. 2000),15 pages.

Onyia, E. C., "Relationships between Formation Strength, Drilling Strength, and Electric Log Properties", *SPE Drilling Engineering*, SPE 18166,(Oct. 1988),pp. 605-618.

Pallister, I. C., et al., "Asset Optimization Using Multiple Realizations and Streamline Simulation", *SPE 59460*, Yokahama, Japan,(Apr. 2000),11 pages.

Perrin, V. P., et al., "Drilling Index—A New Approach to Bit Performance Evaluation", *SPE/IADC 37595*, Amsterdam, The Netherlands,(Mar. 1997),pp. 199-205.

Pessier, R. C., et al., "Different Shales Dictate Fundamentally Different Strategies in Hydraulics, Bit Selection, and Operating Practices", *SPE 28322*, New Orleans, LA,(Sep. 1994),pp. 307-318.

Pessier, R. C., et al., "Quantifying Common Drilling Problems With Mechanical Specific Energy and a Bit-Specific Coefficient of Sliding Friction", *SPE 24584*, Washington, D.C.,(Oct. 1982),pp. 373-388.

Prammer, M. G., et al., "Measurements of Clay-Bound Water and Total Porosity by Magnetic Resonance Logging", *SPE 36522*, Denver, CO,(Oct. 1996),pp. 311-320.

Preece, Alun et al., "Better Knowledge Management through Knowledge Engineering", *IEEE Intelligent Systems*, 1094-7167/01,(Jan./Feb. 2001),pp. 36-43.

Rampersad, P. R., et al., "Drilling Optimization Using Drilling Data and Available Technology", *SPE 27034*, Buenos Aires, Argentina,(Apr. 1994).

Reynolds, W. W., "Economic Analysis of Drilling Plans and Contractors by Use of a Drilling Systems Approach", *Journal of Petroleum Technology*, XP-002261288; published in Mar. 1985 (SPE 13466),(Jul. 1986),pp. 787-793.

Rider, Malcom "The Geological Intrepretation of Wells Logs", *Second Edition*, Gulf Publishing, Houston, Texas,(1996),151-168, 226-238.

Sheppard, M. C., et al., "The Forces at the Teeth of a Drilling Rollercone Bit: Theory and Experiment", *Proceedings: 1988 SPE Annual Tehnical Conference and Exhibition*; vol. Delta, XP002266080 (SPE 18042),(Oct. 2, 1988),pp. 253-260.

Sikarskie, et al., "Penetration Problems in Rock Mechanics", American Society of Mechanical Engineers, Rock Mechanics Symposium,(1973),pp. 41-71.

Simpson, Sr., Michael A., "Hand-Held Calculator Program Helps Optimize Drilling", *World Oil*, (Apr. 1984),pp. 97-101.

Smith, Lee et al., "Successful Field Application of an Electro-Negative 'Coating' to Reduce Bit Balling Tendencies in Water Based Mud", *IADC/SPE 35110*, New Orleans, LA,(Mar. 1996),pp. 547-557.

Soemodihardjo, W. et al., "Application of an Expert System to Rotary Drilling Bit Selection", *1st Victorian Dep. of Manufacturing Ind. Dev.*, (Nov. 1991),pp. II-17 through II-40.

Sparr, J. R., et al., "Formation Compressive Strength Estimates for Predicting Drillability and PDC Bit Selection", *SPE/IADC 29397*, Amsterdam, Netherlands,(Mar. 1995), pp. 569-578.

Teale, R. "The Concept of Specific Energy in Rock Drilling", *International Journal of Rock Mechanics, Mining Sciences*, vol. 2, Pergamon Press, Great Britain,(1965),pp. 57-73.

Warren, T. M., "Factors Affecting Torque for a Roller Cone Bit", *Journal of Petroleum Technology*, vol. 36, No. 10, XP002266079,(Sep. 1984),pp. 1500-1508.

Word, Howell et al., "Drilling Parameters and the Journal Bearing Carbide Bit", *Drilling—DCW*, first published Oct. 1979 in Tulsa, Oklahoma,(Jan. 1980),pp. 92-93.

Xu, H. et al., "A Method for Bit Selection by Modelling ROP and Bit-Life", *The Petroleum Society, Paper 97-78*, Calgary, Alberta, Canada,(Jun. 1997),pp. 1-8.

Xu, H. et al., "Evaluation of Bit Performance Using an Advanced Drilling-Test-System", *IADC/SPE 47809*, Jakarta, Indonesia,(Sep. 1998),pp. 247-252.

Ziaja, M. B., et al., "Lithology Diagnosis Based on the Measurements of Drilling Forces and Moments at the Bit", *IADC/SPE 47799*, Jakarta, Indonesia,(Sep. 1998),pp. 185-194.

Bilgesu, H. I., et al., "A New Approach to Predict Life Based on Tooth or Bearing Failures", *SPE 51082*, Pittsburgh, PA,(Nov. 1998),pp. 253-257.

Oort, Eric V., "Physico-Chemical Stabilization of Shales", *SPE 37623*, Houston, TX,(Feb. 1997),pp. 523-538.

"Advanced Bit Engineering, Selection Lowers Drilling Cost", *Petroleum Engineer* No. 9, vol. 65, (Sep. 1993),14 pages.

Tiwari, Shrikant "Dull Bit Grading and Rock Strength Analysis Key to Bit Selection", *Oil & Gas Journal*, (Dec. 5, 1994),pp. 45-48;51.

Koskie, E. T., et al., "Monitoring MWD Torque Improved PDC Bit Penetration Rates", *World Oil*, (Oct. 1988),pp. 61,62,65,67.

Nguyen, J. P., "Oil and Gas Field Development Techniques: Drilling", Editions Technip, Paris (Translation 1996 from French original 1993),(1996),pp. 1-112;195-209.

Dewan, John T., "Essentials of Modern Open-Hole Log Intrepretation", PennWell Publishing Company, Tulsa, OK,(1983),pp. 227-266.

Bigelow, Ed L., "Introduction to Wireline Log Analysis", Baker Hughes,(2002),pp. 185-231.

Intellectual Property Office, Patents Directorate, Concept House, Cardiff Road, Newport, South Wales, Examination Report under Section 18(3), Apr. 16, 2012.

\* cited by examiner $T_f$ = FRICTIONAL TORQUE
$T_c$ = CUTTING TORQUE
$T_{oper} = T_c + T_f$

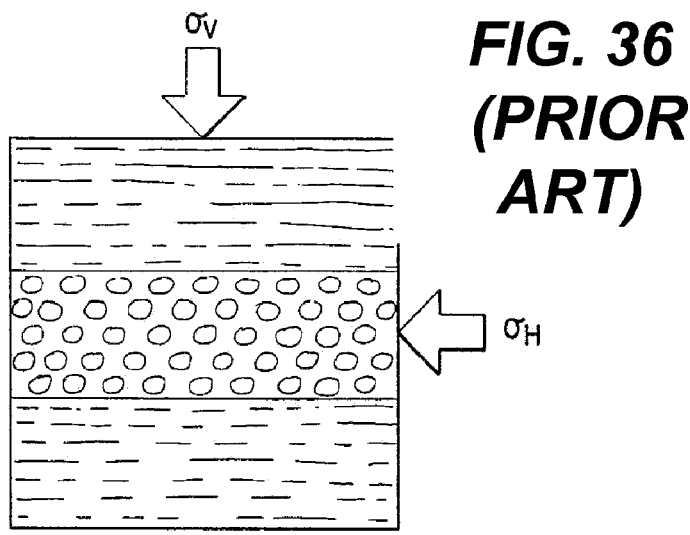
FIG. 36 (PRIOR ART)
FIG. 37 (PRIOR ART)
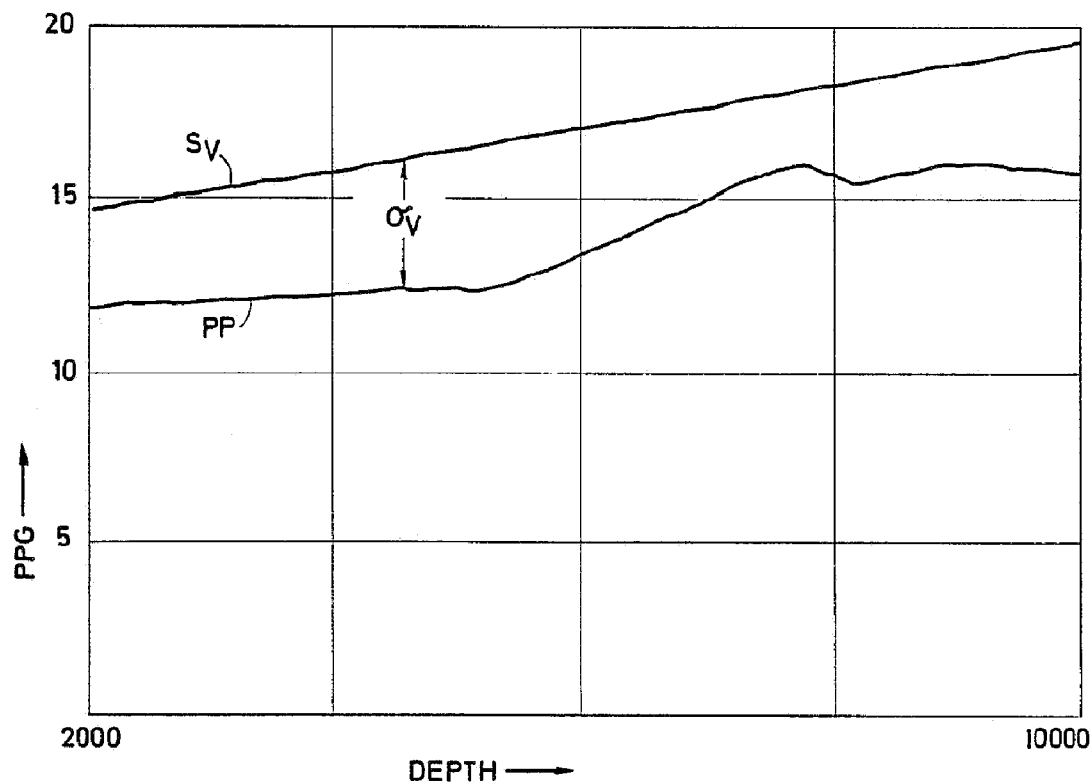

METHOD AND SYSTEM FOR PREDICTING PERFORMANCE OF A DRILLING SYSTEM HAVING MULTIPLE CUTTING STRUCTURES

BACKGROUND

It is useful to predict the characteristics of the formation or formations ahead of a bit when drilling an oil well. Such predictions allow the operator of the drilling equipment to select the bit that will best penetrate the formation or formations.

Some drilling systems include multiple cutting structures, including the bit at the end of the drill string and intermediate cutting structures, such as reamers, above the bit on the drill string. In those cases, it is possible for the intermediate cutting structures to be drilling through rock with properties that are dissimilar to the properties of the rock that the bit at the end of the drill string is cutting through.

BRIEF DESCRIPTION OF THE DRAWINGS

FIG. 36 is a diagrammatic representation of the determination of horizontal effective stress.

FIG. 37 is a graphical representation of the determination of pore pressure and fracture pressure.

DETAILED DESCRIPTION

Figure 1:
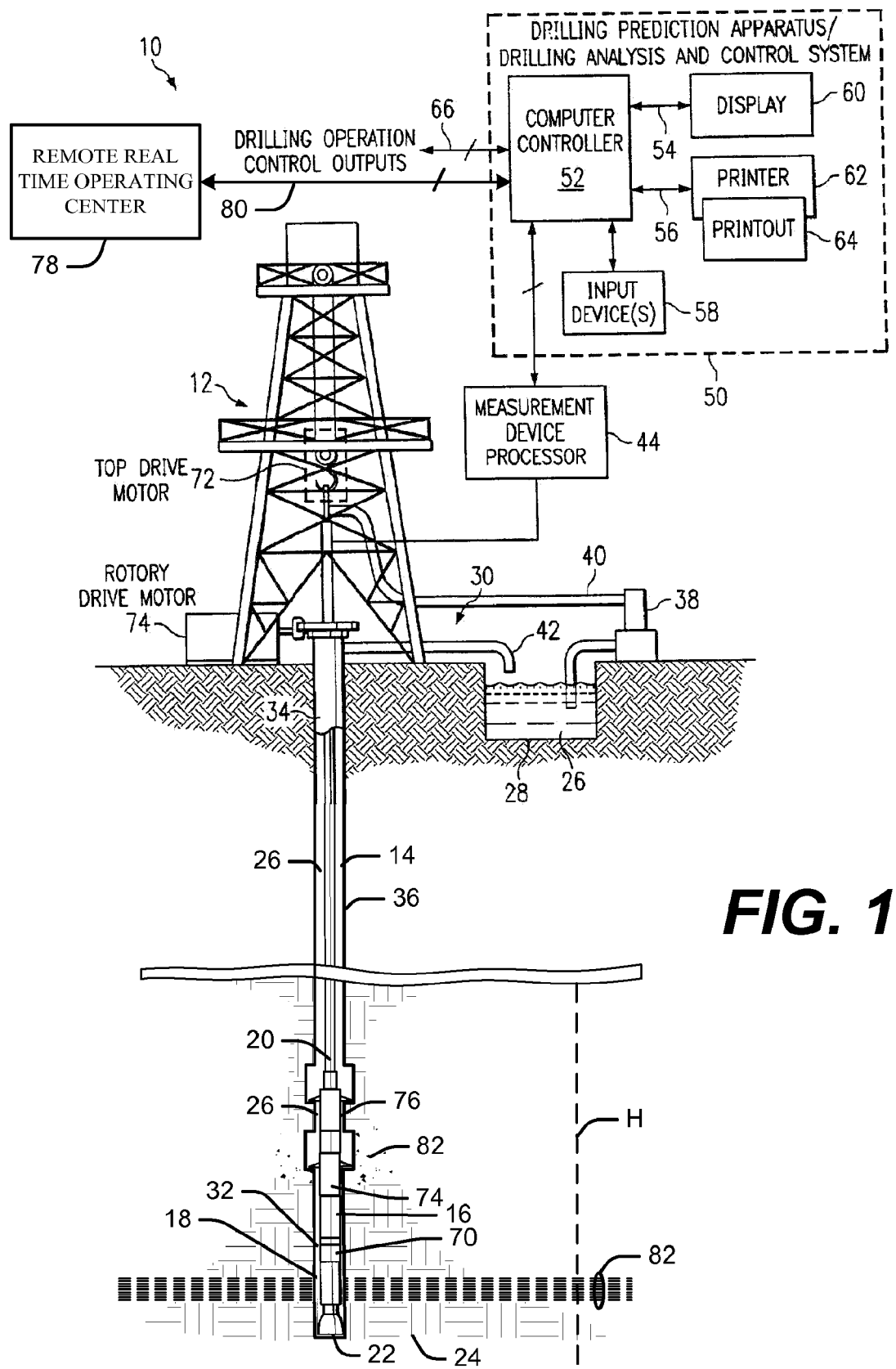
FIG. 1 illustrates one embodiment of a drilling system including an apparatus for predicting the performance of the drilling system having multiple cutting structures.

Referring now to FIG. 1, one embodiment of a drilling system 10 includes a drilling rig 12 disposed atop a borehole 14. In one embodiment, a logging tool 16 is carried by a sub 18, typically a drill collar, incorporated into a drill string 20 and disposed within the borehole 14. In one embodiment, a drill bit 22 is located at the lower end of the drill string 20 and carves a borehole 14 through the earth formations 24. The drill bit 22 may be one or more bits. In one embodiment, one or more secondary cutting structures 74, 76 increase the size of the borehole 14 in selected intervals. In one embodiment, the secondary cutting structures 74, 76 include reamers, such as the Near Bit Reamer or the UnderReamer available from Halliburton. In the example shown in FIG. 1, the rock 82 that secondary cutting structure 74 is cutting through may have different properties than those the rock that the bit 22 is cutting through. The properties of the rock 82 may be known in advance of the secondary cutting structures 74, 76 arriving at the rock 82 because the bit 22 has already cut through rock 82. The properties of the rock ahead of the bit 22 are known only to the extent that the rock has been encountered in other wells and the location of the rock boundary has been correctly predicted. The wear on the cutting structures 22, 74, 76 is predicted, using the techniques discussed below, rather than known.

In one embodiment, drilling fluid (mud) 26 is pumped from a storage reservoir pit 28 near the wellhead 30, down an axial passageway (not illustrated) through the drill string 20, out of apertures in the bit 22 and back to the surface through the annular region 32. The secondary cutting structures 74, 76 may also have apertures similar to those in the bit 22. In one embodiment, metal casing 34 is positioned in the borehole 14 above the drill bit 22 for maintaining the integrity of an upper portion of the borehole 14.

In the embodiment shown in FIG. 1, the annular 32 between the drill string 20, sub 18, and the sidewalls 36 of the borehole 14 forms the return flow path for the drilling mud. Mud is pumped from the storage pit near the well head 30 by pumping system 38. The mud travels through a mud supply line 40 which is coupled to a central passageway extending throughout the length of the drill string 20. Drilling mud is, in this manner, forced down the drill string 20 and exits into the borehole through apertures in the drill bit 22 and the secondary cutting structures 74, 76 for cooling and lubricating the drill bit and the secondary cutting structures and carrying the formation cuttings produced during the drilling operation back to the surface. A fluid exhaust conduit 42 is connected from the annular passageway 32 at the well head for conducting the return mud flow from the borehole 14 to the mud pit 28. The drilling mud is typically handled and treated by various apparatus (not shown) such as out gassing units and circulation tanks for maintaining a preselected mud viscosity and consistency.

The logging tool 16 can be one or more of any conventional logging instrument such as acoustic (sometimes referred to as sonic), neutron, gamma ray, density, photoelectric, nuclear magnetic resonance, or any other conventional logging instrument, or combinations thereof, which can be used to determine the lithology and or the porosity of formations surrounding an earth borehole.

Because the logging tool 16 is embodied in the drill string 20 in FIG. 1, the system is considered to be a measurement while drilling (MWD) or logging while drilling (LWD) system, i.e., it logs while the drilling process is underway. In one embodiment, the logging data can be stored in a conventional downhole recorder (not illustrated), which can be accessed at the earth's surface when the drill sting 20 is retrieved. In one embodiment the logging data can be transmitted to the earth's surface using telemetry such as the conventional mud pulse telemetry systems. In one embodiment, the logging data from the logging tool 16 reaches a surface measurement device processor 44 to allow the data to be processed for use in accordance with the embodiments of the present disclosure as described herein. That is, processor 44 processes the logging data as appropriate for use with the embodiments of the present disclosure.

In addition to LWD instrumentation, wireline logging instrumentation may also be used. That is, in one embodiment, wireline logging instrumentation may also be used for logging the formations surrounding the borehole as a function of depth. With wireline instrumentation, a wireline truck (not shown) is typically situated at the surface of a well bore. A wireline logging instrument is suspended in the borehole by a logging cable which passes over a pulley and a depth measurement sleeve. As the logging instrument traverses the borehole, it logs the formations surrounding the borehole as a function of depth. The logging data is transmitted through a logging cable to a processor located at or near the logging truck to process the logging data as appropriate for use with the embodiments of the present disclosure. As with the MWD embodiment of FIG. 1, the wireline instrumentation may include any conventional logging instrumentation which can be used to determine the lithology and/or porosity of formations surrounding an earth borehole, for example, such as acoustic, neutron, gamma ray, density, photoelectric, nuclear magnetic resonance, or any other conventional logging instrument, or combinations thereof, which can be used to determine lithology.

Referring again to FIG. 1, one embodiment of an apparatus 50 for predicting the performance of the drilling system having multiple cutting structures 10 is shown. The prediction apparatus 50 includes a prescribed set of geology and drilling mechanics models and further includes planning, operations, and analysis phases (to be discussed further herein below). One embodiment of the prediction apparatus 50 includes a computer/controller 52 that includes any suitable commercially available computer, controller, or data processing apparatus, further being programmed for carrying out the method and apparatus as further described herein. In one embodiment, computer/controller 52 includes at least one input for receiving input information and/or commands, for instance, from any suitable input device (or devices) 58. Input device (devices) 58 may include a keyboard, keypad, pointing device, or the like, further including a network interface or other communications interface for receiving input information from a remote computer or database. Still further, in one embodiment computer/controller 52 includes at least one output for outputting information signals and/or equipment control commands. Output signals can be output to a display device 60 via signal lines 54 for use in generating a display of information contained in the output signals. Output signals can also be output to a printer device 62 for use in generating a printout 64 of information contained in the output signals. Information and/or control signals may also be output via signal lines 66 as necessary, for example, to a remote device for use in controlling one or more various drilling operating parameters of drilling rig 12. In other words, a suitable device or means is provided on the drilling system which is responsive to a predicted drilling mechanics output signal for controlling a parameter in an actual drilling of a well bore (or interval) with the drilling system. For example, drilling system may include equipment such as one of the following types of controllable motors selected from a down hole motor 70, a top drive motor 72, or a rotary table motor 74, further in which a given rpm of a respective motor may be remotely controlled. The parameter may also include one or more of the following selected from the group of weight-on-bit, revolutions per minute (RPM), mud pump flow rate, hydraulics, or any other suitable drilling system control parameter.

In one embodiment, computer/controller 52 provides a means for generating a geology characteristic of the formation per unit depth in accordance with a prescribed geology model. In one embodiment, computer/controller 52 further provides for outputting signals on signal lines 54, 56 representative of the geology characteristic. In one embodiment, input device 58 can be used for inputting specifications of proposed drilling equipment for use in the drilling of the well bore (or interval of the well bore). In one embodiment, the specifications include at least a bit specification of a recommended drill bit and the specification of one or more recommended secondary cutting structures. Computer/controller 52 further provides a means for determining a predicted drilling mechanics in response to the specifications of the proposed drilling equipment as a function of the geology characteristic per unit depth, further in accordance with a prescribed drilling mechanics model. In one embodiment, computer/controller 52 provides for outputting on signal lines 54, 56 signals representative of the predicted drilling mechanics.

In one embodiment, computer/controller 52 is programmed for performing functions as described herein, using programming techniques known in the art. In one embodiment, a computer readable medium is included, the computer readable medium having a computer program stored thereon. The computer program for execution by computer/controller 52 is for predicting the performance of a drilling system in the drilling of a well bore of a given formation. In one embodiment, the computer program includes instructions for generating a geology characteristic of the formation per unit depth according to a prescribed geology model and outputting signals representative of the geology characteristic, the geology characteristic including at least rock strength. In one embodiment, the computer program also includes instructions for obtaining specifications of proposed drilling equipment for use in the drilling of the well bore, the specifications including at least a bit specification of a recommended drill bit and the specification of one or more recommended secondary cutting structures. Lastly, in one embodiment, the computer program includes instructions for determining a predicted drilling mechanics in response to the specifications of the proposed drilling equipment as a function of the geology characteristic per unit depth according to a prescribed drilling mechanics model and outputting signals representative of the predicted drilling mechanics, the predicted drilling mechanics including at least one of the following selected from the group consisting of bit wear, mechanical efficiency, power, and operating parameters. The programming of the computer program for execution by computer/controller 52 may further be accomplished using known programming techniques for implementing the embodiments as described and discussed herein. Thus, a geology of the given formation per unit depth can be generated, and in addition a predicted drilling mechanics performance of a drilling system may be determined. Still further, the drilling operation can be advantageously optimized in conjunction with a knowledge of a predicted performance thereof, as discussed further herein below.

In one embodiment, the geology characteristic includes at least rock strength. In one embodiment, the geology characteristic may further include any one or more of the following which include log data, lithology, porosity, and shale plasticity.

As mentioned above, in one embodiment, input device 58 can be used for inputting specifications of proposed drilling equipment for use in the drilling of the well bore (or interval of the well bore). In one embodiment, the specifications include at least a bit specification of a recommended drill bit and the specifications of one or more secondary cutting structures. In one embodiment, the specifications may also include one or more specifications of the following equipment which may include down hole motor, top drive motor, rotary table motor, mud system, and mud pump. Corresponding specifications may include a maximum torque output, a type of mud, or mud pump output rating, for example, as would be appropriate with respect to a particular drilling equipment.

In one embodiment, the predicted drilling mechanics include at least one of the following drilling mechanics selected from the group consisting of bit wear, mechanical efficiency, power, and operating parameters. In one embodiment, the operating parameters can include weight-on-bit, rotary rpm (revolutions-per-minute), cost, rate of penetration, and torque, to be further discussed herein below. The rate of penetration further includes an instantaneous rate of penetration (ROP) and an average rate of penetration (ROP-AVG).

In one embodiment, computer/controller 52 communicates with one or more remote real time operating centers 78 via signal lines 80. In one embodiment, one or more of the remote real time operating centers 78 can control and/or monitor the operation of the drilling system 10 and receive data and information regarding the operation of the drilling system 10 to facilitate that control and/or monitoring. In one embodiment, some or all of the control and monitoring functions ascribed to the computer/controller herein are performed by the remote real time operating center 78.

In one embodiment, the computer/controller 52 includes a series of software tools which use data from the logging tool 16 to update the predicted rock characteristics for the section of the borehole 14 below the sensors in the logging tool 16. The updated predicted log is used to re-calculate the rock strengths and shale plasticity for the un-drilled section of a well. The optimum drilling parameters for a given set of bit and secondary cutting structure or structures are then calculated and the results are provided to the person in charge of the drilling operations in real time.

Figure 2:
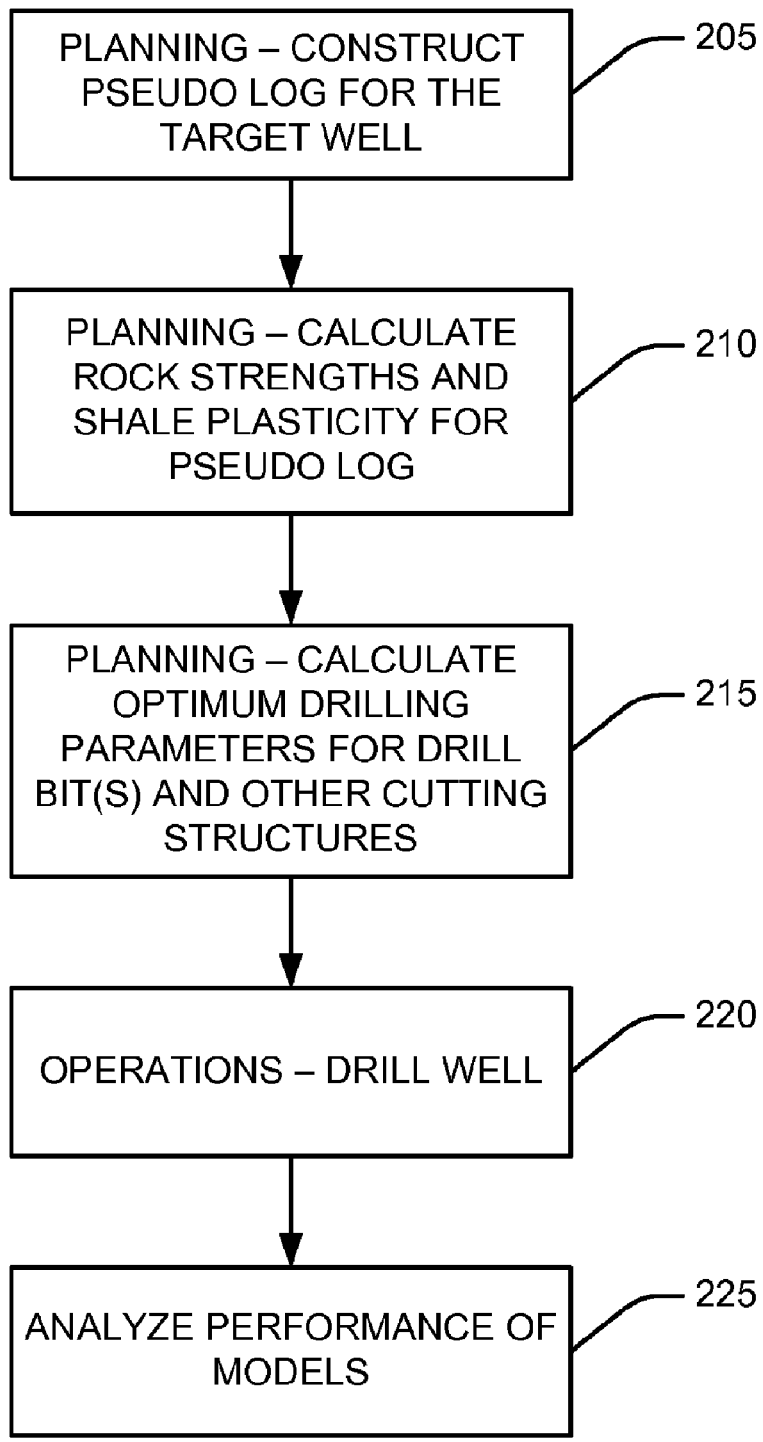
FIG. 2 illustrates a flow chart of one embodiment of the process for predicting the performance of the drilling system having multiple cutting structures.

In one embodiment, the process begins with a planning phase, as shown in FIG. 2. In one embodiment, data from one or more offset wells is used to predict the lithology for the current well and predicted well profile to construct a "pseudo log" for the target well (block 205). In one embodiment, a rock mechanics package is then used to calculate the confined and unconfined rock strengths and the shale plasticity for the pseudo log (block 210). In one embodiment, a drilling mechanics module is then used to calculate the optimum drilling parameters for the specific drill bit and the specific secondary cutting structures to be used in the drilling operation. The optimum values are calculated within the constraints of the drilling equipment, the drill bit and the secondary cutting elements (block 215). The "constraints" of the drilling equipment include maximum ROP, maximum RPM, minimum RPM, torque available, WOB available, mud flow rate available. The "constraints" of the drill bit include maximum allowable WOB, maximum allowable RPM, and maximum allowable torque. The "constraints" of the secondary cutting elements include maximum allowable WOB, maximum allowable RPM, and maximum allowable torque.

In one embodiment, the process continues with operations, during which the well is drilled (block 225). In one embodiment, during drilling operations, the real time data from the logging tool 16 is used to correlate the actual lithology against the predicted lithology and to update the pseudo log. At each update of the pseudo log the rock strengths and shale plasticity are recalculated. As the data from the logging tool 16 is received, the accumulated work done by the bit and the secondary cutting structures is calculated and the wear on the bit and the secondary cutting structures is predicted. In one embodiment, the predicted wear and the updated values for the rock strength are used to recalculate the optimum drilling parameters for the portion of the wellbore that remains to be drilled.

In one embodiment, for drilling assemblies with a single cutting structure, i.e., a bit 22, drilling a wellbore of a uniform diameter the process (this process is described in detail in U.S. Pat. No. 7,032,689, issued on Apr. 24, 2006, entitled "METHOD AND SYSTEM FOR PREDICTING PERFORMANCE OF A DRILLING SYSTEM OF A GIVEN FORMATION"):

(a) predicts the optimum weight on the bit and bit rpm to achieve the best rate of penetration through the rock to be drilled along the length of the wellbore and present this data to the drilling personnel in real time;

(b) predicts the optimum weight on the bit and bit rpm to achieve the maximum bit life through the rock to be drilled along the length of the wellbore and present this data to the drilling personnel in real time;

(c) predicts and displays in real time the limits in terms of weight on bit, speed of bit rotation and applied torque for a particular design of bit in the rock to be drilled along the length of the wellbore;

(d) uses the measured data for the rock properties to calculate and display in real time the wear on the bit that has occurred while drilling to this point and uses the predicted rock properties to calculate the predicted wear rate for the remaining portion of the wellbore and calculates the point where the bit will no longer be able to drill within the limit of the constraints; and (e) uses at least one of the above data to make "break-even" calculations.

In one embodiment, for drilling assemblies with multiple cutting structures, i.e., a bit 22 and one or more secondary cutting structures 74, 76, drilling a wellbore of multiple diameters, in addition to items (a) through (e) listed above the process uses the data from the logging tool 16 below one or more secondary cutting structures 74, 76 to;

(f) calculate the optimum weight and rotational speed for the cutting structures, including the bit 22 and the secondary cutting structures 74, 76, to achieve the best rate of penetration through the rock to be drilled in a particular wellbore and present this data to the drilling personnel in real time;

g) calculate the optimum weight and rotational speed for the cutting structures to achieve the maximum life of the cutting structure through the rock to be drilled in a particular wellbore and present this data to the drilling personnel in real time;

h) predict and display in real time the limits in terms of load, speed of bit rotation and applied torque for a particular design of the cutting structures in the rock to be drilled in a particular wellbore;

i) using the measured data for the rock properties calculate and display in real time the wear on the cutting structures that has occurred while drilling to this point, the wear that will occur to reach the depth of the downhole sensors and using the predicted rock properties calculate the predicted wear rate through the un-drilled portion of the wellbore; and j) provide real time data clearly indicating the load on each cutting structure, identify which of the cutting structures is the limiting factor as the tools pass through formations of different strengths and/or drillability.

In one embodiment, the process ends with an analysis phase, during which data for analysis is provided with a view to refining the criteria for the selection of bits 22 and secondary cutting elements 74, 76.

Figure 3:
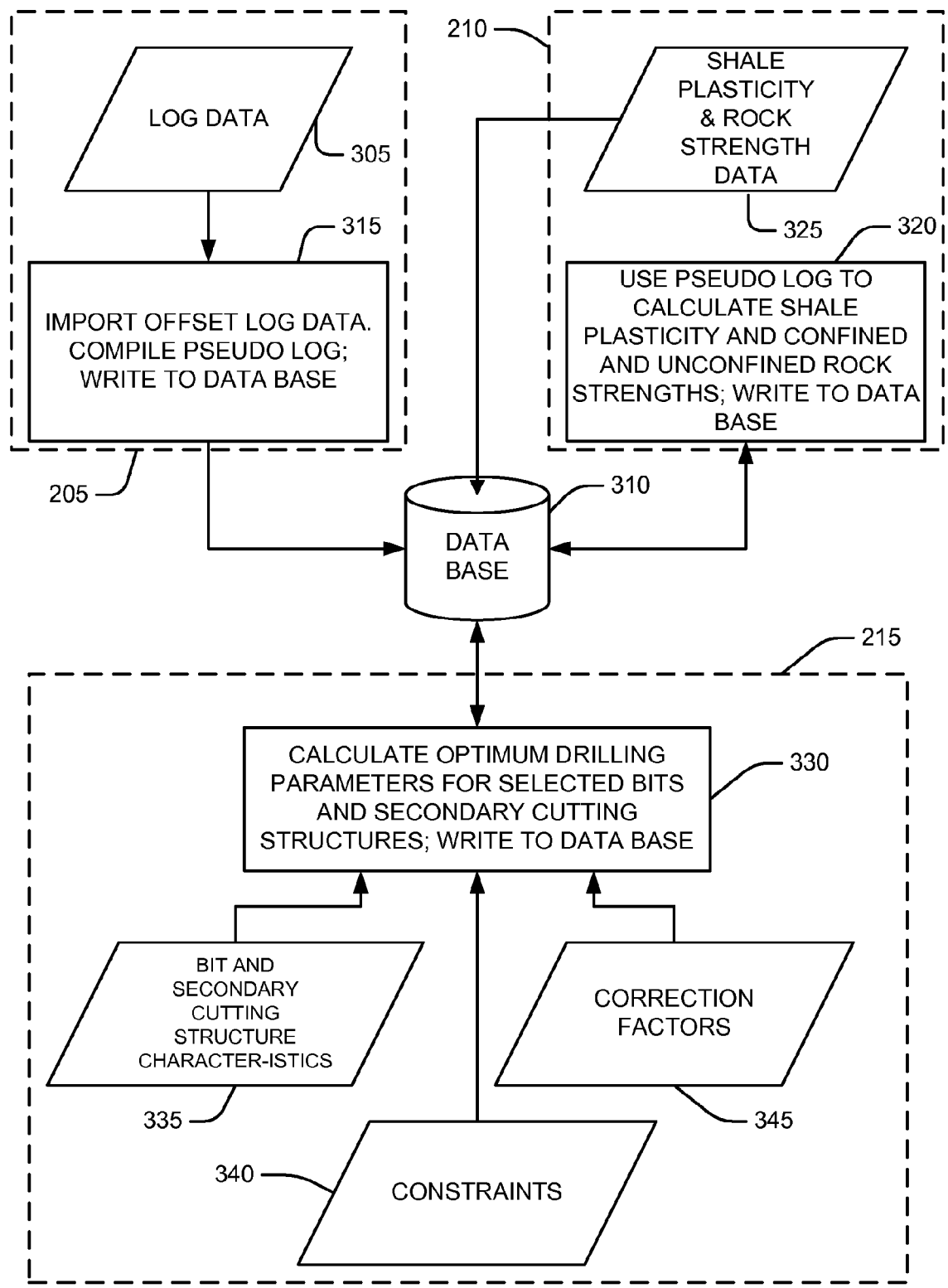
FIG. 3 illustrates a flow chart of one embodiment of the planning phase of the process for predicting the performance of the drilling system having multiple cutting structures.

One embodiment of the planning phase is shown in more detail in FIG. 3. In one embodiment, constructing the pseudo log for the target well (block 205) includes importing offset log data from company owned and third party log data 305, compiling a pseudo log from that data, and writing the pseudo log to a data base 310 (block 315). The process for compiling the pseudo log from offset log data is described in U.S. Pat. No. 6,885,943, issued Apr. 26, 2005, entitled "SIMULTANEOUS RESOLUTION ENHANCEMENT AND DIP CORRECTION OF RESISTIVITY LOGS THROUGH NONLINEAR ITERATIVE DECONVOLUTION," (see section below entitled Theory Behind Compiling a Pseudo Log from Offset Log Data).

In one embodiment, the data base 310 is the repository for all data used in the process described herein. It will be understood that the data base 310 can be a single data base or multiple data bases and can be centralized or distributed.

The process of calculating rock strengths and shale plasticities for the pseudo log (block 210) includes calculating and storing in the data base 310 the shale plasticity and confined and unconfined rock strengths (block 320). The process may include importing company owned or third party shale plasticity and rock strength data 325.

Figure 11:
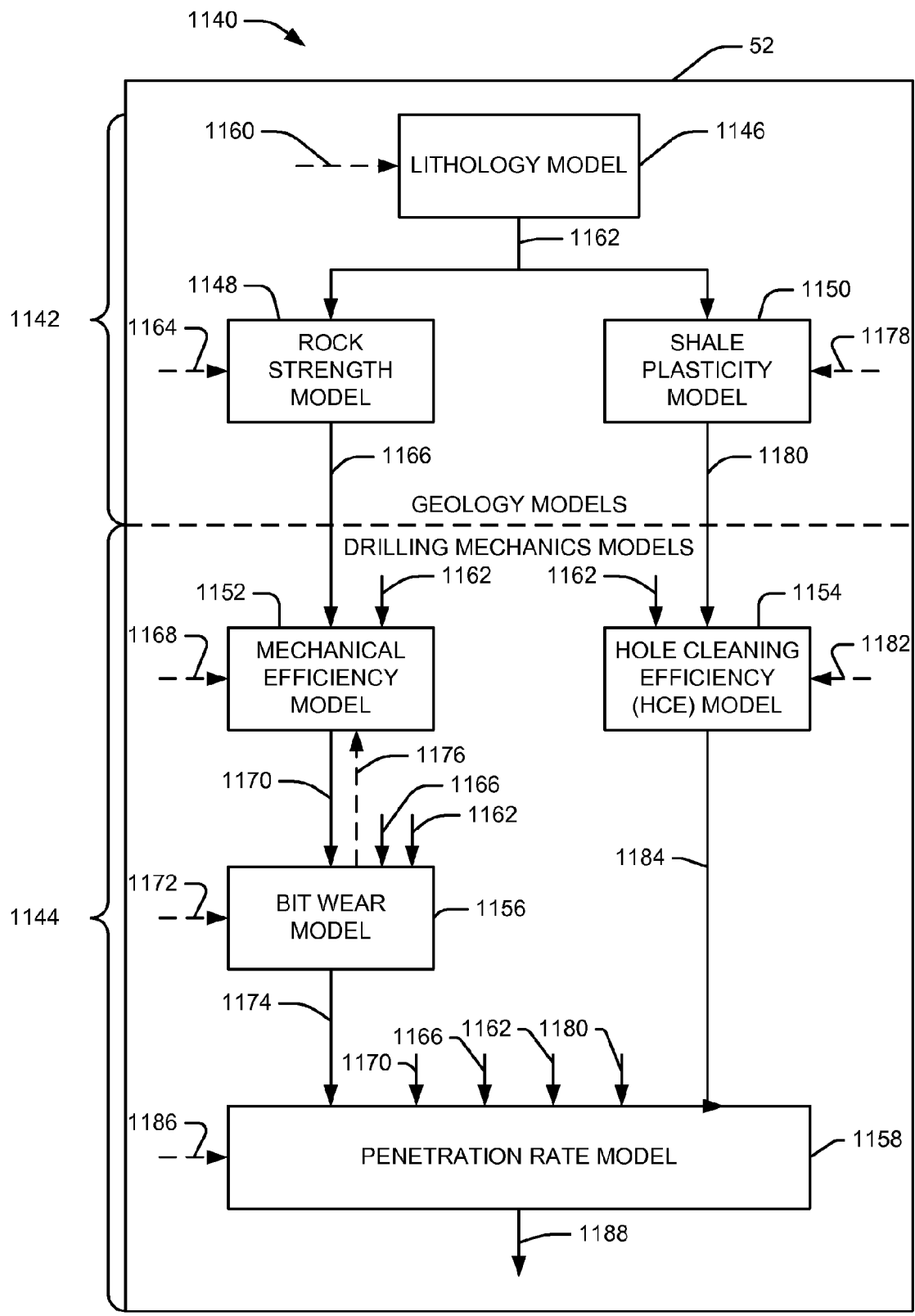
FIG. 11 illustrates geology and drilling mechanics models for use in the embodiments of the drilling performance prediction method and apparatus of the present disclosure.

With reference now to FIG. 11, a model of a total drilling system is provided by the prediction models 1140. The prediction models include geology models 1142 and drilling mechanics models 1144, further in accordance with the present method and apparatus. FIG. 11 illustrates an overview of the various prediction models 1140 and how they are linked together. The prediction models 1140 are stored in and carried out by computer/controller 52 of FIG. 1, further as discussed herein.

In one embodiment, the geology models 1142 include a lithology model 1146, a rock strength model 1148, and a shale plasticity model 1150, as described in U.S. Pat. Nos. 7,032,689, 6,109,368, and 6,408,953 and U.S. Patent Publication No. 2005/0284661 cited above, to calculate rock strengths and shale plasticities. In one embodiment, the lithology model 1146 includes a lithology model as described in U.S. Pat. No. 6,044,327, issued Mar. 28, 2000, entitled "METHOD FOR QUANTIFYING THE LITHOLOGIC COMPOSITION OF FORMATIONS SURROUNDING EARTH BOREHOLES." (see section below entitled Theory Behind Lithology Model). In one embodiment, the lithology model 1146 provides a method for quantifying lithologic component fractions of a given formation, including lithology and porosity. The lithology model 1146 utilizes any lithology or porosity sensitive log suite, for example, including nuclear magnetic resonance, photoelectric, neutron-density, sonic, gamma ray, and spectral gamma ray. In one embodiment, the lithology model 1146 further provides an improved multi component analysis. Components can be weighted to a particular log or group of logs. In one embodiment, the lithology model 1146 acknowledges that certain logs are better than others at resolving a given lithologic component. For instance, it is well known that the gamma ray log is generally the best shale indicator. A coal streak might be clearly resolved by a neutron log but missed entirely by a sonic log. In one embodiment, weighting factors are applied so that a given lithology is resolved by the log or group of logs that can resolve it most accurately. In addition, in one embodiment, the lithology model 1146 allows the maximum concentration of any lithologic component to vary from zero to one-hundred percent (0-100%), thereby allowing calibration of the model to a core analysis. In one embodiment, the lithology model 1146 also allows for limited ranges of existence for each lithologic component, further which can be based upon a core analysis. In one embodiment, the lithology model 1146 may also include any other suitable model for predicting lithology and porosity. In one embodiment, the lithology model preparation uses the techniques described in U.S. Pat. No. 6,044,327, issued Mar. 28, 2000, entitled "METHOD FOR QUANTIFYING THE LITHOLOGIC COMPOSITION OF FORMATIONS SURROUNDING EARTH BOREHOLES."

In one embodiment, the rock strength model 1148 includes a rock strength model as described in U.S. Pat. No. 5,767,399, issued Jun. 16, 1998, entitled "METHOD OF ASSAYING COMPRESSIVE STRENGTH OF ROCK" (see section below entitled Theory Behind Rock Strength Model). In one embodiment, the rock strength model 1148 provides a method for determining a confinement stress and rock strength in a given formation. The rock strength model 1148 may also include any other suitable model for predicting confinement stress and rock strength.

In one embodiment, the shale plasticity model 1150 includes a shale plasticity model as described in U.S. Pat. No. 6,052,649, issued Apr. 18, 2000, entitled "METHOD AND APPARATUS FOR QUANTIFYING SHALE PLASTICITY FROM WELL LOGS" (see section below entitled Theory Behind Plasticity Model). In one embodiment, the shale plasticity model 1150 provides a method for quantifying shale plasticity of a given formation. The shale plasticity model 1150 may also include any other suitable model for predicting shale plasticity. The geology models thus provide for generating a model of the particular geologic application of a given formation.

In one embodiment, the process of calculating optimum drilling parameters for drill bit and other cutting structures (block 215) includes calculating the optimum drilling parameters for selected bits and secondary cutting structures and writing the results to the data base 310 (block 330). In one embodiment, the process uses as inputs bit and secondary cutting structure characteristics 335, constraints 340, including rig and operational limits, and correction factors 345, which may be manually input. These processes are described in detail in the patents cited below in describing the mechanical efficiency model, the bit wear model, the penetration rate model, and the optional hole cleaning efficiency model.

In one embodiment, the drilling mechanics models 1144 include a mechanical efficiency model 1152, a bit wear model 1156, a penetration rate model 1158, and, optionally, a hole cleaning efficiency model 1154, as described in U.S. Pat. No. 7,032,689, cited above, to calculate the optimum drilling parameters for selected bits and secondary cutting structures.

In one embodiment, the mechanical efficiency model 1152 includes a mechanical efficiency model as described in U.S. Pat. No. 7,035,778, issued Apr. 25, 2006, entitled "METHOD OF ASSAYING DOWNHOLE OCCURRENCES AND CONDITIONS" (see section below entitled Theory Behind Mechanical Efficiency Model and Bit Wear Model). In one embodiment, the mechanical efficiency model 1152 provides a method for determining the bit mechanical efficiency. In the mechanical efficiency model, mechanical efficiency is defined as the percentage of the torque that cuts. The remaining torque is dissipated as friction. In one embodiment, the mechanical efficiency model a) reflects the 3-D bit geometry, b) is linked to cutting torque, c) takes into account the effect of operating constraints, and d) makes use of a torque and drag analysis.

With respect to the hole cleaning efficiency (HCE) model 1154, in one embodiment the model takes into account drilling fluid type, hydraulics, lithology, and shale plasticity. The hole cleaning efficiency model 1154 is a measure of an effectiveness of the drilling fluid and hydraulics. If the hole cleaning efficiency is low, then unremoved or slowly removed cuttings may have an adverse impact upon drilling mechanics.

In one embodiment, the bit wear model 1156 includes a bit wear model as described in U.S. Pat. No. 7,035,778, issued Apr. 25, 2006, entitled "METHOD OF ASSAYING DOWNHOLE OCCURRENCES AND CONDITIONS" (see section below entitled Theory Behind Mechanical Efficiency Model and Bit Wear Model). In one embodiment, the bit wear model 1156 provides a method for determining bit wear, i.e., to predict bit life. Furthermore, the bit wear model is used for applying a work rating to a given bit.

In one embodiment, the penetration rate model 1158 includes a penetration rate model as described in U.S. Pat. No. 5,704,436, issued Jan. 16, 1998, entitled "METHOD OF REGULATING DRILLING CONDITIONS APPLIED TO A WELL BIT," (see section below entitled Theory Behind the Penetration Rate Model). In one embodiment, the penetration rate model 1158 provides a method for optimizing operating parameters and predicting penetration rate of the bit and drilling system. In one embodiment, the ROP model provides for one or more of the following including: maximizing a penetration rate, establishing a power limit to avoid impact damage to the bit, respecting all operating constraints, optimizing operating parameters, and minimizing bit induced vibrations.

The drilling mechanics models 1144 as described herein provide for generating a comprehensive model of the particular drilling system being used or proposed for use in the drilling of a well bore, interval(s) of a well bore, or series of well bores in a given drilling operation. The drilling mechanics models 1144 further allow for the generation of a drilling mechanics performance prediction of the drilling system in a given geology. A comparison of actual performance to predicted performance can be used for history matching the drilling mechanics models, as may be required, for optimizing the respective drilling mechanics models.

With reference still to FIG. 11, the present method and apparatus include several modes of operation. The modes of operation include an optimization mode, a prediction mode, and a calibration mode. For the various modes of operation, predicted economics can be included for providing a measure of the number of fewer days per well which can be achieved when a drilling system is optimized using the method and apparatus of the present disclosure.

Optimization Mode

In the optimization mode, the purpose is to optimize operating parameters of the drilling system. Optimization criteria include 1) maximize penetration rate; 2) avoid impact damage to the bit; 3) respect all operating constraints; and 4) minimize bit-induced vibrations.

In the optimization mode, the lithology model 1146 receives data from porosity logs, lithology logs and/or mud logs on input 1160. The porosity or lithology logs may include nuclear magnetic resonance (NMR), photoelectric, neutron-density, sonic, gamma ray, and spectral gamma ray, or any other log sensitive to porosity or lithology. The mud logs are used to identify non-shale lithology components. In response to the log inputs, the lithology model 1146 provides a measure of lithology and porosity of the given formation per unit depth on output 1162. With respect to lithology, the output 1162 preferably includes a volume fraction of each lithologic component of the formation per unit depth. With respect to porosity, the output 1162 preferably includes a volume fraction of pore space within the rock of the formation per unit depth. The measure of lithology and porosity on output 1162 is input to the rock strength model 1148, shale plasticity model 1150, mechanical efficiency model 1152, hole cleaning efficiency model 1154, bit wear model 1162, and penetration rate model 1158.

With respect to the rock strength model 1148, in addition to receiving the measure of lithology and porosity output 1162, rock strength model 1148 further receives mud weight and pore pressure data at input 1164. Mud weight is used to calculate overbalance. Pore pressure is used to calculate overbalance and alternatively, design overbalance may be used to estimate pore pressure. In response to the inputs, the rock strength model 1148 produces a measure of confinement stress and rock strength of the given formation per unit depth on output 1166. More particularly, the rock strength model produces a measure of overbalance, effective pore pressure, confinement stress, unconfined rock strength, and confined rock strength. Overbalance is defined as mud weight minus pore pressure. Effective pore pressure is similar to pore pressure, but also reflects permeability reduction in shales and low porosity non-shales. Confinement stress is an estimate of in-situ confinement stress of rock. Unconfined rock strength is rock strength at the surface of the earth. Lastly, confined rock strength is rock strength under in-situ confinement stress conditions. As shown, the rock strength output 1166 is input to the mechanical efficiency model 1152, bit wear model 1162, and penetration rate model 1158.

With respect to the mechanical efficiency model 1152, in addition to receiving the lithology and porosity output 1162 and confinement stress and rock strength output 1166, mechanical efficiency model 1152 further receives input data relating to operating constraints, 3-D bit model, and torque and drag, all relative to the drilling system, on input 1168. Operating constraints can include a maximum torque, maximum weight-on-bit (WOB), maximum and minimum RPM, and maximum penetration rate. In particular, with respect to mechanical efficiency, operating constraints on the drilling system include maximum torque, maximum weight-on-bit (WOB), minimum RPM, and maximum penetration rate. Operating constraints limit an amount of optimization that can be achieved with a particular drilling system. Further with respect to evaluating the effect of operating constraints on mechanical efficiency, while not all constraints affect both mechanical efficiency and power, it is necessary to know all of the constraints in order to quantify the effects of those constraints which have an effect upon either mechanical efficiency or power. The 3-D bit model input includes a bit work rating and a torque-WOB signature. Lastly, the torque and drag analysis includes a directional proposal, casing and drill string geometry, mud weight and flow rate, friction factors, or torque and drag measurements. The torque and drag analysis is needed to determine how much surface torque is actually transmitted to the bit. Alternatively, measurements of off-bottom and on-bottom torque could be used in lieu of the torque and drag analysis. In addition, near bit measurements from an measurement while drilling (MWD) system could also be used in lieu of the torque and drag analysis. In response to the input information, the mechanical efficiency model 1152 produces a measure of mechanical efficiency, constraint analysis, predicted torque, and optimum weight-on-bit (WOB) for the drilling system in the given formation per unit depth on output 1170. More particularly, the mechanical efficiency model 1152 provides a measure of total torque, cutting torque, frictional torque, mechanical efficiency, a constraint analysis, and an optimum WOB. The total torque represents a total torque applied to the bit. The cutting torque represents the cutting component of the total torque. The frictional torque is the frictional component of the total torque. With mechanical efficiency model 1152, the mechanical efficiency is defined as the percentage of the total torque that cuts. The constraint analysis quantifies the reduction in mechanical efficiency from a theoretical maximum value due to each operating constraint. Lastly, an optimum WOB is determined for which the WOB maximizes the penetration rate while respecting all operating constraints. The optimum WOB is used by the penetration rate model 1158 to calculate an optimum RPM. Furthermore, mechanical efficiency model 1152 utilizes a measure of bit wear from a previous iteration as input also, to be described further below with respect to the bit wear model.

With respect now to bit wear model 1156, the bit wear model receives input from the lithology model via output 1162, the rock strength model via output 1166, and the mechanical efficiency model via output 1170. In addition, the bit wear model 1156 further receives 3-D bit model data on input 1172. The 3-D bit model input includes a bit work rating and a torque-WOB signature. In response to the inputs of lithology, porosity, mechanical efficiency, rock strength, and the 3-D bit model, the bit wear model 1156 produces a measure of specific energy, cumulative work, formation abrasivity, and bit wear with respect to the bit in the given formation per unit depth on output 1174. The specific energy is the total energy applied at the bit, which is equivalent to the bit force divided by the bit cross-sectional area. The cumulative work done by the bit reflects both the rock strength and the mechanical efficiency. The formation abrasivity measure models an accelerated wear due to formation abrasivity. Lastly, the measure of bit wear corresponds to a wear condition that is linked to bit axial contact area and mechanical efficiency. In addition to output 1174, bit wear model 1156 further includes providing a measure of bit wear from a previous iteration to the mechanical efficiency model 1152 on output 1176, wherein the mechanical efficiency model 1152 further utilizes the bit wear measure from a previous iteration in the calculation of its mechanical efficiency output data on output 1170.

Prior to discussing the penetration rate model 1158, we first return to the shale plasticity model 1150. As shown in FIG. 11, the shale plasticity model 1150 receives input 1162 from the lithology model. In particular, shale volume is provided from the lithology model 1146. In addition to receiving the lithology and porosity output 1162, the shale plasticity model 1150 further receives log data from prescribed well logs on input 1178, the well logs including any log sensitive to clay type, clay water content, and clay volume. Such logs may include nuclear magnetic resonance (NMR), neutron-density, sonic-density, spectral gamma ray, gamma ray, and cation exchange capacity (CEC). In response to the inputs, the shale plasticity model 1150 produces a measure of shale plasticity of the formation per unit depth on output 1180. In particular, shale plasticity model 1150 provides a measure of normalized clay type, normalized clay water content, normalized clay volume, and shale plasticity. The normalized clay type identifies a maximum concentration of smectites, wherein smectite is the clay type most likely to cause clay swelling. The normalized clay water content identifies the water content where a maximum shale plasticity occurs. The normalized clay volume identifies the range of clay volume where plastic behavior can occur. Lastly, shale plasticity is a weighted average of the normalized clay properties and reflects an overall plasticity.

With reference to the optional hole cleaning efficiency model 1154, model 1154 receives a shale plasticity input from the shale plasticity model 1150 and a lithology input from the lithology model 1146. In addition to receiving the lithology model output 1162 and the shale plasticity model output 1180, the hole cleaning efficiency model 1154 further receives hydraulics and drilling fluid data on input 1182. In particular, the hydraulics input can include any standard measure of hydraulic efficiency, such as, hydraulic horsepower per square inch of bit diameter. In addition, the drilling fluid type may include water base mud, oil base mud, polymer, or other known fluid type. In response to the inputs, the hole cleaning efficiency model 1154 produces a measure of a predicted hole cleaning efficiency of the bit and drilling system in the drilling of a well bore (or interval) in the formation per unit depth on output 1184. Hole cleaning efficiency is defined herein as the actual over the predicted penetration rate. While the other drilling mechanics models assume perfect hole cleaning, the hole cleaning efficiency (HCE) model is a measure of correction to the penetration rate prediction to compensate for hole cleaning that deviates from ideal behavior. Thus, the measure of hole cleaning efficiency (HCE) reflects the effects of lithology, shale plasticity, hydraulics, and drilling fluid type on penetration rate.

With reference now to the penetration rate model 1158, the penetration rate model 1158 receives mechanical efficiency, predicted torque, and optimum WOB via output 1170 of the mechanical efficiency model 1152. Penetration rate model 1158 further receives bit wear via output 1174 of the bit wear model 1156, rock strength via output 1166 of rock strength model 1148, and predicted HCE via output 1184 of HCE model 1154. In addition, the penetration rate model 1158 further receives operating constraints information on input 1186. In particular, the operating constraints include a maximum torque, maximum weight-on-bit (WOB), maximum and minimum RPM, and maximum penetration rate. Further with respect to evaluating the effect of operating constraints on power, while not all constraints affect both mechanical efficiency and power, it is necessary to know all of the constraints in order to quantify the effects of those constraints which have an effect upon either mechanical efficiency or power. In response to the inputs, the penetration rate model 1158 produces a power level analysis, a constraint analysis, and in addition, a measure of optimum RPM, penetration rate, and economics of the bit and drilling system in the drilling of a well bore (or interval) in the formation per unit depth on output 1188. More particularly, the power level analysis includes a determination of a maximum power limit. The maximum power limit maximizes penetration rate without causing impact damage to the bit. The operating power level may be less than the maximum power limit due to operating constraints. The constraint analysis includes quantifying the reduction in operating power level from the maximum power limit due to each operating constraint. The optimum RPM is that RPM which maximizes penetration rate while respecting all operating constraints. The penetration rate is the predicted penetration rate at the optimum WOB and optimum RPM. Lastly, economics can include the industry standard cost per foot analysis.

Prediction Mode

In the prediction mode, the object or purpose is to predict drilling performance with user-specified operating parameters that are not necessarily optimal. Operating constraints do not apply in this mode. The prediction mode is essentially similar to the optimization mode, however with exceptions with respect to the mechanical efficiency model 1152, bit wear model 1156, and the penetration rate model 1158, further as explained herein below. The optional hole cleaning efficiency model 1154 is the same for both the optimization and prediction modes, since the hole cleaning efficiency is independent of the mechanical operating parameters (i.e., user-specified WOB and user-specified RPM).

With respect to the mechanical efficiency model 1152, in the prediction mode, in addition to receiving the lithology and porosity output 1162 and confinement stress and rock strength output 1166, mechanical efficiency model 1152 further receives input data relating to user-specified operating parameters and a 3-D bit model, relative to the drilling system, on input 1168. The user-specified operating parameters for the drilling system can include a user-specified weight-on-bit (WOB) and a user-specified RPM. This option is used for evaluating "what if" scenarios. The 3-D bit model input includes a bit work rating and a torque-WOB signature. In response to the input, the mechanical efficiency model 1152 produces a measure of mechanical efficiency for the drilling system in the given formation per unit depth on output 1170. More particularly, the mechanical efficiency model 1152 provides a measure of total torque, cutting torque, frictional torque, and mechanical efficiency. The total torque represents the total torque applied to the bit. In the prediction mode, the total torque corresponds to the user-specified weight-on-bit. The cutting torque represents the cutting component of the total torque on the bit. The frictional torque is the frictional component of the total torque on the bit.

With mechanical efficiency model 1152, the mechanical efficiency is defined as the percentage of the total torque that cuts. The prediction mode may also include an analysis of mechanical efficiency by region, that is, by region of mechanical efficiency with respect to a bit's mechanical efficiency torque-WOB signature. A first region of mechanical efficiency is defined by a first weight-on-bit (WOB) range from zero WOB to a threshold WOB, wherein the threshold WOB corresponds to a given WOB necessary to just penetrate the rock, further corresponding to a zero (or negligible) depth of cut. The first region of mechanical efficiency further corresponds to a drilling efficiency of efficient grinding. A second region of mechanical efficiency is defined by a second weight-on-bit range from the threshold WOB to an optimum WOB, wherein the optimum WOB corresponds to a given WOB necessary to just achieve a maximum depth of cut with the bit, prior to the bit body contacting the earth formation. The second region of mechanical efficiency further corresponds to a drilling efficiency of efficient cutting. A third region of mechanical efficiency is defined by a third weight-on-bit range from the optimum WOB to a grinding WOB, wherein the grinding WOB corresponds to a given WOB necessary to cause cutting torque of the bit to just be reduced to essentially zero or become negligible. The third region of mechanical efficiency further corresponds to a drilling efficiency of inefficient cutting. Lastly, a fourth region of mechanical efficiency is defined by a fourth weight-on-bit range from the grinding WOB and above. The fourth region of mechanical efficiency further corresponds to a drilling efficiency of inefficient grinding. With respect to regions three and four, while the bit is at a maximum depth of cut, as WOB is further increased, frictional contact of the bit body with the rock formation is also increased.

Furthermore, mechanical efficiency model 1152 utilizes a measure of bit wear from a previous iteration as input also, to be described further below with respect to the bit wear model.

With respect now to bit wear model 1156, in the prediction mode, the bit wear model receives input from the lithology model via output 1162, the rock strength model via output 1166, and the mechanical efficiency model via output 1170. In addition, the bit wear model 1156 further receives 3-D bit model data on input 1172. The 3-D bit model input includes a bit work rating and a torque-WOB signature. In response to the inputs of lithology, porosity, mechanical efficiency, rock strength, and the 3-D bit model, the bit wear model 1156 produces a measure of specific energy, cumulative work, formation abrasivity, and bit wear with respect to the bit in the given formation per unit depth on output 1174. The specific energy is the total energy applied at the bit, which is equivalent to the bit force divided by the bit cross-sectional area. Furthermore, the calculation of specific energy is based on the user-specified operating parameters. The cumulative work done by the bit reflects both the rock strength and the mechanical efficiency. The calculation of cumulative work done by the bit is also based on the user-specified operating parameters. The formation abrasivity measure models an accelerated wear due to formation abrasivity. Lastly, the measure of bit wear corresponds to a wear condition that is linked to bit axial contact area and mechanical efficiency. As with the calculations of specific energy and cumulative work, the bit wear calculation is based on the user-specified operating parameters. In addition to output 1174, bit wear model 1156 further includes providing a measure of bit wear from a previous iteration to the mechanical efficiency model 1152 on output 1176, wherein the mechanical efficiency model 1152 further utilizes the bit wear measure from a previous iteration in the calculation of its mechanical efficiency output data on output 1170.

With reference now to the penetration rate model 1158, the penetration rate model 1158 receives mechanical efficiency and predicted torque via output 1170 of the mechanical efficiency model 1152. Model 1158 further receives bit wear via output 1174 of the bit wear model 1156, rock strength via output 1166 of rock strength model 1148, and predicted HCE via output 1184 of HCE model 1154. In addition, the penetration rate model 1158 further receives user-specified operating parameters on input 1186. In particular, the user-specified operating parameters include a user-specified weight-on-bit (WOB) and a user-specified RPM. As mentioned above, this prediction mode of operation is used to evaluate "what if" scenarios. In response to the inputs, the penetration rate model 1158 produces a power level analysis and, in addition, a measure of penetration rate and economics of the bit and drilling system in the predicted drilling of a well bore (or interval) in the formation per unit depth on output 1188. More particularly, the power level analysis includes a determination of a maximum power limit. The maximum power limit corresponds to a prescribed power which, when applied to the bit, maximizes penetration rate without causing impact damage to the bit. The operating power level resulting from the user-specified operating parameters may be less than or greater than the maximum power limit. Any operating power levels which exceed the maximum power limit of the bit can be flagged automatically, for example, by suitable programming, for indicating or identifying those intervals of a well bore where impact damage to the bit is likely to occur. The power level analysis would apply to the particular drilling system and its use in the drilling of a well bore (or interval) in the given formation. In addition, the penetration rate is the predicted penetration rate at user-specified WOB and user-specified RPM. Lastly, economics includes the industry standard cost per foot analysis.

Calibration Mode

Lastly, in the calibration mode, the object or purpose is to calibrate the drilling mechanics models to measured operating parameters. In addition, the geology models may be calibrated to measured core data. Furthermore, it is possible to partially or fully calibrate any model or group of models. Similarly as with the prediction mode, operating constraints do not apply in the calibration mode.

Beginning first with the geology models 1142, measured core data may be used to calibrate each geology model. With respect to the lithology model, the lithology model 1146 receives data from porosity logs, lithology logs and/or mud logs, and core data on input 1160. As mentioned above, the porosity or lithology logs may include nuclear magnetic resonance (NMR), photoelectric, neutron-density, sonic, gamma ray, and spectral gamma ray, or any other log sensitive to porosity or lithology. The mud logs are used to identify non-shale lithology components. Core data includes measured core data which may be used to calibrate the lithology model. Calibration of the lithology model with measured core data allows the predicted lithologic composition to be in better agreement with measured core composition. Measured core porosity may also be used to calibrate any log-derived porosity. In response to the inputs, the lithology model 1146 provides a measure of lithology and porosity of the given formation per unit depth on output 1162. With respect to calibrated lithology, the output 1162 preferably includes a volume fraction of each desired lithologic component of the formation per unit depth calibrated to a core analysis and/or a mud log. With respect to calibrated porosity, the log-derived output 1162 preferably is calibrated to measured core porosity. Also, less accurate logs may be calibrated to more accurate logs. The calibration of lithology and porosity on output 1162 is input to the rock strength model 1148, shale plasticity model 1150, mechanical efficiency model 1152, optional hole cleaning efficiency model 1154, bit wear model 1162, and penetration rate model 1158.

With respect to the rock strength model 1148, inputs and outputs are similar to that as discussed herein above with respect to the optimization mode. However in the calibration mode, the input 1164 further includes core data. Core data includes measured core data which may be used to calibrate the rock strength model. Calibration allows the predicted rock strength to be in better agreement with measured core strength. In addition, measured pore pressure data may also be used to calibrate the confinement stress calculation.

With respect to the shale plasticity model 1150, inputs and outputs are similar to that as discussed herein above with respect to the optimization mode. However in the calibration mode, the input 1178 further includes core data. Core data includes measured core data which may be used to calibrate the shale plasticity model. Calibration allows the predicted plasticity to be in better agreement with measured core plasticity. In response to the inputs, the shale plasticity model 1150 provides a measure of shale plasticity of the given formation per unit depth on output 1180. With respect to calibrated shale plasticity, the output 1180 preferably includes a weighted average of the normalized clay properties that reflects the overall plasticity calibrated to a core analysis.

With respect to the mechanical efficiency model 1152, inputs and outputs are similar to that as discussed herein above with respect to the optimization mode, with the following exceptions. In the calibration mode, input 1168 does not include operating constraints or torque and drag analysis, however, in the calibration mode, the input 1168 does include measured operating parameters. Measured operating parameters include weight-on-bit (WOB), RPM, penetration rate, and torque (optional), which may be used to calibrate the mechanical efficiency model. In response to the inputs, the mechanical efficiency model 1152 provides a measure of total torque, cutting torque, frictional torque, and calibrated mechanical efficiency on output 1170. With respect to total torque, total torque refers to the total torque applied to the bit, further which is calibrated to measured torque if data is available. Cutting torque refers to the cutting component of total torque on bit, further which is calibrated to an actual mechanical efficiency. Frictional torque refers to the frictional component of the total torque on bit, further which is calibrated to the actual mechanical efficiency. With respect to calibrated mechanical efficiency, mechanical efficiency is defined as the percentage of the total torque that cuts. The predicted mechanical efficiency is calibrated to the actual mechanical efficiency. The calibration is more accurate if measured torque data is available. However, it is possible to partially calibrate the mechanical efficiency if torque data is unavailable, by using a predicted torque along with the other measured operating parameters.

In the calibration mode, an analysis of mechanical efficiency by region, that is, by region of mechanical efficiency with respect to a bit's mechanical efficiency torque-WOB signature, may also be included. As indicated above, the first region of mechanical efficiency is defined by a first weight-on-bit (WOB) range from zero WOB to a threshold WOB, wherein the threshold WOB corresponds to a given WOB necessary to just penetrate the rock, further corresponding to a zero (or negligible) depth of cut. The first region of mechanical efficiency further corresponds to a drilling efficiency of efficient grinding. The second region of mechanical efficiency is defined by a second weight-on-bit range from the threshold WOB to an optimum WOB, wherein the optimum WOB corresponds to a given WOB necessary to just achieve a maximum depth of cut with the bit, prior to the bit body contacting the earth formation. The second region of mechanical efficiency further corresponds to a drilling efficiency of efficient cutting. The third region of mechanical efficiency is defined by a third weight-on-bit range from the optimum WOB to a grinding WOB, wherein the grinding WOB corresponds to a given WOB necessary to cause cutting torque of the bit to just be reduced to essentially zero or become negligible. The third region of mechanical efficiency further corresponds to a drilling efficiency of inefficient cutting. Lastly, the fourth region of mechanical efficiency is defined by a fourth weight-on-bit range from the grinding WOB and above. The fourth region of mechanical efficiency further corresponds to a drilling efficiency of inefficient grinding. With respect to regions three and four, while the bit is at a maximum depth of cut, as WOB is further increased, frictional contact of the bit body with the rock formation is also increased.

With respect to the bit wear model 1156, inputs and outputs are similar to that as discussed herein above with respect to the optimization mode. However in the calibration mode, the input 1172 further includes bit wear measurement. Bit wear measurement includes a measure of a current axial contact area of the bit. Furthermore, the bit wear measurement is correlated with the cumulative work done by the bit based on the measured operating parameters. In response to the inputs, the bit wear model 1156 provides a measure of specific energy, cumulative work, calibrated formation abrasivity, and calibrated bit work rating with respect to the given drilling system and formation per unit depth on output 174. With respect to specific energy, specific energy corresponds to the total energy applied at the bit. In addition, specific energy is equivalent to the bit force divided by the bit cross-sectional area, wherein the calculation is further based on the measured operating parameters. With respect to cumulative work, the cumulative work done by the bit reflects both the rock strength and mechanical efficiency. In addition, the calculation of cumulative work is based on the measured operating parameters. With respect to calculated formation abrasivity, the bit wear model accelerates wear due to formation abrasivity. Furthermore, the bit wear measurement and cumulative work done can be used to calibrate the formation abrasivity. Lastly, with respect to calibrated bit work rating, the dull bit wear condition is linked to cumulative work done. In calibration mode, the bit work rating of a given bit can be calibrated to the bit wear measurement and cumulative work done.

With respect to the hole cleaning efficiency model 1154, inputs and outputs are similar to that as discussed herein above with respect to the optimization mode. However, in the calibration mode, the hole cleaning efficiency is calibrated by correlating to the measured HCE in the penetration rate model, further as discussed herein below.

With respect to the penetration rate model 1158, inputs and outputs are similar to that as discussed herein above with respect to the optimization mode. However, in the calibration mode, input 1186 does not include operating constraints, but rather, the input 1168 does include measured operating parameters and bit wear measurement. Measured operating parameters include weight-on-bit (WOB), RPM, penetration rate, and torque (optional). Bit wear measurement is a measure of current axial contact area of the bit and also identifies the predominant type of wear including uniform and non-uniform wear. For example, impact damage is a form of non-uniform wear. Measured operating parameters and bit wear measurements may be used to calibrate the penetration rate model. In response to the inputs, the penetration rate model 1158 provides a measure of calibrated penetration rate, calibrated HCE, and calibrated power limit. With respect to calibrated penetration rate, calibrated penetration rate is a predicted penetration rate at the measured operating parameters. The predicted penetration rate is calibrated to the measured penetration rate using HCE as the correction factor. With respect to calibrated HCE, HCE is defined as the actual over the predicted penetration rate. The predicted HCE from the HCE model is calibrated to the HCE calculated in the penetration rate model. Lastly, with respect to the calibrated power limit, the maximum power limit maximizes penetration rate without causing impact damage to the bit. If the operating power level resulting from the measured operating parameters exceeds the power limit then impact damage is likely. The software or computer program for implementing the predicting of the performance of a drilling system can be set up to automatically flag any operating power level which exceeds the power limit. Still further, the power limit may be adjusted to reflect the type of wear actually seen on the dull bit. For example, if the program flags intervals where impact damage is likely, but the wear seen on the dull bit is predominantly uniform, then the power limit is probably too conservative and should be raised.

A performance analysis may also be performed which includes an analysis of the operating parameters. Operating parameters to be measured include WOB, TOB (optional), RPM, and ROP. Near bit measurements are preferred for more accurate performance analysis results. Other performance analysis measurements include bit wear measurements, drilling fluid type and hydraulics, and economics.

Overview

With reference again to FIG. 1, apparatus 50 for predicting the performance of a drilling system 10 for the drilling of a well bore 14 in a given formation 24 will now be further discussed. The prediction apparatus 50 includes a computer/controller 52 for generating a geology characteristic of the formation per unit depth according to a prescribed geology model and for outputting signals representative of the geology characteristic. Preferably, the geology characteristic includes at least rock strength. In addition, the geology characteristic generating means 52 may further generate at least one of the following additional characteristics selected from the group consisting of log data, lithology, porosity, and shale plasticity.

Input device(s) 58 is (are) provided for inputting specifications of proposed drilling equipment for use in the drilling of the well bore, wherein the specifications include at least a bit specification of a recommended drill bit. In addition, input device(s) 58 may further be used for inputting additional proposed drilling equipment input specification(s) which may also include at least one additional specification of proposed drilling equipment selected from the group consisting of down hole motor, top drive motor, rotary table motor, mud system, and mud pump.

Lastly, computer/controller 52 is further for determining a predicted drilling mechanics in response to the specifications of the proposed drilling equipment as a function of the geology characteristic per unit depth according to a prescribed drilling mechanics model. Computer/controller 52 is further for outputting signals representative of the predicted drilling mechanics, the predicted drilling mechanics including at least one of the following selected from the group consisting of bit wear, mechanical efficiency, power, and operating parameters. The operating parameters may include at least one of the following selected from the group consisting of weight-on-bit, rotary rpm (revolutions-per-minute), cost, rate of penetration, and torque. Additionally, rate of penetration includes instantaneous rate of penetration (ROP) and average rate of penetration (ROP-AVG).

As illustrated in FIG. 1, display 60 and printer 62 each provide a means responsive to the geology characteristic output signals and the predicted drilling mechanics output signals for generating a display of the geology characteristic and predicted drilling mechanics per unit depth. With respect to printer 62, the display of the geology characteristic and predicted drilling mechanics per unit depth includes a printout 64. In addition, computer/controller 52 may further provide drilling operation control signals on line 66, relating to given predicted drilling mechanics output signals. In such an instance, the drilling system could further include one or more devices which are responsive to a drilling operation control signal based upon a predicted drilling mechanics output signal for controlling a parameter in an actual drilling of the well bore with the drilling system. Exemplary parameters may include at least one selected from the group consisting of weight-on-bit, rpm, pump flow, and hydraulics.

Figure 4:
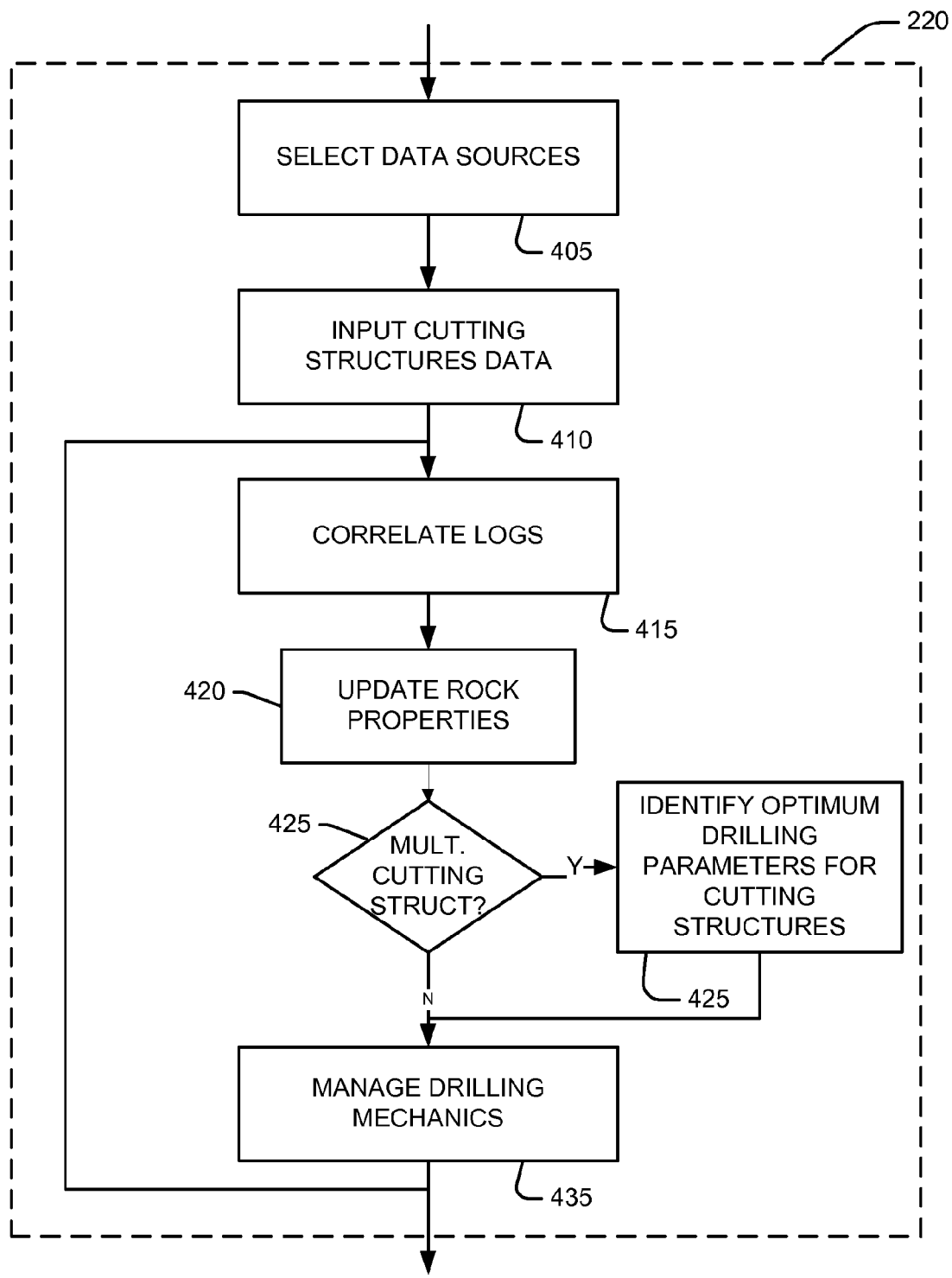
FIG. 4 illustrates a flow chart of one embodiment of the operations phase of the process for predicting the performance of the drilling system having multiple cutting structures.

One embodiment of the operations phase, illustrated in more detail in FIG. 4, begins by selecting data sources (block 405). Cutting structures data, i.e., the specifications of the bit 22 and any secondary cutting structures, e.g., 74, 76, is entered (block 410). The phase then enters a loop, which begins by correlating the pseudo log with the actual logging data being produced by the logging tool 16 (block 415). Rock properties are then updated in the various models (block 420). If the drilling system includes multiple cutting structures (block 425), the optimum drilling parameters for the cutting structures are identified (block 430). That information is used to manage the drilling mechanics (block 435) and the phase returns to the beginning of the loop.

One embodiment of the process of selecting data sources (block 405) is illustrated in more detail in FIGS. 5A-5I. Beginning with FIG. 5A, if the drilling system 10 includes a surface flow meter (block 502), the computer/controller 52 retrieves the rig flow meter sensor value 504 and stores it in the data base 310 (block 506). Otherwise, if the drilling system 10 does not include a surface flow meter, the computer/controller 52 retrieves data regarding the volume per stroke for the configuration of the rig pumps, which may be entered by the drilling system operator, and the rig pump stroke rate 508. The computer/controller calculates the flow rate from those two values and stores the computed flow rate in the data base 310 (block 510).

Figure 5A:
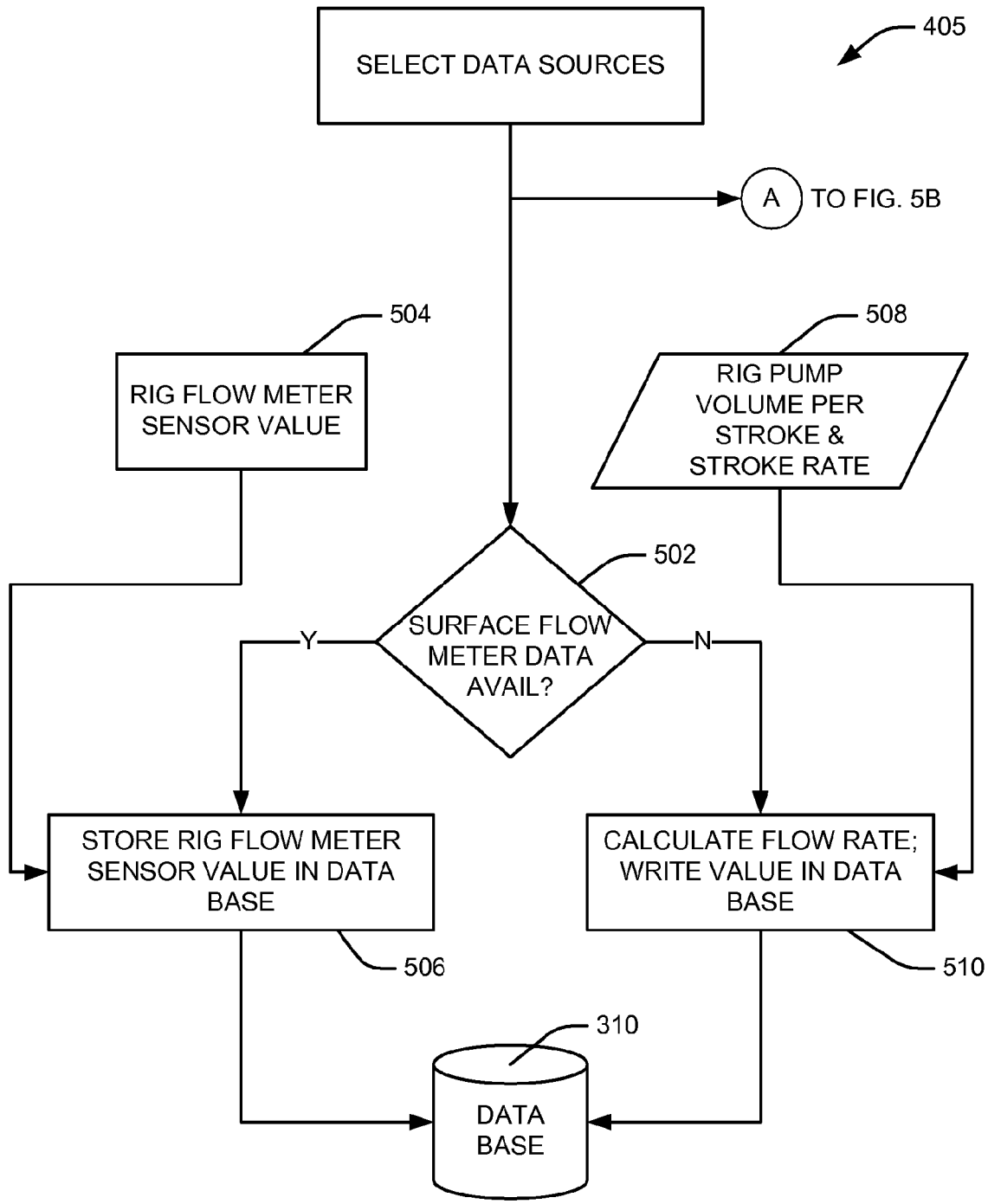
FIGS. 5A-5I illustrate a flow chart of one embodiment of the process of selecting data sources for the operations phase.
Figure 5B:
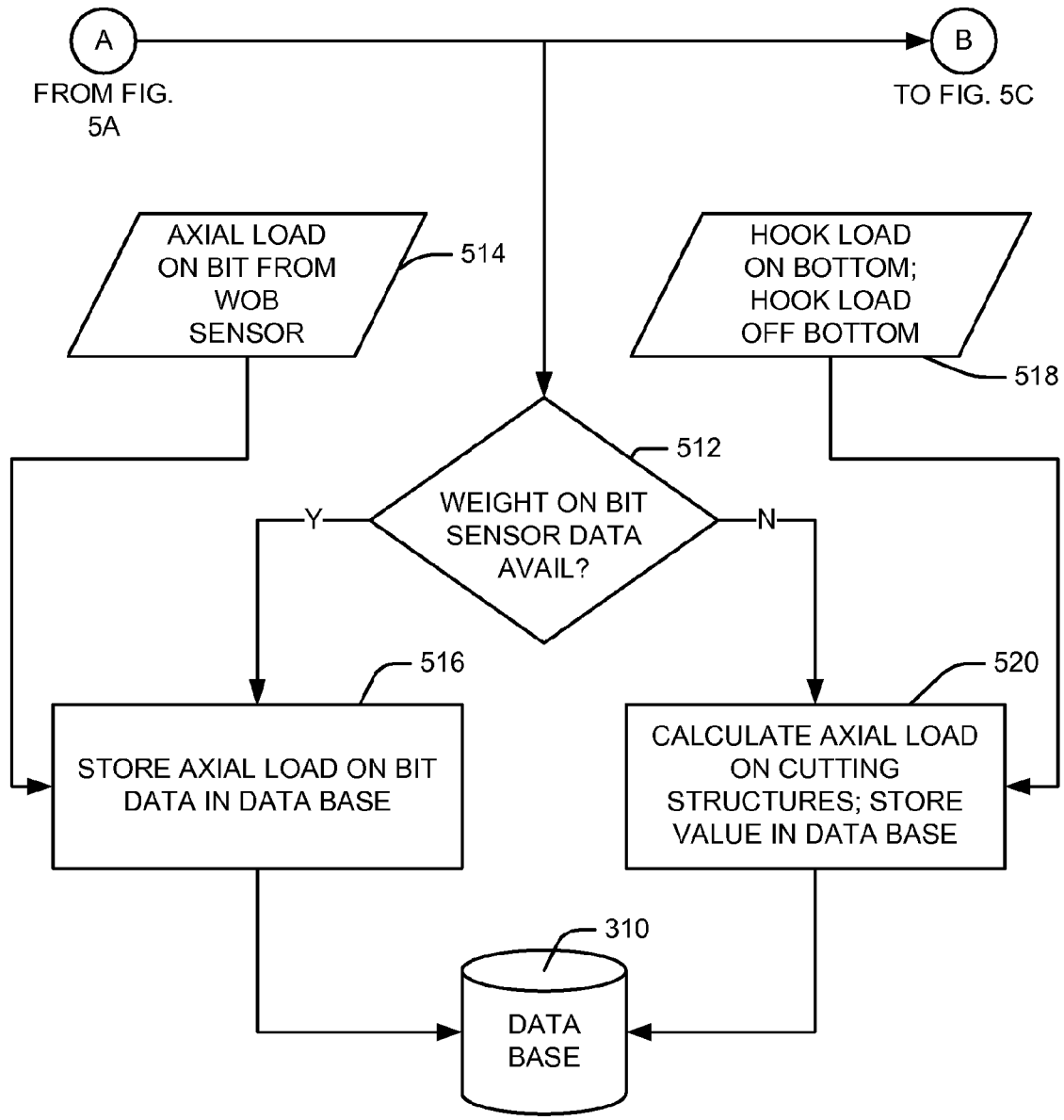

The description of one embodiment of the process of selecting data sources (block 405) continues on FIG. 5B. If the drilling system 10 includes a weight on bit (WOB) sensor (block 512), the computer/controller 52 retrieves the axial load on bit value 514 from the WOB sensor and stores it in the data base 310 (block 516). If the drilling system 10 does not include a WOB sensor (block 512), the computer/controller 52 retrieves values for the hook load when then bit is on the bottom and the hook load when the bit is not on the bottom 518. The computer/controller 52 uses those values to calculate the weight on the combined cutting structures (block 520) and stores the result in the data base 310 (block 520).

Figure 5C:
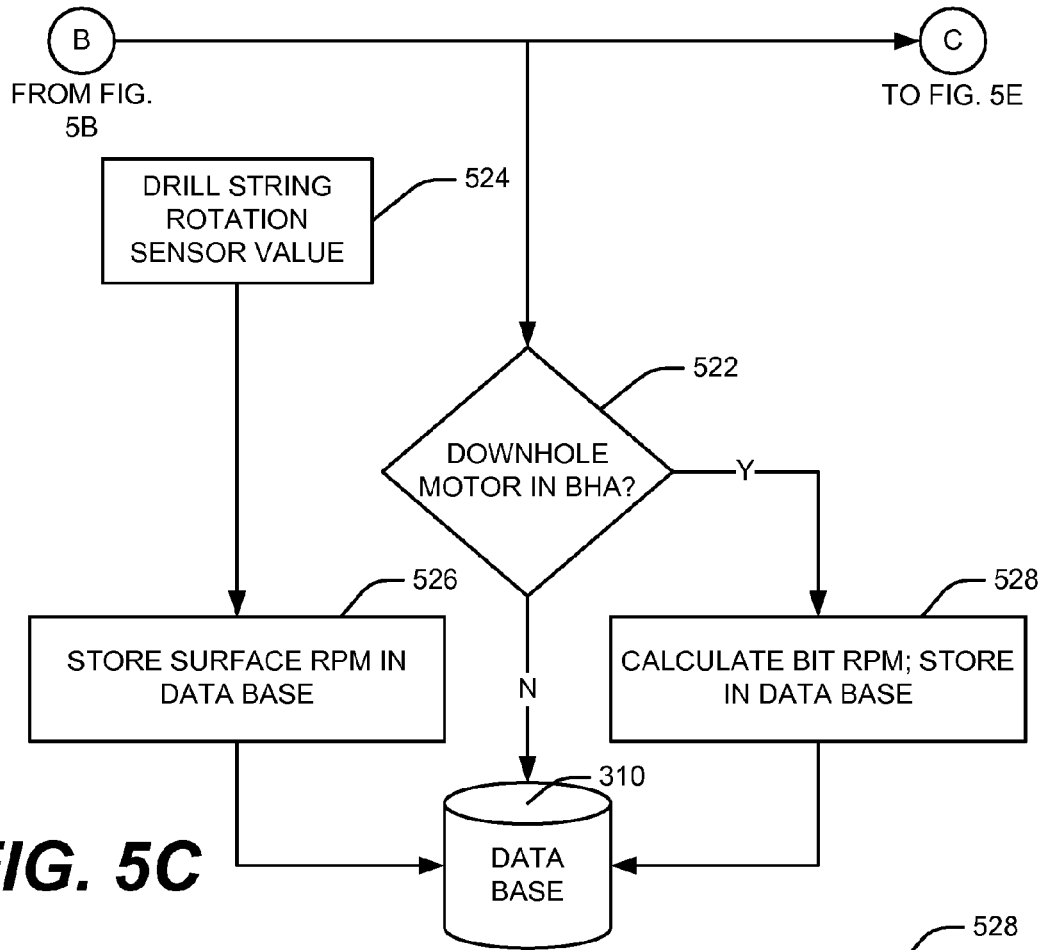
Figure 5D:
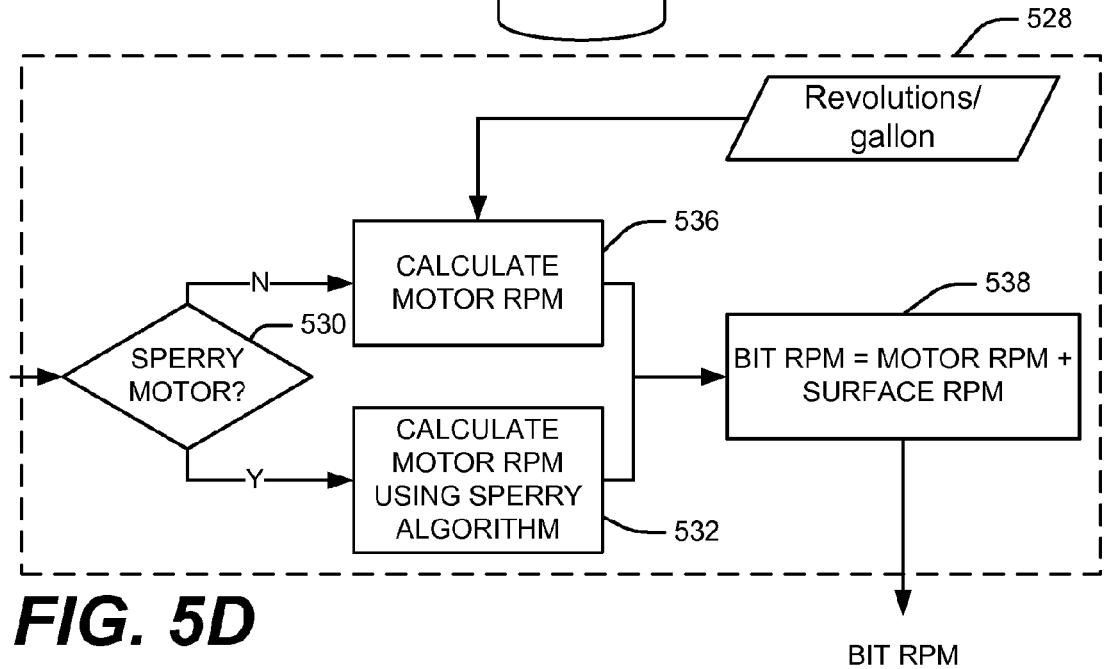

The description of one embodiment of the process of selecting data sources (block 405) continues on FIG. 5C. The computer/controller 52 retrieves the drill string rotation sensor value 524 and stores the surface RPM value in the data base 310 (block 526). If drilling system includes a downhole motor in the BHA, the computer/controller 52 calculates the bit RPM and stores it in the data base 310 (block 528). If the drilling system 10 does not include a downhole motor in the bottom hole assembly (BHA) (block 522), the bit RPM is equal to the surface RPM One embodiment of the process of calculating the bit RPM (block 528) is described in more detail in FIG. 5D. If the drilling system 10 includes a Sperry motor (i.e., a motor manufactured by the Sperry Drilling Services division of Halliburton) (block 530), the computer/controller 52 calculates a corrected motor RPM value using a Sperry algorithm (block 532):

$$y_i = y_0 - e^{bx} + 1 \qquad (1)$$

Where:
  $y_i$=corrected motor RPM value;
  $y_0$=RPM at 0 psi operating differential pressure, calculated by multiplying the current flow rate by the revolutions/gallon for the specific motor;
  b=correction factor for specific motor model; and
  x=current operating differential pressure.

If the drilling system 10 does not include a Sperry motor (block 530), the computer/controller 52 retrieves a revolutions per gallon value 534 entered by the user and uses that value to calculate the motor RPM (block 536). The motor RPM is then added to the surface RPM to calculate the bit RPM (block 538).

Figure 5E:
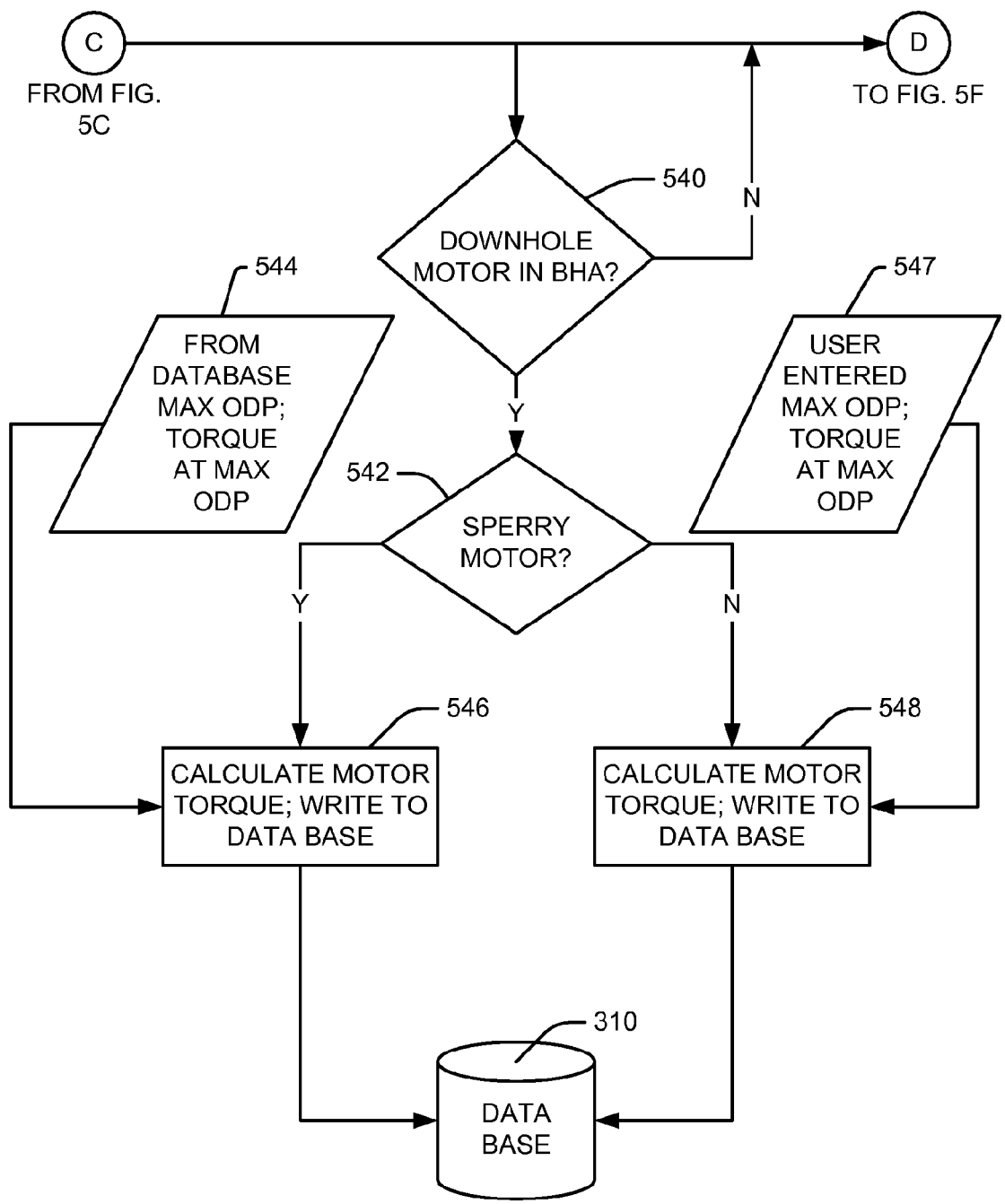

The description of one embodiment of the process of selecting data sources (block 405) continues on FIG. 5E. If the drilling system 10 includes a downhole motor in the BHA (block 540) and the downhole motor is a Sperry motor (block 542), the computer/controller 52 retrieves the maximum Operating Differential Pressure (OPD) and the torque at the maximum ODP 544 from a dataset stored in the database and calculates the motor torque using the following equation (block 546):

$$\text{motor torque} = \text{current ODP} * (\text{maximum torque})/(\text{maximum ODP}) \qquad (2)$$

This value is then stored as torque on bit in the data base 310 (block 546). If the drilling system 10 includes a downhole motor in the BHA (block 540) but the downhole motor is not a Sperry motor (block 542), the values 547 can be entered by a drilling system operator and these values used to compute motor torque using equation (2) above (block 548). This value is then stored in the data base 310 as torque on bit (block 548). This process can also be used by the drilling systems operator to over-ride the default values in the database for Sperry downhole motors.

Figure 5F:
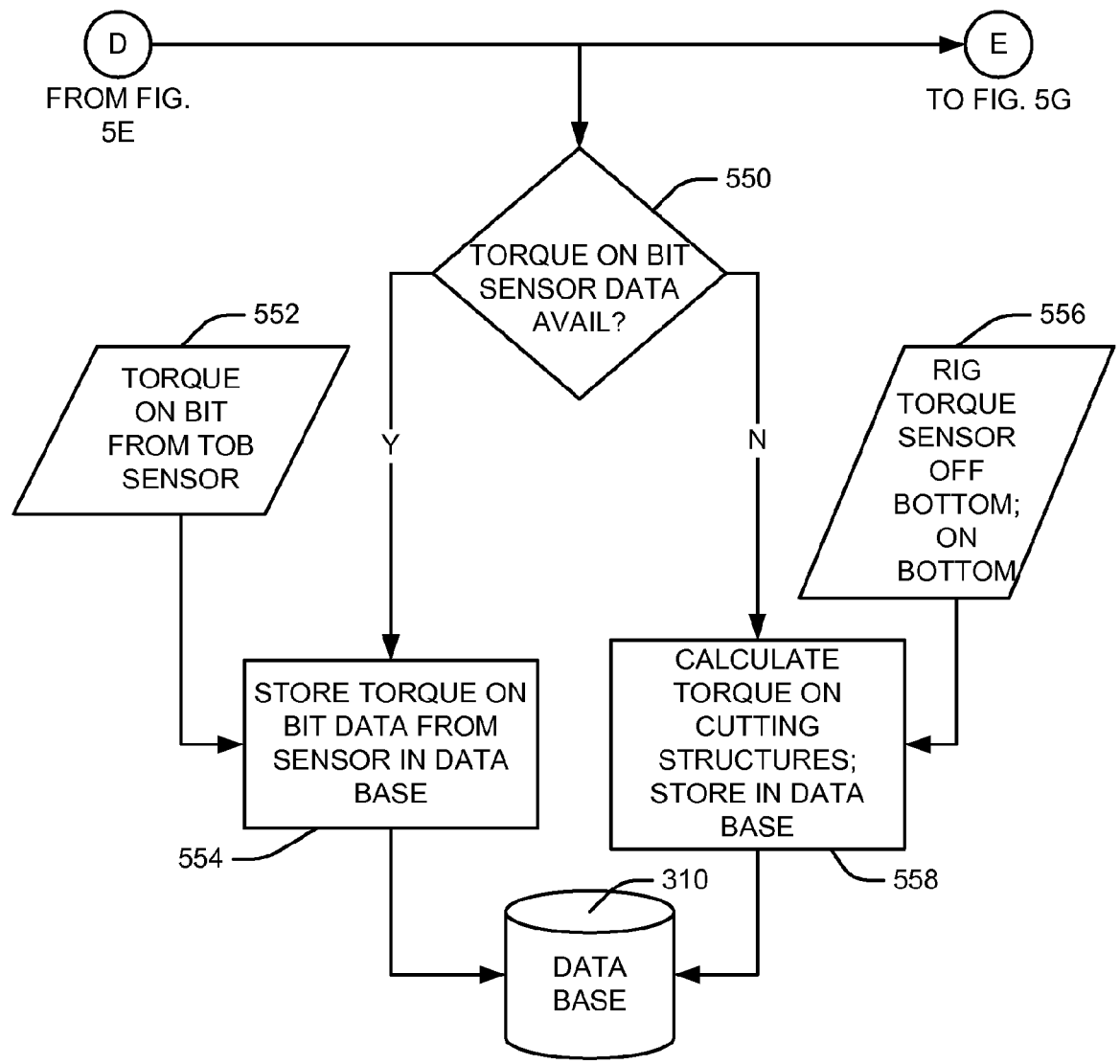

The description of one embodiment of the process of selecting data sources (block 405) continues on FIG. 5F. If TOB data is available in the drilling system 10 (block 550), the computer/controller 52 retrieves the LWD TOB data 552 and stores it in the data base 310 (block 554). If TOB data is not available in the drilling system 10 (block 550), the computer/controller 52 retrieves rig torque sensor values when the bit is off the bottom and when the bit is on the bottom 556. The computer/controller 52 uses those values to compute torque on the combined cutting structures and stores that value in the data base 310 (block 558).

Figure 5G:
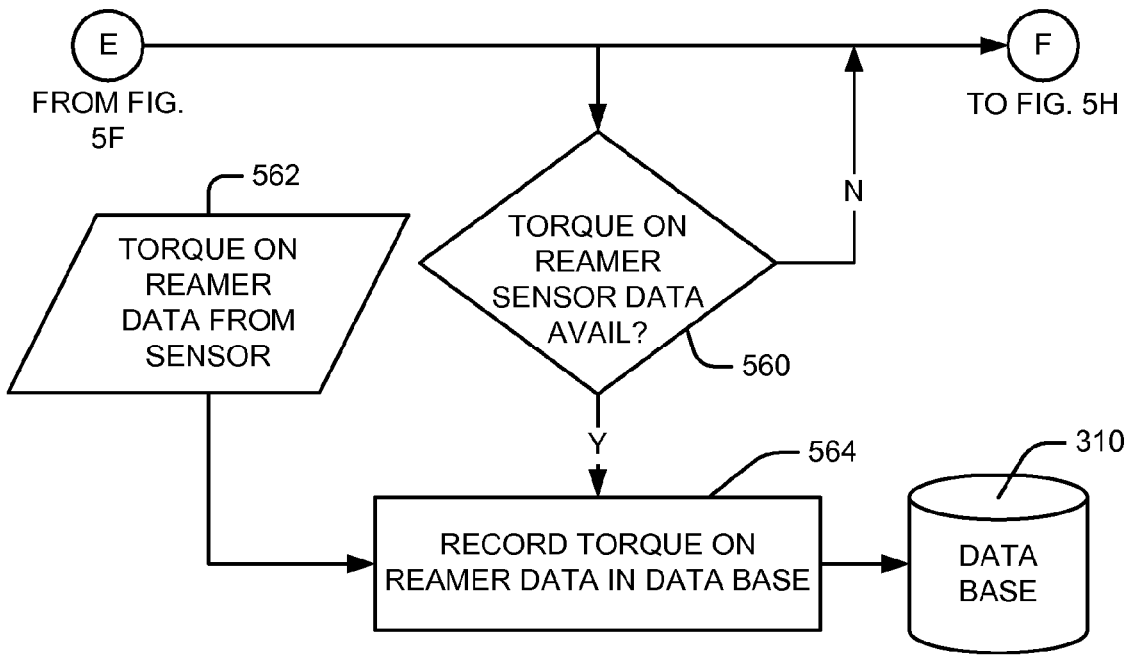

The description of one embodiment of the process of selecting data sources (block 405) continues on FIG. 5G. If reamer TOB sensor data is available (block 560), the computer/controller 52 retrieves the LWD torque on reamer data 562 and stores it in the data base 310 (block 564).

Figure 5H:
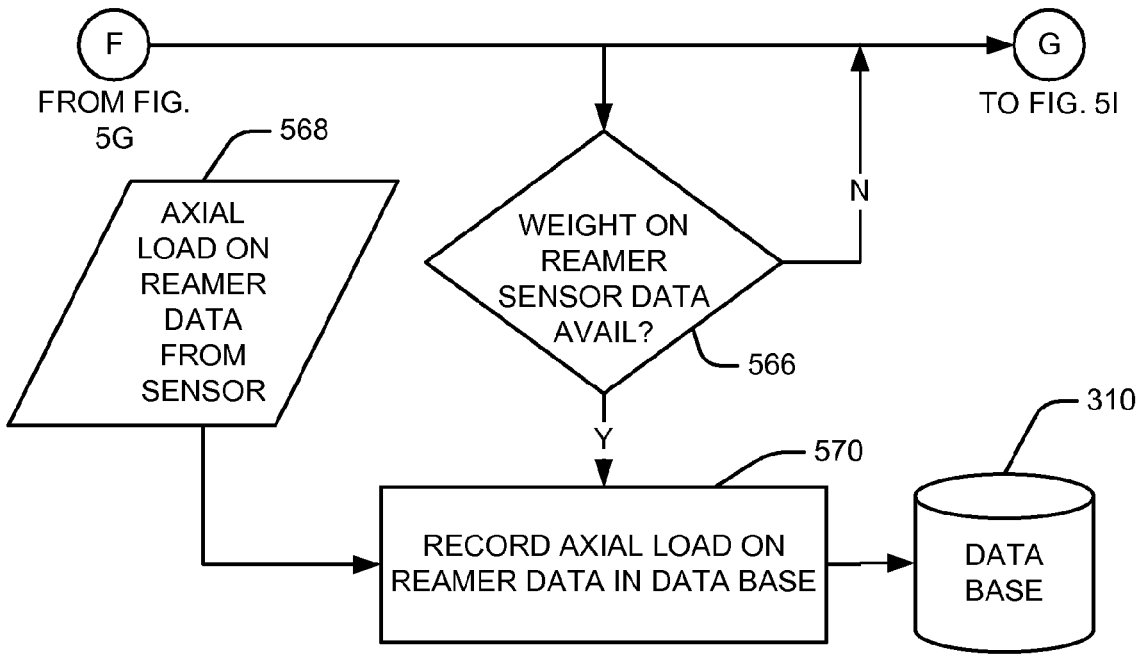

The description of one embodiment of the process of selecting data sources (block 405) continues on FIG. 5H. If reamer WOB sensor data is available (block 566), the computer/controller 52 retrieves the LWD axial load on reamer data 568 and stores it in the data base 310 (block 570).

Figure 5I:
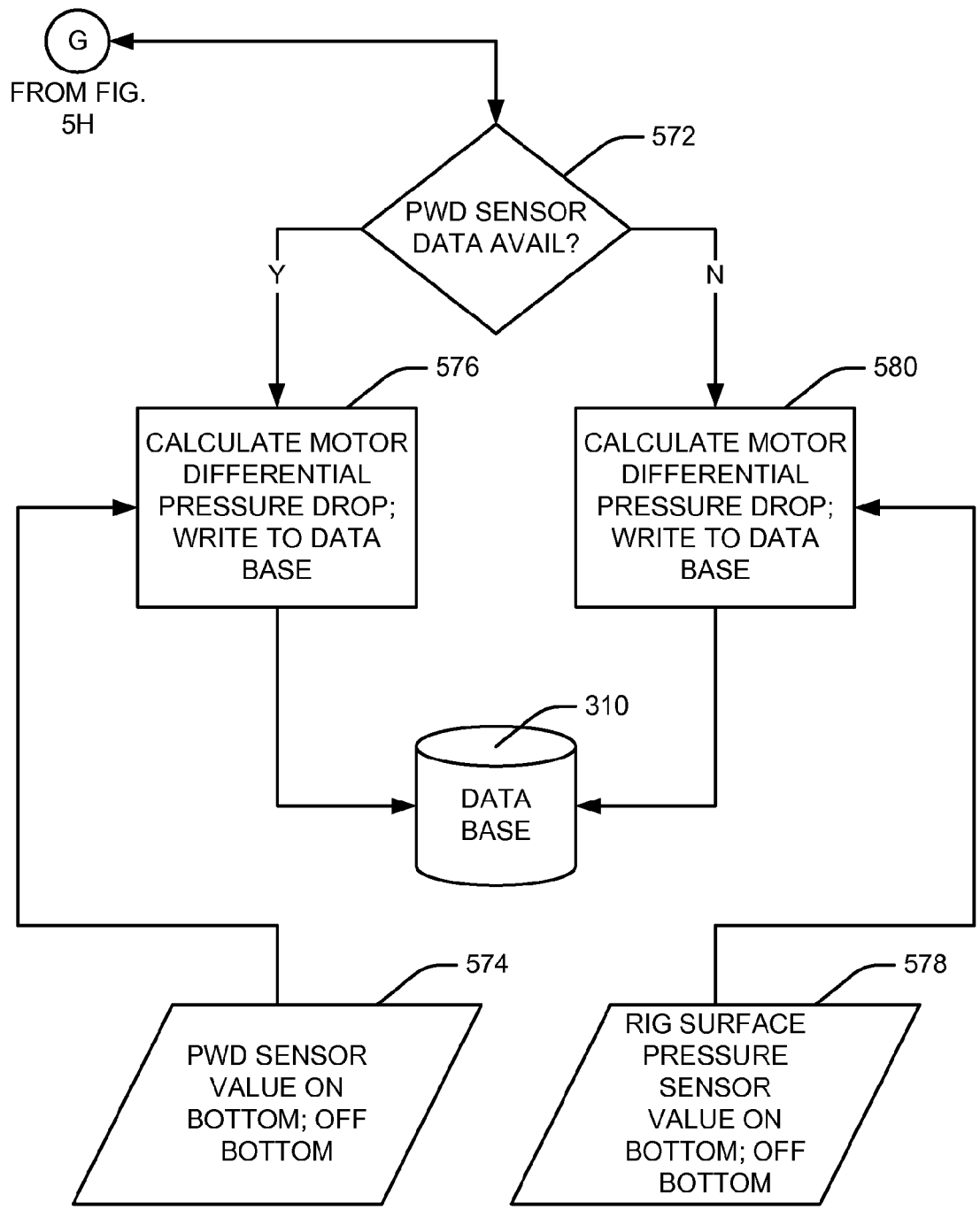

The description of one embodiment of the process of selecting data sources (block 220) continues on FIG. 5I. If pressure-while-drilling ("PWD") sensor data is available (block 572), the computer/controller 52 retrieves PWD sensor data when the bit is on the bottom and when the bit is off the bottom 574, calculates motor differential pressure drop from those values, and stores the result in the data base 310 (block 576). If PWD sensor data is not available (block 572), the computer/controller 52 retrieves rig surface pressure when the bit is on the bottom and when the bit is off bottom 578, uses those values to calculate motor differential pressure drop, and stores the result in the data base 310 (block 580).

Figure 6:
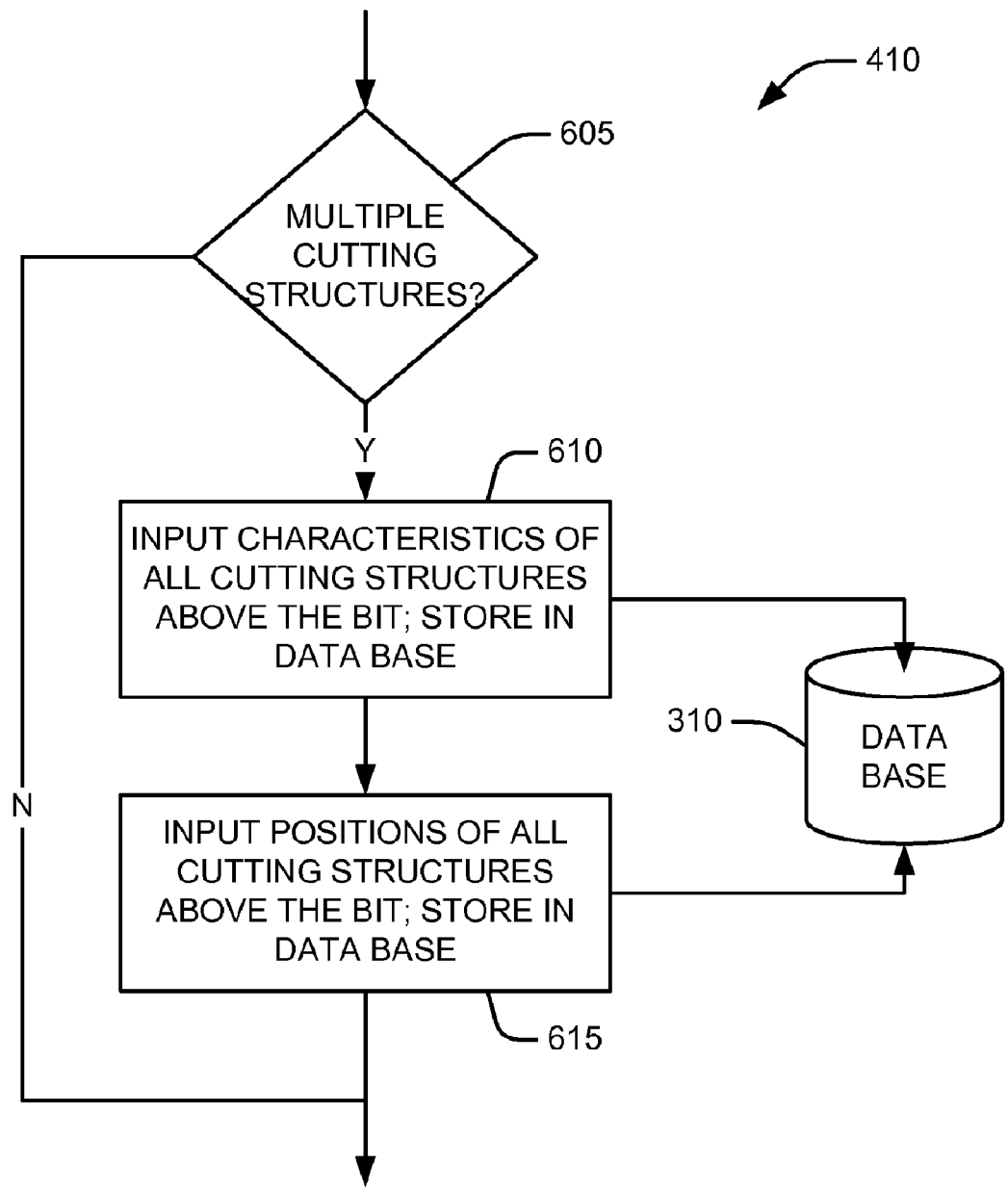
FIG. 6 illustrates a flow chart of one embodiment of the process of inputting cutting structures data.

The process of one embodiment of inputting cutting structures data (block 410) is described in more detail in FIG. 6. If the drilling system 10 does not include multiple cutting structures (block 605), this process is skipped. If the drilling system 10 includes multiple cutting structures (block 605), the characteristics of the cutting structures above the bit (the one or more secondary cutting structures) are entered and stored in the data base 310 (block 610). In addition, the positions of the cutting structures above the bit are entered and stored in the data base 310 (block 615).

Figure 7:
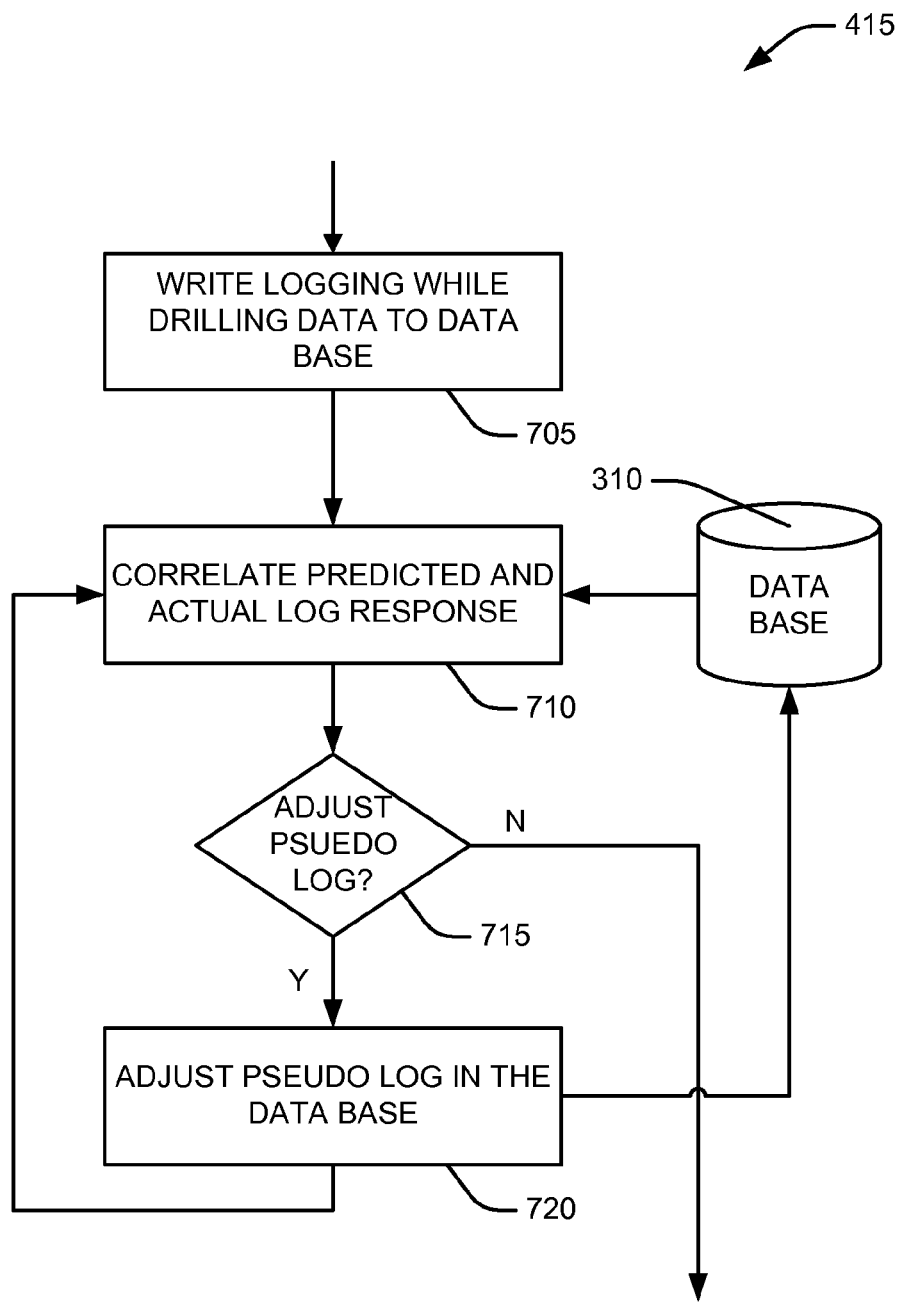
FIG. 7 illustrates a flow chart of one embodiment of the process of correlating logs.

One embodiment of the process of correlating logs (block 415) is described in more detail in FIG. 7. As the well is being drilled, the LWD data is saved to the data base 310 (block 705). The predicted logging data from the pseudo log is compared to the actual logging data (block 710). To do this, the pseudo log responses are presented to a drilling system operator alongside the actual log responses. The drilling system operator matches points on the two sets of curves and software stretches and compresses the remainder of the pseudo log so that the two sets of curve match. A determination is then made as to whether to adjust the pseudo log (block 715). When the systems operator is confident that the match is correct and 'saves' the update, the remainder of the pseudo log is recalculated. The curve matching may be done manually or automatically. If an adjustment is required, the pseudo log is adjusted in the data base 310 (block 720). After the pseudo log is adjusted a notice is sent to the models indicating that new pseudo log data is available. The process then returns to correlating the pseudo log and the actual logging data (block 710). The process of correlating logs continues to the end of the section being drilled (block 715).

Figure 8:
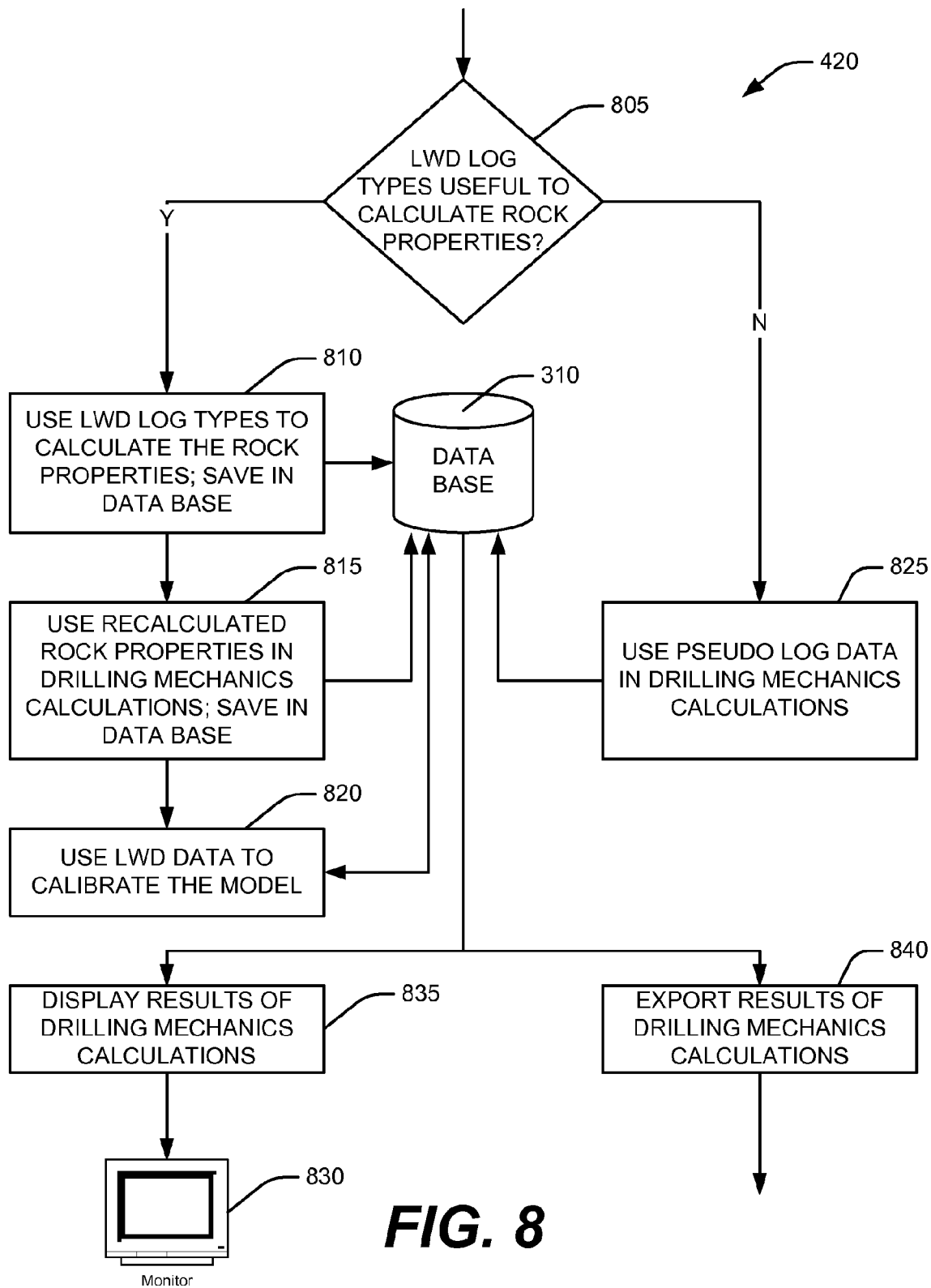
FIG. 8 illustrates a flow chart of one embodiment of the process of updating rock properties.

One embodiment of the process of updating rock properties (block 420) is described in FIG. 8. The process first determines if the LWD logged data is among the types useful to calculate rock properties (block 805). That is, the process determines whether the logs are the types that can be used to calculate confined rock strength, unconfined rock strength, and shale plasticity. If they are, the LWD log data is used to calculate the rock properties and the results are stored in the data base 310 (block 310). The recalculated rock properties are then used to update the drilling mechanics calculations (block 815) and the LWD data is used to calibrate the models described above (i.e., the lithology model, the rock strength model, the shale plasticity model, the mechanical efficiency model, the optional hole cleaning efficiency model, the bit wear model, and the penetration rate model) (block 820). In one embodiment, the models are stored in the data base 310. If the LWD logs are not useful to calculate rock properties, the pseudo log data is used in the drilling mechanics calculations (block 825). The results of the drilling mechanics calculations are then retrieved from the data base 310 and displayed on a monitor 830 (block 835). The results of the drilling mechanics calculations are also exported to other sub-systems within the drilling system 10 and outside the drilling system 10 that use such data to control the drilling system 10 (block 840).

Figure 9:
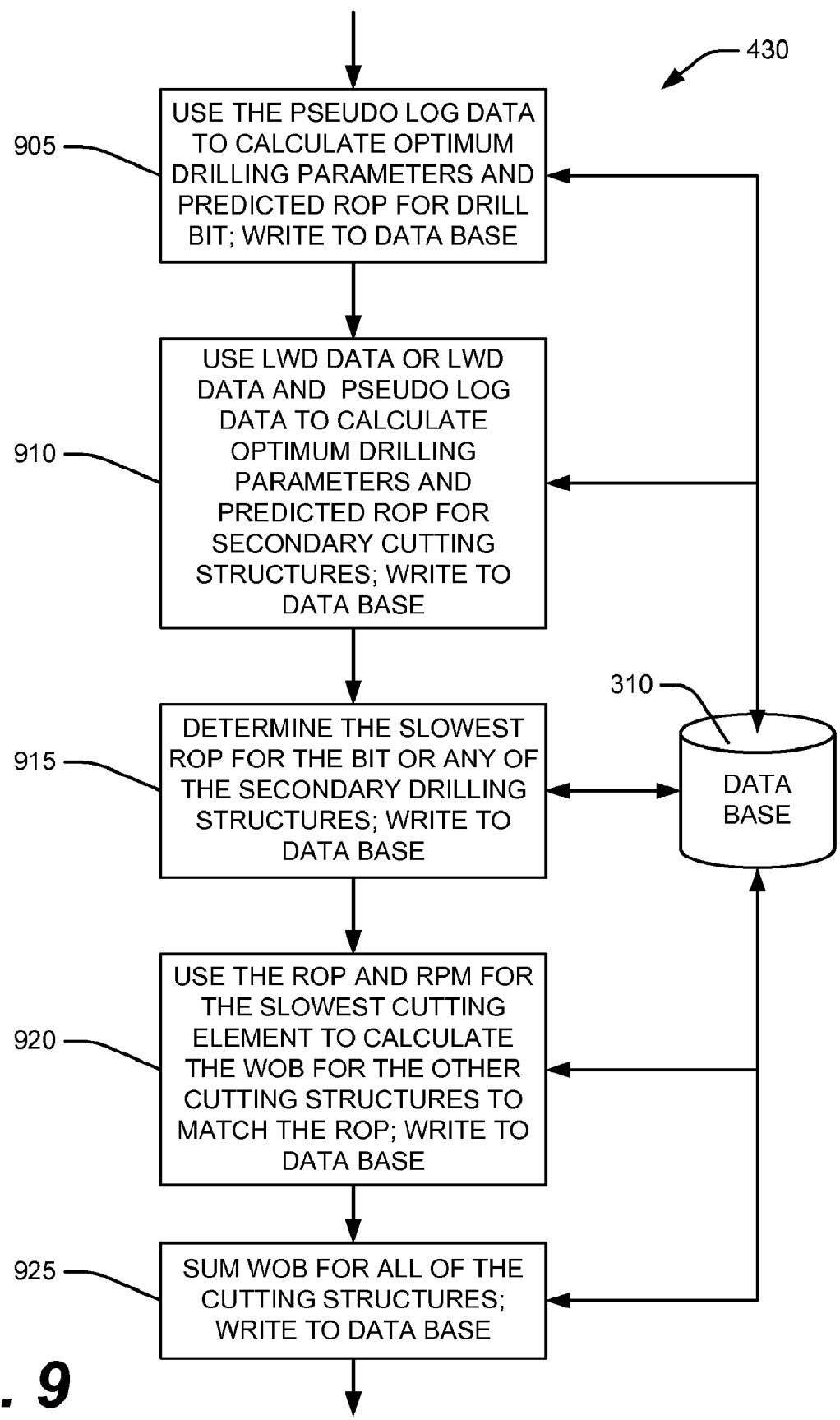
FIG. 9 illustrates a flow chart of one embodiment of the process of identifying the optimum drilling parameters for a drilling assembly with multiple cutting structures where the cutting structures may be drilling through rocks with dissimilar properties. The process is designed to ensure that the load on any one cutting structure does not exceed the predetermined constraints associated with that cutting structure.

One embodiment of the process of identifying the optimum drilling parameters for a drilling assembly with multiple cutting structures where the cutting structures may be drilling through rocks with dissimilar properties (block 430), which is designed to ensure that the load on any one cutting structure does not exceed the predetermined constraints associated with that cutting structure, is described in greater detail in FIG. 9. The pseudo log data stored in the data base 310 is used to calculate (within the constraints) the optimum drilling parameters, including WOB and RPM, and predicted rate of penetration ("ROP") for the drill bit (block 905), as described above in the description of the mechanical efficiency model, the bit wear model, the penetration model, and the optional hole cleaning efficiency model. Those values are stored in the data base 310 (block 905). The LWD data or a combination of the LWD data and the pseudo log data is then used to calculate (within the constraints) the optimum drilling parameters, including WOB and RPM, and predicted ROP for the one or more secondary drilling structures (block 910), as described above in the description of the mechanical efficiency model, the bit wear model, the penetration model, and the optional hole cleaning efficiency model. The LWD data may include data about the rock being penetrated by the secondary drilling structures because such data may have been gathered by LWD equipment below the secondary cutting structures as they passed through the rock already penetrated by the bit 22. Similarly, the LWD data used to calculate (within the constraints) the optimum drilling parameters and predicted ROP for cutting structures, such as cutting structure 76, that are higher on the drill string than other cutting structures, such as cutting structure 74, may include data collected by LWD equipment located between the secondary cutting structures. The optimum drilling parameters and predicted ROPs for the cutting structures are stored in the data base 310 (block 910).

The cutting structure having the slowest ROP is identified, if the assembly does not contain a down hole motor, using the RPM value from the cutting structure with the slowest ROP. The WOB required for each of the other cutting structures to achieve the same ROP is calculated (block 920) as described above in the description of the mechanical efficiency model, the bit wear model, the penetration model, and the optional hole cleaning efficiency model. The result is written to the data base 310 (block 920). If a down hole motor is in the assembly then the RPM value used in the calculations takes the motor speed into consideration (i.e., the bit 22 may operate at a different RPM than the secondary cutting structures). The WOB for all of the cutting structures is then summed and the result is written to the data base 310 (block 925).

Figure 10:
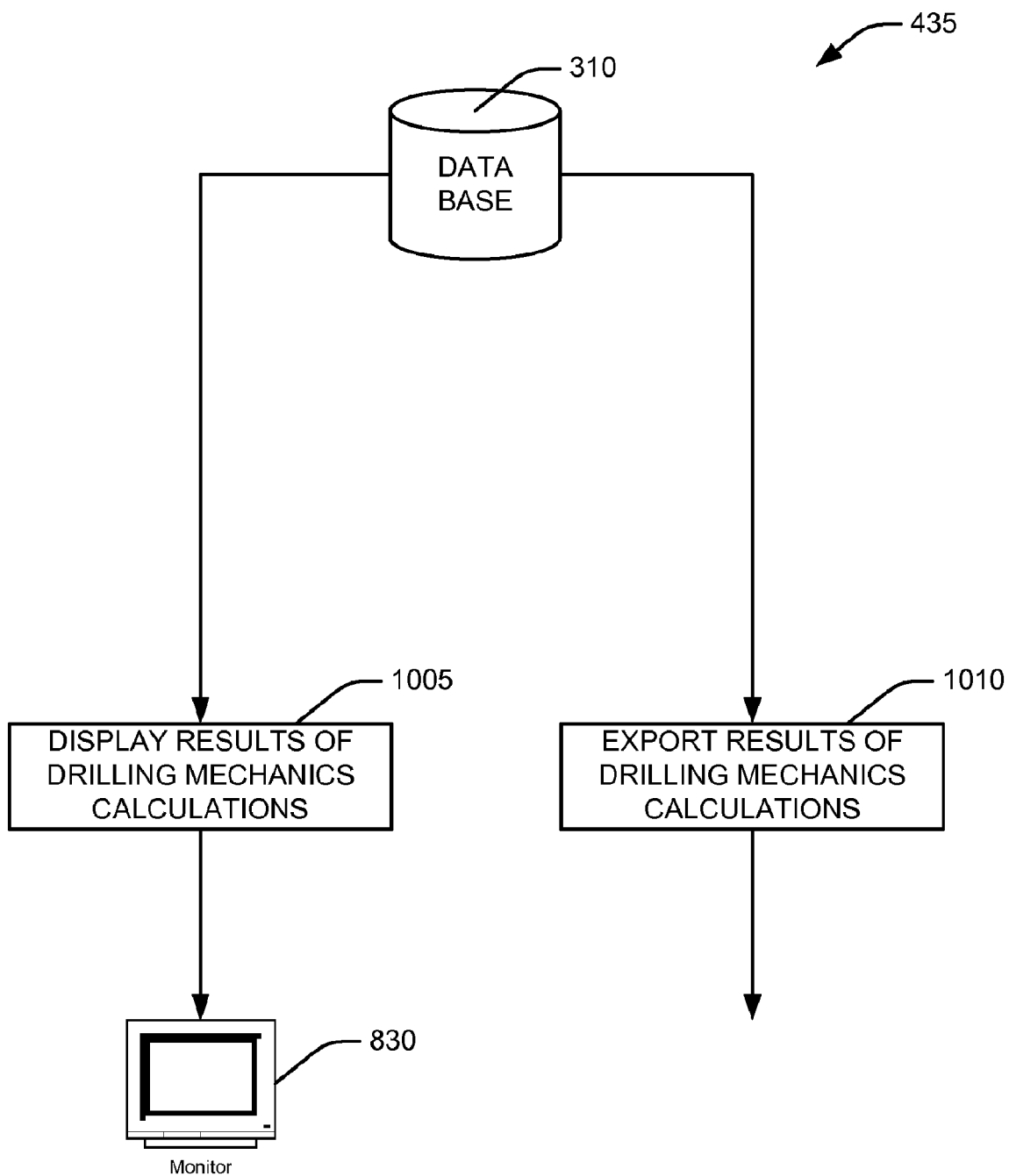
FIG. 10 illustrates a flow chart of one embodiment of the process of managing drilling mechanics.

One embodiment of the process of managing the drilling mechanics (block 435) is illustrated in FIG. 10. The results of the drilling mechanics calculations, which are stored in the data base 310, are displayed on a monitor 830 (block 1005)

and are exported to other sub-systems within the drilling system 10 and outside the drilling system 10 that uses such data to control the drilling system 10 (block 1010). For example, the summed WOB figure and the RPM figure computed in block 925 can be used by the drilling operator, by the computer/controller 52, or by the remote real time operating center 78 to adjust the WOB and the RPM of the drilling system. If the WOB is higher than the figure computed in block 925, the WOB can be reduced. If the WOB is lower than the figure computed in block 925, the WOB can be increased. The RPM for the drilling system is set to the slowest RPM computed for all of the cutting structures. If the drilling system includes a down hole motor, the RPM for the rotary portion of the drilling system is set to the slowest RPM computed for all of the cutting structures that are driven by the rotary portion of the drilling system, i.e., those cutting structures whose RPM is not affected by the down hole motor. When the drilling system includes a down hole motor, the bit 22 may operate at a different RPM than the other cutting structures.

Since the WOB and RPM computed in block 925 have been calculated to optimize the performance of all of the cutting structures within the constraints of the drilling system 10 as a whole including the cutting structures, adjusting the WOB and RPM to those values will optimize the operation of the drilling system 10.

In addition, the predicted rate of penetration, predicted RPM, predicted combined weight and/or predicted individual weight on bit and weight on secondary cutting structures are exported and displayed so that the actual drilling parameters can be controlled to match predicted values.

Theory Behind Lithology Model (See U.S. Pat. No. 6,044,327)

The lithology model 1146 presupposes the existence of a suite of lithology sensitive logs. Core samples are desirable but are not strictly necessary. It is assumed that formation porosity can be extracted from the log suite using any of several methods that are currently in use by the industry. A lithology independent porosity, such as the nuclear magnetic resonance or the neutron-density porosity, is preferred. Calibration of the log derived porosity to measured core porosity is also preferred for greatest verifiable accuracy. If sufficient core analyses are available to calibrate the model, it is theoretically possible to compute a more accurate porosity.

First, the effects of porosity are removed from the raw log data by converting the logs to matrix values. Matrix logs are porosity independent and reflect the properties of the formation matrix exclusively. For instance, for the sonic log, the following well known equation was first proposed by Wyllie:

$$t_{LOG}=(1-\phi)t_M+\phi t_F \quad (1)$$

where:
$t_{LOG}$ raw sonic log data, or formation transit time (μs/ft)
$t_M$ transit time of the formation matrix (μs/ft)
$t_F$ transit time of the fluid occupying the formation pore space (μs/ft)
φ formation porosity (pore volume expressed as a fraction of total volume)

Solving for the matrix transit time, $t_M$, yields:

$$T_m=(t_{LOG}-\phi t_f)/(1-\phi) \quad (2)$$

Similar expressions for matrix values can be derived for any lithology sensitive log including the density, neutron, and gamma ray logs. Note that the photoelectric log must be converted to the volumetric cross section, U, before it can be converted to a matrix value.

The method will yield more accurate results if the lithologic components in the interval of interest are known either from actual core analyses, drill cuttings information or "mud" logs, or from knowledge of local geology from other offset wells in the vicinity of the subject well (i.e. the well in which the well logs were run). The method may be applied without such knowledge but accuracy will suffer as a result because the logging technology currently available to the industry cannot discriminate between non-shale components with absolute certainty. The photoelectric log is more sensitive to non-shale components than the other logs and will generally yield more accurate results. In other words, it is always better to know what components are present from a log independent source so that the log analysis will not find components that are not physically present. This is a limitation of all lithology models.

The use of simultaneous equations to model lithologic composition is deliberately avoided because of several inherent problems with this approach as described above. A novel way to model component fractions that avoids these pitfalls is now described.

Dual Compositional Model

The concentration of a particular lithologic component within the formation matrix is proportional to the difference between a given log value and a reference log value associated with the component in its purest form. For instance, sandstone has a reference sonic value of about 55 (μs/ft). Maximum sandstone concentration within the matrix occurs at this value, and decreases proportionately as the log data moves away from the value, for example, as illustrated in FIG. 1 of the drawings. There may be log values above and below the reference value where the sandstone concentration diminishes to zero. These "extinction limits" can be measured or inferred from laboratory tests.

The concentration of sandstone may now be modeled as follows, using the density log for illustration purposes. If a given density log value is greater than the sandstone reference density, that is if PLOG≧PSS then:

$$f_{SS}=((P_{LOG}-P_{SS})/(P_{SSmax}-P_{SS}))^\alpha \quad (3)$$

On the other hand, if the log density is less than the reference density, that is if $P_{LOG} \leq P_{SS}$ then:

$$f_{SS}=((P_{SS}-P_{LOG})/(P_{SS}-P_{SSmin}))^\alpha \quad (4)$$

where:
$f_{SS}$ concentration factor of sandstone in matrix (fraction)
$P_{LOG}$ density log value (g/cc)
$P_{SS}$ reference density log value for sandstone, 2.65 (g/cc)
$P_{SSmax}$ maximum extinction limit for sandstone density (g/cc)
$P_{SSmin}$ minimum extinction limit for sandstone density (g/cc)
α mineralogy exponent Concentration factors for other components and other logs can be derived similarly. Note that the sandstone concentration is reduced to extinction when its concentration factor $f_{SS}=1$. When the density log value coincides with the sandstone reference value, that is when $P_{LOG}=P_{SS}$, then $f_{SS}=0$ and the sandstone concentration reaches a maximum value. This behavior can be mathematically modeled as follows:

$$C_{SS}=C_{SSmax}(1-f_{SS}) \quad (5)$$

where:
$C_{SS}$ concentration of sandstone in matrix (fraction, non-normalized)
$C_{SSmax}$ maximum concentration of sandstone in matrix (fraction, non-normalized)

The concentration of other components can be modeled similarly. These concentrations are not normalized, that is to say, they do not sum to one. Normalizing the components is accomplished by dividing each component by the sum of all components present. For instance, a three component mixture composed of sandstone, limestone, and shale would be normalized as follows:

$$C_{SS}/(C_{SS}+C_{LS}+C_{SH})+C_{LS}/(C_{SS}+C_{LS}+C_{SH})+C_{SH}/(C_{SS}+C_{LS}+C_{SH}) \quad (6)$$

where:

$C_{LS}$ concentration of limestone in matrix (fraction, non-normalized)

$C_{SH}$ concentration of shale in matrix (fraction, non-normalized)

The normalized concentration for sandstone, $V_{SS}$, may now be expressed as:

$$V_{SS}=C_{SS}/(C_{SS}+C_{LS}+C_{SH}) \quad (7)$$

and eq. (6) can be simplified to:

$$V_{SS}+V_{LS}+V_{SH}=1 \quad (8)$$

where:

$V_{SS}$ sandstone concentration (fraction, normalized)
$V_{LS}$ limestone concentration (fraction, normalized)
$V_{SH}$ shale concentration (fraction, normalized)

The model described by eq. (8) is referred to as a proportional mixture model since it precludes the existence of any component in pure form, even at that component's reference value provided there are multiple components with overlapping ranges of existence. In fact, the model assumes that the concentrations of all components are proportional to the difference between their respective reference values and a given log value of interest. If all components are present to their maximum non-normalized concentrations (i.e., if $C_{SSmax}=C_{LSmax}=C_{SHmax}=1$) then eq. (8) represent the maximum possible concentration of all components present. In essence, it represents a theoretical equilibrium concentration.

At equilibrium concentration, the proportional mixture model provides a valuable mathematical reference. However, such equilibrium concentrations do not generally occur in nature. It is, in fact, possible for the maximum concentration of any component to range from 0-100% at that component's reference value (i.e., $0 \leq V_{SS} \leq 1$). The precise value of this maximum concentration is most accurately determined from a compositional analysis of an actual core sample. The proportional mixture model does allow the maximum concentration of a given component to drop to zero, by allowing $C_{SSmax}$ to drop to zero ($C_{SSmax}$ can range in value from $0 \leq C_{SSmax} \leq 1$). However, the model does not permit a component to exist in pure form. A pure component model is therefore needed to describe this latter situation.

Pure Component Model

A pure component model can be derived by multiplying the non-normalized concentration of each component by the concentration factors of all other components present as follows:

$$C_{SSP}=C_{SSmax}(1-f_{SS})f_{LS}f_{SH} \quad (9)$$

where:

$C_{SSP}$ sandstone concentration, pure component model (fraction, non-normalized) Note that if $C_{SSmax}=0$ and $f_{SS}=0$ then the maximum sandstone concentration is zero (i.e. the component is not physically present) and $f_{ss}$ is arbitrarily set equal to one to avoid a division by zero error when calculating the concentrations of the other components.

Other components can be modeled similarly. Normalizing the components yields the following expression for the pure component model:

$$C_{SSP}/(C_{SSP}+C_{LSP}+C_{SHP})+C_{LSP}/(C_{SSP}+C_{LSP}+C_{SHP})+C_{SHP}/(C_{SSP}+C_{LSP}+C_{SHP}) \quad (10)$$

where:

$C_{LSP}$ limestone concentration, pure component model (fraction, non-normalized)

$C_{SHP}$ shale concentration, pure component model (fraction, non-normalized)

The normalized concentration for sandstone, $V_{SSP}$, may now be expressed as:

$$V_{SSP}=C_{SSP}/(C_{SSP}+C_{LSP}+C_{SHP}) \quad (11)$$

and eq. (10) can be simplified to:

$$V_{SSP}+V_{LSP}+V_{SHP}=1 \quad (12)$$

where:

$V_{SSP}$ sandstone concentration, pure component model (fraction, normalized)
$V_{LSP}$ limestone concentration, pure component model (fraction, normalized)
$V_{SHP}$ shale concentration, pure component model (fraction, normalized)

The pure component model guarantees that a given component will be 100% pure at its reference value. Impure concentrations, or more precisely, concentrations that lie between the proportional and pure limits, can be modeled by taking a weighted average of the two models hence providing a dual compositional model. For instance, 90% of the pure model value and 10% of the proportional mixture value would yield an impure concentration between these limits. In this fashion, the model can be calibrated to a mineralogical analysis of an actual core sample, thereby providing the greatest possible verifiable accuracy.

For instance, for sandstone:

$$V_{SSC}=V_{SS}(1-P)+V_{SSP}P \quad (13)$$

where:

$V_{SSC}$ calibrated sandstone concentration, dual compositional model

P pure component model weighting factor (fraction, empirical)

Calibrated concentrations can be calculated in a similar fashion for other components and other logs.

The preceding text describes the dual compositional model as applied to a single well log. Multiple well logs are analyzed similarly by applying the model to each log individually.

In a computerized application, it is useful to visually inspect the lithology derived from each log individually (in this context, lithology means the concentration of each component as a function of depth). If the log data is reasonably accurate and the components selected for analysis are physically present, then the peak concentration of each component should be in reasonably good depth alignment among all of the logs. For instance, if a sandstone stratum is physically present, then all of the logs individually should indicate peak sandstone concentration at roughly the same depth (in fact, these peak concentrations could be used as reference points for depth alignment purposes). Misalignment of peak concentrations is an indication of inaccurate log data. If the peaks are misaligned, or if different components are seen by different logs at the: peaks, then this indicates either a data quality problem with one or more of the logs, or the component selected may not be physically present and another component should be selected in its place (also, peak concentrations will vary in amplitude due to a particular log's ability to resolve a particular component). The use of simultaneous equations by prior art methods in such circumstances results in negative component concentrations, division by zero errors, or method failure. One must resort to arbitrarily adjusting the reference values of each component in order to force an acceptable solution. This process has been described as "a series of maneuvers which are Byzantine variations on a simple theme that seeks to determine the most feasible set of components whose number is prescribed by the log suite to give a unique solution" by J. H. Doveton and H. W. Cable in "Fast Matrix Methods for the Lithological Interpretation of Geophysical Logs", in Geomathematical and Petrophysical Studies in Sedimentology, Gill, D., and Merriam, D. F., eds., Pergamon, Oxford, 1979, page 106. Of course, such arbitrary adjustments mask a deeper problem. Prior art methods assume that component concentrations are 100% pure at their reference log values. With the proposed dual compositional model, the maximum component concentration does indeed occur at the reference value as it should, but the maximum concentration may vary from 0-100% as it does in nature.

Multiple logs may be analyzed simultaneously by applying an empirical weighting factor to each component oil each log. These weighting factors may be based on a statistical analysis of a given log's ability to resolve a given component. For instance, the weighting factors could be based on the normalized cumulative volumes of each component from each log over an interval of interest. For instance, consider a three (3) component system consisting of limestone, sandstone and shale, with three (3) well logs available, namely the gamma ray, sonic, and density logs. Weighting factors for the limestone component could be estimated as follows:

$$(P_{LS})_{GAMMA} = [\Sigma(V_{LS})_{GAMMA}/(\Sigma(V_{LS})_{GAMMA} + \Sigma(V_{LS})_{SONIC} + \Sigma(V_{LS})_{DENSITY})] \quad (14)$$

$$(P_{LS})_{SONIC} = [\Sigma(V_{LS})_{SONIC}/(\Sigma(V_{LS})_{GAMMA} + \Sigma(V_{LS})_{SONIC} + \Sigma(V_{LS})_{DENSITY})] \quad (15)$$

$$(P_{LS})_{DENSITY} = [\Sigma(V_{LS})_{DENSITY}/(\Sigma(V_{LS})_{GAMMA} + \Sigma(V_{LS})_{SONIC} + \Sigma(V_{LS})_{DENSITY})] \quad (16)$$

where:

$\Sigma(V_{LS})_{GAMMA}$ cumulative limestone concentration from gamma ray log $\Sigma(V_{LS})_{SONIC}$ cumulative limestone concentration from sonic log $\Sigma(V_{LS})_{DENSITY}$ cumulative limestone concentration from density log $\Sigma(P_{LS})_{GAMMA}$ limestone weighting factor for gamma ray log $\Sigma(P_{LS})_{SONIC}$ limestone weighting factor for sonic log $\Sigma(P_{LS})_{DENSITY}$ limestone weighting factor for density log Weighting factors for the other components may be derived similarly. Alternatively, the weighting factors can be measured or inferred from laboratory tests, or estimated based on experience with local geology and the specific logging tools used. The weighting factors are crucial to obtaining accurate results. For instance, it is well known that the gamma ray log is generally the best single-log shale indicator. A coal streak might be detected by the neutron log but missed entirely by the gamma ray or only partially resolved by the sonic log. If the quality of an individual log is poor then low weighting factors can be applied to the log's components to minimize the impact of the log on the overall analysis.

For instance, consider a four (4) component mixture and three (3) well logs as follows:

| | Components | | | |
|---|---|---|---|---|
| Logs | $V_{DOL}P_{DOL}$ | $V_{LS}P_{LS}$ | $V_{SS}P_{SS}$ | $V_{SH}P_{SH}$ |
| Gamma Ray | (0.1)(0.333) | (0.1)(0.1) | (0.2)(0.1) | (0.6)(0.8) |
| Sonic | (0.1)(0.333) | (0.2)(0.5) | (0.5)(0.4) | (0.2)(0.1) |
| Density | (0.2)(0.333) | (0.1)(0.4) | (0.3)(0.5) | (0.4)(0.1) |
| Total by Column | 0.13 | 0.15 | 0.37 | 0.54 | where:
$V_{DOL}$ dolomite concentration
$V_{LS}$ limestone concentration
$V_{SS}$ sandstone concentration
$V_{SH}$ shale concentration
$P_{DOL}$ dolomite weighting factor
$P_{LS}$ limestone weighting factor
$P_{SS}$ sandstone weighting factor
$P_{SH}$ shale weighting factor Also note that the following constraints apply:

$$V_{DOL} + V_{LS} + V_{SS} + V_{SH} = 1 \quad (17)$$

$$(P_{DOL})_{GAMMA\ RAY\ LOG} + (P_{DOL})_{SONIC\ LOG} + (P_{DOL})_{DENSITY} = 1 \quad (18)$$

As indicated by eq. (18), the empirical weighting factors, $P_{DOL}$, $P_{LS}$, $P_{SS}$, and $P_{SH}$, are constrained to sum to one for each lithologic component, not for each log. The numerical example above shows that the weighting factors are applied vertically by column. The weighted shale concentration, $V_{SHW}$, is calculated as follows:

$$V_{SHW} = (V_{SH}P_{SH})_{GAMMA\ RAY\ LOG} + (V_{SH}P_{SH})_{SONIC\ LOG} + (V_{SH}P_{SH})_{DENSITY} \quad (19)$$

In the example, $V_{SWH} = 0.54$. Weighted concentrations for the other non-shale components are calculated similarly The final shale concentration, $V_{SHF}$, is set equal to the weighted shale concentration, or:

$$V_{SHF} = V_{SHW} \quad (20)$$

A normalizing factor, k, is then calculated for the remaining non-shale components as follows:

$$k = (1 - V_{SHW})/(V_{DOLW} + V_{LSW} + V_{SSW}) \quad (21)$$

The final concentrations or the non-shale components are now given by:

$$V_{DOLF} = V_{DOLW} k \quad (22)$$

$$V_{LSF} = V_{LSW} k \quad (23)$$

$$V_{SSF} = V_{SSW} k \quad (24)$$

Log Error Suppression

Under certain conditions, data from some logs can be accurate while data from others can be inaccurate or erroneous. Under such circumstances it is desirable to suppress the incorrect log data. For instance, it is often the case that a coal stratum is well resolved by the density log, but poorly or incorrectly resolved by the sonic. The sonic matrix log often "sees" coal as dolomite and/or limestone due to the unusually high coal porosity.

In general then, for certain unusual lithologies such as coal, salt, and anhydrite for instance, it is desirable to suppress certain components seen by certain logs. The specific components to be suppressed depend on the logging tools used, the logging environment, and the geology. For instance, a computerized application might utilize a threshold coal volume to suppress erroneous dolomite and limestone, or expressed in computer logic:

IF $V_{coal}>5\%$ THEN $V_{dolomite}=0$ and $V_{limestone}=0$

The above line of code may be translated as follows: "If the volume of coal seen by the density log exceeds a threshold volume of 5 percent, then set the volumes of dolomite and limestone seen by the sonic matrix log to zero." Similar logic can be applied to other logs and components as necessary.

Alternate and Equivalent Methods

1) An alternate, but less preferred, approach would be to normalize, or partially normalize, the final shale concentration, $V_{SHF}$, along with the non-shales.

2) As mentioned above, an equivalent approach would be to apply the method to solve for porosity as well as lithology simply by treating porosity as another lithologic component (and, of course, it is another component). In this case, the raw log data could be used without having to convert to matrix values. Appropriate weighting factors could be applied to the logs to solve for porosity. For instance, a more accurate neutron-density porosity could be extracted by applying a weighting factor of 50% to both the neutron and density logs with all other logs receiving a zero porosity weighting; or, a sonic porosity could be extracted by applying a 100% weighting to the sonic porosity, and so on. If sufficient core analyses are available to fully calibrate the lithology model, then it is theoretically possible to extract a more accurate porosity from any log suite using this method. If such core analyses are available, then this would become the preferred method to determine porosity. Another approach would be to solve iteratively for both porosity and lithology. Porosity would be used to solve for lithology, and then lithology would subsequently be used to solve for a more accurate porosity. This process of successive substitutions would be repeated iteratively until the results converge within a desired accuracy range. It would also be possible to introduce more complex logic that would utilize the most accurate porosity from multiple logs based on which porosity value is; more accurate under given conditions. For instance, the sonic porosity might be more accurate than the neutron-density in gas zones.

3) An equivalent, but less preferred, approach would be to combine the pure component and proportional mixture models into a single equivalent model (i.e. yielding numerically equal results) by restructuring eq. (9) as follows:

$$C_{SSP}=C_{SSmax}(1-f_{SS})(f_{LS}+r_{LS})(f_{SH}+r_{SH}) \quad (25)$$

where:
$r_{LS}$ residual limestone factor (fraction, non-normalized)
$r_{SH}$ residual shale factor (fraction, non-normalized)

However, this approach is less preferred because the residual factors $r_{LS}$ and $r_{SH}$ must be determined iteratively by trial and error until the desired concentrations are achieved. This process is exacerbated by the fact that a change to the residual factor of any one component affects the concentration of all other components. Also, the residual factors become numerically smaller as the number of components increases making it difficult to predict the required adjustments. Also, with the eq. (22), it is difficult to calculate the proportional mixture concentration. In short, although this is an equivalent mathematical model, it is much more difficult and laborious to apply in practice.

Theory Behind Plasticity Model (See U.S. Pat. No. 6,052,649)

A first step in one embodiment of the present method is to identify any shale zones along a logged wellbore. If the clay content of a particular lithologic stratum exceeds 40%, then the stratum generally behaves as a shale. The characterization of clay content greater than 40% behaving as a shale is a well-known rule of thumb in the wellbore logging industry.

Shale volume can be extracted from either a gamma ray or a neutron-density log suite. A first criterion for evaluating shale plasticity is whether the shale content exceeds a threshold volume. Expressed in computer logic:

IF $V_{sh}>V_{thresh}$ THEN Plastic Behavior Possible (1)

where:
$V_{sh}$ represents Shale volume; and
$V_{thresh}$ represents Threshold shale volume (rule of thumb is 40% by volume).

A second step in the embodiment of the present method involves an identification of clay type or species. If a spectral gamma ray log is available, then the thorium/potassium ratio is evaluated as follows for identifying clay type:

IF $C_1 \leq R < C_2$ THEN Clay Type is ILLITE (2)

IF $C_2 \leq R \leq C_3$ THEN Clay Type is SMECTITE (3)

IF $R>C_3$ THEN Clay Type is CHLORITE & KAOLINITE (4)

where:
R represents the thorium/potassium ratio (typically thorium is measured in units of ppm and potassium in percent);
$C_1$ represents the lower limit of the thorium/potassium ratio for the clay type which is illite (typical value 0);
$C_2$ represents the upper limit of the thorium/potassium ratio for illite, which is also the lower limit for smectite (typical value 3); and
$C_3$ represents the upper limit of the thorium/potassium ratio for smectite, which is also the lower limit for chlorite and kaolinite (typical value 12).

Alternatively, cation exchange capacity may be used to identify or determine clay type. there are known methods in the art for deriving a measure of cation exchange capacity (CEC) from one of a variety of well logs including gamma ray and neutron-density. If CEC data is available, then criteria for identifying clay type becomes:

IF $K_1 \leq CEC \leq K_2$ THEN Clay Type is CHLORITE & KAOLINITE (5)

IF $K_2 \leq CEC \leq K_3$ THEN Clay Type is ILLITE (6)

IF $CEC>K_3$ THEN Clay Type is SMECTITE (7)

where:
CEC is the cation exchange capacity (typically expressed in units of milliequivalents per gram);
$K_1$ is the lower limit of CEC for chlorite and kaolinite (typical value 0);
$K_2$ is the upper limit of CEC for chlorite and kaolinite, which is also the lower limit for illite (typical value 0.1); and
$K_3$ is the upper limit of CEC for illite, which is also the lower limit for smectite (typical value 0.8)

In the wellbore drilling industry, it is well known that the smectites, which include montmorillonite, are the clay species most likely to cause plastic behavior in shales. This is primarily due to the highly laminated nature of the clay platelets of smectites. Trapped water between the clay platelets can cause significant swelling of the clay structure.

A second key criterion for evaluating shale plasticity is smectite content. Expressed in computer logic:

IF CLAY TYPE=SMECTITE THEN Plastic Behavior Possible    (8)

A third step in the embodiment of the present method involves measurement of the clay water content. Clay water content refers to the water trapped between the clay platelets and is often termed clay-bound water. The clay water content parameter can be derived from any of several well logs, including nuclear magnetic resonance (NMR) and neutron-density. The NMR log is generally preferred because of its greater accuracy over other logs. Clay-bound water is also equivalent to the shale porosity, since it is generally assumed that all pore space within the shale is occupied by water.

With respect to the third step, if the water content is low, then the shale will be too dry to be plastic. Likewise, if the water content is high, then the clay platelets generally can become dispersed to the point where the shale behaves essentially as a liquid. In the situation where the shale behaves essentially as a liquid, plastic behavior is made unlikely. However, there is an intermediate zone where the shale becomes "sticky", or plastic. It is in this intermediate zone that the shale is quite likely to cause problems, such as bit balling. The intermediate zone is thus a third criterion for evaluating shale plasticity. Expressed in computer logic:

IF $W \leq L_{dry}$ THEN Shale is in a Dry Zone    (9)

IF $L_{dry} \leq W \leq L_{liquid}$ THEN Shale is in a Plastic Zone    (10)

IF $L_{liquid} \leq W$ THEN Shale is in a Liquid Zone    (11)

where:
W is a measure of shale water content or porosity (typically expressed as a volume percent);
$L_{dry}$ is an upper limit of water content for shale dry zone, which is also the lower limit for the shale plastic zone (value varies depending on geological location); and
$L_{liquid}$ is an upper limit of water content for shale plastic zone, which is also the lower limit for the shale liquid zone (value varies depending on geologic location).

With respect to the shale water content, the shale behavior transition points, $L_{dry}$ and $L_{liquid}$, can be measured or inferred. That is, the transition points can be measured or inferred from laboratory analysis of shale cuttings taken from prior wells or from a shale shaker while drilling. With respect to the shale shaker, it is essentially a device having a vibrating screen for sifting out rock cuttings from drilling mud obtained while drilling a borehole.

In accordance with the present method, the following three criteria must be met simultaneously for the shale to behave in a plastic manner:

SHALE VOLUME IS GREATER THAN A THRESHOLD VALUE    (12)

SHALE TYPE IS SMECTITE    (13)

SHALE WATER CONTENT IS IN A PLASTIC ZONE    (14)

If any one of the above criteria is not met for a particular shale at a particular geology and drilling condition, then the shale is not likely to be plastic.

A final step in the embodiment of the present method is to provide a single measure of overall shale plasticity. The single measure of overall shale plasticity can be achieved by taking a weighted average of the above three parameters (i.e., shale volume, clay type, and shale water content). Weighting factors are used to bias the average towards those parameters that exert a greater influence on shale plasticity in a given geology.

In order to determine the relative influence of each parameter on an overall shale plasticity measurement, the relevant data ranges of each parameter are normalized. In this manner, the influence of each parameter on overall plasticity then becomes more apparent. The weighting factors can be suitably calibrated, for example, by comparing the shale plasticity predicted from well logs to that measured by chemical analysis in a laboratory.

EXAMPLE

For further understanding, a numerical example is provided herein, to help further clarify the method of the present embodiment. It should be understood that the specific numbers used in the following example are for illustration purposes only. Other examples are possible.

First, shale volume is truncated to a desired range of interest, for example, 40% to 100% inclusive. All shale volumes less than 40% are converted to zero. This truncation isolates the range of shale volume where plastic behavior could occur. The remaining nonzero data is then normalized from 0 to 100%, or alternatively from 0 to 1, which is the fractional equivalent. For example, the normalization could be performed as follows:

$$y = x/(UL - LL) \quad (15)$$

where:
x is the truncated data, in this case shale volume;
y is the normalized data that lies within the plastic range, in this case shale volume;
UL is the upper limit of plastic region, in this case 1.0 (equivalent to 100%); and
LL is the lower limit of plastic region, in this case 0.4 (equivalent to 40%).

A similar process is then performed on the remaining two parameters. However, there is one subtle difference. With shale volume, plasticity is greatest at maximum shale volume. This is also true for clay type from CEC logs. However, with clay water content and clay type from the spectral gamma ray log, maximum shale plasticity occurs within the midrange of the data rather than at the maximum value of the range. Therefore, these two latter parameters must be normalized with respect to the point where maximum shale plasticity occurs. The maximum shale plasticity point can be measured in a laboratory or estimated from experience with a given geology.

If determining clay type using CEC derived from well logs, then the data range is truncated and normalized in the same fashion as for the shale volume. Specifically, CEC values can be truncated to a desired range of interest, for example, 0.8 to 1.5 inclusive. All CEC values less than 0.8 are converted to zero. This truncation isolates the range of CEC values where plastic behavior could occur. The remaining nonzero data is then normalized in a similar fashion as that for the shale volume.

If determining clay type from the spectral gamma ray log, then the range of the thorium/potassium ratio can be truncated to a desired range of interest, for example, 3.7 to 12 inclusive. All values above and below the desired range are converted to zero. This truncation isolates the range of the thorium/potassium ratio where plastic behavior could occur. The remaining nonzero data is then normalized ($R_{n1}$). For instance, $R_{n1}$ is first normalized according to the normalization as illustrated in equation 15. However, maximum shale plasticity generally occurs within the midrange rather than at the maximum value of the range. Thus, the normalization is performed again with respect to the point where maximum shale plasticity occurs ($R_{n2}$). Expressed in computer logic, the clay type normalization ($R_{n2}$) may be accomplished as follows:

IF $R_{n1} \leq M$ THEN $$R_{n2}=1-(M-R_{n1})/M \quad (16)$$

ELSE $$R_{n2}=(1-R_{n1})/(1-M) \quad (17)$$

ENDIF where:
  $R_{n1}$ is the normalized thorium/potassium ratio (unitless with range from 0 to 1) with respect to the maximum value of the truncated data range;
  $R_{n2}$ is $R_{n1}$ normalized with respect to a reference value M; and
  M is the reference point where maximum shale plasticity occurs (unitless with typical range from 0.3 to 0.7).

Alternatively, the above described normalization of clay type can be accomplished using a single, mathematically equivalent normalization operation.

Finally, for the clay water content, the range of porosity values is truncated to a desired range of interest, for example, 0.1 to 0.2 inclusive. All values above and below the truncated range of interest are converted to zero. This truncation isolates the range of porosity values where plastic behavior could occur. The remaining data is then normalized ($W_{n1}$). For instance, $W_{n1}$ is first normalized according to the normalization as illustrated in equation 15. However, maximum shale plasticity generally occurs within the midrange rather than at the maximum value of the range. Thus, the normalization is performed again with respect to the point where maximum shale plasticity occurs ($W_{n2}$). Expressed in computer logic, normalization for clay water content ($W_{n2}$) may be accomplished in a similar fashion as for the thorium/potassium ratio as follows:

IF $W_{n1} \leq M$ THEN $$W_{n2}=1-(M-W_{n1})/M \quad (18)$$

ELSE $$W_{n2}=(1-W_{n1})/(1-M) \quad (19)$$

ENDIF where:
  $W_{n1}$ is the normalized clay water content or porosity (unitless with range from 0 to 1) normalized with respect to the maximum value of the truncated data range;
  $W_{n2}$ is $W_{n1}$ normalized with respect to a reference value M; and
  M is the reference point where maximum shale plasticity occurs (unitless with typical range from 0.3 to 0.7).

Alternatively, the above described normalization of clay water content can be accomplished using a single, mathematically equivalent normalization operation.

Now that the relevant data ranges for each of the three critical parameters have been isolated and normalized for the given example, a measure of overall shale plasticity can now be derived. First, if any of the three parameters has a value of zero as a result of the above normalization process, then the overall shale plasticity is set to zero. This would reflect the fact that one or more of the key conditions required for plasticity to occur has not been met. For this example, suppose that clay type is taken from a spectral gamma ray log. Expressed using computer logic:

If $(V_{shn}=0)$ OR $(R_n=0)$ OR $(W_n=0)$ THEN $$P=0 \quad (20)$$

ENDIF where:
  $V_{shn}$ is the normalized shale volume (unitless with range from 0 to 1); and
  P is the shale plasticity (unitless with valid range from 0 to 1).

Alternatively, if CEC data had been used instead of a spectral gamma ray log, then CEC would be substituted for the normalized thorium/potassium ratio, $R_n$, in equation 20.

Finally, an overall shale plasticity is further calculated as follows:

$$P=(n_1 V^a_{shn}+n_2 R^b_n+n_3 W^c_n)/(n_1+n_2+n_3) \quad (21)$$

where:
  $n_1$ is the weighting factor for normalized shale volume (valid range 0 to 1);
  $n_2$ is the weighting factor for normalized thorium/potassium ratio (valid range 0 to 1);
  $n_3$ is the weighting factor for normalized clay porosity (valid range 0 to 1);
  a is an exponent for normalized shale volume (typical range 0.2-0.7);
  b is an exponent for normalized thorium/potassium ratio (typical range near 1); and
  c is an exponent for normalized clay porosity (typical range near 1).

It should be noted that the exponent "a" applied to the normalized shale volume typically has a low value. This low value is due to the fact that as the shale volume increases above 40%, the rock composition rapidly approaches the behavior of pure shale.

Although there are other mathematical averaging techniques that could be applied for use in the modeling of shale plasticity, the underlying principle would remain the same. Any averaging method would provide a relative indication of shale plasticity. For instance, in equation 21, the denominator could be replaced by the numerical value three (3) to yield a standard arithmetic average. However, the previous above described averaging method is preferred because the individual contribution of each of the three critical parameters to overall shale plasticity can be modeled more accurately.

Alternate and equivalent methods include the following. Any data source that can provide a measure of clay volume, clay species or type, and water content could be utilized by the embodiment of the present method and apparatus. In the preferred embodiment, wireline or measurement while drilling (MWD) well logs are the preferred data source. Also, other averaging techniques could be used, for example, in lieu of equation 21, to provide a shale plasticity indicator in a manner as described herein. The method could also conceivably be applied by considering any two (2) of the above three shale parameters. Finally, any combination of any two (2) of the above shale parameters would yield a simpler plasticity model. That is, the simpler plasticity model could be achieved by setting one of the weighting factors in equation 21 to zero. However, the simpler plasticity model approach would not be as complete or as accurate as considering the effects of all three parameters together. Nevertheless, the simpler approach might be necessary if one of the required data streams is unavailable at such time as an indication of shale plasticity is needed.

Theory Behind Rock Strength Model (see U.S. Pat. No. 5,767,399)

Figure 13:
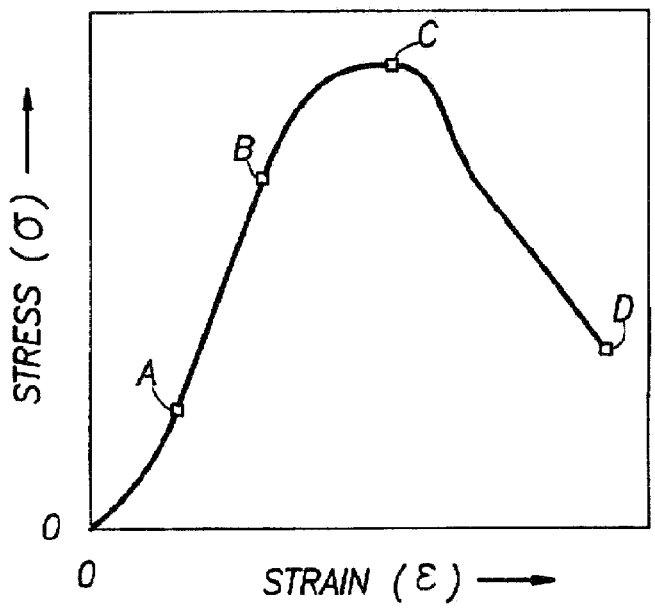
FIG. 13 is a graph illustrating the behavior of rock when subjected to stress.

A typical stress-strain curve for sedimentary rock is presented in FIG. 13. The curve exhibits four regions: OA, AB, BC, and CD. The stress value at point C is defined as the uniaxial compressive strength or ductility limit and is the maximum stress that a particular rock sample can sustain without damage (weakening). In the regions OA and AB the rock exhibits essentially elastic behavior. That is, stress loading and unloading in this region induces negligible permanent deformation. Point B, defined as the yield point or elastic limit, is an inflection point marking the transition from the elastic region OB to the ductile region BC. Stress loading a rock to its ductile region always induces a permanent deformation upon unloading and can cause failure. Reloading the rock will cause the curve to follow a different path that rejoins the original curve in the ductile region before point C. Although the rock is permanently deformed, it still retains its original strength (if it has not failed). In the ductile region BC, the rock can sustain permanent deformation without losing its ability to sustain maximum load (although, as mentioned, it does not always do so, but rather may fail). Region CD is defined as the brittle region. Here the rock's ability to sustain load decreases with increasing deformation. In other words, brittle rocks are permanently weakened, and successive load and unload cycles further weaken the rock. The formation of microcracks in the brittle region contributes to weakening of the rock matrix. A rock in the brittle region is in a state of progressive failure. At the value at point D, total failure will definitely occur, if it has not already done so.

Figure 12:
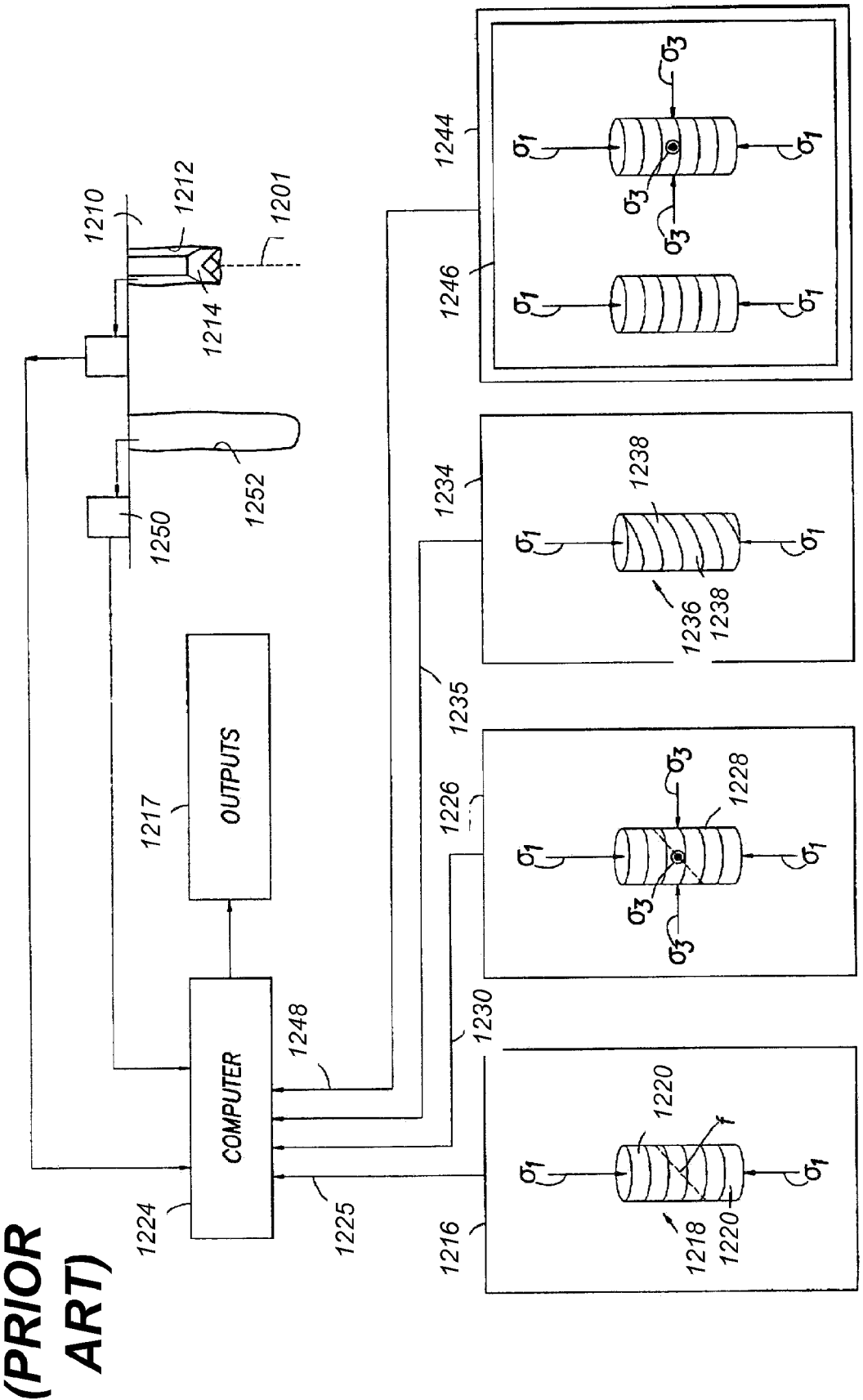
FIG. 12 is a schematic generally representing an embodiment of a rock strength model.

FIG. 12 describes a model of the compressive strength of the rock along the locus of a wellbore. For convenience, there is illustrated a bit 1214 which has begun to drill a wellbore 1212 along that locus, the remainder of which is indicated by line 1201. However, as will be explained more fully below, the modeling method described could be performed in advance of beginning to drill and/or in real time as the well is being drilled.

In any event, prior to the actual modeling, at least one compressive strength assay is performed. To perform such an assay, a primary plurality of rock samples of a lithology occurring along locus 1201 is tested, as indicated at step box 1216. The lithology of the samples tested at 1216 is relatively pure, e.g. a true sandstone or a true shale, as one of skill in geology would classify naturally occurring rock. The lithology is also of a type anticipated along locus 1201. If desired, and if sufficient core samples are available from a particular field, the samples tested may be from the very field in which the well 1214 is to be drilled, and the resulting assays on which modeling is to be based could be in the form of optimal local regression curves and corresponding signal series. However, the investigations to date have indicated that this is unnecessary, as lithologically similar samples from various locations tend to produce sufficiently identical results.

Only one exemplary sample 1218 is shown in box 1216, but it will be understood that the same type of test will be performed on each of the samples in the primary plurality. In particular, the testing in question will determine, for each sample, respectively, compressive strength and porosity. Porosity is determined by any one of several standard methods known in the art.

Compressive strength is determined by applying compressive force to the sample, parallel to the central axis of the sample, as indicated by the arrows in box 1216 until the sample fails. The strength at which the sample fails is indicated herein by the symbol $\sigma_1$ and is the compressive strength of the sample. The sample will fail along an oblique plane f, characteristic of the lithology, and which is the plane of greatest stress. The primary plurality of samples is tested by unconfined compressive stress, and is therefore not laterally supported as the force $\sigma_1$ is being applied.

As shown, the samples are cylindrical, and for purposes of the testing done at step 1216, are cut so that any strata or bed planes 1220 thereof lie perpendicular to the axis of the cylinder. The core samples should be carefully cut and prepared to standard test dimensions, taking care to minimize damage to the samples. Other criteria for proper compressive strength testing are described in detail in any number of reference works available to those of skill in the art, and will not be reiterated in detail herein.

Since compressive strength is strongly dependent on intergranular cementation, and porosity is a measure of intergranular cementation, porosity is used herein as the primary criterion or variable for determining baseline compressive strength. This is not only more accurate than other criteria used in the prior art, but is easier and more practical, since, as mentioned, porosity is easily measured in laboratories, and is also routinely determined in the course of well drilling operations.

After all of the primary samples have been tested, and their respective unconfined compressive strengths and porosities determined, a first series of pairs of electrical compressive strength and porosity signals is generated for processing in computer 1224 as indicated by line 1225. The signals of each pair correspond, respectively, to the compressive strength and porosity for a respective one of the primary samples.

Figure 14:
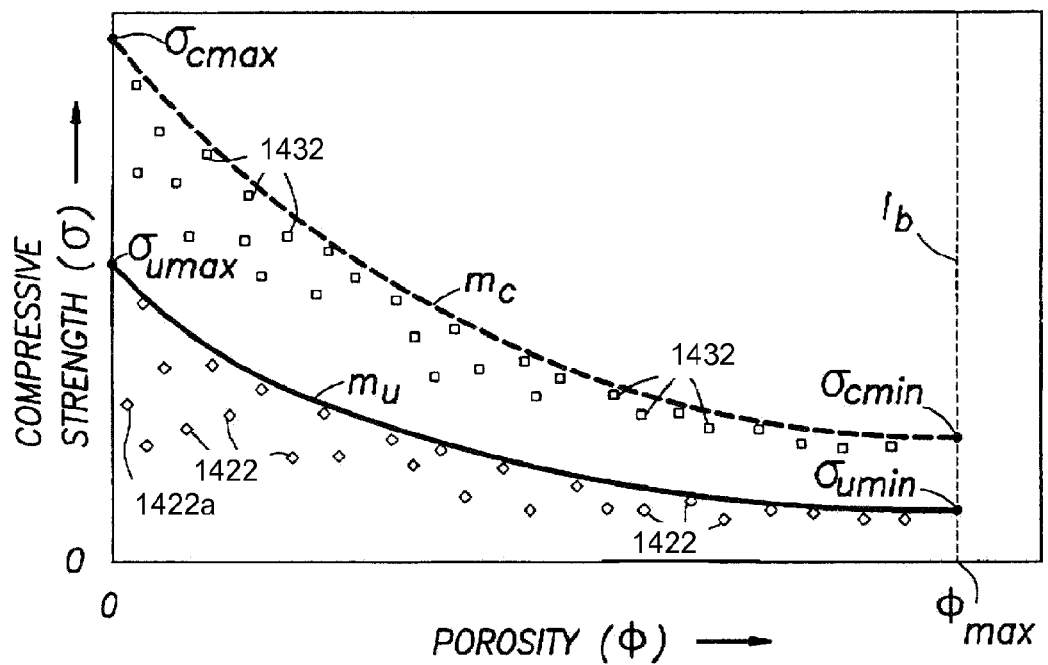
FIGS. 14 and 15 are graphs representing the relationship of porosity and compressive strength.

Referring to FIG. 14, the lower "cloud" of solid data points 1422 correspond to the paired porosities and compressive strengths for respective primary samples, as related to a Cartesian graph of compressive strength versus porosity.

(Throughout this specification, whenever there is reference to numerical values and/or their graphical representations, and/or to calculations or other manipulations of those values or representations, it should be understood that those manipulations may be performed by processing corresponding electrical signals using a suitably programmed or configured computer, such as 1224.) Referring to FIG. 14, it will be seen that samples of very similar porosity test out at different compressive strengths. This is because, in obtaining and preparing the samples, it is inevitably necessary to stress at least some of the rock of each sample, i.e. at least that near the periphery of the sample, to its uniaxial compressive strength or ductility limit (refer again to C in FIG. 13); and some samples will be so stressed more than others. This damage is generally referred to herein as "stress history" of the samples.

An initial goal at this stage of the method is for a computer 1224, appropriately configured or programmed in a manner to be described more fully below, to process the paired signals 1422 of the first series to extrapolate additional such pairs of signals and generate a second series of electrical signals corresponding to unconfined compressive strength as a function of porosity.

In typical prior art methods, whether relying on porosity or any other basic criterion, it has generally been the practice, when presented with such a "cloud" of data points, to generate a function which graphically illustrates as a curve passing through the vertical center of the cloud. However, in order to correct for the aforementioned stress history occurring in the process of collecting and/or preparing the samples, the second series is such that it will graphically illustrate as a curve mu, which passes generally along the upper periphery of the cloud of data points 1422. (As used herein, "corresponding to" will mean functionally related to, whether relating a signal to a physical phenomenon (or value), a signal to another signal, or a physical phenomenon (or value) to another physical phenomenon (or value); in the case of relating a signal to a physical phenomenon, "corresponding precisely to" will mean that the signal translates or converts precisely to the value of the phenomenon or datum in question.)

It has been found that the curve in mu will be generally of the form:

$$\sigma_u = S_e \sigma_{umax} + (1 - S_e) \sigma_{umin} \quad (1)$$

where:

$$S_e = (1 - \phi/\phi_{max})^\alpha \quad (2)$$

$\sigma_u$=unconfined compressive strength
$\sigma_{umax}$=maximum unconfined compressive strength (at zero porosity)
$\sigma_{umin}$=minimum unconfined compressive strength (at maximum porosity)
$\phi$=porosity
$\phi_{max}$=maximum porosity
$\alpha$=a mineralogy value.

It is noted that $S_e$ is defined as the "effective solidity." Equation (2) is a convenient mathematical definition because, theoretically, if the porosity of the rock were ever to reach a maximum value, there would be no intergranular cementation, and consequently zero compressive strength; in other words, the rock would disintegrate; the formula given above for $S_e$ yields the requisite minimum value of zero when porosity is at a maximum. It is also noted that the mineralogy value $\alpha$ is empirical and lithology specific.

Since equation (1) shows the general form of curve $m_u$ to be as illustrated in FIG. 14, i.e. a logarithmic decline, $\alpha$ may be thought of as a value which determines the amount of concavity of the curve with respect to a straight line (not shown) connecting the end points of curve $m_u$. Therefore, one method is to use the computer 1224 to iteratively process electrical signals potentially corresponding to $\phi_{max}$ and the paired value for $\sigma_{umin}$, $\sigma_{umax}$, and $\alpha$ to generate several potential second series of the form set forth in equation (1); graphically output (as indicated at 1217) or otherwise illustrate these curves on a Cartesian graph of compressive strength versus porosity, along with points, such as 1422, corresponding to the paired signals in the first series; and then choose that potential second series whose output curve can be seen visually to most nearly fit or lie near the upper periphery of the data cloud, again as shown in FIG. 14.

Figure 15:
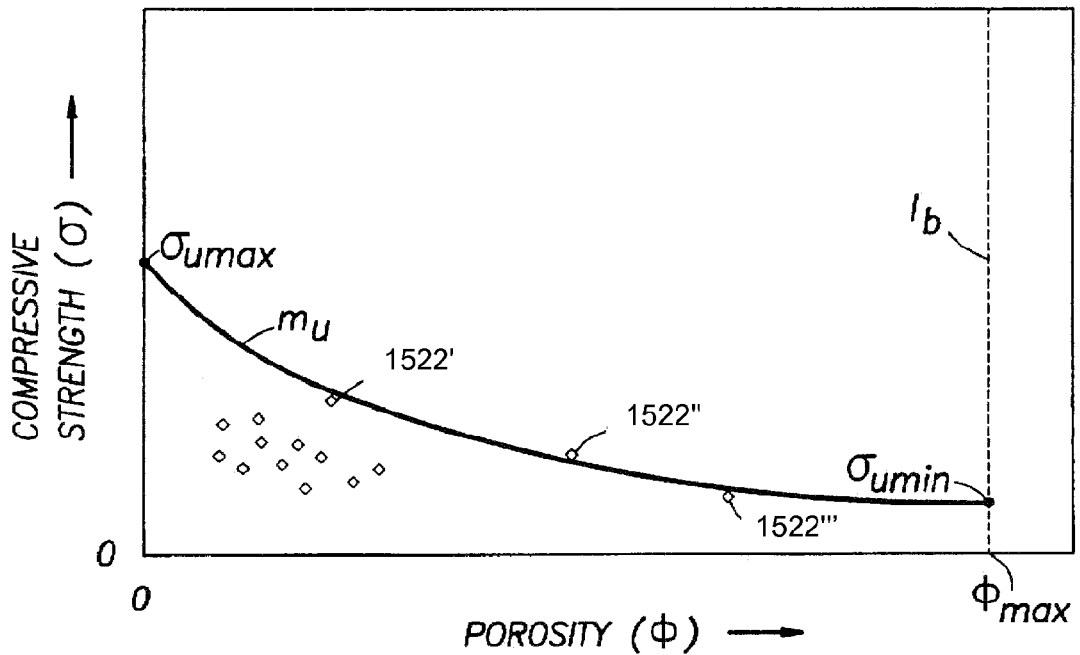

To further clarify what is meant by "fitting" the upper periphery of a data cloud, refer now to FIG. 15. It will be seen that the curve $m_u$' in FIG. 15, in taking the form of the known relationship, and then curve fitting as nearly as possible the upper periphery of the data cloud, actually only passes through two of the data points, specifically 1522' and 1522" and near a third 1522'''. This illustrates two important points. First, the concentration of most of the data points is well below the curve $m_u$', and in accord with conventional wisdom, the points 1522', 1522" and 1522''' might well have been considered aberrations, and discarded from the data analyzed; and in any event, the curve would probably have been placed through the center of the overall data cloud, which would have given a drastically different result. However, experiments have indicated that $m_u$' is in fact representative of the correct signal series for the data cloud depicted. Secondly, it is not necessary, and indeed is sometimes impossible, for the curve of the proper form, and having the best fit, to pass through all of the significant (upper fringe) data points. In this case, the curve does not pass precisely through point 1522''', and in fact, passes below it, still representing the best fit for the upper periphery of the cloud in question, given the requisite form of a logarithmic decline.

The above-described method uses a combination of iterative processing of the signals mentioned, by the computer 1224, coupled with human interaction, i.e. visually inspecting the various potential second series' curves with respect to the data cloud to pick the best fit. In other embodiments, it may be possible to program or configure the computer 1224 to perform the entire "fitting" process.

In any event, by fitting the curve mu or mu' to the upper periphery of the data cloud, it is ensured that those samples which have been least damaged in collection and preparation are used to generate the relationship expressed in equation (1), and those more damaged are disregarded. Thus is the stress history of the samples taken into account to provide a more accurate assay of the unconfined compressive strength of rock of the lithology in question as it would occur in nature (virgin rock strength).

Referring again to FIG. 14, it can be seen that the data points 1422 do not include any for which the porosity $\phi$ has a value of zero, and therefore, at which the compressive strength a is at a maximum. Likewise, there is no point 1422 at which $\phi$ has a maximum value, and $\sigma$ has zero value, as described above. However, it is highly preferable for the processing described above to generate the series of curve mu so that it does extend to such maximum and minimum porosity values and the paired compressive strengths, $\sigma_{umax}$ and $\sigma_{umin}$ that the curve $m_u$, which will be used in modeling to be described below, will cover all possible cases.

Furthermore, it is important to bound the second series of signals, and the corresponding function as represented by curve $m_u$, by the aforementioned maximum porosity value, as indicated by line lb. This ensures a more accurate model than if the curve mu were extended all the way down to meet the $\phi$ axis in FIG. 14. This is because, at the point at which the curve would meet the $\phi$ axis, one would assume a condition of zero compressive strength and a maximum porosity of one hundred (100%) percent. However, such conditions do not occur in nature. In fact, any rock occurring in nature would disintegrate, i.e. reach maximum porosity and minimum compressive strength, at a higher value for $\sigma$ and a lower value for $\phi$. Likewise, the reason effective solidity $S_e$ is defined as indicated above, rather than a more conventional definition of solidity as $1-\phi$, is for the convenience of causing Se to be zero at the true maximum porosity, again to more accurately reflect the way the rock behaves in nature.

Although, in less preferred embodiments, the second series of signals, corresponding to equation (1) and curve mu, could be used to model, or at least "guesstimate," various conditions which must be evaluated in developing a well drilling plan, it is highly preferred that the relationship given in equation (1), and therefore the corresponding second series of signals, be adjusted for various conditions which affect the compressive strength of the rock. In other words, equation (1) and curve mu represent the behavior of the rock at standard conditions. Thus, electrical adjustment signals corresponding to values related to these condition(s) are generated and processed with the second series of signals to generate a cumulative series of electrical signals corresponding to adjusted compressive strength as a function not only of porosity, but also of those other condition(s).

The most important of the conditions for which such adjustment is preferably made is the effect of confining stress on the rock as it occurs in nature. To adjust equation (1) and the corresponding series of signals for confinement stress, the following protocol may be used:

A secondary plurality of rock samples, of essentially the same lithology as those of the first plurality, are collected and prepared as described above in connection with step box 1216. As indicated in step box 1226, similar compressive strength testing is performed on these secondary samples, an exemplary one of which is illustrated at 1228, by applying compressive force in the axial direction until the sample fails at the compressive strength value $\sigma_1$, as indicated by the like-referenced arrows. However, in these tests, the samples are laterally confined with a confining stress $\sigma_3$, as indicated by the like-numbered vectors. For the present, the description will relate to a set of such tests all done at one given confining pressure $\sigma_3$, although as explained hereafter, the procedure would preferably be repeated for other sets of the secondary samples using different confining pressures. Of course, as with the tests on the primary rock samples, the porosity of each sample will have been determined prior to the compressive testing.

Accordingly, once again, a confined compressive strength $\sigma_1$ and a porosity $\phi$ are determined for each sample. A third series of pairs of electrical confined compressive strength and porosity signals are generated for processing in computer 1224 as indicated by line 130. The signals of each such pair correspond, respectively, to the confined compressive strength and porosity for a respective one of the secondary samples, and these pairs of signals are graphically represented by the hollow data points 1432 in FIG. 14. This third series of paired signals is processed by computer 1224 to extrapolate additional such pairs of signals and generate a fourth series of electrical signals corresponding to confined compressive strength as a function of porosity, graphically illustrated by curve mc. Again, such a curve may be one of the outputs 1217 of computer 1224.

Since the mineralogical value a will be constant for all rock samples of the lithology in question, whether tested confined or unconfined, and since $\alpha$ will already have been determined in developing the series of signals corresponding to curve $m_u$, a curve such as $m_c$ can be fitted to the upper periphery of the cloud of data points 1432 without the need to iterate so many variables. Specifically, the curve $m_c$ and corresponding function and fourth series of signals may be viewed as an adjusted form of curve mu and its respective corresponding function and signal series, and may in fact be used as the aforementioned cumulative series if confinement stress is the only condition for which equation (1) is adjusted. It has been found that this fourth series of signals, when viewed as an adjustment of the second series of signals, i.e. a cumulative series, will be of the form $$\sigma_c = S_e[\sigma_{umax} + \Delta\sigma_{max}(\sigma_3/\sigma_{3max})^\beta] + (1-S_e)[\sigma_{umin} + \Delta\sigma_{min}(\sigma_3/\sigma_{3max})^\beta] \quad (3)$$

where:
$\sigma_c$ = confined compressive strength
$\sigma_3$ = confining stress
$\sigma_{3max}$ = maximum laboratory confining stress applied during testing
$\beta$ = a principal stress relationship value
$\Delta\sigma_{max}$ = maximum increase in rock strength at zero porosity and maximum confining stress ($\phi=0$, $\sigma_3=\sigma_{3max}$)
$\Delta\sigma_{min}$ = minimum increase in rock strength at maximum porosity and maximum confining pressure ($\phi=\phi_{max}$, $\sigma_3=\sigma_3$max)

It is noted that the terms in equation (3) which represent changes, i.e. $\Delta\sigma_{max}$ and $\Delta\sigma_{min}$, refer to changes with respect to unconfined compressive strength for the same respective porosity values. Also, the expression ($\sigma_3/\sigma_{3max}$) could be adjusted to standard conditions for theoretical correctness, but this has been omitted here for simplicity, as the difference is negligible.

Although it is important for curve $m_c$ to be bounded by a maximum porosity (and corresponding minimum compressive strength) for purposes similar to those described in connection with curve $m_u$, in the exemplary embodiment just described, this will already have been done, since the maximum porosity for a given lithology is constant, and does not vary with confinement pressure or stress.

At this point, it is noted that, while we are still discussing the curve fitting process of a curve such as mc for a given set of the secondary samples tested at one confining pressure $\sigma3$, other such sets of secondary samples will have been so tested, at different confining pressures, respectively, hence the presence of both terms $\sigma_3$ and $\sigma_{3max}$ in equation (3). $\sigma_{3max}$ corresponds to the highest such confining pressure used in these tests. (This assumes that $\sigma_{3max}$ for the testing process was chosen to be higher than any confining stress anticipated for in situ rock whose strength is to be modeled, but not excessively high; in less preferred embodiments, the term $\sigma_{3max}$ in equation (3) could be replaced by any given one of the confining pressures used in testing.)

Returning now to the procedure for curve fitting the upper periphery of a cloud of data points such as 1432, where $\alpha$ is already known, it is simplest to begin with that cloud of data points, and corresponding signals, which result from the testing at $\sigma_{3max}$, and we assume point 1432 to be from that set. For the time being, we set $\beta=1$. As mentioned, a (which is incorporated in $S_e$) is known, from the prior method steps described in connection with equation (1), and the form of curve mc is known to be given by equation (3). Therefore, to fit the curve mc to the upper periphery of the cloud of data points 1432 resulting from testing at the maximum confining pressure $\sigma_{3max}$, one may simply iterate the terms $\Delta\sigma_{max}$ and $\Delta\sigma_{min}$ until a good curve fit is visually seen. Thus, while the form of curve mc may be produced as an output 1217 from processing of the signals corresponding to points 1432 with the signals corresponding to equation (1), the final curve fit, and determination of the final values for $\Delta\sigma_{max}$, $\Delta\sigma_{min}$, $\sigma_{cmax}$ (see FIG. 14), and $\sigma_{cmin}$ may best be done with human visual interaction. It is also helpful to note that, where, as postulated, curve mc fits the data cloud from the maximum test confining pressure, $\Delta\sigma_{max}$ may be visualized as the distance between points $\sigma_{umax}$ and $\sigma_{cmax}$ in FIG. 14, and likewise, the term $\Delta\sigma_{min}$ may be visualized as the distance between points $\sigma_{umin}$ and $\sigma_{cmin}$.

As previously mentioned, several sets of the secondary samples 1228 will have been tested, each at a respective confining pressure $\sigma_3$. Up to this point, we have been discussing the generation of a fourth series of signals, corresponding to a curve of the form $m_c$, for just one of these sets of samples, i.e. that set which was tested at the maximum confining pressure. Now, consider that, for several such sets of tested samples, alternative such fourth series of signals will be generated in the manner described above, still leaving $\beta$, in equation (3), equal to one, and substituting for $\sigma_{3max}$ the actual confining pressure used in testing the respective set of secondary samples. This process will generate respective alternate fourth series of signals which correspond to curves (not shown) of accurate shape or form for the respective clouds of data points (not shown). However, unless the true value of $\beta$ happens to be equal to one for the lithology in question, these alternate curves will not lie along the upper peripheries of their respective clouds of data points. Therefore, we iterate different values for $\beta$ until these other curves do properly fit the upper peripheries of their data clouds. This yields a final actual value for $\beta$, whereby equation (3) may be made generic to all possible confinement stresses and becomes the equation corresponding to the cumulative series of signals if confinement stress is the only condition for which the series corresponding to equation (1) is adjusted.

In the exemplary embodiment just defined, all the steps dealing with the data gathered at step box 1226 and the corresponding signals may be considered part of the generation of the generic equation (3), and thus of the generation of the cumulative series (even if additional adjustment factors are added, as described below); and the electrical signals corresponding to data points such as 1432 (third series), curves such as $m_c$ (fourth series), and/or value $\beta$ may be considered "stress adjustment signals."

In other embodiments, other processes may be used to adjust for confinement stress in producing the cumulative series. For example, instead of working directly with equation (3) and corresponding series of electrical signals, it is possible to perform a similar process using the following equation:

$$\Delta\sigma_c = [S_e \Delta\sigma_{max} + (1-S_e)\Delta\sigma_{min}](\sigma_3/\sigma_{3max})^\beta \qquad (4)$$

where:
$\Delta\sigma_c$=the change in rock strength due to confining stress
and then further process the resulting signals by performing the electronic equivalent of adding $\Delta\sigma_c$ from equation (4) to $\sigma_u$ from equation (1) to yield the cumulative series.

In less preferred embodiments, one might test only a single set of samples 1228 at one confining pressure $\sigma_3$, generate a curve such as mc by working with the data points 1432 and their corresponding signals in the same manner as described above for the generation of the curve mu, and then simply use the signal series corresponding to that single curve of the form mc as the cumulative series. Indeed, in these less preferred embodiments, this may be done without ever performing any of the unconfined stress tests 16 and related processing steps. However, it should be understood that modeling from such a series would have similar drawbacks to modeling from the series represented by equation (1) and curve mu in that the model would only be truly valid or completely accurate for one confinement condition.

Preferably, equation (3) and the corresponding series of electrical signals are further adjusted to account for changes in compressive strength due to a dip angle of a bedding plane of the rock. The effect of orientation on rock strength can be significant for highly laminated rocks such as shale. For instance, a maximum reduction in shale strength of about 40% has been observed at a critical relative dip angle of about 55°. This critical angle occurs when bedding planes coincide with the internal plane f of greatest shear stress (see box 1216). Thus, additional electrical adjustment signals are generated as orientation adjustment signals corresponding to such changes.

A tertiary plurality of samples 1236 of similar lithology to that involved thus far, but having strata or bedding planes 1238 lying at an oblique angle to the central axes of the cylindrical samples are used.

Several sets of such samples are tested, under unconfined conditions as shown in step box 1234, with the samples of each set having a constant porosity $\phi$ but differing as to bed plane angle $\theta$. Corresponding compressive strength, porosity, and bed plane angle signals are generated for processing by computer 1224, as indicated by line 1235.

Figure 16:
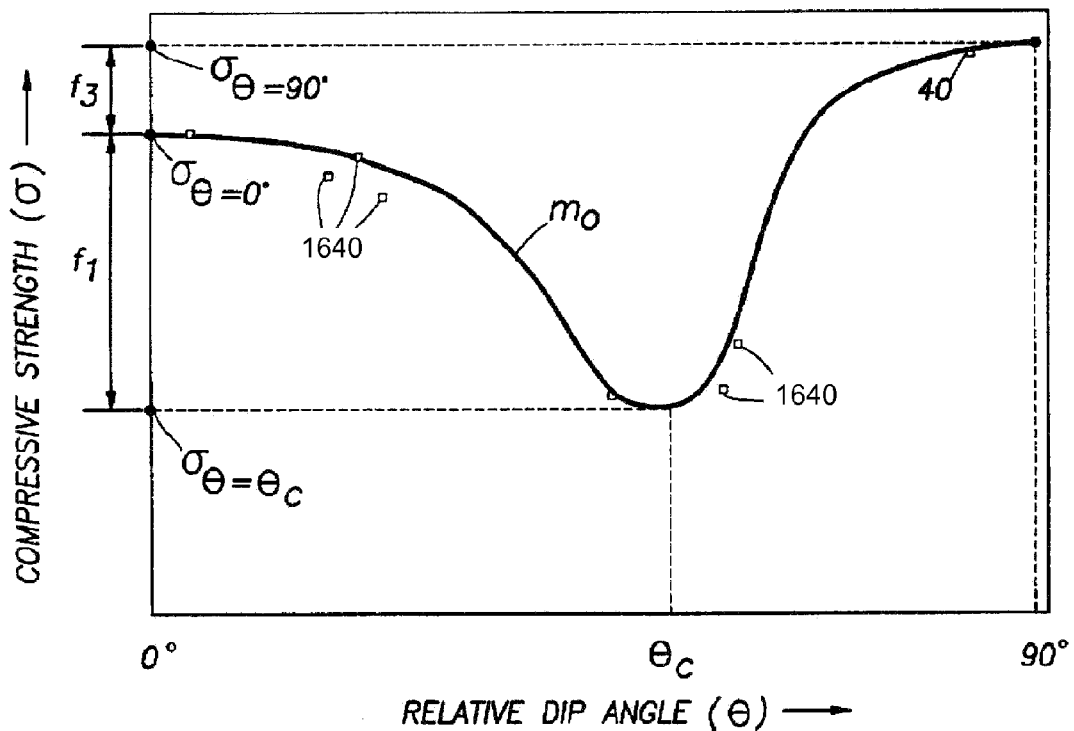
FIGS. 16 and 17 are graphs representing the relationship of relative dip angle and compressive strength.

FIG. 16 graphically depicts the manner in which compressive strength varies with relative dip angle $\theta$ for one given porosity $\phi$. (For purposes of this application, "relative dip angle" will mean dip angle with respect to the borehole axis rather than with respect to earth. If the relative dip angle $\theta$ is 0°, the bedding planes are perpendicular to the borehole axis; if the relative dip angle $\theta$ is 90°, the bedding planes are parallel to the borehole axis.) It has been discovered that the $\theta/\sigma$ relationship is represented by a curve of the form of mo and that curve will generally correspond to an equation of the form:

$$\sigma_{co} = S_e[\sigma_{umax} + \Delta\sigma_{max}(\sigma_3/\sigma_{3max})^\beta](1-c_{umax}) + (1-S_e)$$
$$[\sigma_{umin} + \Delta\sigma_{min}(\sigma_3/\sigma_{3max})^\beta](1-c_{umin}) \qquad (5)$$

where:
for $0 < \theta \leq \theta_c$:

$$\gamma = (\theta/\theta_c)\pi/2 \qquad (6)$$

$$f_1 = (\sigma_{\theta=0} - \sigma_{\theta=\theta_c})/\sigma_{\theta=0}, \text{at zero porosity} \qquad (7)$$

$$f_2 = f_1, \text{at maximum porosity} \qquad (8)$$

$$c_{omax} = f_1 \sin^n(\gamma) \qquad (9)$$

$$c_{omin} = f_2 \sin^n(\gamma) \qquad (10)$$

and for $\theta_c < \theta \leq 90°$:

$$\gamma = \pi/2 + (\theta - \theta_c)/(1 - \theta_c 2/\pi) \qquad (11)$$

$$f_3 = (\sigma_{\theta=90°} - \sigma_{\theta=\theta_c})/\sigma_{\theta=0}, \text{at zero porosity} \qquad (12)$$

$$f_4 = f_3, \text{at maximum porosity} \qquad (13)$$

$$c_{omax} = (f_1 + f_3)\sin^n(\gamma) - f_3 \qquad (14)$$

$$c_{omin} = (f_2 + f_4)\sin^n(\gamma) - f_4 \qquad (15)$$

and:
$\sigma_{co}$=compressive strength adjusted for confinement stress and orientation
$c_{omax}$=maximum orientation correction at zero porosity
$c_{omin}$=minimum orientation correction at maximum porosity
$f_1$=maximum percent reduction in compressive strength at critical relative dip angle ($\theta=\theta_c$ as compared to $\theta=0°$), at zero porosity
$f_2$=maximum percent reduction in compressive strength at critical relative dip angle ($\theta=\theta_c$ as compared to $\theta=0°$), at maximum porosity
$f_3$=maximum percent increase in compressive strength parallel to dip angle ($\theta=90°$ as compared to $\theta=0°$), at zero porosity
$f_4$=maximum percent increase in compressive strength parallel to dip angle ($\theta=90°$ as compared to $\theta=0°$), at maximum porosity
$\theta$=relative dip angle of bedding planes with respect to the wellbore axis.
$\theta_c$=critical relative dip angle where compressive strength reaches a minimum value.
$\gamma$=sine function parameter derived from relative dip angle that reaches a maximum value of $\pi/2$ when $\theta=\theta_c$
$\sigma_\theta$=compressive strength at a specific relative dip angle $\theta$
n=an orientation exponent For one of the sets of tertiary samples, a series of pairs of electrical signals, the signals of each pair corresponding, respectively, to the relative dip angle $\theta$ and compressive strength a for a given sample, are generated, and these may be outputted at 1217, and in any event visualized, as data points such as 1640 in FIG. 16. Knowing the general form of equation (5) as well as the general form of its representation as a curve such as $m_o$ (a conjunction of portions of two different sine waves), one can then fit a curve $m_o$ and a corresponding series of signals (generated by processing the signals corresponding to points 1640) to the upper periphery of the cloud of data points 40 by iterating estimated values for $\theta_c$, $f_1$, $f_2$, $f_3$, $f_4$, and n, either by further processing of the signals and/or by at least some human visual intervention referring to a graphical representation such as shown in FIG. 16. As in other contexts above, fitting the upper periphery of the cloud takes stress history into account.

Figure 17:
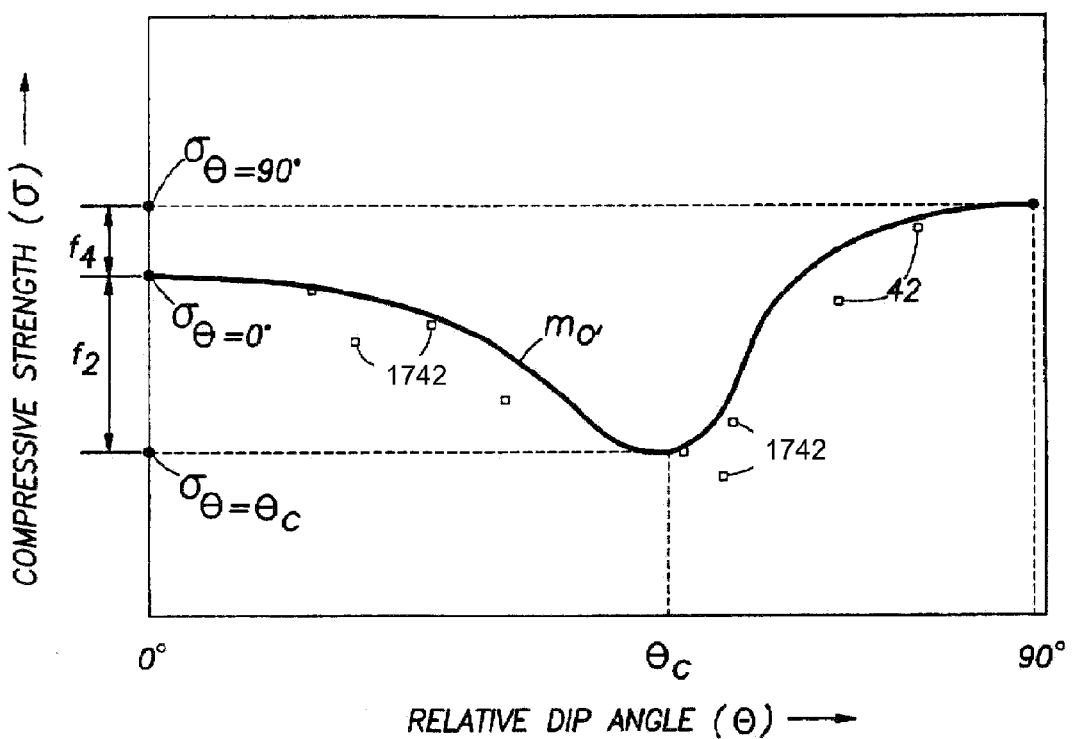

Preferably, if only two sets of samples have been tested, the porosities of the two sets, respectively, are near zero (which is the case illustrated in FIG. 16), and near maximum porosity (which is the case illustrated in FIG. 17). In FIG. 17, the data points corresponding to the relative dip angles $\theta$ and compressive strengths $\sigma$, and the corresponding signals, for the second set are indicated at 1742, and the curve fitted to the upper periphery of this cloud of data points in FIG. 17 is labeled $m_o'$.

Once at least two such curves have been fitted, and final values determined for the variables iterated in order to fit those curves, it is then possible to determine values for comax and comin, and generate corresponding signals, which are the unknowns ultimately needed to solve equation (5). Thus, the signals corresponding to $c_{omax}$ and $c_{omin}$ are the ultimate orientation adjustment signals, and equation (5) now corresponds to the cumulative series of signals, if confinement stress and orientation are the only factors for which adjustment is made. Conceptually, $c_{omax}$ and $c_{omin}$ may be viewed as factors which adjust the curve mc (FIG. 14) by moving its end points vertically, with the term Se resulting in proper translation of all intermediate points, to result in a curve corresponding to the cumulative series of equation (5).

As mentioned, in the exemplary embodiment, the only tests done at step box 1234 are done in unconfined condition. However, in more detailed embodiments, it would be possible to develop additional data by repeating the process described above for other sets of tertiary samples tested at one or more confining pressures (compare step box 1226).

As before, there are other equivalent ways of processing. For example, the following equation corresponds to a combination correction signal for compressive stress and orientation, which could simply be added to equation (1) to produce the cumulative equation, and of course, the computer 1224 could perform the electronic equivalent by processing the signals corresponding to equations (7) and (1) to produce the cumulative series, (if compressive stress and orientation are the only factors for which correction or adjustment is made):

$$\Delta\sigma_{co} = S_e[\sigma_{umax} + \Delta\sigma_{max}(\sigma_3/\sigma_{3max})^\beta](-c_{omax}) + (1-S_e)[\sigma_{umin} + \Delta\sigma_{min}(\sigma_3/\sigma_{3max})^\beta](-c_{omin}) \quad (16)$$

In the most highly preferred embodiments, it is also preferable to further adjust for changes in compressive strength due to temperature, and it has been found that such temperature effects are functionally related to confinement pressure. The effect of temperature on compressive strength is ordinarily relatively low, e.g. on the order of 2-7%, for most, but not all, lithologies, in the temperature range of interest. Therefore, for some lithologies, the effect could be more significant. Furthermore, at high confining pressures, the temperature effect becomes more pronounced, and therefore more significant.

Because of the discovered relationship of confinement stress on temperature, a greater number of subsets of quaternary samples are preferably tested in the operation indicated by step box 1244.

It has been found that the fully adjusted cumulative series, i.e. adjusted for confinement stress effects, orientation effects, and temperature effects, will be of the form:

$$\sigma_{cot} = S_e[\sigma_{umax} + \Delta\sigma_{max}(\sigma_3/\sigma_{3max})^\beta](1-c_{tmax}) + (1-S_e)[\sigma_{umin} + \Delta\sigma_{min}(\sigma_3/\sigma_{3max})^\beta](1-c_{tmin}) \quad (16)$$

where:

$$c_{tmin} = [(T-T_s)/(T_{max}-T_s)]^b[(\sigma_3/\sigma_{3max})^a(f_5-f_6)+f_6] \quad (17)$$

$$c_{tmax} = [(T-T_s)/(T_{max}-T_s)]^b[(\sigma_3/\sigma_{3max})^a(f_7-f_8)+f_8] \quad (18)$$

$f_5$=percent reduction in compressive strength at maximum test temperature and maximum test confining stress ($T=T_{max}$, $\sigma_3=\sigma_{3max}$) at maximum porosity ($\phi=\phi_{max}$).

$f_6$=percent reduction in compressive strength at maximum test temperature and standard pressure ($T=T_{max}$, $\sigma_3=0$), at maximum porosity ($\phi=\phi_{max}$).

$f_7$=percent reduction in compressive strength at maximum test temperature and maximum test confinement stress ($T=T_{max}$, $\sigma_3=\sigma_{3max}$), at zero porosity ($\phi=0$).

$f_8$=percent reduction in compressive strength at maximum test temperature and standard pressure ($T=T_{max}$, $\sigma_3=0$), at zero porosity ($\phi=0$).

$\sigma_{cot}$=compressive strength adjusted for confinement stress, orientation, and temperature.

$T_{max}$=maximum test temperature.

$T_s$=standard temperature.

T=temperature.

a=a pressure-strength relationship value.

b=a temperature-strength relationship value.

The process indicated in step box 1244 would preferably involve the testing of at least eighteen (18) sets of quaternary samples. A first family of those sets will all have a common porosity in the samples, and that porosity is preferably as low as possible $\phi_l$. This family preferably includes three sets of quaternary samples, one of which is tested unconfined, a second of which is tested at a first confinement stress, and the third of which is tested at another confinement stress, greater than the first confinement stress and equal to $\sigma_{3max}$ (step box 1226). Each of these sets, in turn, preferably includes at least three sub-sets, each of which is tested at a different temperature (although in less preferred embodiments, it may be possible to work with only two such sub-sets per set). The second family includes quaternary samples all having a common, relatively high, porosity $\phi_h$, and having sets and sub-sets otherwise corresponding to those of the first family.

Figure 18:
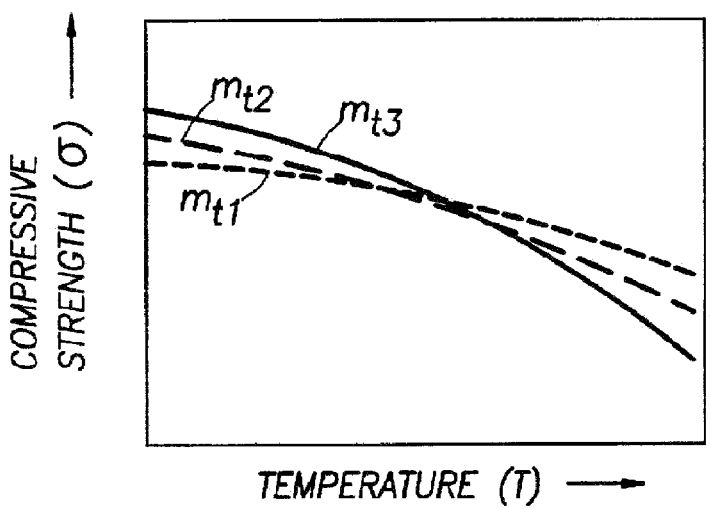
FIGS. 18 and 19 are graphs representing the relationship of temperature and compressive strength.

FIG. 18 graphically depicts an upper periphery curve fit for the test results from such a first family. Thus, the porosity $\phi_L$ for all points on the curves $m_{t1}$, $m_{t2}$, and $m_{t3}$ is the same and is relatively low. Curve $m_{t1}$ reflects the way compressive strength a varies with temperature T without any confinement stress; curve $m_{t2}$ shows such variation with a first (lower) confinement stress; and curve $m_{t3}$ represents such variation where the samples are confined at the highest confinement stress used in the series of tests. Thus, each of the curves in FIG. 18 depicts one of the aforementioned sub-sets of tests, so that only temperature and compressive strength vary, as porosity and confinement stress is constant for each sub-set.

Accordingly, the tests from which these three curves would be developed would produce, for each such sub-set, a temperature T and compressive strength a for each sample. Based on these, a respective set of paired electrical signals, the signals of each pair corresponding, respectively, to the temperature T and compressive strength $\sigma$ for a given sample in the respective sub-set, would have been generated, and corresponding data points could have been graphically depicted in FIG. 18 (not shown). These signals, for each sub-set of quaternary samples respectively, would be processed by computer 1224 to extrapolate additional such pairs and generate a series of signals corresponding to the respective curve, and as described in other contexts above, each curve would be fitted to the upper periphery of the respective cloud of data points by iterating estimated values for $f_5$, $f_6$, $f_7$, $f_8$, a, and b.

As with orientation, the reason it is preferred that the porosity for all the tests represented by FIG. 17 be relatively low is so that the extrapolations performed by computer 24 in generating series of signals corresponding to equations (17), (18) and/or (19) will be as accurate as possible for zero porosity (since it is virtually impossible to obtain samples with zero porosity). The same applies for the relatively high porosity for the second family of quaternary samples vis a vis the impossibility of obtaining samples with maximum porosity.

Figure 19:
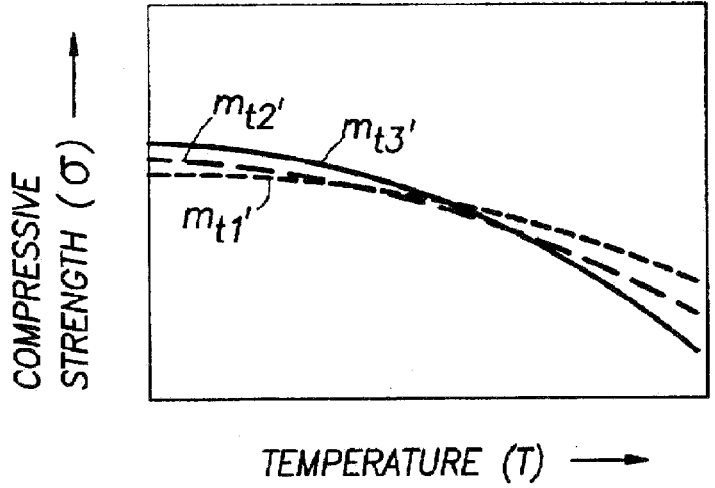

As just implied, FIG. 19 graphically depicts the same type of information as FIG. 18, but for the second family of quaternary samples, having relatively high porosity.

Once the two families of curves depicted in FIGS. 18 and 19 have been fitted (at least two curves per φ value), and final values determined for $f_5$, $f_6$, $f_7$, $f_8$, a, and b, it is then possible to determine values for $c_{tmin}$ and $c_{tmax}$, using equations (18) and (19), and generate corresponding signals, which are the unknowns ultimately needed to solve equation (17). Thus, the signals corresponding to ctmin and ctmax in this embodiment, are the ultimate temperature adjustment signals, and equation (17), as mentioned, corresponds to the ultimate cumulative series of signals Like comax and comin, $c_{tmax}$ and $c_{tmin}$ may be viewed as factors which adjust the curve mc (FIG. 14) by indicating the vertical adjustment at the end points, with the term Se then resulting in proper translation of all intermediate points.

The signals corresponding to the T and σ values exemplified in FIGS. 18 and 19 may, for this embodiment, be viewed as temperature variable signals; $f_5$, $f_6$, $f_7$, $f_8$, a, and b may be viewed as intermediate temperature signals; and $c_{tmin}$ and $c_{tmax}$ may be viewed as the ultimate temperature adjustment signals which correspond, respectively, to a minimum temperature adjustment value (at maximum porosity) and a maximum temperature adjustment value (at minimum porosity).

Note that equations (17), (18) and (19) are good if tests at 1244 have been performed at a confining stress equal to $\sigma_{3max}$ (equation (3)) and at least one lower confining stress. Otherwise, equations (17), (18) and (19) would have to be modified to include different terms for the respective maximum confining stresses used at steps 1226 and 1244.

In another embodiment, a signal series which may be added to the series corresponding to equation 1 to result in a cumulative series adjusted for compressive stress, orientation, and temperature, corresponds to the equation:

$$\Delta\sigma_{cot} = S_e[\sigma_{umax} + \Delta\sigma_{max}(\sigma_3/\sigma_{3max})^\beta](1-c_{omax})(-c_{tmax}) + \qquad (20)$$
$$(1-S_e)[\sigma_{umin} + \Delta\sigma_{min}(\sigma_3/\sigma_{3max})^\beta](1-c_{omin})(-c_{tmin})$$

In still other embodiments, it is possible to develop individual adjustment signals for each of the conditions for which adjustment is made, independently of one another, and add all of those to equation (1). In this case, in preferred embodiments, one or more of the individual adjustment signals may be developed as a function of one or more of the other conditions; for example, a temperature adjustment signal, which does not also adjust for confinement stress, may nevertheless be developed as a function of confinement stress. Furthermore, in less preferred embodiments, only some of these individual adjustment signals may be added to the first series of signals if it is not desired to adjust for all of the aforementioned conditions.

In any event, having arrived at some cumulative series, depending upon the conditions for which adjustment is desired, and thus at a general assay of compressive strength as a function (at least) of porosity for one relatively pure lithology, e.g. sandstone, the entire process is preferably repeated to provide an assay for relatively pure shale, a significantly different lithology, or any other lithology(ies) anticipated along locus 1201. One or both of these assays is then used in modeling the compressive strength at least at several sites along the locus 1201 of well bore 1214, and preferably, to provide a continuous model for all such sites.

More specifically, site characteristics of the rock for the locus 1201 are determined at a plurality of sites along the length of the locus, and as the rock would be addressed by a drill bit. These site characteristics include porosity and other physical properties similar to those used to generate any adjustment signals incorporated in the cumulative series. In addition, the site characteristics for each site should include values corresponding to the relative percentages of the lithologies (in this case sandstone and shale) for each site. This may be done in advance of drilling well bore 1212 using logs and other relevant data, diagrammatically indicated at 1250, from a nearby well bore 1252 which has been drilled through rock which is presumptively the same or similar to that along locus 1201.

Site signals, corresponding to the respective site characteristics, are generated and processed by computer 1224 with the cumulative series to generate in situ compressive strengths corresponding to the in situ compressive strengths of the rock at each site. More specifically, the computer performs the electronic equivalent of substituting the values for site characteristics for the corresponding variables in the equation for the cumulative series, and then solving.

If the site characteristics indicate that at least a portion of locus 1201 passes through rock of mixed lithology, the site characteristics (other than percentages of sandstone and shale) are used to generate two compressive strength signals for that site, one from the cumulative series based on sandstone, and the other from the cumulative series based on shale. Then, computer 1224 processes those signals to take a weighted average based on the aforementioned percentages. Other aspects pertain to the manner in which the various site signals are generated. Some site characteristics and corresponding signals may relate to local conditions (e.g. overburden, overbalance, geological stress) other than those corresponding to the variables in the cumulative series and may be used to further refine the model.

Relative dip angle data may be available directly from MWD or well logs. Relative dip may also be calculated if directional survey data and formation dip and azimuth data are available. A preferred method for electronically calculating it, i.e. generating a signal corresponding to the relative dip angle at a given site along locus 1201, will now be described. For each site, an electrical wellbore angle signal corresponding to the well bore inclination angle, an electrical well bore azimuth signal corresponding to the well bore azimuth, an electrical bed plane angle signal corresponding to the dip angle of the bed plane with respect to the earth, and an electrical bed plane dip azimuth signal corresponding to "dip azimuth" (i.e. the compass or azimuthal direction in which the bed plane dips) are generated. These signals are processed to generate an electrical relative dip angle signal corresponding to the relative dip angle θ of the bed plane with respect to the borehole at the respective site by performing the electronic equivalent of using a vector dot product, as follows:

$$\cos\theta = i_d i_w + j_d j_w + k_d k_w \qquad (21)$$

where $(i_d, j_d, k_d)$ and $(i_w, j_w, k_w)$ are unit vectors $u_d$ and $u_w$ describing the direction of lines normal to the formation dip plane, and parallel to the wellbore axis, respectively. The relative dip angle should be constrained to be less than 90°, or using computer logic:

$$\text{IF } \theta > \pi/2 \text{ then } \theta = \pi - \theta \qquad (22)$$

The i,j,k components of the unit vector $u_d$ describing a line normal to the dipping formation plane may be expressed as:

$$i_d = \sin\lambda_d \sin(A_d - \pi) \qquad (23)$$

$$j_d = \sin\lambda_d \cos(A_d \pi) \qquad (24)$$

$$k_d = \cos\lambda_d \qquad (25)$$

The i,j,k components of the unit vector $u_w$ describing a line parallel to the wellbore axis may be expressed as:

$$i_d = \sin\lambda_w \sin A_w \qquad (26)$$

$$j_d = \sin\lambda_w \cos A_w \qquad (27)$$

$$k_d = \cos\lambda_w \qquad (28)$$

where:
$\lambda_d$=formation dip angle
$A_d$=formation dip azimuth
$\lambda_w$=wellbore inclination angle
$A_w$=wellbore azimuth For any of the site signals corresponding to confinement stress, in generating the corresponding site signal, greater accuracy is achieved if one or more of several local physical conditions are taken into account. These are: the pressure differential between fluid in the well bore and fluid in the surrounding formation ("overbalance"), the effective stress due to overburden, and the effective stress due to the local geological stress field.

In general terms, the confining stress $\sigma_3$ may be expressed as a function of the effective stress due to overbalance, the effective stress due to overburden, and the effective stress due to the local geologic stress field expressed as a resultant vector.

The effective confining stress due to overbalance at a given depth may be expressed as:
where:
$\sigma_b$=effective stress due to overbalance
$\sigma_{md}$=pressure exerted on bottom due to the dynamic mud weight (i.e. includes the incremental increase in static mud weight due to annular friction losses)
$\sigma_{jf}$=pressure exerted on bottom due to jet impact force
$\sigma_{pof}$=pump-off stress due to the constricted annular area between the bit and the wellbore
$a_{pore}$=formation pore pressure. Note that if the formation permeability is essentially zero (or negligible) then the effective pore pressure is zero.

The effective stress due to overburden $\sigma_x$ has different horizontal and vertical components. In one preferred embodiment, we consider forces acting at a point on an annulus of rock perpendicular to the wellbore at a given site of interest.

The horizontal confinement stress due to overburden acts radially at such a point at any vertical depth and is uniform in all horizontal directions. It may be represented as the vector $\sigma_h u_h$ where $\sigma_h$ is the magnitude of horizontal stresses due to overburden, and $u_h$ is a unit vector describing the direction of $\sigma_h$ at the point of interest. Note that the direction of $u_h$ is defined by any azimuth. The magnitude of $\sigma_h$ may be estimated as:

$$\sigma_h = \sigma_{fp} - \sigma_{pore} \qquad (30)$$

where:
$\sigma_{fp}$=fracture propagation pressure
$\sigma_{pore}$=formation pore pressure Other methods to determine the magnitude of $\sigma_h$ are disclosed in prior art, such as U.S. Pat. No. 4,981,037 (see section below entitled Theory Behind Estimating the Magnitude of Stresses). $u_h$ has the following vector components:

$$i_h = \sin A = i \text{ of interest} \qquad (31)$$

$$j_h = \cos A = j \text{ of interest} \qquad (32)$$

$$k_h = 0 \qquad (33)$$

where:
A=azimuth of interest

The vertical confinement stress due to overburden acts vertically downwardly by at any vertical depth, and may be expressed as $\sigma_v u_v$ where $u_v$ is a unit vector describing the direction of $\sigma_v$. Methods to estimate the magnitude of $\sigma_v$ are disclosed in prior art such as U.S. Pat. No. 4,981,037. $u_v$ has the following vector components:

$$i_v = 0 \qquad (34)$$

$$j_v = 0 \qquad (35)$$

$$k_v = 1 \qquad (36)$$

The confinement stress due to local geologic stress field may be expressed as $\sigma_g u_g$ where $u_g$ is a unit vector describing the direction of $\sigma_g$. The magnitude of $\sigma_g$ may be measured or partially inferred from structural features. $u_g$ has the following vector components:

$$i_g = \sin\lambda_g \sin A_g \qquad (37)$$

$$j_g = \sin\lambda_g \cos A_g \qquad (38)$$

$$k_g = \cos\lambda_g \qquad (39)$$

where:
$A_g$=azimuth of local geologic stress field
$\lambda_g$=inclination of local geologic stress field In order to apply the vectors $\sigma_{huh}$, $\sigma_{gug}$, and $\sigma_{vuv}$, we must define the aforementioned point of interest on the aforementioned annulus of rock at the site in question. This in turn requires that we determine unit vectors in the directions of circumferential, axial, and lateral forces applied by the bit at the point of interest with respect to the wellbore (and bit) axis.

For this purpose, we define an angle $\eta$. $\eta$ is defined as any arbitrary angle referenced from the high side of the hole (positive clockwise) and lies in the plane of the aforementioned rock annulus. $\eta_d$ is defined as the acute angle from high side to the point along the circumference of the wellbore where the torsional bit force is parallel to dip. It is necessary to define $\eta_d$ in order to precisely define the relative dip angle for the point of interest.

Recall the definitions of $\theta$, $u_d$, and $u_w$, in equations 21, 23 through 25, and 26 through 28, respectively.

Next we define v1 which is the projection of $u_d$ in the direction of $u_w$:

$$v_1 = u_w \cos\theta \qquad (40)$$

$$i_1 = i_w \cos\theta \qquad (41)$$

$$j_1 = j_w \cos\theta \qquad (42)$$

$$k_1 = k_w \cos\theta \qquad (43)$$

Next we define $v_2$ which is the vector from the tip of $u_d$ to the tip of $v_1$. Vector $v_2$ is orthogonal to $u_w$ and points towards the dipping formation. This vector and the high side vector described below subtend the angle $\eta_d$.

$$v_2 = v_1 - u_d \tag{44}$$

$$i_2 = i_1 - i_d \tag{45}$$

$$j_2 = j_1 - j_d \tag{46}$$

$$k_2 = k_1 - k_d \tag{47}$$

Converting $v_2$ to a unit vector $u_2$ in the same direction as $v_2$ we have:

$$u_2 = v_2 / |v_2| \tag{48}$$

Next we define a high side vector $u_{hs}$, a unit vector pointing to the high side of the wellbore in the plane of the rock annulus as follows:

$$i_{hs} = \sin(\lambda_w + \pi/2) \sin A_w \tag{49}$$

$$j_{hs} = \sin(\lambda_w + \pi/2) \cos A_w \tag{50}$$

$$k_{hs} = \cos(\lambda_w + \pi/2) \tag{51}$$

Finally the angle $\eta_d$ may be determined from the following vector dot product:

$$\cos \eta_d = u_2 \cdot u_{hs} = i_2 i_{hs} + j_2 j_{hs} + k_2 k_{hs} \tag{52}$$

Since $\eta_d$ has a valid range of $-\pi/2 \leq \eta_d \leq \pi/2$, $\eta_d$ should be constrained within this range, or using computer logic:

$$\eta_d > \pi/2 \text{ then } \eta_d = \eta_d - \pi \tag{53}$$

Now, having defined, mathematically (and thus also in corresponding electric signals) the aforementioned point of interest on the rock annulus, we can proceed to calculate (process signals) to determine the compressive strength signal at that point. In the preferred embodiment, this is done by breaking down the total compressive strength into those components which oppose circumferential (torsional), axial and lateral bit force, respectively. In mathematical terms:

The total in-situ rock strength opposing the total drilling force may be expressed as:

$$\sigma_1 = f_t \sigma_{1t} + f_a \sigma_{1a} + f_l \sigma_{1l} \tag{54}$$

and, $$1 = f_t + f_a + f_l \tag{55}$$

where:
  $\sigma_1$ = in-situ rock strength opposing the total bit force
  $f_t$ = torsional fraction of the total bit force (applied force)
  $\sigma_{1t}$ = in-situ rock strength opposing the circumferential bit force
  $f_a$ = axial fraction of the total bit force (applied force)
  $\sigma_{1a}$ = in-situ rock strength opposing the axial bit force
  $f_l$ = lateral fraction of the total bit force (reactive force, zero mean value, negligible with BHA stabilization)
  $\sigma_{1l}$ = in-situ rock strength opposing the lateral bit force To define the compressive strength opposing the torsional (circumferential) bit force at any point on the rock, we first obtain unit vectors describing the directions of $\sigma_{1t}$, $\sigma_{2t}$, and $\sigma_{3t}$ at the point of interest. ($\sigma_{2t}$ is confining stress perpendicular to $\sigma_{1t}$ and $\sigma_{3t}$.) Any point of interest may be defined by a respective arbitrary value of angle $\eta$.

For a given value of angle $\eta$, we define a unit vector perpendicular to the wellbore axis pointing in the direction defined by angle $\eta$. To precisely define the unit vector, we obtain its inclination and azimuth angles as follows:

$$\tan A_3 = \tan \eta / \cos \lambda_w \tag{56}$$

where:
  $A_3$ = azimuth difference between $u_3$ and $u_w$
  Note that if $\lambda_w = \pi/2$, then $A_3 = \pi/2$ $$A_t = A_w + A_3 + \pi \tag{57}$$

and $$\cos \lambda_t = \cos \eta \sin \zeta_w \tag{58}$$

where:
  $A_t$ = azimuth of unit vector $u_3$
  $\lambda_t$ = inclination angle of unit vector $u_3$ Next we define $u_3$ a unit vector orthogonal to both the wellbore axis and to $\sigma_{1t}$ as follows:

$$i_3 = \sin \lambda_t \sin A_t \tag{59}$$

$$j_3 = \sin \lambda_t \cos A_t \tag{60}$$

$$k_3 = \cos \lambda_t \tag{61}$$

Finally, a unit vector $u_{\sigma 1t}$ describing the direction of $\sigma_{1t}$, the rock strength opposing the circumferential bit force, at the point of interest may be determined from the following vector cross product (the cross product follows the "left-hand" rule since the vertical axis is positive downwards):

$$u_{\sigma 1t} = u_3 \times u_w \tag{62}$$

$$i_{\sigma 1t} = j_3 k_w - k_3 j_w \tag{63}$$

$$j_{\sigma 1t} = k_3 i_w - j_3 k_w \tag{64}$$

$$k_{\sigma 1t} = i_3 j_w - j_3 i_w \tag{65}$$

Unit vectors $u_{\sigma 2t}$ and $u_{\sigma 3t}$ describing the directions of $\sigma_{2t}$ and $\sigma_3 t$, the orthogonal confinement stresses accompanying the circumferential bit force, at the point of interest have already been determined above and are defined as follows:

$$u_{\sigma 2t} = u_3 \tag{66}$$

$$u_{\sigma 3t} = -u_w \tag{67}$$

The confinement stress at the point of interest may be obtained by projecting all confinement stresses in the directions defined by $u_{\sigma 2t}$ and $u_{\sigma 3t}$, and then summing all of the scalar components in each direction. The confinement stress is then the lesser of these two vectorial stress summations, since the confinement stress is always defined by the minimum principal stress. One of these confinement stresses $\sigma_{2t}$ may be determined as follows:

$$\sigma_{2t} = |(\sigma_h u_h + \sigma_v u_v + \sigma_g u_g) \cdot u_{\sigma 2t}| \tag{68}$$

In eq. (68) note that $u_h$ acts in the direction of $u_{\sigma 2t}$ (i.e. $u_h$ has the same i and j components as $u_{\sigma 2t}$). The absolute value of each component is summed as the summation is bidirectional.

The other orthogonal confinement stress $\sigma_{3t}$ is:

$$\sigma_{3t} = \sigma_b - (\sigma_h u_h + \sigma_v u_v + \sigma_g u_g) \cdot u_{\sigma 3t} \tag{69}$$

In eq. (69) note that $u_h$ acts in the direction of $u_{\sigma 3t}$ (i.e. $u_h$ has the same i and j components as $u_{\sigma 3t}$). The matrix stresses are subtracted from the overbalance. Note that only the positive components of the vector projections are summed in the direction of $u_{\sigma 3t}$ because the negative components are replaced by the fluid pressure term $\sigma_b$ (i.e. all negative components are discarded). If $\sigma_{2t}$ is less than $\sigma_{3t}$ then lost circulation is likely to occur.

The in-situ rock compressive strength is then computed using the minimum confinement stress just determined above and the relative dip angle defined by angle η. The relative dip angle encountered by the torsional bit force, $\theta_t$, at angle η is defined as:

$$\theta_t = \pi/2 - \theta(\eta - \eta_d)2/\pi \quad (70)$$

Since $\eta_d$ has a valid range of $-\pi/2 \leq \eta_d \leq \pi/2$, η should be constrained within the following range: $(\eta_d - \pi/2) \leq \eta \leq (\eta_d + \pi/2)$, or using computer logic:

$$\text{If } \eta > (\eta_d + \pi/2) \text{ then: } \eta = \eta - \pi \quad (71)$$

The intermediate rock compressive strength so computed above, $\sigma_{1ti}$, must then be reduced by an amount defined by the confinement stress acting in the direction of $u_{\sigma1t}$. The result, $\sigma_{1t}$, is the in-situ rock strength opposing the circumferential bit force at the point of interest and may be expressed as:

$$\sigma_{1t} = \sigma_{1ti} - (\sigma_h u_h + \sigma_v u_v + \sigma_g u_g) \cdot u_{\sigma1t} \quad (72)$$

$\sigma_{1ti}$ is a special case of the equation for a cumulative series from the above assays so that $\sigma_{1t}$ is a modified form of such cumulative series, adjusted for local forces affecting the basic compressive strength. It may also be viewed as an incremental compressive strength in the circumferential direction.

In eq. (72) note that $u_h$ acts in the direction of $u_{\sigma1t}$ (i.e. $u_h$ has the same i and j components as $u_{\sigma1t}$). The absolute value of each component is summed as the summation is bidirectional.

The rock strength opposing the axial bit force is obtained in a similar manner. Unit vectors describing the directions of $\sigma_{1a}$, $\sigma_{2a}$, and $\sigma_{3a}$ are obtained at the point of interest.

A unit vector $u\sigma1a$ describing the direction of $\sigma1a$, the rock strength opposing the axial bit force, at the point of interest may be determined as follows:

$$u_{\sigma1a} = u_{\sigma3t} \quad (73)$$

Unit vectors $u_{\sigma2a}$ and $u_{\sigma3a}$ describing the directions of $\sigma_{2a}$ and $\sigma_{3a}$, the orthogonal confinement stresses accompanying the axial bit force, at the point of interest are defined as follows:

$$u_{\sigma2a} = u_{\sigma2t} \quad (74)$$

$$u_{\sigma3a} = u_{\sigma1t} \quad (75)$$

The confinement stress at the point of interest may be obtained by projecting all appropriate confinement stresses in the directions defined by $u_{\sigma2a}$ and $u_{\sigma3a}$, and then summing all of the scalar components in each direction. The confinement stress is then the lesser of these two vectorial stress summations, since the confinement stress is always defined by the minimum principal stress. One of these confinement stresses σ2a may be determined as follows:

$$\sigma_{2a} = |(\sigma_h u_h + \sigma_v u_v + \sigma_g u_g) \cdot u_{\sigma2a}| \quad (76)$$

In eq. (76) note that uh acts in the direction of uσ2a (i.e. uh has the same i and j components as uσ2a). The absolute value of each component is summed as the summation is bidirectional.

The other orthogonal confinement stress σ3a is:

$$\sigma_{3a} = |(\sigma_h u_h + \sigma_v u_v + \sigma_g u_g) \cdot u_{\sigma3a}| \quad (77)$$

In eq. (77) note that $u_h$ acts in the direction of $u_{\sigma3a}$ (i.e. $u_h$ has the same i and j components as $u_{\sigma3a}$). The absolute value of each component is summed as the summation is bidirectional. The in-situ rock compressive strength is then computed using the minimum confinement stress just determined above and the relative dip angle defined by angle η. The relative dip angle encountered by the axial bit force, $\theta_a$, at angle η is defined as:

$$\theta_a = \theta \quad (78)$$

The intermediate rock compressive strength so computed above, $\sigma_{1ai}$, must then be reduced by an amount defined by the confinement stress acting in the direction of $u_{\sigma1a}$. The result, $\sigma_{1a}$, is the in-situ rock strength opposing the axial bit force at the point of interest and may be expressed as:

$$\sigma_{1a} = \sigma_{1ai} - \sigma_b - (\sigma_h u_h + \sigma_v u_v + \sigma_g u_g) \cdot u_{\sigma1a} \quad (79)$$

$\sigma_{1ai}$ is a special case of the equation for a cumulative series from the above assays so that $\sigma_{1a}$ is a modified form of such cumulative series, adjusted for local forces affecting the basic compressive strength. It may also be viewed as an incremental compressive strength in the axial direction.

In eq. (79) note that uh acts in the direction of $u_{\sigma1a}$ (i.e. uh has the same i and j components as uσ1a). The matrix stresses and the overbalance are subtracted from σ1ai. Note that only the positive components of the vector projections are summed in the direction of $u_{\sigma1a}$ because the negative components are replaced by the fluid pressure term $\sigma_b$ (i.e. all negative components are discarded).

The rock strength opposing the lateral bit force is obtained in a similar manner. Unit vectors describing the directions of $\sigma_{1L}$, $\sigma_{2L}$, and $\sigma_{3L}$ are obtained at the point of interest. This point of interest is defined by angle η.

A unit vector uσ1L describing the direction of σ1L, the rock strength opposing the lateral bit force, at the point of interest may be expressed as follows:

$$u_{\sigma1L} = u_{\sigma2t} \quad (80)$$

Unit vectors $u_{\sigma2L}$ and $u_{\sigma3L}$ describing the directions of $\sigma_{2L}$ and σ3L, the orthogonal confinement stresses accompanying the lateral bit force, at the point of interest are defined as follows:

$$u_{\sigma2L} = u_{\sigma3t} \quad (81)$$

$$u_{\sigma3L} = u_{\sigma1t} \quad (82)$$

The confinement stress at the point of interest may be obtained by projecting all appropriate confinement stresses in the directions defined by $u_{\sigma2L}$ and $u_{\sigma3L}$, and then summing all of the scalar components in each direction. The confinement stress is then the lesser of these two vectorial stress summations, since the confinement stress is always defined by the minimum principal stress. One of these confinement stresses $\sigma_{2L}$ may be determined as follows:

$$\sigma_{2L} = |(\sigma_h u_h + \sigma_v u_v + \sigma_g u_g) \cdot u_{\sigma2L}| \quad (83)$$

In eq. (83) note that $u_h$ acts in the direction $u_{\sigma2L}$ (i.e. $u_h$ has the same i and j components as $u_{\sigma2L}$). The absolute value of each component is summed as the summation is bi-directional.

The other orthogonal confinement stress $\sigma_{3L}$ is:

$$\sigma_{3L} = |(\sigma_h u_h + \sigma_v u_v + \sigma_g u_g) \cdot u_{\sigma3L}| \quad (84)$$

In eq. (84) note that uh acts in the direction of $u_{\sigma3L}$ (i.e. uh has the same i and j components as uσ3L). The absolute value of each component is summed as the summation is bidirectional. The in-situ rock compressive strength is then computed using the minimum confinement stress just determined above and the relative dip angle defined by angle η.

The relative dip angle encountered by the lateral bit force, $\theta_L$, at angle $\eta$ is defined as:

$$\theta_L = \pi/2 - \theta(1 - |\eta - \eta_d|2/\pi) \tag{85}$$

$\eta$ should be constrained as described above in eq. (71).

The intermediate rock compressive strength so computed above, $\sigma_{1Li}$, must then be reduced by an amount defined by the confinement stress acting in the direction of $u_{\sigma 1L}$. The result, $\sigma_{1L}$, is the in-situ rock strength opposing the lateral bit force at the point of interest and may be expressed as:

$$\sigma_{1L} = \sigma_{1Li} - \sigma_b - (\sigma_h u_h + \sigma_v u_v + \sigma_g u_g) \cdot u_{\sigma 1L} \tag{86}$$

$\sigma_{1Li}$ is a special case of the equation for a cumulative series from the above assays so that $\sigma_{1L}$ is a modified form of such cumulative series, adjusted for local forces affecting the basic compressive strength. It may also be viewed as an incremental compressive strength in the lateral direction.

In eq. (86) note that uh acts in the direction of $u_{\sigma 1L}$ (i.e. uh has the same i and j components as u$\sigma$1L). The matrix stresses and the overbalance are subtracted from $\sigma_{1Li}$. Note that only the positive components of the vector projections are summed in the direction of $u_{\sigma 1L}$ because the negative components are replaced by the fluid pressure term $\sigma_b$ (i.e. all negative components are discarded).

Substituting $\sigma_{1l}$, $\sigma_{1a}$ and $\sigma_{1L}$ into equation (54), we can get compressive strength at the point of interest.

Average values for $\sigma_{1l}$, and $\sigma_{1L}$, may be obtained by repeating the above process for multiple points on the rock annulus using respective $\eta$'s, and then averaging the results. There are many ways to accomplish this task. The number of points can be minimized through careful selection. In addition it is desirable to determine the points where maximum and minimum values occur for wellbore stability analysis. If the minimum values approach zero, wellbore instability (i.e. "cave-ins") is likely. For $\sigma_{1a}$, we again repeat for other points, but use the minimum $\sigma$ for these, rather than an average.

Finally, we use these averages and minimum with equation (54) to get the in-situ compressive strength for the site.

In other exemplary embodiments, rather than basing the analysis on consideration of individual points about the circumference of the site, one might use averages of the confinement stresses (circumferential, axial and lateral) and the average relative dip angle to produce a compressive strength signal for the entire annular site, which compressive strength signal is, itself, an average.

As mentioned above, the modeling may be done in advance of drilling using data from adjacent wellbore 1252. In addition, because the physical data needed to do this modeling are typically easily obtainable during a drilling process, the modeling may also be done in real time, either instead of, or in addition to, the advance modeling. A highly preferred method would be to use the advance modeling for initial guidance, but modify the drilling plan developed therefrom, as indicated, if real time modeling indicates sufficient differences, which could occur if the locus 1201 passes through rock of different characteristics than that of the adjacent wellbore 1252.

Theory Behind Mechanical Efficiency Model and Bit Wear Model (see U.S. Pat. No. 7,032,689)

The basic rationale is to assay the work by using the well known relationship:

$$\Omega_b = F_b D \tag{1}$$

where:
$\Omega_b$=bit work
$F_b$=total force at the bit
D=distance drilled

The length of an interval of the borehole between points I and T can be determined and recorded as one of a number of well data which can be generated upon drilling the well. To convert it into an appropriate form for inputting into and processing by the computer 52, this length, i.e. distance between points I and T, is preferably subdivided into a number of small increments of distance, e.g. of about one-half foot each. For each of these incremental distance values, a corresponding electrical incremental distance signal is generated and inputted into the computer 52. As used herein, in reference to numerical values and electrical signals, the term "corresponding" will mean "functionally related," and it will be understood that the function in question could, but need not, be a simple equivalency relationship. "Corresponding precisely to" will mean that the signal translates directly to the value of the very parameter in question.

In order to determine the work, a plurality of electrical incremental actual force signals, each corresponding to the force of the bit over a respective increment of the distance between points I and T, are also generated. However, because of the difficulties inherent in directly determining the total bit force, signals corresponding to other parameters from the well data, for each increment of the distance, are inputted. These can, theoretically, be capable of determining the true total bit force, which includes the applied axial force, the torsional force, and any applied lateral force. However, unless lateral force is purposely applied (in which case it is known), i.e. unless stabilizers are absent from the bottom hole assembly, the lateral force is so negligible that it can be ignored. In one embodiment, the well data used to generate the incremental actual force signals are:

weight on bit (w), e.g. in lb.;
hydraulic impact force of drilling fluid ($F_j$), e.g. in lb.;
rotary speed, in rpm (N);
torque (T), e.g. in ft. lb.;
penetration rate (R), e.g. in ft./hr. and;
lateral force, if applicable ($F_l$), e.g. in lb.

With these data for each increment, respectively, converted to corresponding signals inputted to the computer 52, the computer 52 is programmed or configured to process those signals to generate the incremental actual force signals to perform the electronic equivalent of solving the following equation:

$$\Omega_b = [(w + F_j) + 120\pi NT/R + F_l]D \tag{2}$$

where the lateral force, $F_l$, is negligible, that term, and the corresponding electrical signal, drop out.

Surprisingly, it has been found that the torsional component of the force is the most dominant and important, and in less preferred embodiments, the work assay may be performed using this component of force alone, in which case the corresponding equation becomes:

$$\Omega_b = [120\pi NT/R]D \tag{3}$$

In an alternate embodiment, in generating the incremental actual force signals, the computer 52 may use the electronic equivalent of the equation:

$$\Omega_b = 2\pi T/d_c D \tag{4}$$

where d represents depth of cut per revolution, and is, in turn, defined by the relationship:

$$d_c = R/60N \tag{5}$$

The computer 52 is programmed or configured to then process the incremental actual force signals and the respective incremental distance signals to produce an electrical signal corresponding to the total work done by the bit 22 in drilling between the points I and T. This signal may be readily converted to a humanly perceivable numerical value outputted by computer 52, in the well known manner.

The processing of the incremental actual force signals and incremental distance signals to produce total work may be done in several different ways, as discussed further herein below.

In one version, the computer 52 processes the incremental actual force signals and the incremental distance signals to produce an electrical weighted average force signal corresponding to a weighted average of the force exerted by the bit between the initial and terminal points. By "weighted average" is meant that each force value corresponding to one or more of the incremental actual force signals is "weighted" by the number of distance increments at which that force applied. Then, the computer simply performs the electronic equivalent of multiplying the weighted average force by the total distance between points I and T to produce a signal corresponding to the total work value.

In another version, the respective incremental actual force signal and incremental distance signal for each increment are processed to produce a respective electrical incremental actual work signal, whereafter these incremental actual work signals are cumulated to produce an electrical total work signal corresponding to the total work value.

In still another version, the computer may develop a force/distance function from the incremental actual force signals and incremental distance signals, and then perform the electronic equivalent of integrating that function.

Not only are the three ways of processing the signals to produce a total work signal equivalent, they are also exemplary of the kinds of alternative processes which will be considered equivalents in connection with other processes, and described below.

Technology is now available for determining, when a bit is vibrating excessively while drilling. If it is determined that this has occurred over at least a portion of the interval between points I and T, then it may be preferable to suitably program and input computer 52 so as to produce respective incremental actual force signals for the increments in question, each of which corresponds to the average bit force for the respective increment. This may be done by using the average (mean) value for each of the variables which go into the determination of the incremental actual force signal.

Wear of a drill bit is functionally related to the cumulative work done by the bit. In addition to determining the work done by bit in drilling between points I and T, the wear of the bit in drilling that interval is measured. A corresponding electrical wear signal is generated and inputted into the computer as part of the historical data. (Thus, for this purpose, point I should be the point the bit is first put to work in the hole, and point T should be the point at which bit is removed.) The same may be done for additional wells and their respective bits.

Figure 20:
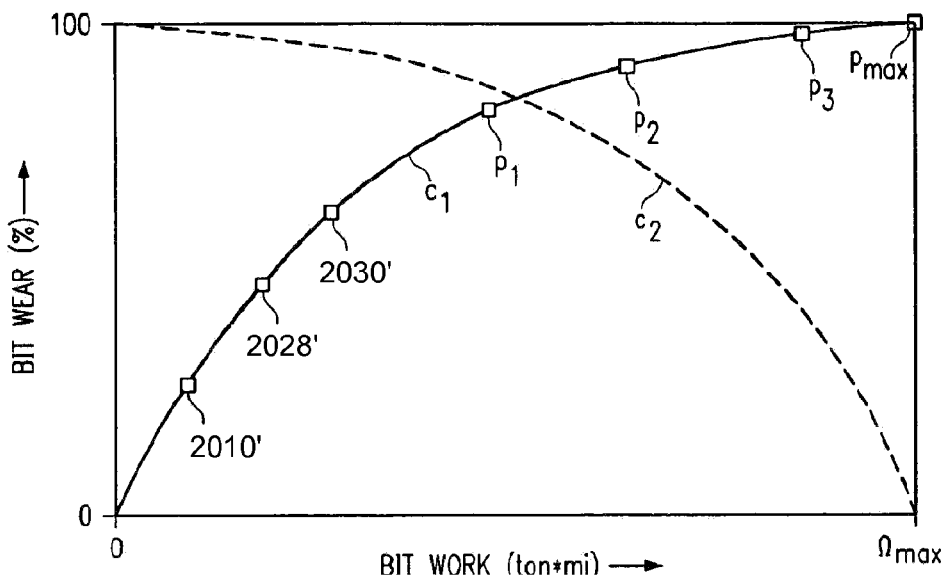
FIG. 20 is a graphical illustration of the rated work relationship.

FIG. 20 is a graphic representation of what the computer 52 can do, electronically, with the signals corresponding to such data. FIG. 20 represents a graph of bit wear versus work. Using the aforementioned data, the computer 52 can process the corresponding signals to correlate respective work and wear signals and perform the electronic equivalent of locating a point on this graph for each of the holes and its respective bit. For example, point 2010' may represent the correlated work and wear for one bit, point 2028' may represent the correlated work and wear for a second bit, and point 2030' may represent the correlated work and wear for a third bit. Other points $p_1$, $p_2$ and $p_3$ represent the work and wear for still other bits of the same design and size.

By processing the signals corresponding to these points, the computer 52 can generate a function, defined by suitable electrical signals, which function, when graphically represented, takes the form of a smooth curve generally of the form of curve c, it will be appreciated, that in the interest of generating a smooth and continuous curve, such curve may not pass precisely through all of the individual points corresponding to specific empirical data. This continuous "rated work relationship" can be an output in its own right, and can also be used in various other aspects of the technique to be described below.

It is helpful to determine an end point pmax which represents the maximum bit wear which can be endured before the bit is no longer realistically useful and, from the rated work relationship, determining the corresponding amount of work. Thus, the point pmax represents a maximum-wear-maximum-work point, sometimes referred to herein as the "work rating" of the type of bit in question. It may also be helpful to develop a relationship represented by the minor image of curve $c_1$, i.e. curve $c_2$, which plots remaining useful bit life versus work done from the aforementioned signals.

The electrical signals in the computer which correspond to the functions represented by the curves $c_1$ and $c_2$ are preferably transformed into a visually perceptible form, such as the curves as shown in FIG. 20.

As mentioned above in another context, bit vibrations may cause the bit force to vary significantly over individual increments. In developing the rated work relationship, it is preferable in such cases to generate a respective peak force signal corresponding to the maximum force of the bit over each such increment. A limit corresponding to the maximum allowable force for the rock strength of that increment can also be determined as explained below. For any such bit which is potentially considered for use in developing the curve $c_1$, a value corresponding to the peak force signal should be compared to the limit, and if that value is greater than or equal to the limit, the respective bit should be excluded from those from which the rated work relationship signals are generated. This comparison can, of course, be done electronically by computer 52, utilizing an electrical limit signal corresponding to the aforementioned limit.

The rationale for determining the aforementioned limit is based on an analysis of the bit power. Since work is functionally related to wear, and power is the rate of doing work, power is functionally related to (and thus an indication of) wear rate.

Since power, $$P = F_b D/t \tag{6}$$

$$P = F_b D/t \tag{6}$$

$$= F_b R \tag{6a}$$

where t = time

R = penetration rate, a fundamental relationship also exists between penetration rate and power.

For adhesive and abrasive wear of rotating machine parts, published studies indicate that the wear rate is proportional to power up to a critical power limit above which the wear rate increases rapidly and becomes severe or catastrophic. The wear of rotating machine parts is also inversely proportional to the strength of the weaker material. The drilling process is fundamentally different from lubricated rotating machinery in that the applied force is always proportional to the strength of the weaker material.

Figure 25:
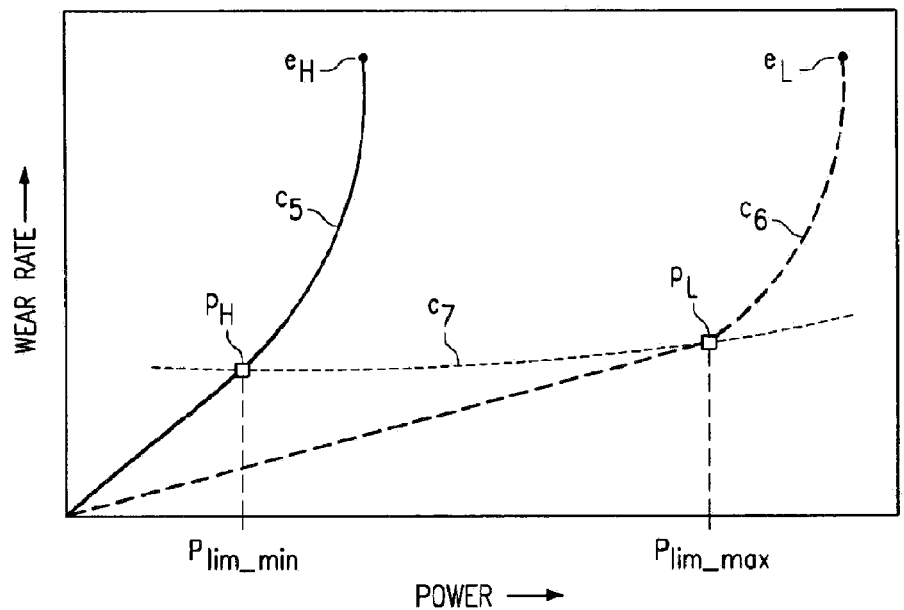
FIG. 25 is a graphical illustration of power limits.

In FIG. 25, wear rate for the bit design in question is plotted as a function of power for high and low rock compressive strengths in curves $c_5$ and $c_6$, respectively. It can be seen that in either case wear rate increases linearly with power to a respective critical point $p_H$ or $p_L$ beyond which the wear rate increases exponentially. This severe wear is due to increasing frictional forces, elevated temperature, and increasing vibration intensity (impulse loading). Catastrophic wear occurs at the ends $e_H$ and $e_L$ of the curves under steady state conditions, or may occur between $p_H$ and $e_H$ (or between $p_L$ and $e_L$) under high impact loading due to excessive vibrations. Operating at power levels beyond the critical points $p_H$, $p_L$ exposes the bit to accelerated wear rates that are no longer proportional to power and significantly increases the risk of catastrophic wear. A limiting power curve $c_7$ may be derived empirically by connecting the critical points at various rock strengths. Note that this power curve is also a function of cutter (or tooth) metallurgy and diamond quality, but these factors are negligible, as a practical matter. The curve c7 defines the limiting power that avoids exposure of the bit to severe wear rates.

Once the limiting power for the appropriate rock strength is thus determined, the corresponding maximum force limit may be extrapolated by simply dividing this power by the rate of penetration.

Alternatively, the actual bit power could be compared directly to the power limit.

Of course, all of the above, including generation of signals corresponding to curves $c_5$, $c_6$ and $c_7$, extrapolation of a signal corresponding to the maximum force limit, and comparing the limit signal, may be done electronically by computer 52 after it has been inputted with signals corresponding to appropriate historical data.

Other factors can also affect the intensity of the vibrations, and these may also be taken into account in preferred embodiments. Such other factors include the ratio of weight on bit to rotary speed, drill string geometry and rigidity, hole geometry, and the mass of the bottom hole assembly below the neutral point in the drill string.

The manner of generating the peak force signal may be the same as that described above in generating incremental actual force signals for increments in which there is no vibration problem, i.e. using the electronic equivalents of equations (2), (3), or (4)+(5), except that for each of the variables, e.g. w, the maximum or peak value of that variable for the interval in question will be used (but for R, for which the minimum value should be used).

One use of the rated work relationship is in further developing information on abrasivity. Abrasivity, in turn, can be used to enhance several other aspects of the technique, as described below.

As for the abrasivity per se, it is necessary to have additional historical data, more specifically abrasivity data from an additional well or hole which has been drilled through an abrasive stratum such as a "hard stringer," and the bit which drilled the interval including hard stringer.

It should be noted that, as used herein, a statement that a portion of the formation is "abrasive" means that the rock in question is relatively abrasive, e.g. quartz or sandstone, by way of comparison to shale. Rock abrasivity is essentially a function of the rock surface configuration and the rock strength. The configuration factor is not necessarily related to grain size, but rather than to grain angularity or "sharpness."

The abrasivity data include the well data necessary to determine work, as well as a wear measurement for the bit. In addition, the abrasivity data include the volume of abrasive medium drilled by the bit. The latter can be determined in a known manner by analysis of well logs.

Figure 21:
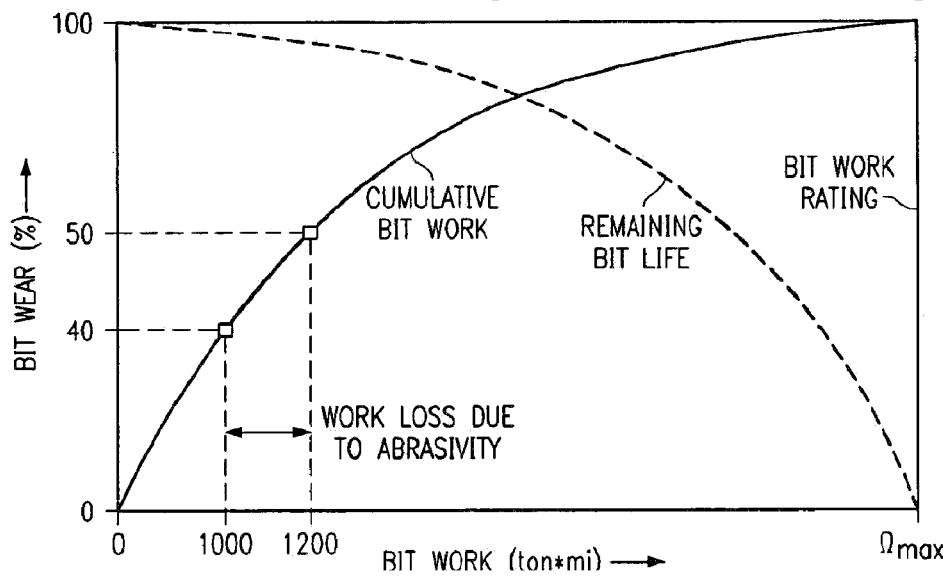
FIG. 21 is a graphical illustration of work loss due to formation abrasivity.

As with other aspects, the data are converted into respective electrical signals inputted into the computer 52. The computer 52 quantifies abrasivity by processing the signals to perform the electronic equivalent of solving the equation:

$$\lambda = (\Omega_{rated} - \Omega_b)/V_{abr} \quad (7)$$

where:
$\lambda$=abrasivity
$\Omega_b$=actual bit work (for amount of wear of bit)
$\Omega_{rated}$=rated work (for the same amount of wear)
$V_{abr}$=volume of abrasive medium drilled For instance, suppose that a bit has done 1,000 ton-miles of work and is pulled with 50% wear after drilling 200 cubic feet of abrasive medium. Suppose also that the historical rated work relationship for that particular bit indicates that the wear should be only 40% at 1,000 ton-miles and 50% at 1,200 ton-miles of work as indicated in FIG. 21. In other words, the extra 10% of abrasive wear corresponds to an additional 200 ton-miles of work. Abrasivity is quantified as a reduction in bit life of 200 ton-miles per 200 cubic feet of abrasive medium drilled or 1 (tonmile/ft.sup.3). This unit of measure is dimensionally equivalent to laboratory abrasivity tests. The volume percent of abrasive medium can be determined from well logs that quantify lithologic component fractions. The volume of abrasive medium drilled may be determined by multiplying the total volume of rock drilled by the volume fraction of the abrasive-component. Alternatively, the lithological data may be taken from logs by measurement while drilling techniques.

The rated work relationship and, if appropriate, the abrasivity, can further be used to remotely model the wear of a bit of the same size and design but in current use in drilling another well.

Using measurement while drilling techniques, and other available technology, the type of data generated can be generated on a current basis for the well 70. Because this data is generated on a current basis, it is referred to herein as "real time data." The real time data is converted into respective electrical signals inputted into computer 52. Using the same process as for the historical data, the computer can generate incremental actual force signals and corresponding incremental distance signals for every increment drilled. Further, the computer can process the incremental actual force signals and the incremental distance signals to produce a respective electrical incremental actual work signal for each increment drilled by the bit, and periodically cumulate these incremental actual work signals.

This in turn produces an electrical current work signal corresponding to the work which has currently been done by the bit. Then, using the signals corresponding to the rated work relationship, the computer can periodically transform the current work signal to an electrical current wear signal produced indicative of the wear on the bit in use.

These basic steps would be performed even if the bit was not believed to be drilling through hard stringer or other abrasive stratum. Preferably, when the current wear signal reaches a predetermined limit, corresponding to a value at or below the work rating for the size and design bit in question, the bit is retrieved.

Because the well being drilled is near historical well, and it is therefore logical to conclude that bit is drilling through hard stringer, the abrasivity signal is processed to adjust the current wear signal as explained in the abrasivity example above.

Once again, it may also be helpful to monitor for excessive vibrations of the bit in use. If such vibrations are detected, a respective peak force signal should be generated, as described above, for each respective increment in which such excessive vibrations are experienced. Again, a limit corresponding to the maximum allowable force for the rock strength of each of these increments is also determined and a corresponding signal generated. Computer 52 electronically compares each such peak force signal to the respective limit signal to assay possible wear in excess of that corresponding to the current wear signal. Remedial action can be taken. For example, one may reduce the operating power level, i.e. the weight on bit and/or rotary speed.

In any case, the current wear signal is preferably outputted in some type of visually perceptible form.

As indicated, preferred embodiments include real time wear modeling of a bit currently in use, based at least in part on data generated in that very drilling operation. However, it will be appreciated that, in less preferred embodiments, the work, rated work relationship, and/or abrasivity generated will still be useful in at least estimating the time at which the bit should be retrieved; whether or not drilling conditions, such as weight-on-bit, rotary speed, etc. should be altered from time to time; and the like. The same is true of efficiency, to be described more fully below, which, as also described more fully below, can likewise be used in generating the wear model.

In addition to the rated work relationship, the work signals produced can also be used to assay the mechanical efficiency of bit size and type.

Specifically, a respective electrical incremental minimum force signal is generated for each increment of a well interval, such as I to T, which has been drilled by the bit. The computer 52 can do this by processing the appropriate signals to perform the electronic equivalent of solving the equation:

$$F_{min} = \sigma_i A_b \quad (8)$$

where:
$F_{min}$=minimum force required to drill increment
$\sigma_i$=in-situ rock compressive strength
$A_b$=total cross-sectional-area of bit The total in-situ rock strength opposing the total drilling force may be expressed as:

$$\sigma_i = f_t \sigma_{it} + f_a \sigma_{ia} + f_l \sigma_{il} \quad (9)$$

and, $$1 = f_t + f_a + f_l \quad (10)$$

where:
$\sigma_i$=in-situ rock strength opposing the total bit force
$f_t$=torsional fraction of the total bit force (applied force)
$\sigma_{it}$=in-situ rock strength opposing the torsional bit force
$f_a$=axial fraction of the total bit force (applied force)
$\sigma_{ia}$=in-situ rock strength opposing the axial bit force
$f_l$=lateral fraction of the total bit force (reactive force, often zero mean value, negligible with BHA stabilization)
$\sigma_{il}$=in-situ rock strength opposing the lateral bit force.

Since the torsional fraction dominates the total drilling force (i.e. $f_t$ is approximately equal to 1), in the in-situ rock strength is essentially equal to the torsional rock strength, $\sigma_i = \sigma_{it}$.

A preferred method of modeling $\sigma_i$ is explained in the section above describing the theory behind the rock strength model.

The minimum force signals correspond to the minimum force theoretically required to fail the rock in each respective increment, i.e. hypothesizing a bit with ideal efficiency.

Next, these incremental minimum force signals and the respective incremental distance signals are processed to produce a respective incremental minimum work signal for each increment.

Finally, the incremental actual work signals and the incremental minimum work signals are processed to produce a respective electrical incremental actual efficiency signal for each increment of the interval I-T (or any other well increment subsequently so evaluated). This last step may be done by simply processing said signals to perform the electronic equivalent of taking the ratio of the minimum work signal to the actual work signal for each respective increment.

It will be appreciated, that in this process, and many of the other process portions described in this specification, certain steps could be combined by the computer 52. For example, in this latter instance, the computer could process directly from those data signals which have been described as being used to generate force signals, and then—in turn—work signals, to produce the efficiency signals, and any such "short cut" process will be considered the equivalent of the multiple steps set forth herein for clarity of disclosure and paralleled in the claims, the last-mentioned being one example only.

As a practical matter, computer 52 can generate each incremental actual efficiency signal by processing other signals already defined herein to perform the electronic equivalent of solving the following equation:

$$E_b = (\sigma_{it} f_t + \sigma_{ia} f_a + \sigma_{il} \cdot s_l) A_b / (2\pi T/d_c + w + F_r + f_l) \quad (11)$$

However, although equation 11 is entirely complete and accurate, it represents a certain amount of overkill, in that some of the variables therein may, as a practical matter, be negligible. Therefore, the process may be simplified by dropping out the lateral efficiency, resulting-in the equation:

$$E_b = (\sigma_{it} f_t + \sigma_{ia} f_a) A_b / (2\pi T/d_c + w + F_i) \quad (12)$$

or even further simplified by also dropping out axial efficiency and other negligible terms, resulting in the equation:

$$E_b = \sigma_{it} (d_c/T)(A_b/2\pi) \quad (13)$$

Other equivalents to equation (11) include:

$$E_b = A_b (\sigma_{it} f_t^2 / F_t + \sigma_{ia} f_a^2 / F_a + \sigma_{il} f_l^2 / F_l) \quad (14)$$

The efficiency signals may be outputted in visually perceptible form.

The efficiency model can also be used to embellish the real time wear modeling, described above. More particularly, the actual or real time work signals for the increments drilled by the bit may be processed with respective incremental minimum work signals from a reference hole to produce a respective electrical real time incremental efficiency signal for each such increment of the hole being drilled, the processing being as described above. As those of skill in the art will appreciate (and as is the case with a number of the sets of signals referred to herein) the minimum work signals could be produced based on real time data from hole being drilled instead of, or in addition to, data from a reference hole.

These real time incremental efficiency signals are compared, preferably electronically by computer 52, to the respective incremental "actual" efficiency signals based on prior bit and well data. If the two sets of efficiency signals diverge over a series of increments, the rate of divergence can be used to determine whether the divergence indicates a drilling problem, such as catastrophic bit failure or balling up, on the one hand, or an increase in rock abrasivity, on the other hand. This could be particularly useful in determining, for example, whether the bit in fact passes through hard stringer as anticipated and/or whether or not the bit passes through any additional hard stringers. Specifically, if the rate of divergence is high, i.e. if there is a relatively abrupt change, a drilling problem is indicated. On the other hand, if the rate of divergence is gradual, an increase in rock abrasivity is indicated.

A decrease in the rate of penetration (without any change in power or rock strength) indicates that such an efficiency divergence has begun. Therefore, it is helpful to monitor the rate of penetration while the bit is drilling, and using any decrease(s) in the rate of penetration as a trigger to so compare the real time and actual efficiency signals.

Figure 22:
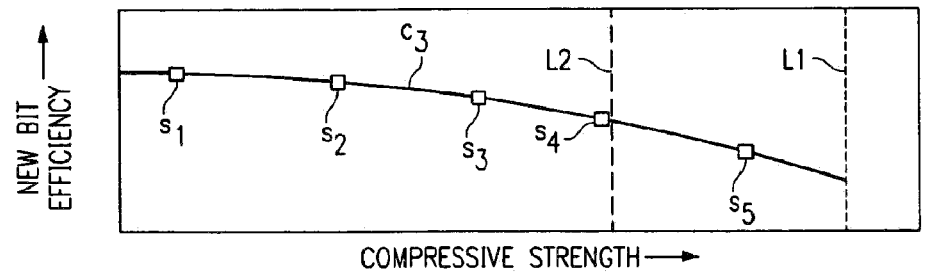
FIG. 22 is a graphical illustration of a relationship between rock compressive strength and bit efficiency.
Figure 23:
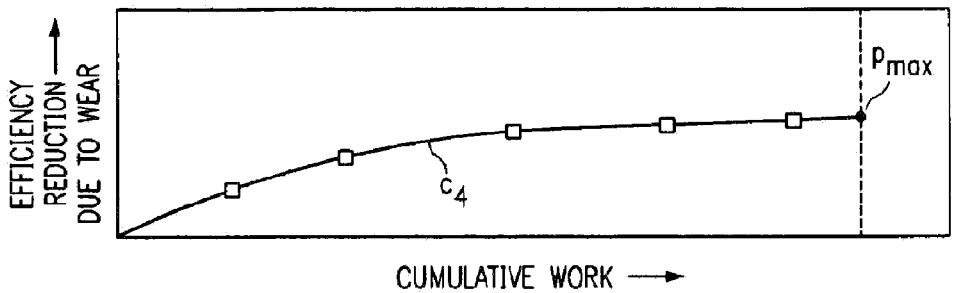
FIG. 23 is a graphical illustration of a relationship between cumulative work done by a bit and reduction in the efficiency of that bit due to wear.

Efficiency can also be used for other purposes, as graphically indicated in FIGS. 22 and 23. Referring first to FIG. 22, a plurality of electrical compressive strength signals, corresponding to difference rock compressive strengths actually experienced by the bit, may be generated. Each of these compressive strength signals is then correlated with-one of the incremental actual efficiency signals corresponding to actual efficiency of the bit in an increment having the respective rock compressive strength. These correlated signals are graphically represented by points $s_1$ through $s_5$ in FIG. 22. By processing these, computer 52 can extrapolate one series of electrical signals corresponding to a continuous efficiency-strength relationship, graphically represented by the curve $c_3$, for the bit size and design in question. In the interest of extrapolating a smooth and continuous function $c_3$, it may be that the curve $c_3$ does not pass precisely through each of the points from which it was extrapolated, i.e. that the one series of electrical signals does not include precise correspondents to each pair of correlated signals $s_1$ through $s_5$.

Through known engineering techniques, it is possible to determine a rock compressive strength value, graphically represented by L1, beyond which the bit design in question cannot drill, i.e. is incapable of significant drilling action and/or at which bit failure will occur. The function $c_3$ extrapolated from the correlated signals may be terminated at the value represented by L1. In addition, it may be helpful, again using well known engineering techniques, to determine a second limit or cutoff signal, graphically represented by L2, which represents an economic cutoff, i.e. a compressive strength beyond which it is economically impractical to drill, e.g. because the amount of progress the bit can make will not justify the amount of wear. Referring also to FIG. 23, it is possible for computer 52 to extrapolate, from the incremental actual efficiency signals and the one series of signals represented by curve $c_3$, another series of electrical signals, graphically represented by curve $c_4$ in FIG. 23, corresponding to a continuous relationship between cumulative work done and efficiency reduction due to wear for a given rock strength. This also may be developed from historical data. The end point $p_{max}$, representing the maximum amount of work which can be done before bit failure, is the same as the like-labeled point in FIG. 20. Other curves similar to $c_4$ could be developed for other rock strengths in the range covered by FIG. 22.

It is also possible for computer 52 to process signals already described to produce a signal corresponding to the rate of penetration, abbreviated "ROP." As mentioned above, there is a fundamental relationship between penetration rate and power. This relationship is, more specifically, defined by the equation:

$$R = P_{lim} E_b / \sigma_f A_b \tag{15}$$

it will be appreciated that all the variables in this equation from which the penetration rate, R, are determined, have already been defined, and in addition, will have been converted into corresponding electrical signals inputted into computer 52. Therefore, computer 52 can determine penetration rate by processing these signals to perform the electronic equivalent of solving equation 15.

The most basic real life application of this is in predicting penetration rate, since means are already known for actually measuring penetration rate while drilling. One use of such a prediction would be to compare it with the actual penetration rate measured while drilling, and if the comparison indicates a significant difference, checking for drilling problems.

A particularly interesting use of the rated work relationship, efficiency and its corollaries, and ROP is in determining whether a bit of the design in question can drill a significant distance in a given interval of formation, and if so, how far and/or how fast. This can be expanded to assess a number of different bit designs in this respect, and for those bit designs for which one or more of the bits in question can drill the interval, an educated bit selection can be made on a cost-per-unit-length-of-formation-drilled basis.

Figure 24:
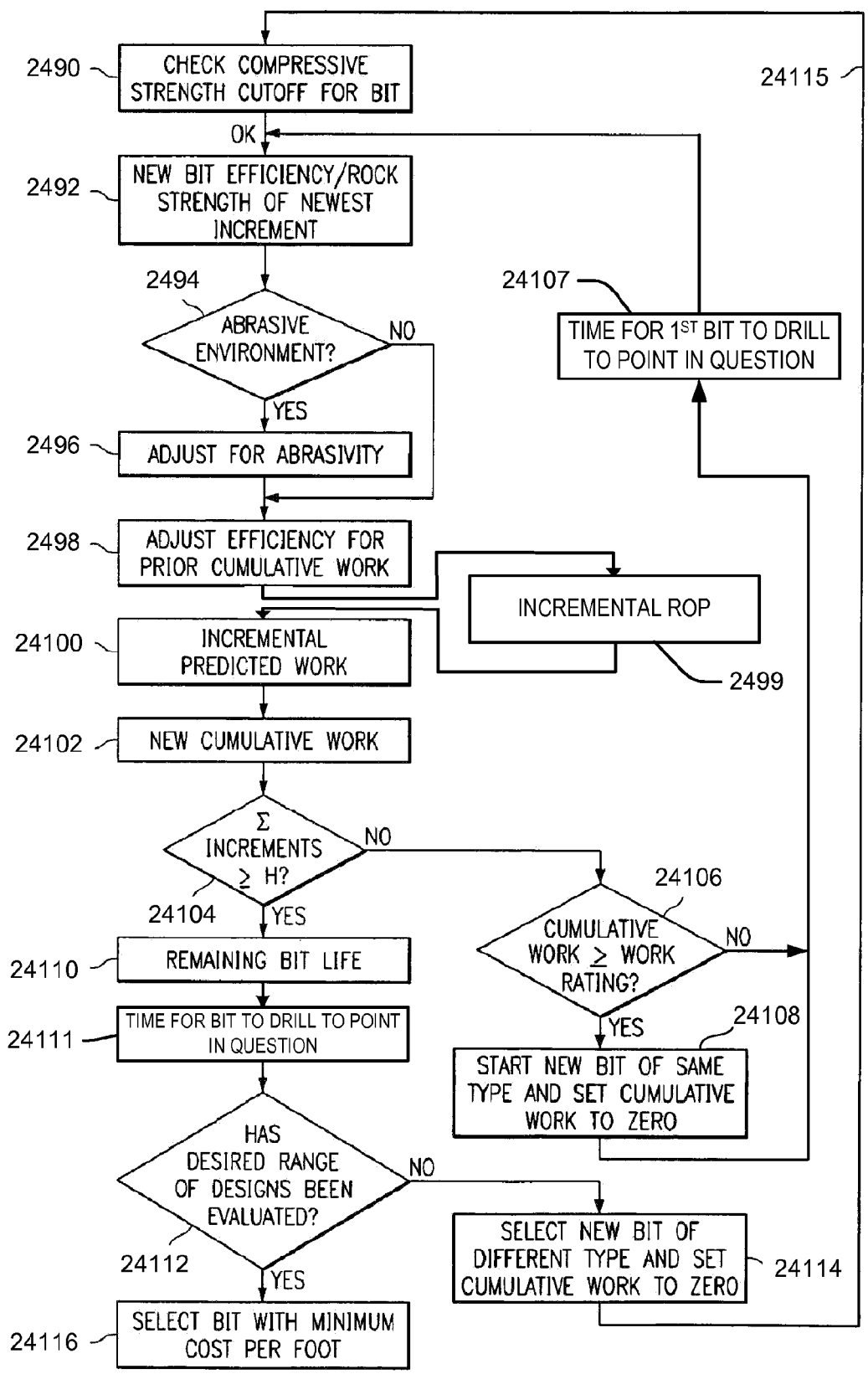
FIG. 24 is a diagram generally illustrating a bit selection process.

FIG. 24 diagrams a decision tree, interfaced with the processes which can be performed by computer 52. An interval H of interest passes through hard stringer 84 as shown in FIG. 1.

First, as indicated in block 2490, the maximum rock compressive strength for the interval H of interest is compared to a suitable limit, preferably the value at L2 in FIG. 22, for the first bit design to be evaluated. The computer 52 can do this by comparing corresponding signals. If the rock strength in the interval H exceeds this limit, then the bit design in question is eliminated from consideration. Otherwise, the bit has "O.K" status, and we proceed to block 2492. The interval H in question will have been subdivided into a number of very small increments, and corresponding electrical signals will have been inputted into the computer 52. For purposes of the present discussion, we will begin with the first two such increments. Through the processes previously described, an efficiency signal for a new bit of the first type can be chosen for the rock strength of the newest increment in interval H, which in this early pass will be the second of the aforementioned two increments.

Preferably, computer 52 will have been programmed so that those increments of interval H which presumptively pass through hard stringer will be identifiable. In a process diagrammatically indicated by block 2494, the computer determines whether or not the newest increment, here the second increment, is abrasive. Since the second increment will be very near the surface or upper end of interval H, the answer in this pass will be "no."

The process thus proceeds directly to block 2498. If this early pass through the loop is the first pass, there will be no value for cumulative work done in preceding increments. If, on the other hand, a first pass was made with only one increment, there may be a value for the work done in that first increment, and an adjustment of the efficiency signal due to efficiency reduction due to that prior work may be done at block 2498 using the signals diagrammatically indicated in FIG. 23. However, even in this latter instance, because the increments are so small, the work and efficiency reduction from the first increment will be negligible, and any adjustment made is insignificant.

As indicated at block 2499, the computer will then process the power limit, efficiency, in situ rock strength, and bit cross sectional area signals, to model the rate of penetration for the first two increments (if this is the very first pass through the loop) or for the second increment (if a first pass was made using the first increment only). In any case, each incremental ROP signal may be stored. Alternatively, each incremental ROP signal may be transformed to produce a corresponding time signal, for the time to drill the increment in question, and the time signals may be stored. It should be understood that this step need not be performed just after step box 2498, but could, for example, be performed between step boxes 24102 and 24104, described below.

Next, as indicated at block 24100, the computer will process the efficiency signals for the first two increments (or for the second increment if the first one was so processed in an earlier pass) to produce respective electrical incremental predicted work signals corresponding to the work which would be done by the bit in drilling the respective increments.

As indicated at block 24102, the computer then cumulates the incremental predicted work signals for these first two increments to produce a cumulative predicted work signal.

As indicated at block 24104, signals corresponding to the lengths of the first two increments are also cumulated and electronically compared to the length of the interval H. For the first two increments, the sum will not be greater than or equal to the length of H, so the process proceeds to block 24106. The computer will electronically compare the cumulative work signal determined at block 24102 with a signal corresponding to the work rating, i.e. the work value for $p_{max}$ (FIG. 20) previously determined. For the first two increments, the cumulative work will be negligible, and certainly not greater than the work rating. Therefore, as indicated by line 24107, we stay in the main loop and return to block 2492 where another efficiency signal is generated based on the rock strength of the next, i.e. third, increment. The third increment will not yet be into the hard stringer, so the process will again proceed directly from block 2494 to block 2498. Here, the computer will adjust the efficiency signal for the third increment based on the prior cumulative work signal generated at block 24102 in the preceding pass through the loop, i.e. adjusting for work which would be done if the bit had drilled through the first two increments. The process then proceeds as before.

For those later increments, however, which do lie within the hard stringer, the programming of computer 52 will, at the point diagrammatically indicated by block 2494, trigger an adjustment for abrasivity, based on signals corresponding to data developed as described hereinabove, before proceeding to the adjustment step 2498.

If, at some point, the portion of the process indicated by block 24106 shows a cumulative work signal greater than or equal to the work rating signal, we know that more than one bit of the first design will be needed to drill the interval H. At this point, in preferred embodiments, as indicated by step block 24107, the stored ROP signals are averaged and then processed to produce a signal corresponding to the time it would have taken for the first bit to drill to the point in question. (If the incremental ROP signals have already been converted into incremental time signals, then, of course, the incremental time signals will simply be summed.) In any event, we will assume that we are now starting another bit of this first design, so that, as indicated by block 24108, the cumulative work signal will be set back to zero before proceeding back to block 2492 of the loop.

On the other hand, eventually either the first bit of the first design or some other bit of that first design will result in an indication at block 24104 that the sum of the increments is greater than or equal to the length of the interval H, i.e. that the bit or set of bits has hypothetically drilled the interval of interest In this case, the programming of computer 52 will cause an appropriate indication, and will also cause the process to proceed to block 24110, which diagrammatically represents the generation of a signal indicating the remaining life of the last bit of that design. This can be determined from the series of signals diagrammatically represented by curve $c_2$ in FIG. 20.

Next, as indicated by step block 24111, the computer performs the same function described in connection with step block 24107, i.e. produce a signal indicating the drilling time for the last bit in this series (of this design).

Next, as indicated by block 24112, the operator will determine whether or not the desired range of designs has been evaluated. As described thus far, only a first design will have been evaluated. Therefore, the operator will select a second design, as indicated at block 24114. Thus, not only is the cumulative work set back to zero, as in block 24108, but signals corresponding to different efficiency data, rated work relationship, abrasivity data, etc., for the second design will be inputted, replacing those for the first design, and used in restarting the process. Again, as indicated by 24115, the process of evaluating the second design will proceed to the main loop only if the compressive strength cutoff-for the second design is not exceeded by the rock strength within the interval H.

At some point, at block 24112, the operator will decide that a suitable range of bit designs has been evaluated. We then proceed to block 24116, i.e. to select the bit which will result in the minimum cost per foot for drilling interval H. It should be noted that this does not necessarily mean a selection of the bit which can drill the farthest before being replaced. For example, there may be a bit which can drill the entire interval H, but which is very expensive, and a second bit design, for which two bits would be required to drill the interval, but with the total cost of these two bits being less than the cost of one bit of the first design. In this case, the second design would be chosen.

More sophisticated permutations may be possible in instances where it is fairly certain that the relative abrasivity in different sections of the interval will vary. For example, if it will take at least three bits of any design to drill the interval H, it might be possible to make a selection of a first design for drilling approximately down to the hard stringer, a second and more expensive design for drilling through hard stringer, and a third design for drilling below hard stringer.

An alternate method for determining bit mechanical efficiency is provided. This alternate method of determining bit mechanical efficiency is in addition to the method of determining bit mechanical efficiency previously presented herein above. In conjunction with assaying the work of a bit of given size and design in the drilling of an interval of a rock formation, bit mechanical efficiency may also be defined as a percentage of the total torque applied by the bit that actually drills the rock formation. This definition of bit mechanical efficiency forms the basis for a torque-bit mechanical efficiency model for assaying work of a bit of given size and design.

To better understand this alternate embodiment, let us first review for a moment how bit mechanical efficiency has been traditionally described in the art. Mechanical efficiency has been described in the art as the ratio of the inherent strength of a rock over the force applied by a bit to drill through the rock. This definition of mechanical efficiency may be mathematically expressed as follows:

$$E_1 = \sigma A/F \tag{16}$$

where:
$E_1$=prior art bit mechanical efficiency (fractional);
$\sigma$=rock compressive strength (lbf/in$^2$, or psi);
A=cross-sectional area of the bit (in$^3$); and
F=drilling force applied by the bit (lbf).

In addition, bit force may be mathematically expressed as follows:

$$F = 1207\pi NT_r/R \tag{17}$$

where:
F=drilling force applied by the bit (lbf);
N=bit rotary speed (rpm);
$T_t$=total torque applied by the bit (ftlbf); and
R=bit penetration rate (ft/hr).

As mentioned above, the method of determining bit mechanical efficiency according to the alternate embodiment includes defining bit mechanical efficiency as a percentage of the total torque applied by the bit that actually drills the rock. This definition of bit mechanical efficiency is expressed as follows:

$$E_2 = T_c/T_t \quad (18)$$

where:
$E_2$=equivalent bit mechanical efficiency (fractional);
$T_c$=cutting torque applied by the bit (ftlbf); and
$T_t$=total torque applied by the bit (ftlbf).

The bit mechanical efficiency model according to the alternate embodiment recognizes the fact that a portion of the total torque is dissipated as friction, or $$T_t = T_e + T_f \quad (19)$$

where:
$T_f$=frictional torque dissipated by the bit (ftlbf).

The preceding two definitions of bit mechanical efficiency can be shown to be mathematically equivalent definitions, that is, $E_2 = E_1$. To prove that the two are mathematically equivalent, let us consider the following discussion.

When bit mechanical efficiency is one hundred percent (100%), then it follows logically that the bit frictional torque must be zero. That is, when E=1, then Tf=0, and therefore the total torque equals the cutting torque (Tt=Tc).

Substituting these values into equations (16) and (17) for bit mechanical efficiency yields:

$$E_1 = 1 = \sigma AR/120\pi NT_t = \sigma AR/120\pi NT_c \quad (20)$$

Solving for $T_e$ yields:

$$T_c = (\sigma AR/120\pi N) \quad (21)$$

Substituting this expression for $T_c$ into equation (20) yields:

$$E_1 = (\sigma AR/120\pi N)(1/T_t) = T_c/T_t = E_2 \quad (22)$$

Therefore, $E_2 = E_1$, and the two definitions of bit efficiency are mathematically equivalent.

Figure 26:
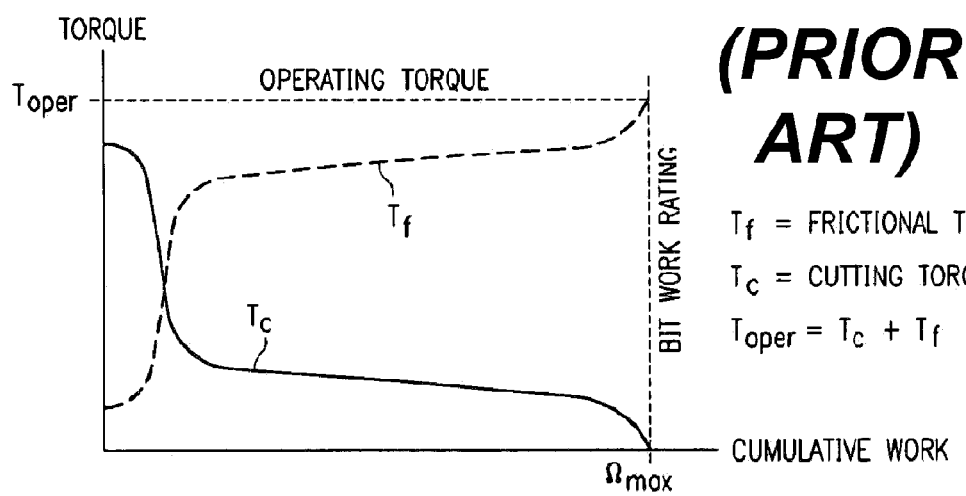
FIG. 26 is a graphical illustration of a relationship between cumulative work done by a bit and torque, further for illustrating the effect of bit wear on torque.

Turning now to FIG. 26, the effect of bit wear on torque shall be discussed. For a bit of given size and design, the illustration shows the relationship between torque and cumulative work done by the bit. The cumulative work scale extends from zero cumulative work up to the cumulative work $\Omega_{max}$ of the bit. Recall that the wear of a drill bit is functionally related to the cumulative work done by the bit. The cumulative work $\Omega_{max}$ thus corresponds to the point at which the bit has endured a maximum bit wear. Beyond $\Omega_{max}$ the bit is no longer realistically useful.

From FIG. 26, torque is shown as including a cutting torque (i.e., the percentage of total torque which is cutting torque) and a frictional torque (i.e., the percentage of total torque which is functional torque). Cutting torque ($T_c$) is torque which cuts the rock of a given formation. Frictional torque ($T_f$) is torque which is dissipated as friction. Torque is further a function of an operating torque ($T_{oper}$) of the particular drilling rig or drilling apparatus which is applying torque to the bit. The operating torque is further limited by a maximum safe operating torque of the particular drilling rig or drilling apparatus. As will become further apparent from the discussion below, the torque-bit mechanical efficiency model according to the alternate embodiment recognizes previously unknown effects of drilling rig operating torque upon bit mechanical efficiency. In FIG. 26, for any given point along the cumulative work axis up to $\Omega_{max}$, the operating torque is equal to the sum of the cutting torque plus the frictional torque. As the cumulative work of the bit increases from zero to $\Omega_{max}$, the percentage of cutting torque decreases as the percentage of frictional torque increases. The percentage of cutting torque to frictional torque varies further in accordance with the geometries of the given bit, weight-on-bit, rock compressive strength, and other factors, as will be explained further herein below. Beyond the maximum work rating, $\Omega_{max}$, for a bit of given size and design, cutting torque is a minimum and frictional torque is a maximum.

As discussed herein, computer 52 provides various signal outputs including visually perceptible outputs, such as in the form of a display output, soft copy output, or hard copy output. Such visually perceptible outputs may include information as shown in the various figures of the present application. For example, the effect of bit wear on torque may be displayed on a computer display terminal or computer print out as a plot of torque versus cumulative work done by a bit, such as shown in FIG. 26. Another output may include a display or print out of a plot of mechanical efficiency of a bit as a function of cumulative work done. Still further, the display or printout may include a plot of mechanical efficiency as a function of depth of a down hole being drilled. Other bit work-wear characteristics and parameters may also be plotted as a function of depth of the down hole being drilled.

Figure 27:
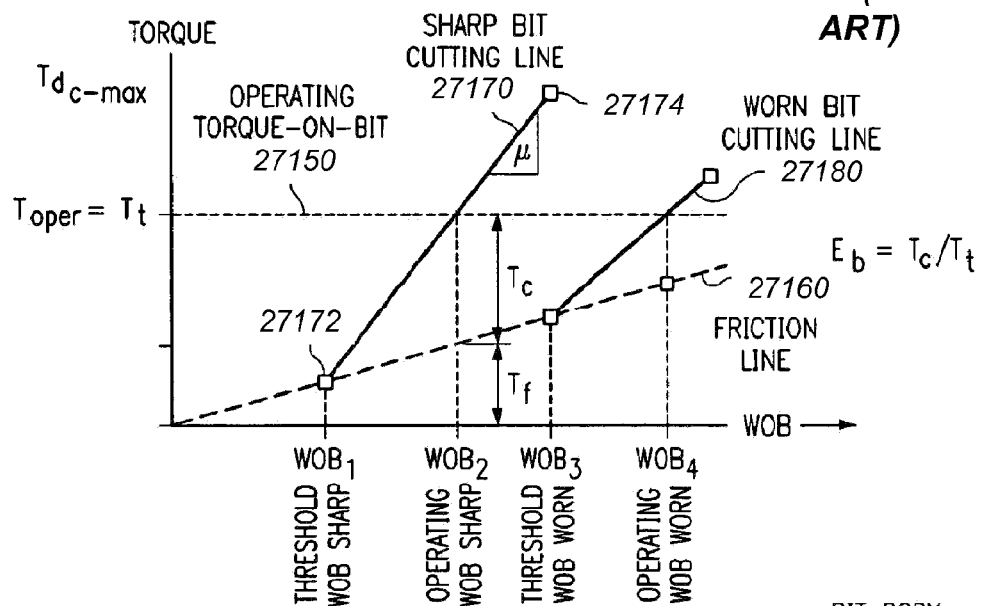
FIG. 27 illustrates a relationship between weight-on-bit (WOB) and torque according to a torque-bit mechanical efficiency model.

Referring now to FIG. 27, a graph of torque versus weight-on-bit (WOB) for a bit of given size and design for drilling a rock formation of a given rock compressive strength is illustrated and will be further explained herein below. The torque versus WOB graph may also be referred to as the torque versus WOB characteristic model of the bit of given size and design. Still further, the torque versus WOB characteristic model may also be referred to as a torque-mechanical efficiency model of the bit of given size and design for a given rock compressive strength.

Operating torque Toper is illustrated in FIG. 27 as indicated by the reference numeral 27150. Operating torque is the torque provided to the bit from a particular drilling rig (not shown) or drilling apparatus being used, or under consideration for use, in a drilling operation. The operating torque of a drilling rig or drilling apparatus is limited by mechanical limitations of the specific rig or apparatus, further by a maximum safe operating torque of the particular rig or apparatus. As mentioned above, operating torque of the particular drilling rig has an effect upon bit mechanical efficiency, as can be further understood from the discussion herein below.

Limiting torque values for the torque versus WOB characteristic model may be determined from historical empirical data (i.e., well logs showing torque measurements), from laboratory tests, or calculated. For instance, a limiting torque value $T_{dc-MAX}$ can be determined by the torque at which a maximum depth of cut is reached by critical cutters of the given bit. The maximum depth of cut corresponds to the condition, of the cutting structure being fully embedded into the rock being cut. Data for determining $T_{dc-MAX}$ can be obtained by laboratory tests. Alternatively, the torque $T_{dc-MAX}$ can be calculated from the relationship between downward force applied to the bit (WOB), axial projected contact area, and rock compressive strength as expressed in equation (25) below and a computer simulation solving for torque in equation (23) below, as will be discussed further herein. In addition, in an actual drilling operation in the field, $T_{dc}$ may also be determined by beginning to drill at a fixed rotary speed and minimal weight-on-bit, then gradually increasing the weighton-bit while monitoring a total torque and penetration rate. Penetration rate will increase with weight-on-bit to a point at which it will level off, or even drop, wherein the torque at that point is $T_{dc}$. For any given total torque value represented via an electrical signal, it is possible to process a corresponding electrical signal to produce a signal corresponding to a weight-on-bit value. That is, once the torque versus WOB characteristic is known, then for any given torque, it is possible to determine a corresponding weight-on-bit. Thus, a weight-on-bit value, W, corresponding to a torque, T, in question can be determined from the torque versus WOB characteristic model and a corresponding signal generated and input into computer 52, or vice versa.

Alternatively, where signal series or families of series are being developed to provide complete advance guidelines for a particular bit, it may be helpful to define, from field data, a value, μ, which varies with wear as follows:

$$\mu = (T - T_0)/(W - W_0) \tag{23}$$

where
$T_0$=torque for threshold weight-on-bit; and
$W_0$=threshold weight-on-bit.

The computer 52 can process signals corresponding to T, $T_0$, $W_0$ and μ (to perform the electrical equivalent of solving the equation given by:

$$W = ((T - T_0)/\mu) + W_0 \tag{24}$$

Thus, a signal can be produced which is representative of the weight-on-bit corresponding to the torque in question.

Digressing for a moment, the present technique is further directed to an analysis system for providing information to a customer for use in selecting an appropriate bit (or bits) for a drilling operation of a given formation. Briefly, raw data from data logs can be electronically collected and processed by computer 52. From the data logs, lithology the composition of the formation is determined. In addition, porosity of the formation may also be calculated or measured from the log data. With a knowledge of lithology and porosity, rock strength can be calculated, as described more fully in the section regarding the rock strength model. Once rock strength is known, then the work that a particular bit of a given size and design must do to construct a well bore of a given interval in a given formation may be determined. With a knowledge of the work which the bit must do to construct a given well bore, then an intelligent decision may be made as to selecting the best bit for use in drilling the particular well bore. Determination of lithology, porosity, and rock strength thus involves log analysis based upon geology. With the alternate embodiment, an analysis of torque versus weight-on-bit and bit mechanical efficiency is based upon drilling bit mechanics, rock strength, and operating torque of a drilling rig or drilling apparatus being used or considered for use in a particular drilling operation.

An analysis system having the ability to provide information that heretofore has been previously unavailable is provided. That is, with knowledge of how much work a bit must do in drilling a bore hole of a given interval, the life of the bit may be accurately assessed. In addition to bit work, bit wear may be accurately assessed. Incremental work and incremental wear can further be plotted as a function of bore hole depth for providing a visually recognizable indication of the same. Still further, bit mechanical efficiency may also be more accurately assessed.

Returning now to the discussion of bit mechanical efficiency, mechanical efficiency can be defined as the ratio of torque that cuts over the total torque applied by the bit. The total torque includes cutting torque and frictional torque. Both cutting torque and frictional torque create bit wear, however, only cutting torque cuts the bit. When a bit is new, most of the torque goes towards cutting the rock. However, as the bit progressively wears, more and more torque goes to frictional torque. Stated differently, as the bit progressively wears, less and less of the torque cuts the rock. Eventually, none of the torque cuts the rock and the torque is entirely dissipated as friction. In the later instance, when there is only frictional torque, the bit is essentially rotating in the bore hole without any further occurrence of any cutting action. When the bit acts as a polished surface and does not cut, it will generate torque and eventually wear itself out.

As discussed earlier, mechanical efficiency can be estimated from measured operating parameters. Measured operating parameters include WOB, rotary rpm, penetration rate (corresponding to how fast the drill bit is progressing in an axial direction into the formation), and torque on bit (TOB, corresponding to how much torque is being applied by the bit). In addition, TOB may be estimated from the torque versus. weight-on-bit model as discussed further herein. In addition, an actual mechanical efficiency may also be determined from the torque versus weight-on-bit model.

Let us now consider the relationship between the geometry of a drill bit and mechanical efficiency. A drill bit of given size and design can be designed on a computer using suitable known computer aided design software. The geometry of a drill bit includes the shape of cutters (i.e., teeth), the shape of a bit body or bit matrix, and placement of the cutters upon a bit body or bit matrix. Bit geometries may also include measurements corresponding to a minimum projected axial contact area for a cutter ($A_{axial-MIN}$) a maximum projected axial contact area for a cutter ($A_{axial-MAX}$), a maximum depth of cut ($d_{c-MAX}$), and cross-sectional area of the bit ($A_x$). See for example FIG. 29A.

Equipped with the geometry of a drill bit, such as having the bit geometry information and design data stored in the computer, bit mechanical efficiency may then be estimated at a given wear condition and a given rock strength. In other words, mechanical efficiency in any rock strength at any wear condition for a given bit can be calculated—(i.e.; predicted). With respect to the phrase "at any wear condition," there exists a theoretical wear condition after which the cutting teeth of the bit are worn to such an extent that mechanical efficiency becomes unpredictable after that. The theoretical wear condition may correspond to a point at which critical cutters (i.e. critical bit teeth) of the bit are worn down to the bit body or bit matrix. Assuming uniform wear, mechanical efficiency is theoretically determinable up to a theoretical one hundred percent (100%) wear condition. Thus, during the planning phase of a drilling operation, the mechanical efficiency for a particular bit can be estimated. Mechanical efficiency is estimated from the ratio of cutting torque to total torque, further as derived from the relationship of torque to WOB. From the geometries of a bit of given size and design and from the cumulative work-wear relationship of the bit, the corresponding torque versus WOB characteristic graph for a given rock strength can be constructed, as shown in FIG. 27.

Construction of the torque versus WOB graph of FIG. 27 will now be further explained, beginning with a brief review of basic drilling. For the formation of a bore hole, a drill bit is attached at the end of a drill string. The drill string is suspended from a drilling rig or drilling apparatus. Such a drill string may weigh hundreds of thousands of pounds. During an actual drilling operation, a drilling derrick may actually suspend a mile or two of pipe (drill string) into the bore hole with the drill bit attached to the end of the drill string. Weight-on-bit may be adjusted to a desired amount using various standard techniques known in the art. For example, if the drill string weighed 300,000 pounds, and a weight-on-bit of 20,000 pounds is desired, then the derrick is adjusted to suspend only 280,000 pounds. Suitable devices are also known for measuring weight-on-bit.

During actual drilling, there are at least two drilling parameters which can be controlled. One parameter is WOB, as discussed above. The other parameter is the rate at which the bit is turned, also referred to as rotary rpm (RPM).

The torque-versus-WOB characteristic model for a bit of given size and design can be generated as follows. Theoretically, beginning with a perfectly smooth, one hundred percent (100%) dull bit of the given size and design, the 100% dull bit is rotated on a rock or formation (having a given rock strength) at a given rpm (e.g., sixty (60) rpm). A gradual application of increasing WOB (beginning at zero WOB) is applied, wherein no drilling effect or cutting into the rock or formation occurs. This is because the bit is essentially dull and the bit does not penetrate into the rock. Spinning or rotating of the 100% dull bit with WOB thus results in a rate of penetration equal to zero (ROP=0). Torque is generated, however, even though the rate of penetration is zero. Torque may be plotted as a function of WOB to produce a torque versus WOB characteristic for the 100% dull bit. Such a torque versus WOB characteristic for the 100% dull bit is representative of a friction line, such as identified by reference numeral 27160, in FIG. 27. At zero ROP, the rock is not being cut and the torque is entirely frictional torque.

Once the friction line 27160 is determined, the torque versus WOB characteristic of a sharp bit can be obtained. The sharp bit is a bit of the given size and design in new condition. The sharp bit has geometries according to the particular bit design, for which the torque versus WOB characteristic model is being generated. One method of obtaining information for generating the torque versus WOB characteristic for the sharp bit is to rotate the drill string and sharp bit (e.g., at 60 rpm) just prior to the bit touching the bottom of the bore hole. WOB is gradually applied. A certain threshold WOB (WOB1) must be applied for the sharp bit to just obtain a bite into the rock or formation. At that point, the threshold WOB is obtained and recorded, as appropriate. Once the sharp bit begins cutting into the rock, and with further gradual increase WOB, the torque for the sharp bit follows a sharp bit torque versus WOB characteristic. The torque versus WOB characteristic for the sharp bit is shown and represented by the sharp bit cutting line, identified by reference numeral 27170, in FIG. 27. While the sharp bit is cutting at a given rotary rpm and gradually increasing WOB, there will be a corresponding ROP, up to a maximum ROP. In addition, as the rock is being cut by the sharp bit, the torque applied by the bit includes both cutting torque ($T_c$) and frictional torque ($T_f$).

As shown in FIG. 27, the sharp bit cutting line 27170 extends from an initial point 27172 on the friction line 27160 at the threshold WOB ($WOB_1$) to an end point 27174 corresponding to a maximum depth of cut $d_c$ for the sharp bit, alternatively referred to as the maximum depth of cut point. The maximum depth of cut $d_c$ for the sharp bit corresponds to that point 27174 on the sharp bit cutting line 27170 at which the critical cutters of the sharp bit are cutting into the rock by a maximum amount. In addition, there is a corresponding torque on bit ($T_{dc-MAX}$) and weight on bit ($WOB_3$) for the maximum depth of cut point 27174 of the sharp bit, as will be discussed further herein below.

For the torque versus WOB characteristic model, the operating torque ($T_{oper}$) of a drilling rig is represented by horizontal line 27150 on the torque versus WOB graph of FIG. 27. Every drilling rig or drilling apparatus has a maximum torque output. That is, the drilling rig or apparatus can only apply so much rotary torque to a drilling string and bit as is physically possible for that particular drilling rig. Thus, effects upon mechanical efficiency as a consequence of the torque output of the particular drilling rig, and more particularly, maximum torque output, can be observed from the torque-versus-WOB characteristic model for a particular bit. The maximum value of the operating torque on bit Toper for the torque-versus-WOB characteristic model will thus be limited by the maximum torque output for the particular drilling rig being used or under consideration for use in a drilling operation.

For drilling operations, a safety factor is typically implemented in which the drilling rig is not operated at its maximum operating torque-on-bit, but rather at some optimum operating torque-on-bit different from the maximum operating torque-on-bit. An optimum operating torque-on-bit is preferably selected within a range typically less than or equal to the maximum operating torque for operational safety concerns. Selection of an optimum torque range from the graph of torque versus WOB provides for determination of an optimum operating WOB range. Referring again to FIG. 27, and with respect to the sharp bit cutting line 27170, there is a corresponding maximum operating WOB ($WOB_2$) for the operating torque on bit according to the particular drilling rig being used or considered for use in a drilling operation.

For illustration purposes, an operating torque $T_{oper}$ is selected which occurs within an operating torque range. Referring again to FIG. 27, for the operating torque $T_{oper}$, there is a corresponding weight-on-bit WOB2. When the sharp bit is cutting the rock, the total torque ($T_t$ equal to $T_{oper}$) includes cutting torque ($T_c$) and frictional torque ($T_f$). From the torque versus WOB characteristic model, the cutting torque ($T_c$) is that portion of the total torque which cuts the rock. The frictional torque ($T_f$) is that portion of the total torque which is dissipated as friction. With knowledge of the total torque ($T_{oper}$) and the frictional torque ($T_f$) from the torque versus WOB characteristic model, the cutting torque ($T_c$) can be readily determined (i.e., $T_c = T_{oper} - T_f$).

As the particular bit wears, the drilling operation will require an adjustment for more and more (i.e., increased) WOB in order for the bit to get a bite in the rock. Recall that bit wear can be measured using the cumulative work-wear model for the particular bit. The threshold WOB will need to be increased accordingly as the bit wears. Thus for a worn bit, the drilling operation will require a higher WOB than for the sharp bit. The required higher-threshold weight-on-bit $WOB_3$ and a corresponding worn bit cutting line 27180 are illustrated in FIG. 27. For the worn bit, the percentage of frictional torque-increases (in greater proportion than for the sharp bit) and the percentage of cutting torque decreases (in greater proportion than for the sharp bit) with respect to a given total torque as WOB increases, as shown in FIGS. 26 and 27.

Construction of a torque versus WOB characteristic model for a bit of given size and design, as shown in FIG. 27, may be accomplished from the known geometries of the bit of given size and design. This is, for a given rock strength σ, further using known geometries of the bit of given size and design (as may be readily derived from a 3-dimensional model of the bit), the various slopes of the torque versus WOB characteristic model can be obtained. The slope of the friction line 27160, the slope p of the sharp bit cutting line 27170, and the slope of the worn bit cutting line 27180 may be calculated. For example, friction line 27160 may be established using the procedure as indicated herein above. Furthermore, the bit geometries provide information about projected axial contact area Aaxial at a given depth of cut dc or both the sharp bit and the worn bit. For example, with information about the maximum axial projected contact area, the sharp bit cutting line upper limit torque value for maximum depth of cut, $T_{dc\text{-}MAX}$, end point 27174 can be determined. Still further, threshold WOB (WOB$_1$) for the sharp bit and the threshold WOB (WOB$_3$) for the worn bit can also be determined based upon axial projected contact area of the sharp bit and the worn bit, respectively, as will be explained further herein below. Note that the threshold WOB value (WOB$_3$) of the worn bit is the same value as the WOB value of the sharp bit at end point 27174 of the sharp bit cutting line, based upon the fact that the axial projected contact area of the worn bit at zero depth of cut is the same as the axial projected contact area of the sharp bit at maximum depth of cut.

Figure 28A:
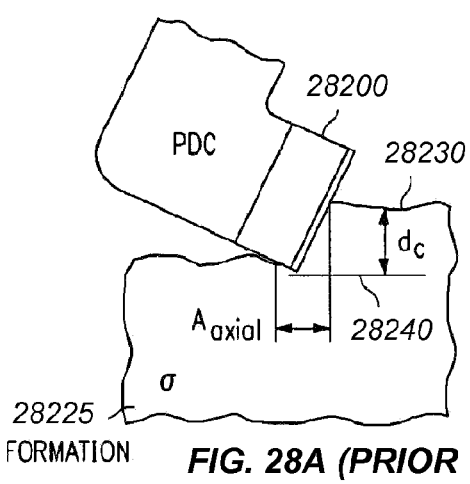
FIGS. 28A and 28B each illustrate bit mechanical geometries, including axial projected contact area, for use in determining a threshold weight-on-bit (WOB) for a given axial projected contact area and rock compressive strength.
Figure 28B:
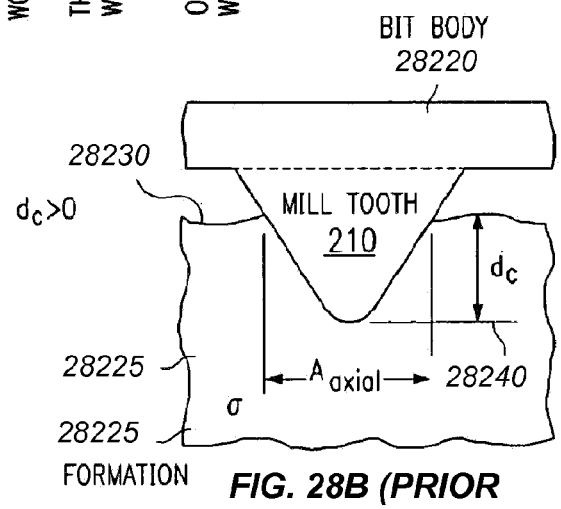

Referring now to FIGS. 28A and 28B, illustrative examples of drilling WOB are shown. FIG. 28A illustrates the effect of a drilling WOB for a PDC (polycrystalline diamond compact) cutter 28200. FIG. 28B illustrates the effect of a drilling WOB for a milled tooth cutter 28210. The cutters shown in FIGS. 28A and 28B each represent a simplified bit having one cutter tooth. Typically, a bit has a bit body 28220 (or bit matrix) with many cutters on an exterior surface of the bit body. Likewise, a bit may only have one cutter. A bit may include tungsten carbide teeth inserted into a bit body matrix or a bit may include milled cutter teeth. Other-types of bits are known in the art and thus not further described herein.

In FIGS. 28A and 28B, depth of cut (dc) is shown for each type of bit cutter, further where the depth of cut is greater than zero ($d_c > 0$). Depth of cut ($d_c$) is a measure of the depth of the embeddedness of a respective cutter into the rock 28225 at a particular WOB. Depth of cut can thus be defined as the distance from an uppermost surface 28230 of the rock being cut by an individual cutter to the lowermost contact surface 28240 of the individual cutter embedded into the rock 28225 being cut. Also illustrated in FIGS. 28A and 28B is an anal projected contact area $A_{axial}$ for each type of bit cutter. Axial projected contact area for each cutter is defined as an area of cutter contact which is axially projected upon the rock for a given depth of cut, where the area of cutter contact may change according to the respective depth of cut for a given WOB.

With respect to the torque versus WOB characteristic model, for any given bit, there is at least one cutter. In addition, for any given geometry of the bit, there will be a total axial projected contact area of that bit, the total axial projected contact area being a function of a respective depth of cut for a given WOB. Furthermore, the total axial projected contact area is the sum of axial projected contact areas of each cutter or tooth on the bit. Total axial projected contact area can change with a change in depth of cut.

The sharp bit cutting line 27170 may be established using bit geometries beginning with a determination of the threshold WOB. The threshold WOB (WOB$_1$) is dependent upon the following relationship:

$$F/A_{axial} = \sigma, \text{for a given } d_c (\text{in FIG. 29}, d_c = 0) \quad (25)$$

where
force (F)=downward force applied to the bit;
$A_{axial}$=cumulative axial projected contact area;
$\sigma$=rock compressive strength; and
$d_c$=depth of cut.

Figure 29A:
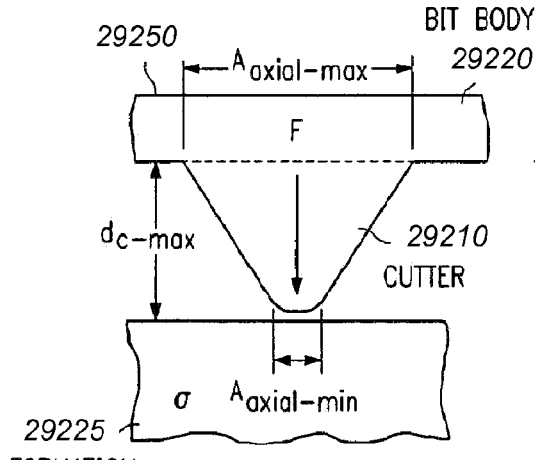
FIGS. 29A and 29B each illustrate bit mechanical geometries, including axial projected contact area, for use in determining a threshold weight-on-bit (WOB) for a given axial projected contact area and rock compressive strength.
Figure 29B:
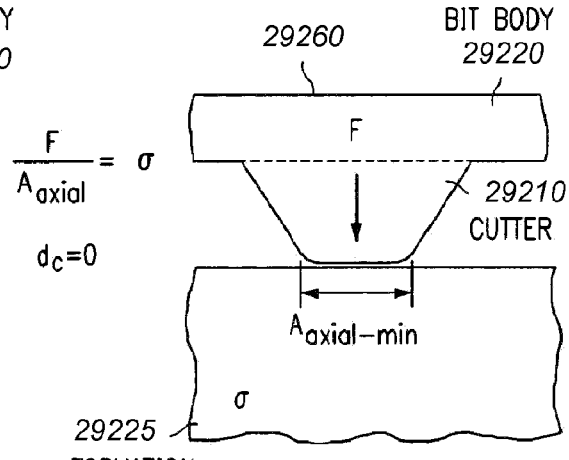

To further illustrate threshold WOB, in conjunction with FIGS. 27, 29A and 29B, suppose that the rock strength of a given formation is 10,000 psi, where rock strength is determined using a suitable method, for example, as discussed previously herein. Further, for simplicity, suppose that a sharp bit 29250 includes the total axial projected contact area is one square inch (1 in2) and that the bit is resting on the surface of a rock 29225 but not yet penetrating into the rock (FIG. 29A). In order to just start or initiate a penetration into the rock, there first must be a force balance. For the force balance, there must exist an application of enough applied force that the force applied is equal to the resistance force. Then, a force greater than the force balance is needed to obtain the action of cutting into the rock. In our example, the resistance force is 10,000 psi, corresponding to the strength of rock. Thus, a WOB of at least 10,000 pounds must be applied to rust initiate a penetration into the rock.

Consider now the instance of when the bit wears, for example, such that the worn bit 29260 includes a total axial projected contact area of two square inches (2 in$^2$) as in FIG. 29B. For the worn bit 29260 to just initiate penetration into the rock 29225, it requires 20,000 psi or double the WOB from the sharp bit having an axial projected contact area of one square inch. That is, 20,000 psi is required with an axial projected contact area of two square inches to obtain the force balance required before cutting can actually begin. Thus, all of the weight on bit which is required to just initiate penetration is dissipated as friction. This threshold WOB for the bit is the mechanism which distinguishes the frictional component of torque from the cutting component of torque.

As a bit wears, from sharp to worn, the mechanical efficiency of the bit changes. For example, the bit may start out with an axial projected contact area of one square inch. After cutting a certain increment, the bit may have worn to an axial projected contact area of two square inches, for example. The worn bit will dissipate more of the total torque as frictional torque than that of the sharp bit. The threshold WOB (WOB$_3$) for the worn bit is higher than that of the sharp bit (WOB$_1$). Total torque remains unchanged, however. As the bit wears, more and more of the total torque is dissipated as friction and less and less of it is cutting (see FIGS. 26 and 27). This effect on torque also influences ROP. That is, as the frictional torque increases, the ROP decreases since an increased portion of the total torque is being dissipated as friction and not as cutting torque.

The undesirable effects of increased frictional torque on ROP may be compensated for by speeding up or increasing the rotary rpm of the drill string, to a certain extent. As the bit tooth or cutter wears, there is a corresponding decrease in penetration per revolution. As the bit turns once, for increased wear, there is less and less cutter or tooth available to dig out the rock, thus less and less of the rock is dug out per revolution. However, if the bit is rotated faster, then the decreased ROP due to bit wear can be compensated for within a certain range. Also, rpm is limited by a maximum power limit at a given torque level. Once the bit dulls beyond a certain threshold amount, then compensating for decreased ROP by increased rpm becomes ineffective (under certain constraints and conditions) and the bit is needed to be replaced.

The above description thus highlights the underlying mechanism for the model of mechanical efficiency based upon the relationship or cutting torque to total torque. Recall that according to a prior method of determining mechanical efficiency, mechanical efficiency is a measure of rock strength divided by applied bit force. To further illustrate the difference between the prior definition and the definition as disclosed herein, consider the following. Suppose, for example, it is desired to drill a bore hole in sandstone having a rock strength of 10,000 psi. If the bore hole is drilled using an applied bit force of 20,000 psi, then twice as much force is being applied than is actually needed. The operating mechanical efficiency then is fifty percent (50%). Similarly, if a bit force of 10,000 psi is applied, then the mechanical efficiency would be one hundred percent 100%. For a mechanical efficiency of 100%, every ounce of force would be drilling the rock. This is mathematically equivalent to saying there is zero frictional torque. Zero frictional torque means that everything that is being applied to the bit is cutting the rock. In reality, 100% mechanical efficiency is not possible. There will always be something that is dissipated as function.

One measure of mechanical efficiency is the ratio of cutting torque to total torque. Instead of rock strength and bit force, the technique described herein uses the percentage of torque that cuts (i.e., the percentage of cutting torque to total torque). Total torque applied to the bit is equal to the sum of cutting torque and frictional torque.

Let us now turn our discussion to the determination of cutting torque from a 3-D model of a bit of given size and design. As previously discussed, a 3-D model of the bit of given size and design can be stored in a computer. Use of the 3-D model bit can be simulated via computer, using mechanical simulation techniques known in the art. That is, the 3-D model of the bit can be manipulated to simulate drilling into rock of various rock strengths, from new bit condition to worn bit condition using the functional relationships discussed herein. The simulations can be performed for various rock strengths and various wear conditions, as will be further discussed herein below. Briefly, the 3-D model provides a set of parameters which include i) the friction line slope, ii) the sharp bit cutting line slope, iii) the worn bit cutting line slope, iv) the axial projected contact area for the sharp bit corresponding to its threshold WOB, v) the axial projected contact area for the worn bit corresponding to its threshold WOB, vi) a theoretical work rating for the bit, and vii) a wear characteristic which is a function of instantaneous axial projected contact area, the wear characteristic describing the rate of change of bit wear from the sharp bit cutting line to the worn bit cutting line as a function of cumulative work done for the particular bit.

From an analysis of the simulated drillings, torque versus WOB parameters can be determined. These parameters include slope of the friction line 27160, slope of the sharp bit line 27170, and slope of the worn bit line 27180. In addition, the axial projected contact area for the sharp bit and the axial projected contact area of the worn bit are determined from the 3-D model (or bit geometries). Once the above parameters for the bit of given size and design have been determined, then the torque versus WOB characteristic model or graph can be constructed for any rock strength and any wear condition.

The axial projected contact area of a new (i.e., sharp) bit is determined by a geometric calculation. The axial projected contact area is a geometrical measurement based upon a placement of the cutters or teeth on the bit. The same is true for the axial projected contact area of the worn bit. The computer simulation determines the rate at which the slope $\mu$ changes from the sharp bit cutting line 27170 to the worn bit cutting line 27180 with increase in wear based upon a cumulative work-wear relationship of the particular bit of given size and design. The simulation furthermore determines the rate at which the bit becomes worn from the particular cumulative work-wear relationship.

The size of a bit and the number of cutters (i.e., number of cutting blades or teeth) contribute to the determination of the axial projected contact area for a sharp bit, as well as for a worn bit. More specifically, the total axial projection of the cutter contact area of cutters for a given bit is the sum of axial projections of each cutter of the bit which actually contacts the formation which is used. Recall the discussion of axial projected contact area with respect to FIGS. 28A and 28B. Axial projected contact area is further a measure of cutter contact area of cutters which actually contact the formation to be drilled. Total projected axial contact area for a sharp bit is less than the total cross-sectional area ($\pi r2$) of the bit, where r is the radius of the bit in question.

Axial projected contact area may be even further better understood from the following discussion. For determination of threshold WOB, a new bit (i.e., sharp bit) may have an axial projected contact area Aaxial as shown in FIG. 29A, where the depth of cut is zero. Note that only one cutter or tooth is shown for simplicity. With an increase in WOB beyond the threshold WOB, further during cutting of the rock by the bit, the depth of cutter will then be greater than zero but less than or equal to a maximum depth of cut for the particular cutter. During drilling, the cutter will be embedded into the rock by a certain amount and a corresponding change in the axial projected contact area of the cutter will occur. With a knowledge of the maximum axial projected contact area (e.g., at the maximum depth of cut ($d_{c-max}$) as shown in FIG. 29A) for a cutter, the upper limit torque value, $T_{dc-max}$, point 27174 of the sharp bit cutting line 27170 of the torque versus WOB graph, may be determined. That is, with knowledge of the maximum axial projected contact area ($A_{axial-max}$) of the bit and the rock strength, the force or WOB at the maximum axial projected contact area can be determined from equation (25). The WOB value at the maximum axial projected contact area of the bit also corresponds to the WOB value for the maximum depth of cut of the bit. Furthermore, with knowledge of the slope $\mu$, threshold WOB value, threshold torque value, and the WOB value for the maximum axial projected contact area, then the corresponding upper limit torque, $T_{dc-max}$, may be determined using equation (23) and solving for $T_{dc-max}$.

Axial projected contact area is the axial projection of the total 3-D shape of the bit onto the plane of the formation, which is a further function of the depth of cut ($d_c$). Axial projected contact area of a bit is the projection of the cutting structure onto the axial plane. Whatever engagement that the cutters have into the formation, the total axial contact area is the cumulative sum of the individual cutter axial projections according to each cutter's engagement into the rock being drilled. Axial contact area is then expressed as the sum of all of the incremental axial projected contact areas from the individual cutters on the bit (i.e., individual cutting elements or teeth).

As mentioned, the 3-D bit model is used to simulate drilling, generate the friction slope, generate the sharp cutting line slope, and generate the worn cutting line slope. The axial projected contact area for a given depth of cut of a bit can be determined, from the geometries of the bit, such as might be obtained from a 3-D model of the bit which has been stored on a computer. A particular rock compressive strength can be provided, such as a rock compressive strength as measured from a particular formation or as selected for use with respect to torque versus WOB modeling purposes.

Maximum wear, corresponding to a theoretical maximum axial projected contact area for critical cutters of the bit of given size and design, can be determined from the geometries of the bit. That is, such a determination of a theoretical maximum axial projected contact area can be obtained from the geometries of the 3-D model of the bit. For instance, from the illustrations shown in FIGS. 29A and 29B, as the cutter wears, the axial projected contact area of an individual cutter may increase to a theoretical maximum amount, such as indicated by $A_{axial-max}$. Such a maximum amount can correspond to the axial projected contact area of the individual cutter when the cutter 29210 is in a wear condition just prior to the cutter 29210 being worn down to the bit body 29220. If a cutter is worn down to 100% wear, then the bit body will contact the formation. At that point, the axial projected contact area of the cutter becomes the axial projected contact area of the bit body. In other words, as the bit wears, more particularly, the critical cutters 29210c of the bit, the axial projected contact area of the critical cutters 29210c increase to a maximum theoretical amount after which the axial projected contact area increases rapidly in an exponential manner. See FIGS. 30 and 31.

Figure 31:
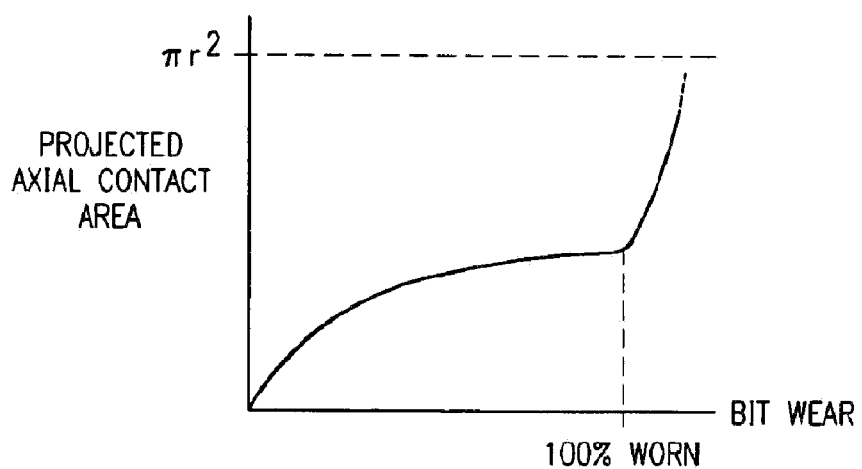
FIG. 31 shows an illustrative relationship between bit wear and projected axial contact area of the cutters of a bit of a given size and design.

At the instance that the axial projected contact area of the critical cutters becomes a theoretical maximum, any additional applied torque on bit is frictional torque. At such a point, there exists no further additional cutting torque since any additional applied torque is predominantly frictional. This results from the rapidly increased axial projected contact area contributed by the bit body. When the bit is sharp, such a rapid increase in axial projected contact area occurs when critical cutters of the bit are at a maximum depth of cut as indicated by reference numeral 27174 in FIG. 27. The information thus gained from the sharp bit is used for determining a threshold WOB (WOB3) for the worn bit, wherein the critical cutters of the worn bit are at a theoretical 100% wear condition. In other words, the 100% wear condition is a condition in which the cutting element is worn to the point such that the body of the bit is contacting the formation. Note that the bit body can be defined as anything that supports the cutting structure. Typically, some cutters of the cutting structure are more critical than others, also referred to as critical cutters 29210c. Thus, during bit wear, there will occur a sudden large increase in axial projected contact area to such an extent that all additional applied torque is frictional. This is due to a sudden discontinuity in the axial projected contact area as the cutters become more and more worn. An example of axial projected contact area versus bit wear is shown in FIG. 31.

Determination of the torque corresponding to the maximum depth of cut end-point 27174 on the sharp bit cutting line 27170 also provides for the determination of the maximum depth of cut point for the worn bit cutting line (i.e. threshold WOB, WOB3). It is noted that the axial projected contact area of the sharp bit at maximum depth of cut per revolution is the same as the axial projected contact area for critical cutters of the worn bit. With the worn bit, cutting occurs by non-critical cutters of the worn bit until such time as no further cutting occurs and all additional applied torque is frictional.

The torque versus WOB model further emulates the rate at which the slope $\mu$ of the sharp bit cutting line 27170 becomes the slope of the worn bit cutting line 27180. There is a difference in the slope of the sharp bit cutting line and the worn bit cutting line. This difference is due to the ability of the sharp bit to cut more effectively than that of the worn bit. In addition, with respect to the torque versus WOB model, a maximum depth of cut per revolution is equivalent to a maximum penetration per revolution.

As discussed, for the occurrence of a sharp increase in axial projected contact area of the bit to occur, at least one cutter (or tooth) of the cutting structure is needed to wear down to a 100% worn condition. This is regardless of whether or not the remainder of cutters are engaging the rock formation to some extent. The sudden increase in axial projected contact area further results in additional torque being consumed as frictional torque. When all of the applied torque is frictional, then the bit is essentially used up and has reached the end of its useful life.

In further discussion of the above, the difference in slope is also due to the fact that, for the worn bit, there is a substantial increase in axial projected contact area over that of the sharp bit. Beyond the point of substantial increase in axial projected contact area, the bit is essentially used up.

Figure 30:
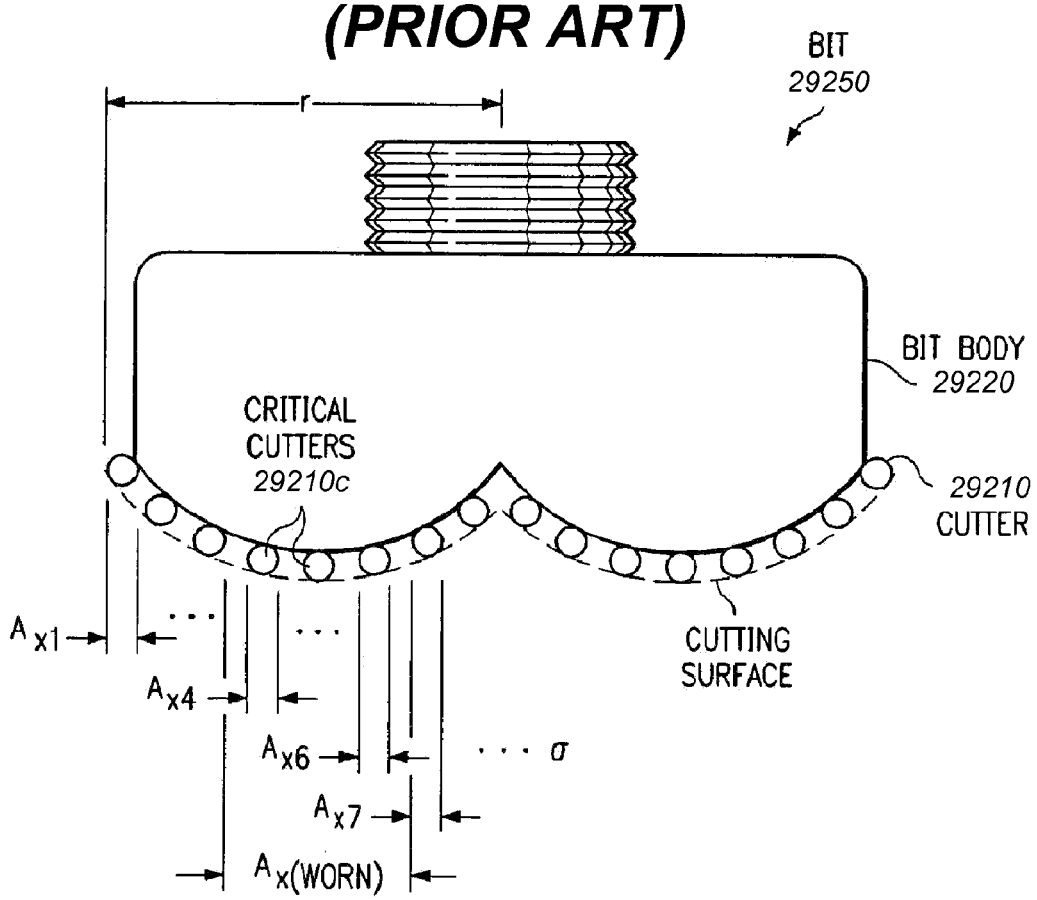
FIG. 30 illustrates an exemplary bit having cutters in contact with a cutting surface of a borehole, further illustrating axial contact areas of the cutters and critical cutters.

With reference to FIG. 30, a bit includes cutters all along a boundary of the tip of the bit, with some cutters 29210 of the bit being referred to as critical cutters 29210c. Critical cutters 29210c may not necessarily be on the crest of the tip of the bit. The critical cutters do the most work per revolution and therefore are exposed to the highest power level per revolution. Critical cutters thus wear out first, prior to other cutters on the bit. When the critical cutters 29210c wear down to the bit body 29220, such that the bit body 29220 is in contact with the formation instead of the critical cutter, then the bit 29250 is characterized as being 100% worn. While the bit is characterized as 100% worn, other cutters on the bit may be in relatively new condition, i.e., not worn very much. Thus, the technique described herein provides a much more accurate measure of bit wear in terms of bit mechanical efficiency.

Currently in the industry, the measure of bit wear is based upon the wear of an entire bit. Such a measure of wear based upon the entire bit can be misleading. Consider for example, an entire bit may only have 20% wear, however, if the critical cutters are worn out to the point where the formation is contacting the bit body (or bit matrix), then the bit is effectively useless. The technique described herein provides an improved measure of bit wear in terms of bit mechanical efficiency over prior wear measurement methods. When the critical cutters wear out, the bit has essentially finished its most useful life.

In conjunction with the cumulative work-wear relationship discussed above, a computer can be suitably programmed, using known programming techniques, for measuring the amount of work that it takes to wear the critical cutters of a bit of given size and design down to the bit body. The computer may also be used to generate the theoretical work rating of a bit of given size and design, as previously discussed herein. The theoretical work rating can be compared with an actual measured work done during actual drilling, and further compared to the actual wear condition. The actual wear condition and work can be input into the computer to history match the computer generated work rating model to what actually occurs. Thus, from a modeling of the bit wear, it is possible to determine an amount of work done during drilling of an interval and an actual wear condition of the bit.

Modeling of the amount of work that a bit does (or the amount of work that a bit can withstand) before the bit must be replaced is advantageous. That is, knowing a given rock strength of a formation to be drilled, the amount of work a bit must do to form a desired interval of well bore can be calculated. Based upon the previous discussion, it is possible to simulate drilling with a bit of given size and design, and to determine the work done by the bit and a corresponding mechanical efficiency. Recall the example presented above with respect to FIGS. 29A and 29B for determining a threshold WOB for a sharp bit and a worn bit, wherein the axial projected contact area for the worn bit was double the axial projected contact area for the sharp bit. Consider now doubling the rock strength a. As a result of doubling rock strength, the sharp bit cutting curve 27170 will move up the friction line 27160 to a new threshold WOB while maintaining its same slope. In addition, rock strength a changes another condition. That is, for a given distance or interval of well bore, rock strength a also has an effect on bit wear. Bit wear causes the slope of the sharp bit cutting line 27170 to transform into the slope of the worn bit cutting line 27180. These two phenomena occur simultaneously, i.e., changes to the threshold WOB and slope of the cutting line, which is not apparent from the prior art definition of mechanical efficiency. The technique described herein advantageously addresses the effect of rock strength and bit wear, in addition to the effect of operating torque of the drilling rig or apparatus, on bit mechanical efficiency.

Rock strength has an effect on bit mechanical efficiency. The operating torque of the drilling rig (or drilling apparatus) is illustrated on the torque versus WOB characteristic graph of FIG. 27. The drilling rig may include a down hole motor, a top drive, or a rotary table, or other known drilling apparatus for applying torque on bit. There is thus a certain mechanical limitation of the mechanism which applies torque on bit and that mechanical limitation has a controlling effect on bit mechanical efficiency.

In a preferred embodiment, measurements (i.e., penetration rate, torque, etc.) are made ideally at the bit. Alternatively, measurements may be made at the surface, but less preferred at the surface. Measurements done at the surface, however, introduce uncertainties into the measurements, depending upon the parameter being measured.

As mentioned, a computer may be suitably programmed, using known programming techniques, for simulating drilling with a bit of given size and design, from sharp (new) to worn. The drilling may be simulated in one or more rocks of different compressive strengths, such as soft rock, intermediate rock, and hard rock. Such simulated drilling is based upon the geometries of the particular bit of given size and design and also based upon the rock strength of the formation of interest. With the geometries of the bit of interest and rock strength, the simulated drilling can determine wear condition and further determine mechanical efficiencies base upon the ratio of cutting torque to total torque. Geometries of the particular bit of given size and design include its shape, bit cross-sectional area, number of cutters, including critical cutters, axial projected contact area of individual cutters for a given depth of cut or WOB, total axial projected contact area for a given depth of cut or WOB, and maximum depth of cut for critical cutters. Such simulated drilling may be used for determining points on the torque versus weight on bit characteristic graph of the torque-mechanical efficiency model.

As discussed above, the computer may be used for running discrete simulations of wearing a bit from sharp (new) to worn as a function of work done, further at different rock strengths, to determine the slopes and rates of change of the slopes. For example, the computer may simulate drilling with a bit of given size and design for three different rock strengths, or as many as deemed necessary for the advance planning of a particular drilling operation. Such simulations using the torque-mechanical efficiency characteristic model provide for determination of mechanical efficiency with a particular bit of given size and design in advance of an actual drilling operation. Thus, not only can an appropriate bit be selected, but the effects of the particular drilling rig on mechanical efficiency can be analyzed in advance of the actual drilling operation.

The technique described herein provides a method for producing a suitable torque versus WOB characteristic model or signature for a particular bit of given size and design, further at various rock strengths. With various bits, a multitude of torque versus WOB signatures may be produced. The torque versus WOB signatures provide useful information in the selection of a particular bit for use in advance of actual drilling for a particular drilling operation. In addition, the effect of mechanical limitations of a particular drilling rig or apparatus, on bit mechanical efficiency can also be taken into, account during the process of selecting an appropriate bit for the particular drilling operation.

An example of a simulation of drilling with a bit from sharp to worn can be as follows. Suppose that the simulation is drilling into rock having a strength of 5,000 psi. Knowing the bit geometries, the friction line of the torque versus WOB signature may be constructed, such as previously discussed. Next, the slope of the sharp bit cutting line may be determined, along with a threshold WOB for the given rock strength. With the threshold WOB for the sharp bit and the sharp bit cutting line slope, the sharp bit cutting line may then be constructed. The end point of the sharp bit cutting line is then determined using the maximum axial projected contact area. As the bit wears, the sharp bit cutting curve is transformed into the worn bit cutting curve. That is, the worn bit cutting curve may be determined from a knowledge of the sharp bit cutting curve and the bit wear. As discussed herein, bit wear is functionally related to cumulative work done by the bit, thus the amount of work done by the bit can be used for simulating bit wear. In addition, the bit is worn when the critical cutters are worn to the bit body or bit matrix Thus, when the critical cutters are worn to the bit body, the simulation is completed. The simulation may then be used for producing an exponent which identifies, depending upon the cumulative amount of work done which can be obtained with knowledge of the rock strength, where the sharp bit cutting line slope occurs on the friction line and how fast the sharp bit cutting line slope is transformed into the worn bit cutting line slope as a function of cumulative work done (i.e., the rate of change of the slope of the sharp bit cutting bit line to the slope of the worn bit cutting line). As the bit does more and more work, more and more of the cutting structure of the bit is being worn away. The axial projected contact area changes from Axial (sharp) to Axial (worn). In this example, the simulation simulates how the bit performs in 5,000 psi rock.

In continuation of the above example, suppose now that the rock strength is 10,000 psi. Thus, instead of starting at the WOB threshold for 5,000 psi, the sharp cutting line begins at a little higher along the friction line at a higher WOB. In addition, the sharp cutting line transitions into the worn cutting line a little higher along the friction line. The torque versus WOB signature for various rock strengths can be similarly constructed. Rock strengths may also include 15,000, 20,000, . . . , up to 50,000 psi, for example. Other rock strengths or combinations of rock strengths are also possible. With a series of torque versus WOB signatures for various rock strengths for a particular bit of given size and design, it would be a simple matter to overlay the same and connect corresponding key points of each signature. In this way, no matter what the rock strength is and no matter what the wear condition is, mechanical efficiency of a bit of given size and design can be determined from the torque versus WOB characteristic model.

The technique described herein provides a useful analysis system, method and apparatus, for predicting mechanical efficiency of a bit of given size and design in advance of an actual drilling operation. The effects of mechanical limitations of a drilling rig (for use in the actual drilling operation) on mechanical efficiency are taken into account for a more accurate assessment of mechanical efficiency. The technique described herein may also be embodied as a set of instructions in the form of computer software.

While the discussion above emphasizes predictive modeling of the mechanical efficiency, parameters may also be measured while actually drilling in a drilling operation. The results of the measured parameters may be compared to predicted parameters of the torque versus WOB characteristic model. If needed, coefficients of the predictive model may be modified accordingly until a history match is obtained.

With the ability to predict mechanical efficiency for a particular drilling operation from the torque versus WOB characteristic model, an optimal WOB can be determined for that particular drilling operation: and mechanical efficiency. Mechanical efficiency defined as the percentage of torque that cuts further provides for a more accurate work-wear relationship for a particular bit of given size and design.

Theory Behind the Penetration Rate Model (see U.S. Pat. No. 5,704,436)

Before the bit is even started into its respective hole, the compressive strength of the formation interval desired to be drilled by the bit will have been assayed. This can conveniently be done, in a manner known in the art, by analyzing drilling data, such as well logs, discharged cuttings analyses, and core analyses from the nearby hole intervals. For this part of the description, we will assume a very simple case in which the assay indicates a constant compressive strength over the entire interval.

Figure 32:
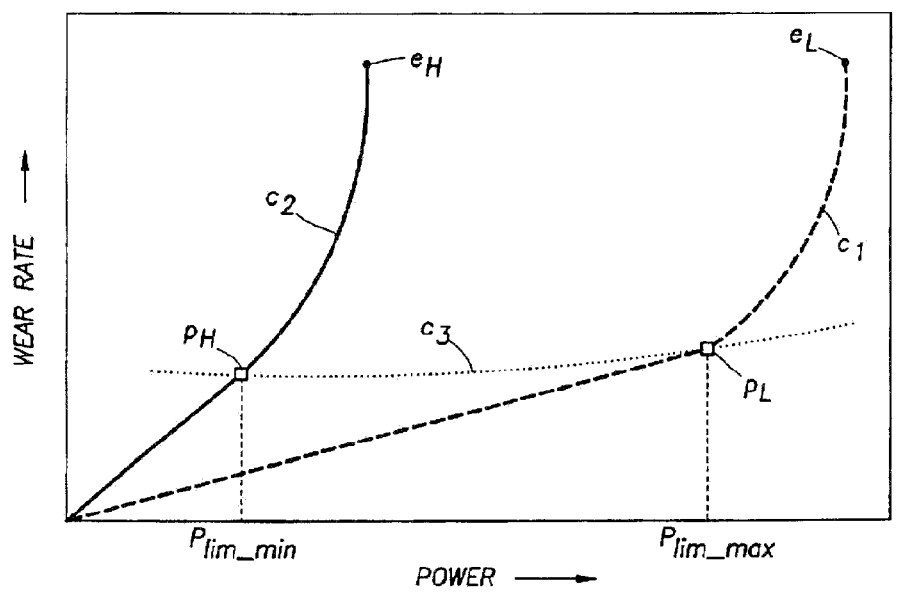
FIG. 32 is a graphical illustration of power limits.

Next, a power limit is generated. Referring to FIG. 32, research has shown that, as operating power is increased, the wear rate of any given bit tends to follow a fairly predictable pattern. Curve c1 illustrates this pattern for a relatively soft rock, i.e. a rock of relatively low compressive strength. It can be seen that the wear rate increases approximately linearly with increases in power up to a point $p_L$. With further increases in power, the wear rate begins to increase more rapidly, more specifically, exponentially. These severe wear rates are due to increasing frictional forces, elevated temperature, and increasing vibration intensity (impulse loading). Finally, the wear rate reaches an end point $e_L$, which represents catastrophic bit failure. This catastrophic wear would occur at the power at this end point under steady state conditions in actual field drilling, but could occur at a lower power, i.e. somewhere between $p_L$ and $e_L$, under high impact loading due to excessive vibrations. The curve $c_2$ is a similar curve for a rock of relatively high compressive strength. Again, the wear rate increases approximately linearly with increase in power (albeit at a greater rate as indicated by the slope of the curve $c_2$, up to a point $p_H$, after which the wear rate begins to increase more rapidly until catastrophic failure is reached at point $e_H$.

In order to generate an appropriate power limit, critical structure of the same type as in the bit 18 is analyzed. In less preferred embodiments of the invention, such analysis could, for example, consists of running a single polycrystalline diamond compact, mounted on a suitable support, against material of approximately the same compressive strength as that assayed for the formation interval in a laboratory, gradually increasing the operating power, until failure is observed. However, this failure could be anomalous, e.g. a function of some peculiarity of the particular cutter so analyzed, and in any event, would only give a power value for catastrophic failure, such as at point $e_H$ or $e_L$. It is preferable to avoid not only such catastrophic failure, but also to avoid operating at power levels which produce the exponentially increasing wear rates exemplified by the portions of the curves between points $p_H$ and $e_H$, and between points $p_L$ and $e_L$.

Therefore, a plurality of critical structures of the same size and design as the bit, and which structures have drilled material of approximately the same compressive strength as that so assayed, along with respective drilling data are analyzed. Some of these structures may be separate bit parts or subassemblies, especially if the bit is of the PDC drag type wherein the critical structures are the cutters, worn and analyzed under laboratory conditions. However, it is helpful if at least some of the structures so analyzed be incorporated in complete bits which are worn in field drilling In any event, from the data from the critical structures so analyzed, corresponding electrical signals are generated and processed in a computer 52 to generate a first type series of correlated pairs of electrical signals.

Before elaborating on this first type series of correlated pairs of electrical signals, it is noted that, for the sake of simplicity, only two worn bits and their respective holes and drilling data are illustrated. However, in preferred embodiments, the first type series of signals would be generated from a greater number of worn bits and their respective drilling data. These could come from the same formation or from other fields having formations of comparable compressive strengths and/or multiple lab tests.

In the first type series of correlated pairs of electrical signals, the two signals of each such pair correspond, respectively, to wear rate and operating power for the respective worn bit.

FIG. 32 is a mathematical, specifically graphical, illustration of the relationships between these signals. The curve c1 represents the aforementioned series of the first type for rock of a relatively low compressive strength. By processing the series of signals corresponding to the curve $c_1$, it is possible for computer 52 to generate an electrical power limit signal corresponding to a power limit, e.g. the power value at point $p_L$, for the low compressive strength in question, above which power limit excessive wear is likely to occur.

A second series of correlated pairs of signals of the first type is likewise generated for a relatively high compressive strength, and a graphic illustration of the relationship between these signals is illustrated by curve $c_2$. Again, from these signals, an electrical power limit signal can be generated, which signal corresponds to a power limit at critical point $p_H$, where wear rate stops increasing linearly with increase in power, and begins to increase exponentially.

In accord with preferred embodiments of the present invention, additional series of the first type, comprising correlated pairs of signals, would be generated for intermediate compressive strengths. From the signals of each such series, a power limit signal for the respective compressive strength would be generated. These other series are not graphically illustrated in FIG. 32, for simplicity and clarity of the illustration. It would be seen that, if they were illustrated, points such as $p_L$ and $p_H$ chosen as the power limits, and the power limit points of all curves connected, the connections would result in the curve $c_3$, which would give power limits for virtually all compressive strengths in a desired range. It will be appreciated that computer 52 can be made to process the signals in these various series to result in another type of series of signals corresponding to curve $c_3$. Assuming the curve c1 is for the lowest compressive strength in the desired range, and the curve $c_2$ for the highest, then the values $p_{Lim-min}$ and $p_{Lim-max}$ represent the power limits of a range of feasible powers for the bit design in question. It is noted that the curve $c_3$ could theoretically be viewed as also a function of cutter (or tooth) metallurgy and diamond quality, but these factors are negligible, as a practical matter.

A most basic aspect of the present invention includes regulating drilling conditions at which the given bit is operated to maintain a desired operating power level less than or equal to the power limit for the compressive strength assayed for the rock currently being drilled by that bit. Preferably, the power limit chosen is a point such as $p_L$, where wear rate begins to increase exponentially. However, in less preferred embodiments, it could be higher. Thus, when drilling through the softest rock in the range, the conditions are regulated to keep the power at or below the power $p_{Lim-max}$. Preferably, the power is kept less than the power limit, to provide a safety factor. However, it is desirable that the power be maintained about as close as reasonably possible to the power limit. "As close as reasonably possible" is meant to allow for not only the aforementioned safety factor, but also for practical limitations, e.g. limitations of the drilling rig being used such as torque limit, flow rate limit, etc. This expression is modified by "about" because the spirit of this aspect of preferred forms of the invention is meant to include workable variations, the maximum values of which may vary, e.g. with cost of operating time or a given operator's assessment of an appropriate safety factor.

Operating as close as reasonably possible to the power limit maximizes the rate of penetration, which is directly proportional to power. In general, it is desirable to maximize penetration rate, except in extreme cases wherein one might begin drilling so fast that the quantity of cuttings generated would increase the effective mud weight to the point where it could exceed the fracture gradient for the formation.

The drilling conditions so regulated include conditions applied to the bit, specifically rotary speed and weight-on-bit. Bit vibrations, which can be detected while drilling through known means, may cause the forces transmitted to the formation by the bit to vary over small increments of the interval being drilled or to be drilled. In such instances, it is preferable that the applied conditions be regulated with reference to the peak transmitted forces among these fluctuations, rather than, say, the mean transmitted forces.

In accord with another aspect of preferred forms of the invention, there are a number of combinations of rotary speed and weight-on-bit, any one of which will result in a power corresponding to the power limit. The invention includes a method of optimizing the particular combination chosen.

Figure 33:
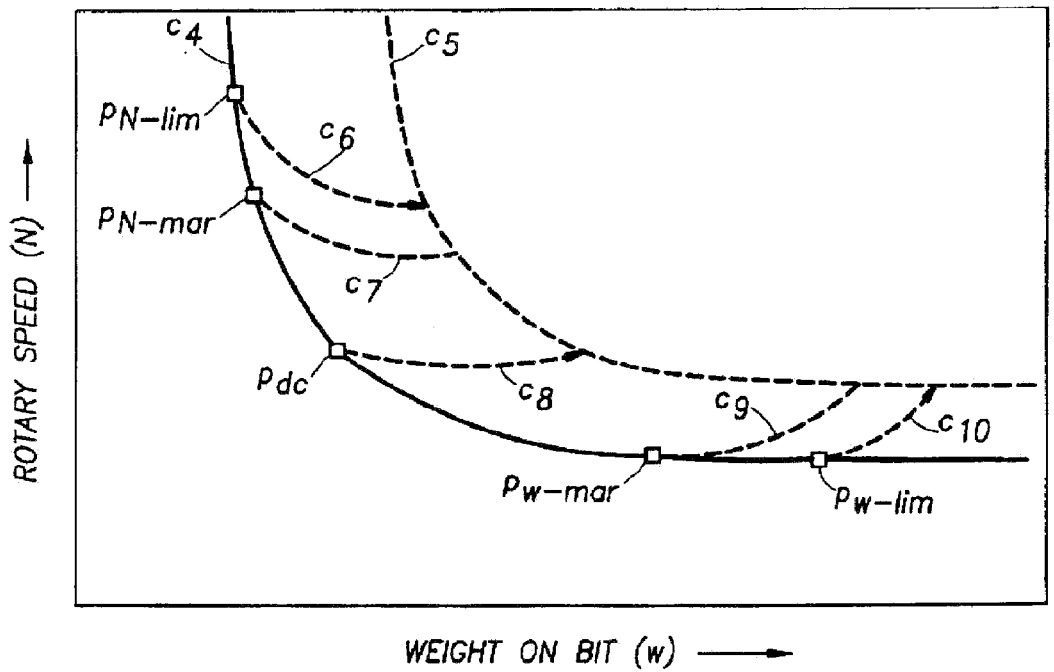
FIG. 33 is a graphical illustration of second type signal series for relatively soft rock.

FIG. 33 includes a curve $c_4$ representing values corresponding to paired signals in a series of a second type for a new bit of the design in question. The signal series corresponding to curve c4 is generated, in a manner described more fully below, from historical data from a number of bits of the same size and design as the bit being used in drilling, and which have drilled formation of approximately the same compressive strength as that assayed for the interval. A curve such as c4 may result from plotting the rotary speed values against the weight-on-bit values from the individual historical data and then extrapolating a continuous curve. It will be appreciated that those of skill in the art could program computer 52 to perform equivalent operations on correlated pairs of electrical signals corresponding, respectively, to the rotary speed and weight-on-bit values of the historical data, and that the computer 52 could even produce a graphical representation such as curve $c_4$. The historical data would be used to generate corresponding electrical signals inputted into the computer 52, which then further generates sufficient additional such pairs of signals, consistent with the pattern from the original inputs, to provide a second type series of correlated pairs of weight-on-bit and rotary speed signals. From this second series, the graphical representation c4 can be extrapolated, indeed generated by computer 52.

Correlating the curve c4 (and/or the corresponding series of signals) with the historical drilling data (or corresponding signals), it is possible to determine a point $p_{N\text{-}mar}$ at which the rotary speed value, N, is at a marginal desirable value, i.e. a value above which undesirable bit movement characteristics are likely to occur, specifically the inevitable lateral and/or axial vibrations begin to increase, either because the rotary speed is too high and/or the corresponding weight-on-bit is too low. At another point $p_{N\text{-}Lim}$, at which the rotary speed is even higher, these undesirable bit movement characteristics, specifically axial and/or lateral vibrations, peak, e.g. resulting in bit whirl; thus it is even less desirable to operate near or above the rotary speed at $p_{N\text{-}Lim}$. The weight-on-bit at $p_{N\text{-}Lim}$ is the minimum weight-on-bit needed to dampen such vibrations and is sometimes referred to herein as the "threshold" weight-on-bit.

Likewise, it is possible to locate a point pw-mar at which the weight-on-bit, w, is at a marginal desirable value in that, above this value, other kinds of undesirable bit movement characteristics, specifically increasing torsional vibrations, occur. At $p_{w\text{-}Lim}$ these undesirable movements peak and "stick-slip" (jerky rather than continuous bit rotation) may occur, so it is even less desirable to operate with weights near or above the weight-on-bit value at $p_{N\text{-}Lim}$.

In general, although any point on the curve c4 includes a rotary speed and weight-on-bit value corresponding to the power limit for the compressive strength in question and for a new bit, it will clearly be desirable to operate within the range between points $p_{N\text{-}mar}$ and $p_{w\text{-}mar}$. As illustrated, the curve c4 corresponds precisely to the power limit. Therefore, to include the aforementioned safety feature, it would be even more preferable to operate in a range short of either of the points PN-mar or pw-mar. Even more preferably, one should operate at values corresponding to a point on the curve c4 at which the weight-on-bit value, w, is less than, but about as close as reasonably possible to the weight-on-bit value at Pw-mar. This is because, the higher the rotary speed, the more energy is available for potential vibration of the drill string (as opposed to just the bit per se).

Bearing in mind that FIG. 33 pertains to relatively soft rock, it will be seen that, about as close as reasonably possible to $p_{w\text{-}mar}$ will, in this case, actually be rather far from pw-mar. This is because, in very soft rock, the bit will reach a maximum depth of cut, wherein the cutting structures of the bit are fully embedded in the rock, at a weight-on-bit value at point $p_{dc}$, which is well below the weight-on-bit value at $p_{W\text{-}mar}$. For PDC and roller cone bits, it is unreasonable, and useless, to apply additional weight on the bit beyond that which fully embeds the cutters. For diamond impregnated bits, it may be desirable to operate at a weight-on-bit somewhat greater than that at $p_{dc}$. This partially embeds the matrix bit body, into which the diamonds are impregnated. Thus the matrix wears along with the diamonds so that the diamonds always protrude somewhat from the matrix (a condition sometimes called "self-sharpening"). Therefore, the optimum rotary speed and weight-on-bit values will be those at or near point $p_{dc}$.

From additional historical drilling data, another series of correlated signals of the second type can be generated for a badly worn bit of the type in question, and these correspond to the curve $c_5$. Intermediate series of this second type, for lesser degrees of wear, could also be generated, but are not illustrated by curves in FIG. 33 for simplicity and clarity of illustration. In any event, the computer 52 can be made to process the signals of these various series, in a manner well known in the art, so as to generate series of signals of a third type corresponding to curves $c_6$, $c_7$, $c_8$, $c_9$, and $c_{10}$. Curve $c_6$ corresponds to $p_{w\text{-}mar}$ type values, as they vary with wear. Curve $c_7$ corresponds to $p_{N\text{-}mar}$ type values as they vary with bit wear. Curve $c_8$ corresponds to $p_{dc}$ type values as they vary with bit wear. Curve $c_9$ corresponds to $p_{w\text{-}mar}$ type values as they vary with bit wear. And curve $c_{10}$ corresponds to pw-Lim type values as they vary with wear. Thus, as drilling proceeds, it is desirable to measure and/or model the wear of bit 18, and periodically increase the weight-on-bit, and correspondingly alter the rotary speed, preferably staying within the range between curves $c_6$ and $c_{10}$, more preferably between curve $c_7$ and curve $c_9$, and even more preferably at or near curve $c_8$.

Figure 34:
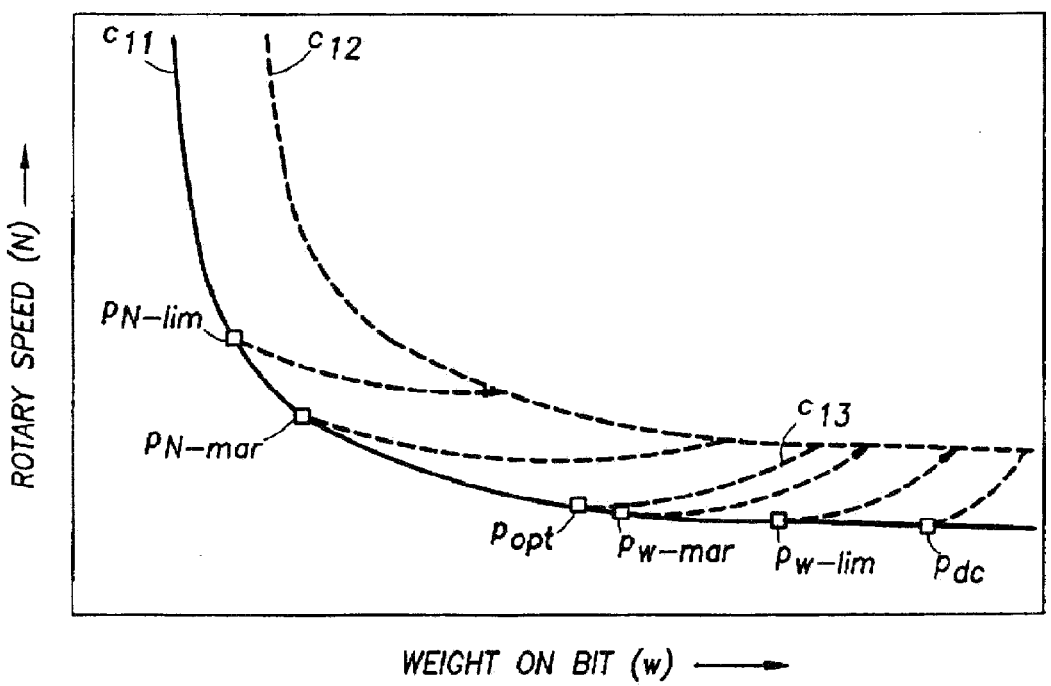
FIG. 34 is a graphical illustration similar to that of FIG. 33, but for relatively hard rock.

FIG. 34 is similar to FIG. 33, but represents series of signals for a relatively hard (high compressive strength) rock. Here, again, there are shown two curves $c_{11}$ and $c_{12}$ corresponding, respectively, to series of signals of the second type for a new and badly worn bit. In this hard rock, the point Pw-mar whereafter further increases in weight-on-bit will result in undesirable torsional vibrations, has a weight-on-bit value less than that of point $p_{dc}$ and so, therefore does $p_{w-Lim}$. Thus, in hard rock, even allowing for a safety factor, it will be possible to operate at an optimum pair of values, occurring at $p_{opt}$ much closer to $p_{w-mar}$, than is the case for soft rock. Other pairs of values, analogous to $p_{opt}$, can be found for varying degrees of bit wear. From the signals corresponding to these, a series of paired electrical signals can be generated and corresponding curve $c_{13}$ extrapolated by computer 52.

As before, "as close as reasonably possible" is meant to allow for not only a safety factor, but also for practical limitations. For example, a theoretically optimum pair of rotary speed, weight-on-bit values might, in the context of a particular drill string geometry or hole geometry, produce drill string resonance, which should be avoided.

In other highly unusual examples, the rock may be so hard, and the torque capability of the motor so low, that the rig is incapable of applying enough weight-on-bit to even reach the threshold weight-on-bit value at $p_{N-Lim}$. Then it is impossible to even stay within the range between $p_{N-Lim}$ and $p_{w-Lim}$. Then one would operate about as close as reasonably possible to this range, e.g. at a weight-on-bit less than that at $p_{N-Lim}$ and a correspondingly high rotary speed.

It should also be borne in mind that, while values such as those shown on the various curves in FIGS. 33 and 34 are generally valid, aberrant conditions in a particular drilling operation may cause undesirable bit and/or drill string movements at rotary speed and weight-on-bit values at which they should not, theoretically, occur. Thus it is desirable to provide means, known in the art, to detect such movements in real time (while drilling) and take appropriate corrective action whenever such movements are detected, staying as close to the optimum values as possible while still correcting the condition.

With the above general concepts in mind, there will now be described one exemplary method of processing signals to obtain series of signals of the type corresponding to the curves in FIGS. 33 and 34.

For the rock strength $\sigma$ in question, historical empirical wear and power data are used to generate corresponding electrical signals, and those signals are processed by computer 52 to generate a series of paired signals of the first type, corresponding to a limiting power curve such as $c_1$ or $c_2$.

Next, from historical empirical data, e.g. logs from offset holes showing torque and vibration measurements, limiting torque values may be determined. Specifically a torque value $T_{N-Lim}$ at which lateral and axial vibrations peak, i.e. a value corresponding $p_{N-Lim}$ for the $\sigma$ and wear condition in question and a torque value $T_{w-Lim}$ at which torsional vibrations peak (produce "stick slip"), i.e. a value corresponding to $p_{Lim}$ for the $\sigma$ and the wear condition in question, are determined. Preferably, torque values $T_{N-mar}$ and $T_{w-mar}$ corresponding, respectively, to $p_{N-mar}$ and $p_{w-mar}$ for the $\sigma$ and wear condition in question are likewise determined.

Preferably, there are plentiful torque and vibration data for the $\sigma$ and wear condition in question. These are converted to corresponding electrical signals inputted into computer 52. These signals are processed by computer 52 to produce signals corresponding to the torque values $T_{N-Lim}$, $T_{N-mar}$, $T_{w-mar}$ and $T_{w-Lim}$.

At least if $\sigma$ is low, i.e. the rock is soft, and preferably in any case, a torque value $T_{dc}$, corresponding to the torque at which the maximum depth of cut is reached (i.e. the cutting structure is fully embedded) is also determined. It will be seen that this value and its corresponding electrical signal also correspond to $p_{dc}$.

The data for determining $T_{dc}$ can be provided by laboratory tests. Alternatively, in an actual drilling operation in the field, $T_{dc}$ can be determined by beginning to drill at a fixed rotary speed and minimal weight-on-bit, then gradually increasing the weight-on-bit while monitoring torque and penetration rate. Penetration rate will increase with weight-on-bit to a point at which it will level off, or even drop. The torque at that point is $T_{dc}$.

For each of the aforementioned torque values, it is possible to process the corresponding electrical signal to produce signals corresponding to corresponding rotary speed and weight-on-bit values, and thus to locate a corresponding point on a curve such as those shown in FIGS. 33 and 4.

A value w, the weight-on-bit corresponding to the torque, T, in question can be determined and a corresponding signal generated and inputted into computer 52.

Alternatively, where signal series or families of series are being developed to provide complete advance guidelines for a particular bit, it may be helpful to define, from field data, a value, μ, which varies with wear:

$$\mu = (T - T_0)/(w - w_0) \tag{1}$$

where
$T_o$ = torque for threshold weight-on-bit
$w_0$ = threshold weight-on-bit
Then computer 52 processes the T, $T_o$, $w_o$ and μ signals to perform the electronic equivalent of solving the equation:

$$w = (T - T_0)/\mu + w_0 \tag{2}$$

to produce a signal corresponding to the weight-on-bit corresponding to the torque in question. Next, computer 52 performs the electronic equivalent of solving the equation:

$$N = P_{Lim}/(2\pi\mu + d_c)w60 \tag{3}$$

where
N = rotary speed
$p_{Lim}$ = the power limit previously determined as described above
$d_c$ = penetration per revolution (or "depth of cut")
where it is desired to use both axial and torsional components (the lateral component being negligible). Alternatively, if it is desired to use the torsional component only, these equations become:

$$N = P_{Lim}/120\pi\mu w \tag{4}$$

or $$N = P_{Lim}/120\pi T \tag{4a}$$

The computer does this by processing signals corresponding to the variables and constants in equation (3), (3a), (4) or (4a).

We now have signals corresponding, respectively, to a weight-on-bit, w, and a rotary speed, N, corresponding to the torque, T, in question, i.e. a first pair of signals for a series of the second type represented by curves $c_4$, $c_5$, $c_{11}$, and $c_{12}$. For example, if the torque used was $T_{Lim}$, we can locate point $p_{N-Lim}$.

By similarly processing additional torque signals for the same bit wear condition and rock strength, $\sigma$, we can develop the entire second type series of pairs, corresponding to a curve such as $c_4$, including all the $_{reference}$ points $p_{N-Lim}$, $p_{N-mar}$, $p_{dc}$, $p_{w-mar}$ and $p_{w-Lim}$.

Then, when drilling with a bit of the size, design and wear condition in question, in rock of the strength σ in question, one operates at a rotary speed, weight-on-bit combination corresponding to a pair of signals in this series, in the range between $p_{N\text{-}Lim}$ and $p_{w\text{-}Lim}$, unless w at $p_{w\text{-}Lim}$>w at $p_{dc}$, in which case one operates at values between $p_{N\text{-}Lim}$ and $p_{dc}$.

More preferably, one operates between $p_{N\text{-}mar}$ and $p_{w\text{-}mar}$, or $p_{N\text{-}mar}$ and $p_{dc}$, whichever gives the smaller range. Even more preferably one operates about as close as reasonably possible to pdc or pw-mar, whichever has the lower weight-on-bit. If $p_{dc}$ has the lower weight-on-bit, and the bit is of the PDC or roller cone type, one operates at or slightly below the values at $p_{dc}$, depending on the safety factor desired. However, if the bit is of the diamond impreg type, one might prefer to operate at or slightly above $p_{dc}$.

By similar processing of signals for the same rock strength, σ, but different wear conditions, one can develop a family of series of paired signals of the second type, which can be depicted as a family of curves or a region, such as the region between curves $c_{11}$ and $c_2$.

It is then possible to develop series of the third type, corresponding, for example, to curves $c_8$ and $c_{13}$. Then, by monitoring or modeling the wear of the bit, one can optimize by increasing the weight-on-bit, w, applied as the bit wears and correspondingly adjusting the rotary speed, N.

In less preferred embodiments, one may simply select a torque $T_{opt}$, e.g. as close as reasonably possible to $T_{dc}$ or $T_{w\text{-}mar}$, whichever is less, then process as explained above to obtain the corresponding w and N. Repeating this for different wear conditions, one can simply generate a series of the third type, e.g. corresponding to curve $c_{13}$.

However, it is preferable to develop ranges, as shown in FIGS. 33 and 34 to provide guidelines for modification of the hypothetical optimum operating conditions. For example, if operating at $p_{opt}$ with a particular string and hole geometry should produce resonance in the string, the operator can then select another set of conditions between $p_{N\text{-}mar}$ and $P_{w\text{-}mar}$.

It will be understood by those of skill in the art that many alternate ways of generating and processing data to generate the signal series are possible, the above being exemplary.

As mentioned above, up to this point, we have assumed σ is constant over the interval. However, in actual drilling operations, a may vary over the interval drilled by one bit. Thus, regardless of the method used to develop signal series of the second and third type for a given rock strength, it is desirable to repeat the above process for other rock strengths which the bit in question is designed to drill. For example, for a given bit, one might develop signal series corresponding to curves such as shown in FIG. 33 for the softest rock it is anticipated the bit will drill, other signal series corresponding to curves such as shown in FIG. 4 for the hardest rock, and still other such series for intermediate rock strengths. This can provide an operator in the field with more complete information on optimizing use of the bit in question.

Then, for example, if the assay of the interval to be drilled by the bit includes strata of different rock strengths, the operation in each of these strata can be optimized. By way of further example, if the assay is based on adjacent holes, but MWD measurements indicate that rock of a different strength is, for some reason, being encountered in the hole in question, the operating conditions can be changed accordingly.

Theory Behind Estimating the Magnitude of Stresses (see U.S. Pat. No. 4,981,037)

Pore fluid pressure is a major concern in any drilling operation. Pore fluid pressure can be defined as the isotropic force per unit area exerted by the fluid in a porous medium. Many physical properties of rocks (compressibility, yield strength, etc.) are affected by the pressure of the fluid in the pore space. Several natural processes (compaction, rock diagenesis and thermal expansion) acting through geological time influence the pore fluid pressure and in situ stresses that are observed in rocks today.

One known relationship among stresses is the Terzaghi effective stress relationship in which the total stress equals effective stress plus pore pressure (S=v+P). The technique described herein applies this relationship to well log data to determine pore pressure. Total overburden stress and effective vertical stress estimates are made using petrophysically based equations relating stresses to well log resistivity, gamma ray and/or porosity measurements. This technique can be applied using measurement-while-drilling logs, recorded logs or open hole wireline logs. The derived pressure and stress determination can be used real-time for drilling operations or afterward for well planning and evaluation.

Total overburden stress is the vertical load applied by the overlying formations and fluid column at any given depth. The overburden above the formation in question is estimated from the integral of all the material (earth sediment and pore fluid, i.e. the overburden) above the formation in question. Bulk weight is determined from well log data by applying petrophysical modeling techniques to the data. When well log data is unavailable for some intervals, bulk weight is estimated from average sand and shale compaction functions, plus the water column within the interval.

The effective vertical stress and lithology are principal factors controlling porosity changes in compacting sedimentary basins. Sandstones, shales, limestones, etc. compact differently under the same effective stress σv. An effective vertical stress log is calculated from porosity with respect to lithology. Porosity can be measured directly by a well logging tool or can be calculated indirectly from well log data such as resistivity, gamma ray, density, etc.

Effective horizontal stress and lithology are the principal factors controlling fracturing tendencies of earth formations. Various lithologies support different values of horizontal effective stress given the same value of vertical effective stress. An effective horizontal stress log and fracture pressure and gradient log is calculated from vertical effective stress with respect to lithology. A non-elastic method is used to perform this stress conversion.

Pore pressures calculated from resistivity, gamma ray and/or normalized drilling rate are usually better than those estimated using shale resistivity overlay methods. When log quality is good, the standard deviation of unaveraged effective vertical stress is less than 0.25 ppg. Resulting pore pressure calculations are equally precise, while still being sensitive to real changes in pore fluid pressure. Prior art methods for calculating pore pressure and fracture gradient provide values within 2 ppg of the true pressure.

The present invention utilizes only two input variables (calculated or measured directly), lithology and porosity, which are required to estimate pore fluid pressure and in situ stresses from well logs.

The total overburden stress ($S_v$) is the force resulting from the weight of overlying material, e.g.

$$S_v = \int^{surface}_{depth}[\rho_{matrix}(1-\phi)+\rho_{fluid}(\phi)]g dz \quad (1)$$

where g=gravitational constant and φ=fluid filled porosity;

$\rho_{matrix}$=density of the solid portion of the rock which is a function of lithology;

$\rho_{fluid}$=density of the fluid filling the pore space.

Typical matrix densities are 2.65 for quartz sand; 2.71 for limestone; 2.63 to 2.96 for shale; and 2.85 for dolomite, all depending upon lithology.

Effective vertical stress is that portion of the overburden stress which is borne by the rock matrix. The balance of the overburden is supported by the fluid in the pore space. This principal was first elucidated for soils in 1923 and is applied to earth stresses as measured from well logs by this invention. The functional relationship between effective stress and porosity was first elucidated in 1957. The technique described herein combines these concepts by determining porosity from well logs and then using this porosity to obtain vertical effective stress using the equation:

$$\sigma_v = \sigma_{max} S^{\alpha+1}$$

where
- $\sigma_{max}$=theoretical maximum vertical effective stress at which a rock would be completely solid. This is a lithology-dependent constant which must be determined empirically, but is typically 8,000 to 12,000 psi for shales, and 12,000 to 16,000 psi for sands.
- $\alpha$=compaction exponent relating stress to strain. This must also be determined empirically, but is typically 6.35.
- S=solidity=1−porosity
- $\sigma_v$=vertical effective stress.

Figure 35:
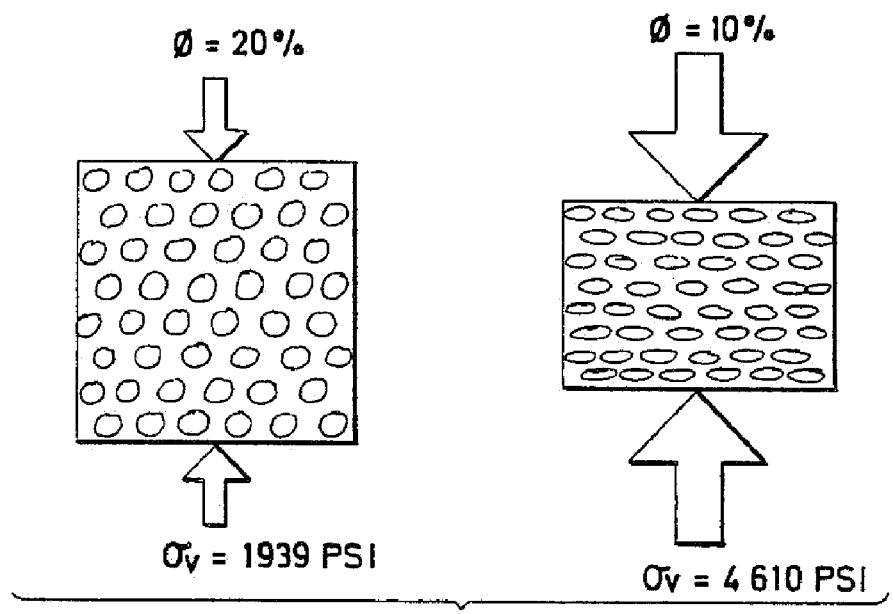
FIG. 35 is a diagrammatic representation of the determination of vertical effective stress.

The effect of vertical stress is diagrammatically shown in FIG. 35. Both sides represent the same mass of like rock formations. The lefthand side represents a low stress condition, for example less than 2000 psi, and a porosity of 20% giving the rock a first volume. The righthand side represents a high stress condition, for example greater than 4,500 psi, yielding a lower porosity of 10% and a reduced second volume. Clearly, the difference in the two samples is the porosity which is directly related to the vertical stress of the overburden.

Horizontal effective stress is related to vertical effective stress as it developed through geological time. The relationship between vertical and horizontal stresses is usually expressed using elastic or poro-elastic theory, which does not take into consideration the way stresses build up through time. The present invention uses visco-plastic theory to describe this time-dependent relationship. The equation relating vertical effective stress to horizontal effective stress is:

$$\sigma_H = \{(-\tfrac{1}{2}\sigma_v + 2\alpha^2\sigma_v^2 + 12\alpha\kappa\sigma_v + 18\kappa^2)/(1-8\alpha^2) + [-\tfrac{1}{2}(23\alpha\kappa + 8\alpha^2\sigma_v)/(1-8\alpha^2)]^2\}^{1/2} + \tfrac{1}{2}(23\alpha\kappa + 8\alpha^2\sigma_v)/(1-8\alpha^2) \quad (3)$$

where
- $\rho_H$=effective horizontal stress
- $\sigma_v$=effective vertical stress
- $\alpha$=dilatency factor
- $\kappa$=coefficient of strain hardening The constants $\alpha$ and $\kappa$ are lithology-dependent and must be determined empirically. Typical values of $\kappa$ range from 0.0 to 20, depending upon lithology, while $\alpha$ typically ranges from 0.26 to 0.32, depending upon lithology. The horizontal stress is shown diagrammatically in FIG. 36.

The technique described herein calculates vertical effective stress from porosity, and total overburden stress from integrated bulk weight of overlying sediments and fluid. Given these two stresses, pore pressure is calculated by determining the difference between the two stresses. This is graphically illustrated in FIG. 37 with the vertical effective stress being the difference between total overburden stress and pore pressure. Effective horizontal stress is calculated from vertical effective stress. Fracture pressure of a formation is almost the same as the horizontal effective stress.

Theory Behind Compiling a Pseudo Log from Offset Log Data (see U.S. Pat. No. 6,885,943)

Figure 38:
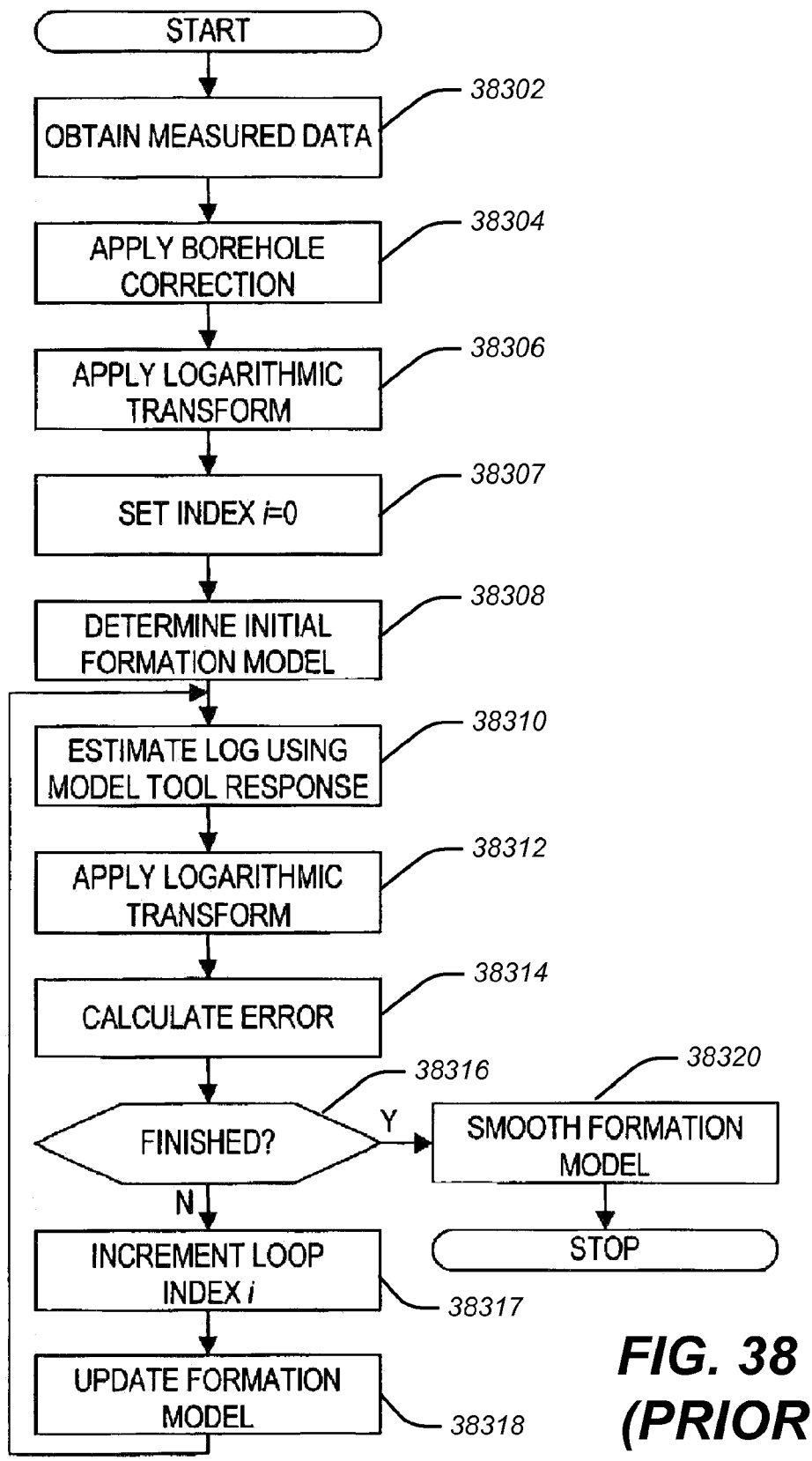
FIG. 38 shows a flowchart of a preferred nonlinear iterative deconvolution method.

FIG. 38 shows a flowchart diagram of a preferred method for deconvolving the measured log data. The preferred method may be implemented as software executed by computer 52. In block 38302, the measured log data is obtained. The data may be in the form of resistivity (or equivalently, conductivity) measurements made at various positions distributed axially along the borehole. Relative dip measurements at axially distributed positions are preferably included too.

In block 38304, the computer 52 preferably adjusts the resistivity measurements to correct for the borehole effect. As one of ordinary skill in the art would be aware, the measurements made by most resistivity tools are affected in a determinable way by the fluid in borehole around the tool. The properties of the fluid and the tool are known and can be combined to determine the adjustment for each measurement to compensate for the borehole effect. The output of this block is hereafter denoted $M_j$, where j is an index that ranges over the measurement positions of interest in the borehole. The measurement positions of interest may be all actual measurement positions, equally-spaced (possibly interpolated) positions, or just selected positions. The measurement positions of interest may depend on any number of factors, and may vary between iterations. In the preferred embodiment, the measurement positions are equally spaced with a spacing somewhat smaller than the minimum spatial resolution of the tool. If resistivity measurements are unavailable for the selected measurement positions, they are preferably determined by interpolation between available measurements.

In block 38306, the computer 52 calculates log $M_j$. The logarithmic transform may employ the natural logarithm or some other base, as desired. In block 38307, loop index i is initialized to zero. In block 38308, computer 52 determines an initial formation model $F_j^i$, where i=0 is the iteration number, and j is again the position index. In one embodiment, the initial formation model is determined in accordance with the inflection point method taught by Strickland in U.S. Pat. No. 5,867,806. However, in a preferred embodiment, the initial formation model is simply:

$$F_j^O = M_j \quad (1)$$

If measurements at multiple depths of investigation are available, the initial formation model is preferably chosen to be the measurements at the shallowest or next-to-shallowest depth of investigation.

In block 38310, the computer 52 calculates the expected resistivity measurements for the current formation model. Typically, model equations are available to calculate the response of the tool to any given formation. Often these equations are 1D (one dimensional) equations that accept formation resistivity as a function of axial position, accept relative dip as a function of axial position, and provide the expected tool measurements as a function of axial position along the borehole. However, more sophisticated model equations are sometimes available and may alternatively be employed. The output of this block is hereafter denoted as $L_j^i$, where i and j have their previously defined meanings.

In block 38312, the computer 52 calculates log $L_j^i$. In block 38314, an error measurement is calculated:

$$\epsilon_i = \Sigma_j (\log(M_j) - \log(L_j^i))^2 \quad (2)$$

This error measurement is indicative of how closely estimated measurements match the actual measurements. In block 38316, the computer 52 performs a test to determine whether further loop iterations are desired. The test may include determining whether the error measurement is less than a predetermined threshold and/or determining whether a maximum number of iterations have already been performed.

If further iterations are desired, then in block 38317, the loop index i is incremented. In block 38318, computer 52 updates the formation model as provided below:

$$\log(F_j^i) = \alpha^j \log(F_j^{i-1}) + \beta(\log(M_j) - \log(L_j^i)) \quad \text{for } i = 1, \quad (3)$$

$$\alpha^j \log(F_j^{i-1}) + \beta(\log(M_j) - \log(L_j^i)) \quad \text{for } i > 1.$$

$$(\log(F_j^{i-1}) - \log(F_j^{i-2}))/(\log(L_j^{i-1}) - \log(L_j^{i-2}))$$

where $\alpha^i$ and $\beta^i$ are weighting factors that may vary slowly with respect to iteration number i. Note that the fraction in equation (3) provides an approximate linearizing factor that appears to adequately compensate for the nonlinearities typically present in LWD resistivity logs. In a preferred embodiment, the $\alpha^i$ weighting factor is fixed, while the $\beta^i$ weighting factor is monotonically decreasing:

$$\alpha^i = 1 \quad (4)$$

$$\beta^i = \pi/2(2)^{-i/2}$$

In an alternative embodiment, both weighting factors are fixed:

$$\alpha^i = 1 \quad (5)$$

$$\beta^i = 1.1$$

It has been observed that other fixed weighting factor values close to one are suitable as well, and may be preferred. In one embodiment, $\alpha^i$ is fixed at 0.9, and, $\beta^i$ is fixed at 1.3. The weighting factors may be adjusted in accordance with additional experience so as to assure a good trade-off between fast convergence and stability.

After the update in block 38318, the method repeats, starting from block 38310. Once the computer 52 determines in block 38316 that enough iterations have been performed, the system smoothes the formation model in block 38320. This smoothing may take the form of a Gaussian filter, although other smoothing filters may be used if desired. This smoothing serves to remove high frequency artifacts and noise that may appear in the updated formation model.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A computer implemented method to use in a drilling system having multiple cutting structures, including a bit and one or more secondary cutting structures, to balance the rate of penetration of the drilling system and the wear on the cutting structures by controlling weight on bit and RPM, the method comprising:
    (O1) calculating a predicted rate of penetration for the bit, using in the calculation the current predicted wear on the bit and the properties of the rock to be penetrated by the bit;
    (O2) calculating a predicted rate of penetration for at least one of the one or more secondary cutting structures, using in the calculation the current predicted wear on the secondary cutting structure and the properties of the rock to be penetrated by the secondary cutting structure;
    (O3) determining the slowest rate of penetration among those calculated for the bit and at least one the one or more secondary cutting structures;
    (O4) calculating the weight on bit and RPM for each of the bit and at least one of the one or more secondary cutting structures to substantially match the determined slowest rate of penetration; and
    (O5) summing the calculated weights on bit to calculate a goal weight on bit for the drilling system and setting a goal RPM for a rotary portion of the drilling system to the slowest RPM calculated for the cutting structures that rotate at substantially the speed of the rotary portion of the drilling system.

2. The method of claim 1 where the well is to be drilled along a predicted path, the method further comprising:
    (P1) constructing a pseudo log for the well;
    (P2) using the pseudo log to calculate shale plasticity along the predicted path;
    (P3) using the pseudo log to calculate confined and unconfined rock strengths along the predicted path;
    where (O1) comprises:
        (O1a) using the calculated shale plasticity and rock strengths in the calculation; and
    where (O2) comprises:
        (O2a) using the calculated shale plasticity and rock strengths in the calculation.

3. The method of claim 2 further comprising:
    (O6) collecting logging data from the well while drilling;
    (O7) correlating the pseudo log with the collected logging data;
    (O8) adjusting the pseudo log in light of the results of correlating.

4. The method of claim 3, further comprising:
    (O9) using the pseudo log to re-calculate shale plasticity along the path;
    (O10) using the pseudo log to re-calculate confined and unconfined rock strengths along the path; and
    (O11) repeating (O3) through (O5).

5. The method of claim 4, further comprising:
repeating (O9) through (O11) throughout the drilling of the well.

6. The method of claim 3, further comprising:
    (O9) using the data collected while logging to re-calculate shale plasticity along the path;
    (O10) using the data collected while logging to re-calculate confined and unconfined rock strengths along the path; and
    (O11) repeating (O3) through (O5).

7. The method of claim 1, further comprising:
adjusting the weight on bit for the drilling system so that it substantially matches the goal weight on bit and adjusting the RPM of the rotary portion of the drilling system so that it substantially matches the goal RPM.

8. A computer program stored on a computer-readable medium for execution by a computer to use in a drilling system having multiple cutting structures, including a bit and one or more secondary cutting structures, to balance the rate of penetration of the drilling system and the wear on the cutting structures by controlling weight on bit and RPM, the computer program comprising:

(O1) instructions for calculating a predicted rate of penetration for the bit, using in the calculation the current predicted wear on the bit and the properties of the rock to be penetrated by the bit;
(O2) instructions for calculating a predicted rate of penetration for at least one of the one or more secondary cutting structures, using in the calculation the current predicted wear on the secondary cutting structure and the properties of the rock to be penetrated by the secondary cutting structure;
(O3) instructions for determining the slowest rate of penetration among those calculated for the bit and at least one the one or more secondary cutting structures;
(O4) instructions for calculating the weight on bit and RPM for each of the bit and at least one of the one or more secondary cutting structures to substantially match the determined slowest rate of penetration; and
(O5) instructions for summing the calculated weights on bit to calculate a goal weight on bit for the drilling system and setting a goal RPM for a rotary portion of the drilling system to the slowest RPM calculated for the cutting structures that rotate at substantially the speed of the rotary portion of the drilling system.

9. The computer program of claim 8 where the well is to be drilled along a predicted path, the computer program further comprising:
(P1) instructions for constructing a pseudo log for the well;
(P2) instructions for using the pseudo log to calculate shale plasticity along the predicted path;
(P3) instructions for using the pseudo log to calculate confined and unconfined rock strengths along the predicted path;
where (O1) comprises:
(O1a) instructions for using the calculated shale plasticity and rock strengths in the calculation; and
where (O2) comprises:
(O2a) instructions for using the calculated shale plasticity and rock strengths in the calculation.

10. The computer program of claim 9 further comprising:
(O6) instructions for collecting logging data from the well while drilling;
(O7) instructions for correlating the pseudo log with the collected logging data;
(O8) instructions for adjusting the pseudo log in light of the results of correlating.

11. The computer program of claim 10, further comprising:
(O9) instructions for using the pseudo log to re-calculate shale plasticity along the path;
(O10) instructions for using the pseudo log to re-calculate confined and unconfined rock strengths along the path; and
(O11) instructions for repeating (O3) through (O5).

12. The computer program of claim 11, further comprising: instructions for repeating (O9) through (O11) throughout the drilling of the well.

13. The computer program of claim 10, further comprising:
(O9) instructions for using the data collected while logging to re-calculate shale plasticity along the path;
(O10) instructions for using the data collected while logging to re-calculate confined and unconfined rock strengths along the path; and
(O11) instructions for repeating (O3) through (O5).

14. The computer program of claim 8, further comprising: instructions for adjusting the weight on bit for the drilling system so that it substantially matches the goal weight on bit and adjusting the RPM of the rotary portion of the drilling system so that it substantially matches the goal RPM.

15. A computer implemented method to use in a drilling system having multiple cutting structures, including a bit and one or more secondary cutting structures, to balance the rate of penetration of the drilling system and the wear on the cutting structures by controlling weight on bit and RPM when drilling a well along a predicted path, the method comprising:
during a planning stage:
(P1) constructing a pseudo log for the well;
(P2) using the pseudo log to calculate shale plasticity along the predicted path;
(P3) using the pseudo log to calculate confined and unconfined rock strengths along the predicted path;
during an operations stage during which the well is drilled:
(O1) calculating a predicted rate of penetration for the bit, using in the calculation the current predicted wear on the bit and the properties of the rock to be penetrated by the bit;
(O2) calculating a predicted rate of penetration for at least one of the one or more secondary cutting structures, using in the calculation the current predicted wear on the secondary cutting structure and the properties of the rock to be penetrated by the secondary cutting structure;
(O3) determining the slowest rate of penetration among those calculated for the bit and at least one the one or more secondary cutting structures;
(O4) calculating the weight on bit and RPM for each of the bit and at least one of the one or more secondary cutting structures to substantially match the determined slowest rate of penetration; and
(O5) summing the calculated weights on bit to calculate a goal weight on bit for the drilling system and setting a goal RPM for a rotary portion of the drilling system to the slowest RPM calculated for the cutting structures that rotate at substantially the speed of the rotary portion of the drilling system; and
(O6) adjusting the weight on bit for the drilling system so that it substantially matches the goal weight on bit and adjusting the RPM of the rotary portion of the drilling system so that it substantially matches the goal RPM.

16. The method of claim 15 in which the operations stage further comprises:
(O7) collecting logging data from the well while drilling;
(O8) correlating the pseudo log with the collected logging data;
(O9) adjusting the pseudo log in light of the results of correlating.

17. The method of claim 16 in which the operations stage further comprises:
(O10) using the pseudo log to re-calculate shale plasticity along the path;
(O11) using the pseudo log to re-calculate confined and unconfined rock strengths along the path; and
(O12) repeating (O3) through (O6).

18. The method of claim 17 in which the operations stage further comprises:
repeating (O10) through (O12) throughout the drilling of the well.

19. The method of claim 16 in which the operations stage further comprises:
(O10) using the data collected while logging to re-calculate shale plasticity along the path;

(O11) using the data collected while logging to re-calculate confined and unconfined rock strengths along the path; and (O12) repeating (O3) through (O6).

20. The method of claim 15 further comprising:

during an analysis stage:
providing data to refine the criteria for selecting the drill bit and the one or more secondary cutting structures.

21. A graphical user interface ("GUI") for use in configuring a drilling system having multiple cutting structures to balance the rate of penetration of the drilling system and the wear on the cutting structures by controlling weight on bit and RPM, the GUI comprising:

a display for constructing a pseudo log;

a display for entering constraints for the multiple cutting structures;

a display for displaying a goal weight on bit for the drilling system calculated using the pseudo log and the constraints; and a display for displaying a goal RPM for a rotary portion of the drilling system calculated using the pseudo log and the constraints.

22. The GUI of claim 21 further comprising:

a display for matching the pseudo log to actual logging data by:
allowing points on a display of the pseudo log to be matched to respective points on a display of the actual logging data; and displaying an altered pseudo log whose alteration was guided by the matched points so that the display of the pseudo log substantially matches the display of the actual logging data.

\* \* \* \* \*